US012625315B2

(12) United States Patent
Creasman et al.

(10) Patent No.: US 12,625,315 B2
(45) Date of Patent: May 12, 2026

(54) LIGHTING FIXTURE WITH WAVEGUIDE

(71) Applicant: Cree Lighting USA LLC, Racine, WI (US)

(72) Inventors: Ethan Creasman, Morrisville, NC (US); Randy Bernard, Durham, NC (US); Dana Deskiewicz, Raleigh, NC (US); Nathan Snell, Raleigh, NC (US); John W. Durkee, Raleigh, NC (US); Kurt S. Wilcox, Libertyville, IL (US); Eric J. Tarsa, Goleta, CA (US)

(73) Assignee: CREE LIGHTING USA LLC, Racine, WI (US)

( * ) Notice: Subject to any disclaimer, the term of this patent is extended or adjusted under 35 U.S.C. 154(b) by 0 days.

(21) Appl. No.: 18/589,944

(22) Filed: Feb. 28, 2024

(65) Prior Publication Data

US 2024/0210609 A1     Jun. 27, 2024

Related U.S. Application Data

(60) Continuation of application No. 17/494,349, filed on Oct. 5, 2021, now Pat. No. 11,940,643, which is a (Continued)

(51) Int. Cl.
*F21V 8/00*          (2006.01)
*F21S 8/06*          (2006.01)
(Continued)

(52) U.S. Cl.
CPC ......... *G02B 6/0021* (2013.01); *G02B 6/0035* (2013.01); *G02B 6/0036* (2013.01);
(Continued)

(58) Field of Classification Search
CPC .. G02B 6/0075; G02B 6/0078; G02B 6/0091; F21V 17/002
See application file for complete search history.

(56) References Cited

U.S. PATENT DOCUMENTS 3,532,871 A     10/1970  Shipman
5,613,751 A      3/1997  Parker et al.
(Continued)

FOREIGN PATENT DOCUMENTS

WO          2014120971 A1     8/2014
WO          2014145283 A1     9/2014

OTHER PUBLICATIONS

Non-Final Office Action for U.S. Appl. No. 15/890,272, mailed Oct. 1, 2019, 12 pages.
(Continued)

*Primary Examiner* — Sean P Gramling
(74) *Attorney, Agent, or Firm* — J. Clinton Wimbish; Maynard Nexsen PC

(57)          ABSTRACT
Generally, embodiment(s) disclosed herein may include modular luminaires and customizable luminaire combinations to produce desired overall illumination patterns, modular luminaires interchangeable between one or more lighting systems/luminaires having differing configurations, and/or luminaires with portions thereof formed primarily by optical waveguides, e.g., a wall sconce where primarily only waveguides extend from the wall. Further, contemplated throughout this disclosure is modification of panel-style and/or blade-style waveguide(s) for use with luminaire configurations having different sizes, shapes, and structural elements including as modular luminaires for use in creating further customizable lighting systems/luminaires.

21 Claims, 78 Drawing Sheets

Related U.S. Application Data continuation-in-part of application No. 16/101,182, filed on Aug. 10, 2018, now Pat. No. 11,137,120, which is a continuation-in-part of application No. 15/890,272, filed on Feb. 6, 2018, now Pat. No. 11,536,894, said application No. 17/494,349 is a continuation-in-part of application No. 15/890,272, filed on Feb. 6, 2018, now Pat. No. 11,536,894, said application No. 17/494,349 is a continuation-in-part of application No. 16/919,533, filed on Jul. 2, 2020, now Pat. No. 11,169,313, which is a continuation of application No. 16/523,006, filed on Jul. 26, 2019, now Pat. No. 10,739,509, which is a division of application No. 15/481,206, filed on Apr. 6, 2017, now Pat. No. 10,459,142, which is a continuation of application No. 14/991,581, filed on Jan. 8, 2016, now Pat. No. 9,625,636, which is a division of application No. 14/577,730, filed on Dec. 19, 2014, now abandoned, and a continuation-in-part of application No. 14/485,609, filed on Sep. 12, 2014, now Pat. No. 9,952,372, and a continuation-in-part of application No. 14/472,035, filed on Aug. 28, 2014, now Pat. No. 9,645,303, and a continuation-in-part of application No. 14/462,426, filed on Aug. 18, 2014, now Pat. No. 10,379,278, and a continuation-in-part of application No. 14/462,391, filed on Aug. 18, 2014, now Pat. No. 9,513,424, said application No. 14/991,581 is a continuation-in-part of application No. 14/292,778, filed on May 30, 2014, now Pat. No. 9,366,799, and a continuation-in-part of application No. PCT/US2014/030017, filed on Mar. 15, 2014, and a continuation-in-part of application No. PCT/US2014/013937, filed on Jan. 30, 2014, and a continuation-in-part of application No. PCT/US2014/013931, filed on Jan. 30, 2014, said application No. 14/991,581 is a continuation-in-part of application No. 14/101,129, filed on Dec. 9, 2013, now Pat. No. 10,234,616, and a continuation-in-part of application No. 14/101,051, filed on Dec. 9, 2013, now Pat. No. 9,366,396, and a continuation-in-part of application No. 14/101,099, filed on Dec. 9, 2013, now Pat. No. 9,411,086, and a continuation-in-part of application No. 14/015,801, filed on Aug. 30, 2013, now Pat. No. 9,291,320, and a continuation-in-part of application No. 13/938,877, filed on Jul. 10, 2013, now Pat. No. 9,389,367, and a continuation-in-part of application No. 13/839,949, filed on Mar. 15, 2013, now Pat. No. 9,581,751, and a continuation-in-part of application No. 13/840,563, filed on Mar. 15, 2013, now Pat. No. 10,436,969, and a continuation-in-part of application No. 13/841,074, filed on Mar. 15, 2013, now Pat. No. 9,625,638, and a continuation-in-part of application No. 13/842,521, filed on Mar. 15, 2013, now Pat. No. 9,519,095, and a continuation-in-part of application No. 13/841,622, filed on Mar. 15, 2013, now Pat. No. 10,436,970.

(60) Provisional application No. 62/455,422, filed on Feb. 6, 2017, provisional application No. 62/009,039, filed on Jun. 6, 2014, provisional application No. 62/005,955, filed on May 30, 2014, provisional application No. 61/922,017, filed on Dec. 30, 2013.

(51) Int. Cl.
| | | |
|---|---|---|
| *F21V 7/00* | (2006.01) | |
| *F21V 17/10* | (2006.01) | |
| *F21V 21/005* | (2006.01) | |
| *F21V 23/00* | (2015.01) | |
| *F21V 23/06* | (2006.01) | |
| *F21Y 101/00* | (2016.01) | |
| *F21Y 103/10* | (2016.01) | |
| *F21Y 103/33* | (2016.01) | |
| *F21Y 115/10* | (2016.01) | |

(52) U.S. Cl.
CPC ......... *G02B 6/0046* (2013.01); *G02B 6/0048* (2013.01); *G02B 6/0063* (2013.01); *G02B 6/0078* (2013.01); *F21S 8/061* (2013.01); *F21V 7/0008* (2013.01); *F21V 17/10* (2013.01); *F21V 21/005* (2013.01); *F21V 23/001* (2013.01); *F21V 23/06* (2013.01); *F21Y 2101/00* (2013.01); *F21Y 2103/10* (2016.08); *F21Y 2103/33* (2016.08); *F21Y 2115/10* (2016.08); *G02B 6/0031* (2013.01)

(56) References Cited

U.S. PATENT DOCUMENTS

| | | | |
|---|---|---|---|
| 5,812,714 | A | 9/1998 | Hulse |
| 5,897,201 | A | 4/1999 | Simon |
| 7,083,313 | B2 | 8/2006 | Smith |
| 7,520,650 | B2 | 4/2009 | Smith |
| 8,430,548 | B1 | 4/2013 | Kelly et al. |
| 8,506,112 | B1 | 8/2013 | Dau et al. |
| 8,541,795 | B2 | 9/2013 | Keller et al. |
| 8,975,827 | B2 | 3/2015 | Chobot et al. |
| 9,366,799 | B2 | 6/2016 | Wilcox et al. |
| 9,581,750 | B2 | 2/2017 | Wilcox et al. |
| 9,666,744 | B2 | 5/2017 | Clements |
| 9,709,725 | B2 | 7/2017 | Wilcox et al. |
| 9,818,919 | B2 | 11/2017 | Lowes et al. |
| 9,835,317 | B2 | 12/2017 | Yuan et al. |
| 9,841,154 | B2 | 12/2017 | Sorenson et al. |
| 9,869,432 | B2 | 1/2018 | Keller et al. |
| 9,952,372 | B2 | 4/2018 | Wilcox et al. |
| 10,278,250 | B2 | 4/2019 | McBryde et al. |
| 10,379,278 | B2 | 8/2019 | Wilcox et al. |
| 10,422,939 | B2 | 9/2019 | Tarsa et al. |
| 10,502,899 | B2 | 12/2019 | Wilcox et al. |
| 2008/0037284 | A1 | 2/2008 | Rudisill |
| 2012/0268966 | A1* | 10/2012 | McCollum ................ F21S 8/06 |
| | | | 977/902 |
| 2012/0287671 | A1 | 11/2012 | Parker et al. |
| 2013/0039050 | A1 | 2/2013 | Dau et al. |
| 2013/0208495 | A1 | 8/2013 | Dau et al. |
| 2014/0211504 | A1 | 7/2014 | Yuan et al. |
| 2014/0313776 | A1 | 10/2014 | Grigore |
| 2016/0161656 | A1* | 6/2016 | York .................... G02B 6/0008 |
| | | | 362/613 |
| 2016/0363711 | A1* | 12/2016 | Meyers ................ G02B 6/0038 |
| 2018/0224596 | A1 | 8/2018 | Creasman et al. |
| 2018/0284339 | A1* | 10/2018 | Isbrucker ............. G02B 6/0018 |

OTHER PUBLICATIONS

Final Office Action for U.S. Appl. No. 15/890,272, mailed Mar. 24, 2020, 13 pages.
Advisory Action for U.S. Appl. No. 15/890,272, mailed Jun. 2, 2020, 3 pages.
Non-Final Office Action for U.S. Appl. No. 15/890,272, mailed Jul. 2, 2020, 12 pages.
Final Office Action for U.S. Appl. No. 15/890,272, mailed Dec. 14, 2020, 14 pages.
Advisory Action for U.S. Appl. No. 15/890,272, mailed Feb. 12, 2021, 3 pages.
Non-Final Office Action for U.S. Appl. No. 15/890,272, mailed Mar. 24, 2021, 10 pages.
Final Office Action for U.S. Appl. No. 15/890,272, mailed Sep. 21, 2021, 8 pages.

(56) References Cited

OTHER PUBLICATIONS

Non-Final Office Action for U.S. Appl. No. 16/101,182, mailed May 29, 2020, 8 pages.
Final Office Action for U.S. Appl. No. 16/101,182, mailed Nov. 12, 2020, 9 pages.
Advisory Action for U.S. Appl. No. 16/101,182, mailed Jan. 14, 2021, 3 pages.
Non-Final Office Action for U.S. Appl. No. 16/101,182, mailed Feb. 11, 2021, 9 pages.
Notice of Allowance for U.S. Appl. No. 16/101,182, mailed May 21, 2021, 10 pages.
Applicant-Initiated Interview Summary for U.S. Appl. No. 15/890,272, mailed Jan. 11, 2022, 4 pages.
Advisory Action for U.S. Appl. No. 15/890,272, mailed Feb. 10, 2022, 3 pages.
Non-Final Office Action for U.S. Appl. No. 15/890,272, mailed Mar. 1, 2022, 8 pages.
Final Office Action for U.S. Appl. No. 15/890,272, mailed Jun. 8, 2022, 6 pages.
Notice of Allowance for U.S. Appl. No. 15/890,272, mailed Aug. 18, 2022, 10 pages.
Non-Final Office Action for U.S. Appl. No. 17/494,349, mailed Dec. 21, 2022, 6 pages.
Non-Final Office Action for U.S. Appl. No. 17/494,349, mailed Jun. 16, 2023, 7 pages.
Applicant-Initiated Interview Summary for U.S. Appl. No. 17/494,349, mailed Sep. 20, 2023, 2 pages.
Notice of Allowance for U.S. Appl. No. 17/494,349, mailed Nov. 22, 2023, 8 pages.

* cited by examiner

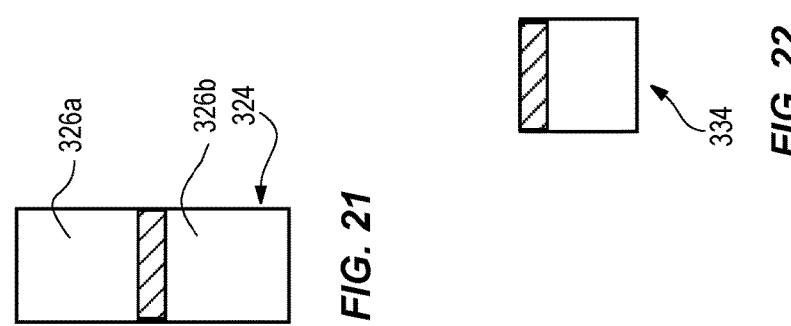
FIG. 21
FIG. 22
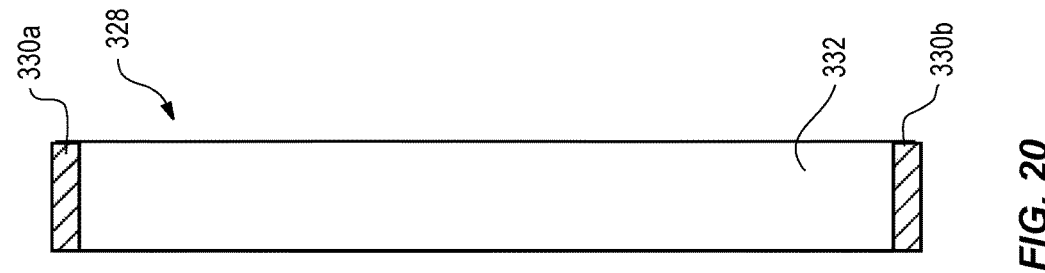
FIG. 20
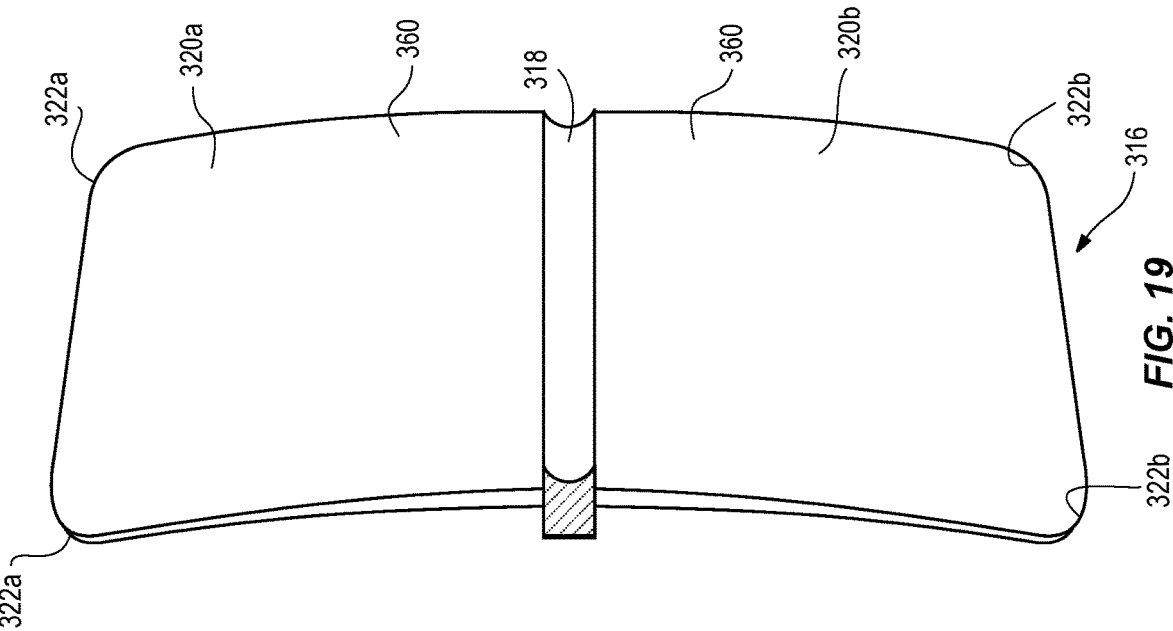
FIG. 19

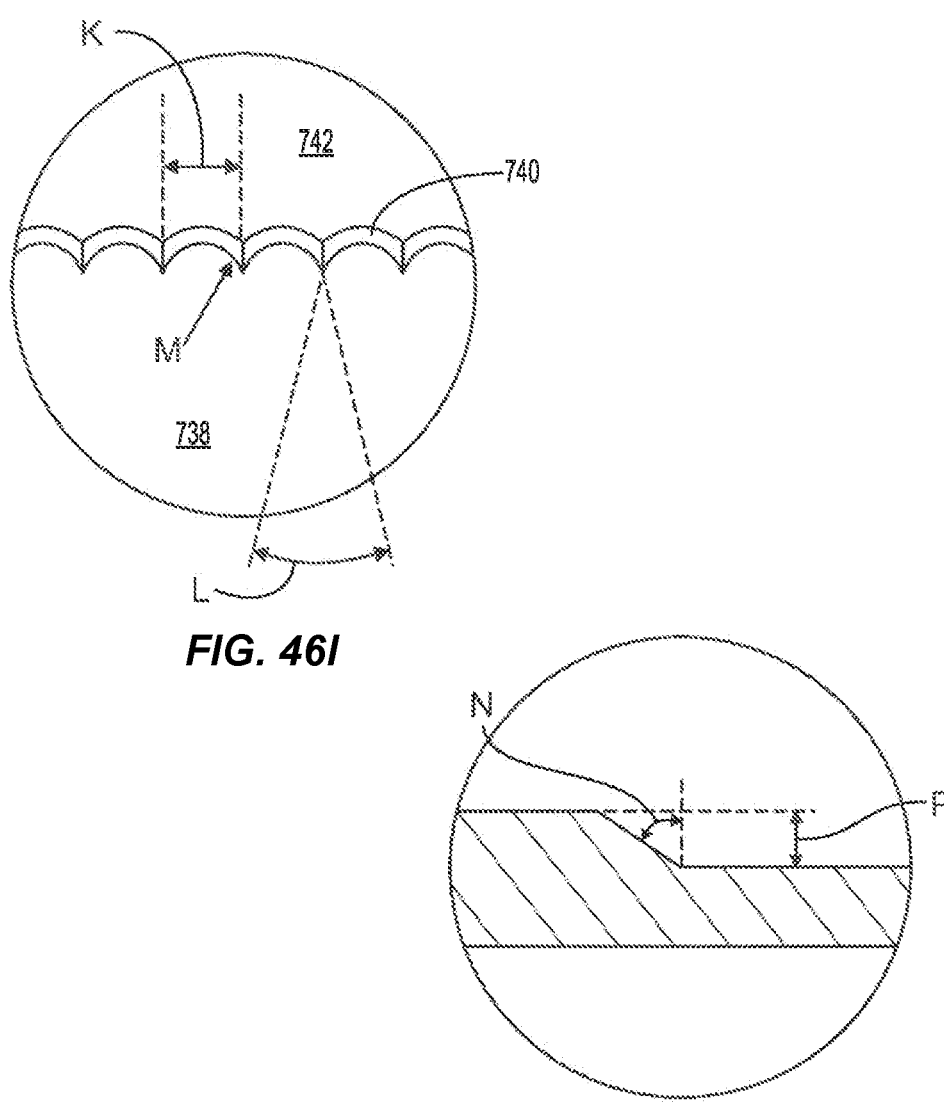
FIG. 46I
FIG. 46J
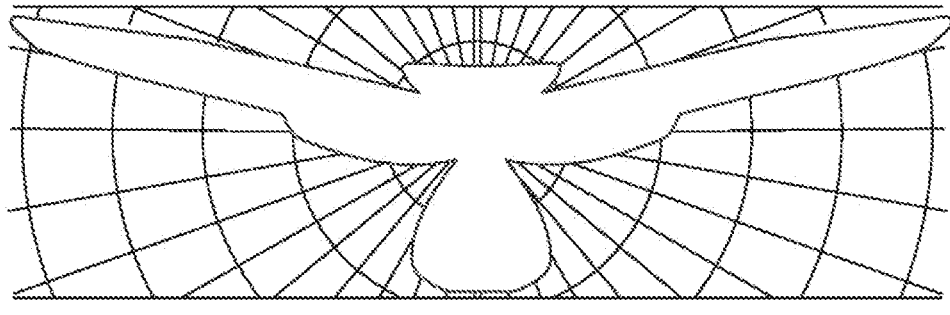
FIG. 46K

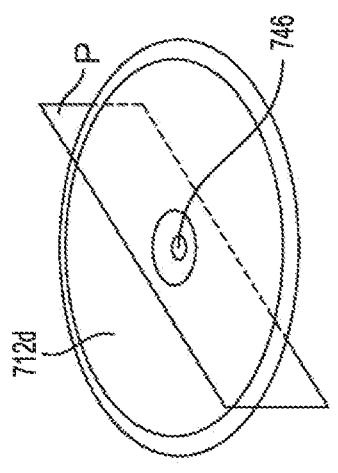
FIG. 59B
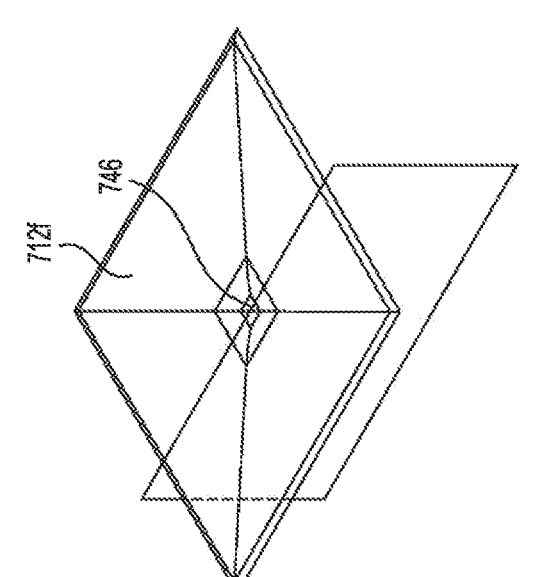
FIG. 60B
FIG. 59A
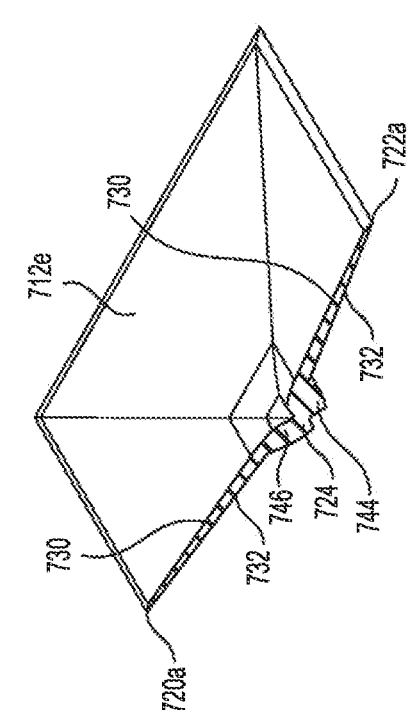
FIG. 60A

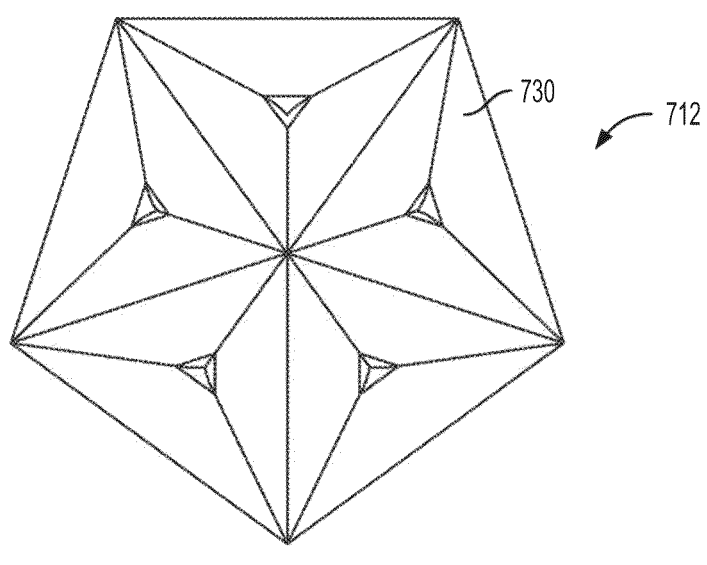
FIG. 67A
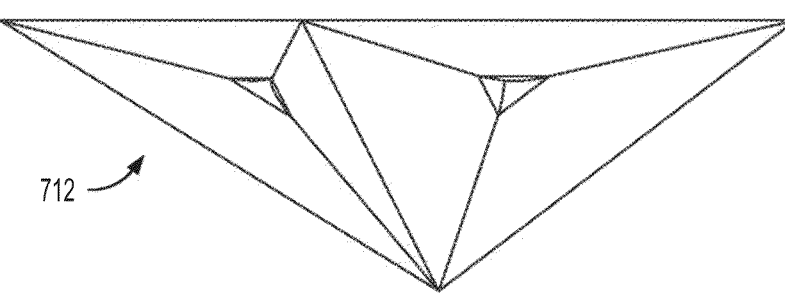
FIG. 67B
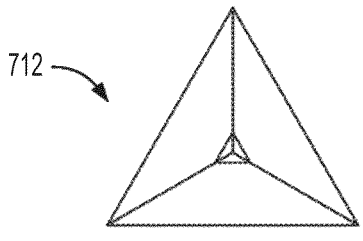
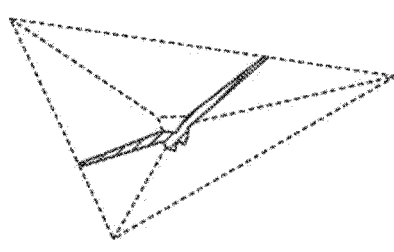
FIG. 67C                    FIG. 67D

LIGHTING FIXTURE WITH WAVEGUIDE

RELATED APPLICATIONS

The present application is a continuation of U.S. patent application Ser. No. 17/494,349, filed Oct. 5, 2021, which is a continuation-in-part of U.S. patent application Ser. No. 15/890,272, filed Feb. 6, 2018 (now U.S. Pat. No. 11,536, 894), which claims the benefit of U.S. Provisional Patent Application Ser. No. 62/455,422, filed Feb. 6, 2017, the contents of which are hereby incorporated herein by reference in their entirety.

U.S. patent application Ser. No. 17/494,349 is a continuation-in-part of U.S. patent application Ser. No. 16/101,182, filed Aug. 10, 2018 (now U.S. Pat. No. 11,137,120), which is a continuation-in-part of U.S. patent application Ser. No. 15/890,272, filed Feb. 6, 2018 (now U.S. Pat. No. 11,536, 894), which claims the benefit of U.S. Provisional Patent Application Ser. No. 62/455,422, filed Feb. 6, 2017, the contents of which are hereby incorporated herein by reference in their entirety.

U.S. patent application Ser. No. 17/494,349 is a continuation-in-part of U.S. patent application Ser. No. 16/919,533, filed Jul. 2, 2020 (now U.S. Pat. No. 11,169,313), which is a continuation of U.S. patent application Ser. No. 16/523, 006, filed Jul. 26, 2019 (now U.S. Pat. No. 10,739,509), which is a divisional of U.S. patent application Ser. No. 15/481,206, filed Apr. 6, 2017 (now U.S. Pat. No. 10,459, 142), which is a continuation of U.S. patent application Ser. No. 14/991,581, filed Jan. 8, 2016 (now U.S. Pat. No. 9,625,636), which is a divisional of U.S. patent application Ser. No. 14/577,730, filed Dec. 19, 2014. Said U.S. patent application Ser. No. 14/991,581 is further a continuation-in-part of U.S. patent application Ser. No. 14/015,801, filed Aug. 30, 2013 (now U.S. Pat. No. 9,291,320), and is further a continuation-in-part of U.S. patent application Ser. No. 13/842,521, filed Mar. 15, 2013 (now U.S. Pat. No. 9,519, 095), and is further a continuation-in-part of U.S. patent application Ser. No. 13/839,949, filed Mar. 15, 2013 (now U.S. Pat. No. 9,581,751), and is further a continuation-in-part of U.S. patent application Ser. No. 13/841,074, filed Mar. 15, 2013 (now U.S. Pat. No. 9,625,638), and is further a continuation-in-part of U.S. patent application Ser. No. 13/841,622, filed Mar. 15, 2013 (now U.S. Pat. No. 10,436, 970), and is further a continuation-in-part of U.S. patent application Ser. No. 13/840,563, filed Mar. 15, 2013 (now U.S. Pat. No. 10,436,969), and is further a continuation-in-part of U.S. patent application Ser. No. 13/938,877, filed Jul. 10, 2013 (now U.S. Pat. No. 9,389,367), and is further a continuation-in-part of U.S. patent application Ser. No. 14/101,099, filed Dec. 9, 2013 (now U.S. Pat. No. 9,411, 086), and is further a continuation-in-part of U.S. patent application Ser. No. 14/101,129, filed Dec. 9, 2013 (now U.S. Pat. No. 10,234,616), and is further a continuation-in-part of U.S. patent application Ser. No. 14/101,051, filed Dec. 9, 2013 (now U.S. Pat. No. 9,366,396), and is further a continuation-in-part of International Patent Application Ser. No. PCT/US2014/013931, filed Jan. 30, 2014, and is further a continuation-in-part of International Patent Application Ser. No. PCT/US2014/013937, filed Jan. 30, 2014, and is further a continuation-in-part of International Patent Application Ser. No. PCT/US2014/030017, filed Mar. 15, 2014, and is further a continuation-in-part of U.S. patent application Ser. No. 14/292,778, filed May 30, 2014 (now U.S. Pat. No. 9,366,799), and is further a continuation-in-part of U.S. patent application Ser. No. 14/485,609, filed Sep. 12, 2014, (now U.S. Pat. No. 9,952,372), and is further a continuation-in-part of U.S. patent application Ser. No. 14/462,426, filed Aug. 18, 2014 (now U.S. Pat. No. 10,379, 278), which claims the benefit of U.S. Provisional Patent Application Ser. No. 61/922,017, filed Dec. 30, 2013, and further claims the benefit of U.S. Provisional Patent Application Ser. No. 62/005,955, filed May 30, 2014, and further claims the benefit of U.S. Provisional Patent Application Ser. No. 62/009,039, filed Jun. 6, 2014. Said U.S. patent application Ser. No. 14/991,581, filed Jan. 8, 2016 (now U.S. Pat. No. 9,625,636), further comprises a continuation-in-part of U.S. patent application Ser. No. 14/462,391, filed Aug. 18, 2014 (now U.S. Pat. No. 9,513,424), and further comprises a continuation-in-part of U.S. patent application Ser. No. 14/472,035, filed Aug. 28, 2014 (now U.S. Pat. No. 9,645,303). The contents of each of the above applications is hereby incorporated herein by reference in its entirety.

FIELD OF THE DISCLOSURE

The present subject matter relates to general illumination lighting, and more particularly, to modular and/or interchangeable outdoor, indoor, and/or enclosed structure luminaires usable, for example, in home, office, and/or warehouse settings.

BACKGROUND

Large areas of open indoor space, such as an office or warehouse spaces, require sufficient lighting to allow for safe and comfortable activities by persons occupying or visiting the space at all times including periods when natural lighting, such as that provided by windows, is unavailable or reduced during nighttime, rainy or foggy weather conditions, or in the absence of windows. An indoor luminaire for large indoor spaces or smaller indoor spaces, such as hallways or individual office spaces, must illuminate spaces varying in size, floor plan, and intended use. It may be useful for such a luminaire to provide customizable illumination patterns in order to effectively match the light produced by the luminaire with the characteristics of the space to be illuminated. Still further, such a luminaire should be universal in the sense that the luminaire can be mounted in various enclosed and non-enclosed locations, on poles or on a surface (such as a wall or ceiling), and preferably present a uniform appearance, while further being customizable such that desired illumination patterns may be achieved along with the universal quality of such luminaire. Additionally, such a luminaire should be aesthetically pleasing, and further versatile enough to provide illumination patterns suitable for the varied environments mentioned hereinabove.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications.

An optical waveguide mixes and directs light emitted by one or more light sources, such as one or more LEDs. A typical optical waveguide includes three main components: one or more coupling elements, one or more distribution elements, and one or more extraction elements. The coupling component(s) direct light into the distribution element (s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

The description provided in the background section should not be assumed to be prior art merely because it is mentioned in or associated with the background section. The background section may include information that describes one or more aspects of the subject technology.

SUMMARY

Generally, embodiment(s) disclosed herein may include modular luminaires and customizable luminaire combinations to produce desired overall illumination patterns, modular luminaires interchangeable between one or more lighting systems/luminaires having differing configurations, and/or luminaires with portions thereof formed primarily by optical waveguides, e.g., a wall sconce where primarily only waveguides extend from the wall. Further, contemplated throughout this disclosure is modification of panel-style and/or blade-style waveguide(s) for use with luminaire configurations having different sizes, shapes, and structural elements including as modular luminaires for use in creating further customizable lighting systems/luminaires.

According to an aspect of the present disclosure, a luminaire comprises a housing and at least one waveguide comprising first and second opposite waveguide ends, a coupling portion disposed at the first waveguide end, and a light emitting portion disposed between the first and second waveguide ends. The luminaire is further arranged such that the first waveguide end is disposed adjacent a first luminaire end and the second waveguide end is disposed at a second luminaire end opposite the first luminaire end. Still further, the luminaire comprises at least one LED element disposed within the housing adjacent the coupling portion of the at least one waveguide such that the at least one waveguide provides a first illumination pattern and the at least one waveguide is interchangeable with another waveguide that provides a second illumination pattern.

According to another aspect of the present disclosure, a lighting system comprises at least one luminaire, which comprise a housing and one or more LED elements disposed therein, and a plurality of waveguides, which comprise a coupling portion and a light emitting portion. Further according to this aspect, the plurality of waveguides is coupled to the housings of the at least one luminaire with the coupling portions of each waveguide adjacent the one or more LED elements, and each waveguide is interchangeable with another waveguide of the plurality of waveguides.

According to still another aspect of the present disclosure, a method of producing an illumination pattern comprises providing a luminaire comprising a luminaire housing with one or more optical waveguide coupling positions wherein at least first and second optical waveguide bodies each comprise a shape adapted to be operatively coupled with the one or more optical waveguide coupling positions. This method further comprises disposing the at least first and second optical waveguide bodies at corresponding one or more optical waveguide coupling positions wherein the first optical waveguide body is adapted to develop a first illumination pattern and the second optical waveguide body is adapted to develop a second illumination pattern, and arranging the at least first and second optical waveguide bodies in the one or more optical waveguide coupling positions.

In accordance with yet another aspect of the present disclosure, an optical waveguide system comprises a modular waveguide comprising first and second opposite waveguide ends, a coupling portion disposed at the first waveguide end, and a light emitting portion disposed between the first and second waveguide ends. This system is further arranged such that the coupling portion of the modular waveguide is disposed adjacent at least one LED element disposed within a luminaire, the first waveguide end is disposed adjacent a first luminaire end and the second waveguide end is disposed at a second luminaire end opposite the first luminaire end, and an illumination pattern produced by the luminaire is customized by interchanging the modular waveguide.

According to another aspect of this disclosure, a lighting system comprises at least first and second luminaires wherein each luminaire comprises a housing, an optical waveguide suspended from the associated housing, and one or more LEDs disposed adjacent the optical waveguide. Further in accordance with this aspect, the system comprises circuitry disposed within the housing of the first luminaire wherein the circuitry comprises LED driving circuitry and power circuitry, the power circuitry provides power to the first luminaire and at least a second luminaire, and the second luminaire is modular.

According to another aspect, an apparatus comprises a housing with one or more LEDs disposed therein and an optical waveguide comprising a coupling portion and a light emission portion wherein the one or more LEDs direct light into the coupling portion of the optical waveguide, and wherein the housing and the optical waveguide at least partially perform a non-lighting function.

According to a still further aspect, a lighting system comprises a plurality of optical waveguides, one or more light emitting diodes associated with each of the optical waveguides of the plurality of optical waveguides, and a housing corresponding with each of the optical waveguides of the plurality of optical waveguides wherein the one or more light emitting diodes are disposed within the housing and adjacent the associated optical waveguide. The housing associated with each of the optical waveguides is disposed along a light coupling edge of the optical waveguide, and the system further comprises a connection portion disposed along an edge of one or more optical waveguides of the plurality of optical waveguides other than the light coupling edge wherein the one or more of the plurality of optical waveguides are connectable with one another by the connection portion.

Yet another aspect contemplates a luminaire comprising a moveable optical waveguide and a housing comprising a driving circuit and one or more LEDs. The moveable optical waveguide is operatively coupled to the housing such that the LEDs direct light into the optical waveguide, and the moveable waveguide comprises at least first and second positions wherein the optical waveguide is aligned with the housing in the first position, wherein the optical waveguide extends from the housing in the second position, and wherein the optical waveguide moves from the first position to the second position within the housing.

According to another aspect, individual example lighting system/luminaire configurations may have interchangeable luminaires and/or waveguides, e.g., a wall fixture formed from four interchangeable, modular luminaires wherein each waveguide is also modular and/or interchangeable. In accordance with this aspect, the versatility and customizability of disclosed luminaire configurations, housings, and/or mountings may be increased by the interchangeability and/or modularity of the luminaires and/or the waveguides disposed therein.

In keeping with aspects of this disclosure, one or more waveguides may partially surround or cover portions of luminaire housings, e.g., one or more waveguides may be secured about a housing of a suspended fixture. Further in accordance with aspects of this disclosure, one or more luminaire(s), troffer(s), and/or wall sconce(s) may include one or more waveguide(s) disposed therein according to particular arrangements, e.g., a troffer with a blade-style or panel-style waveguide suspended vertically.

Other aspects and advantages will become apparent upon consideration of the following detailed description and the attached drawings wherein like numerals designate like structures throughout the specification.

BRIEF DESCRIPTION OF THE DRAWING FIGURES

The accompanying drawings, which are included to provide further understanding and are incorporated in and constitute a part of this specification, illustrate disclosed embodiments and together with the description serve to explain the principles of the disclosed embodiments.

FIG. 19 is a side isometric view of another embodiment of a luminaire that comprises a plurality of optical waveguides in a wall sconce configuration.

FIG. 20 is a front elevational view of another embodiment of a luminaire that comprises one or more optical waveguides with two housings in a wall sconce configuration.

FIG. 21 is a front elevational view of another embodiment of a luminaire that comprises a plurality of optical waveguides in a wall fixture configuration.

FIG. 22 is a front elevational view of a luminaire that comprises an optical waveguide in a pathway lighting configuration.

FIG. 46C is a fragmentary view of an extraction feature used in one embodiment of the disclosure.

FIG. 46D is a fragmentary view of an extraction feature used in a second embodiment of the disclosure.

9

Figure 46A:
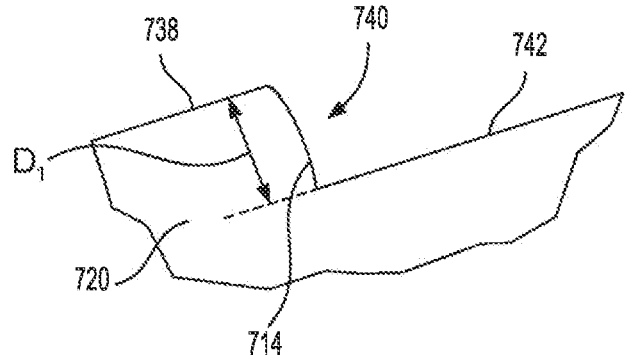
FIG. 46A is an enlarged, fragmentary side elevational view of an extraction feature as referenced by the view line 46A-46A of FIG. 44A.
Figure 46B:
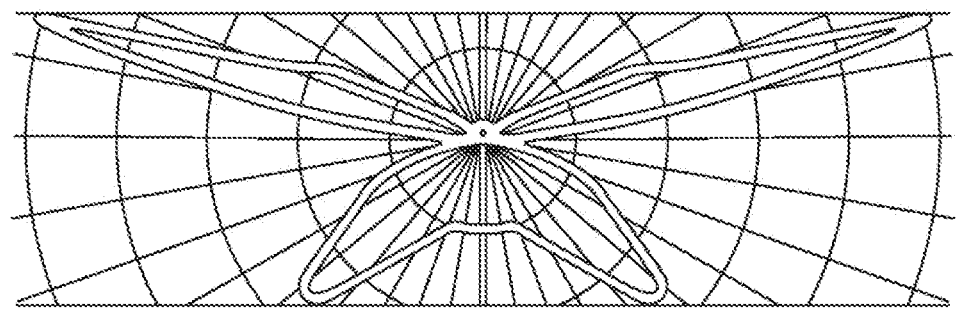
FIG. 46B is a graph illustrating a desired light distribution emitted from the luminaire of FIGS. 43 and 44A.
Figure 46E:
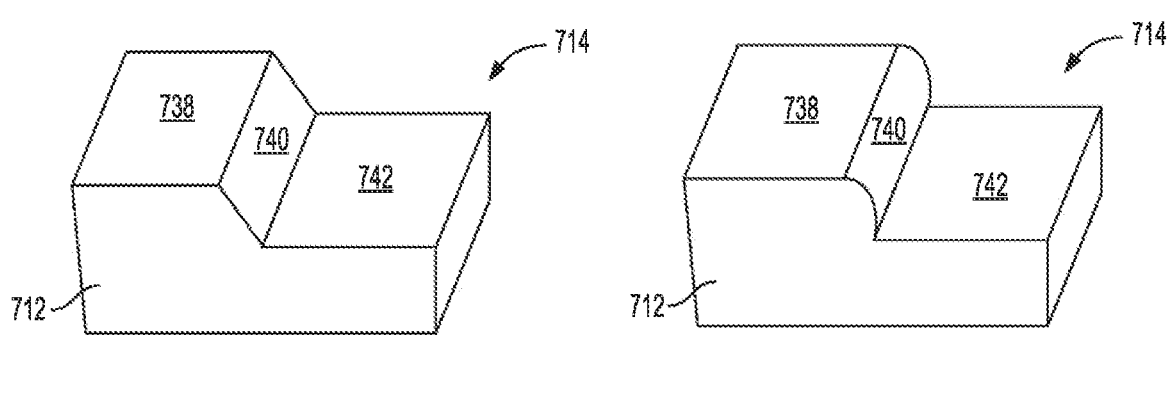
FIG. 46E is a fragmentary isometric view of a waveguide surface showing a particular embodiment of extraction features extending outwardly from the surface of the waveguide.
Figure 46E:
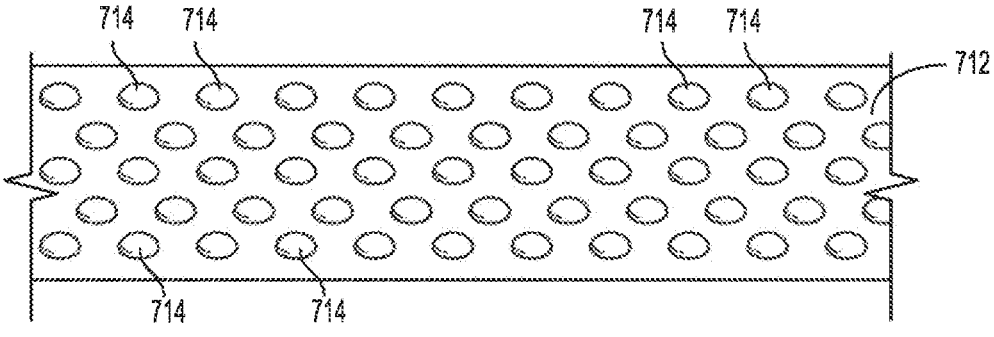
Figure 46F:
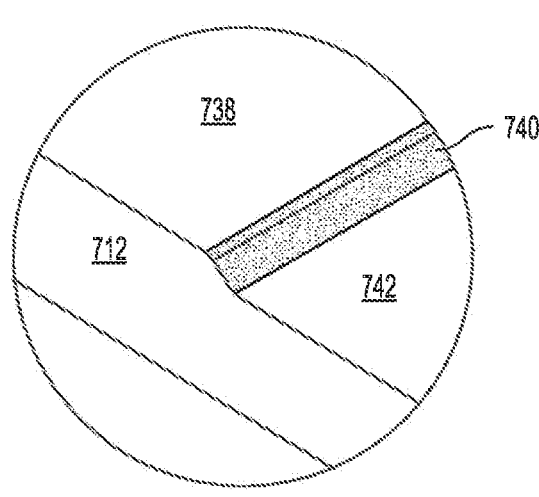
FIG. 46F is fragmentary view of an extraction feature used in a further embodiment of the disclosure.
Figure 46G:
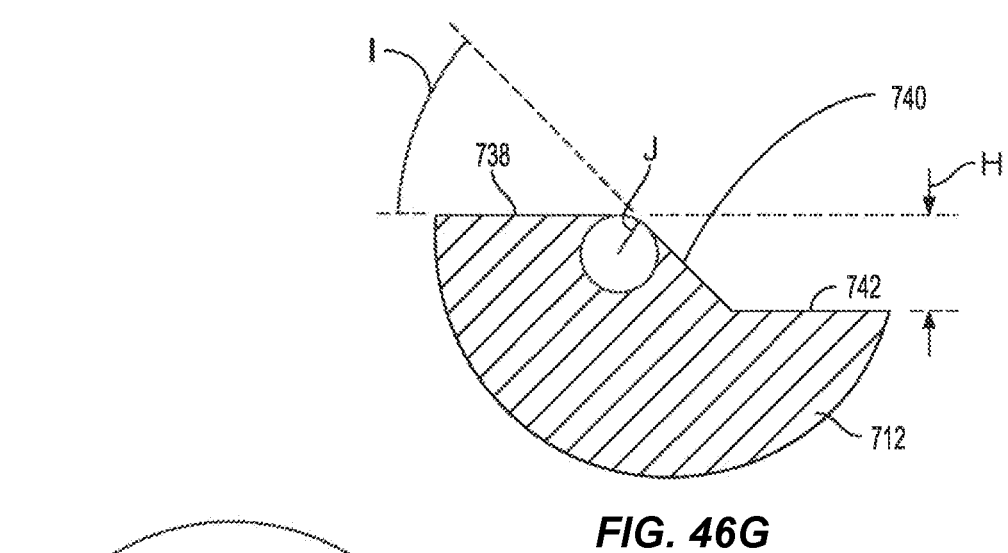
FIG. 46G is an enlarged, fragmentary, cross sectional view of the extraction feature of FIG. 46F.
Figure 46H:
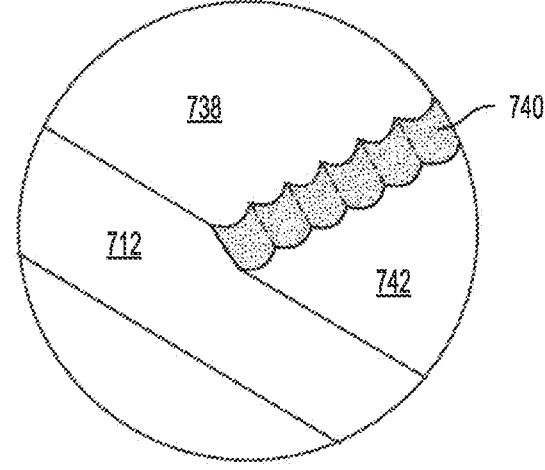
FIG. 46H is a fragmentary view of an extraction feature used in a further embodiment of the disclosure.

FIG. 46I is an enlarged plan view of the extraction feature of FIG. 46H.

FIG. 46J is an enlarged, fragmentary, cross sectional view of the extraction feature of FIG. 46H.

Figure 43:
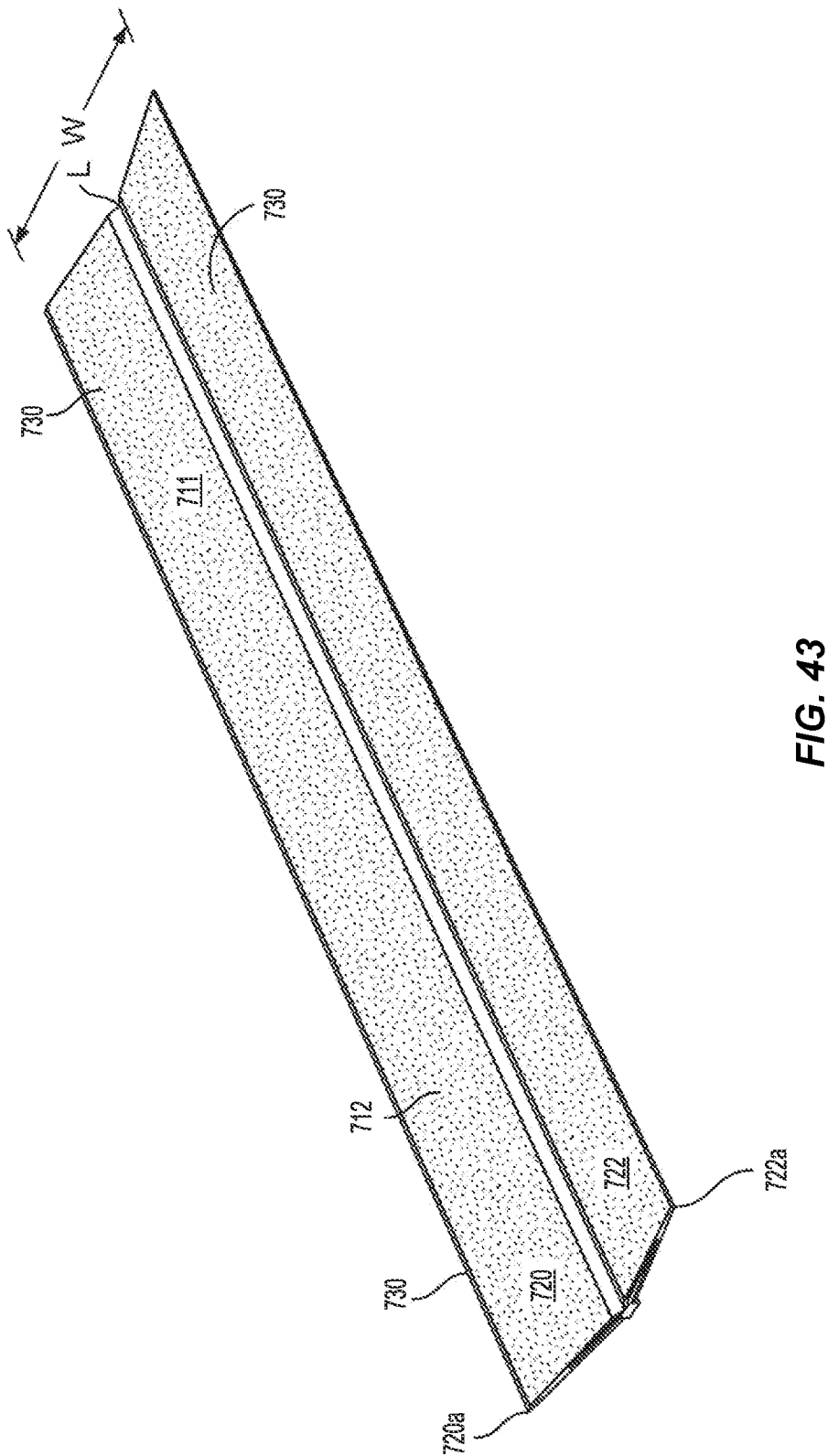
FIG. 43 is an isometric view showing an embodiment of a disclosed luminaire.
Figure 44A:
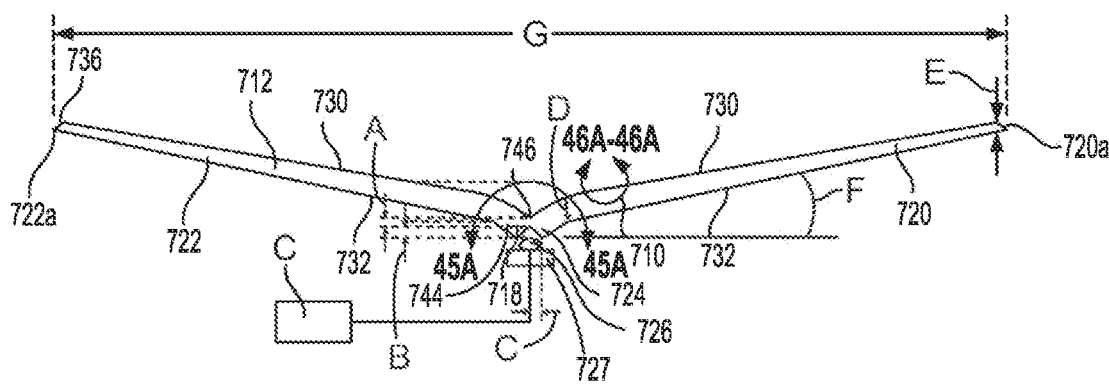
FIG. 44A is a combined end elevation view and block diagram of the embodiment of FIG. 43.

FIG. 46K is a graph illustrating an alternative desired light distribution emitted from the luminaire of FIGS. 43 and 44A.

Figure 47A:
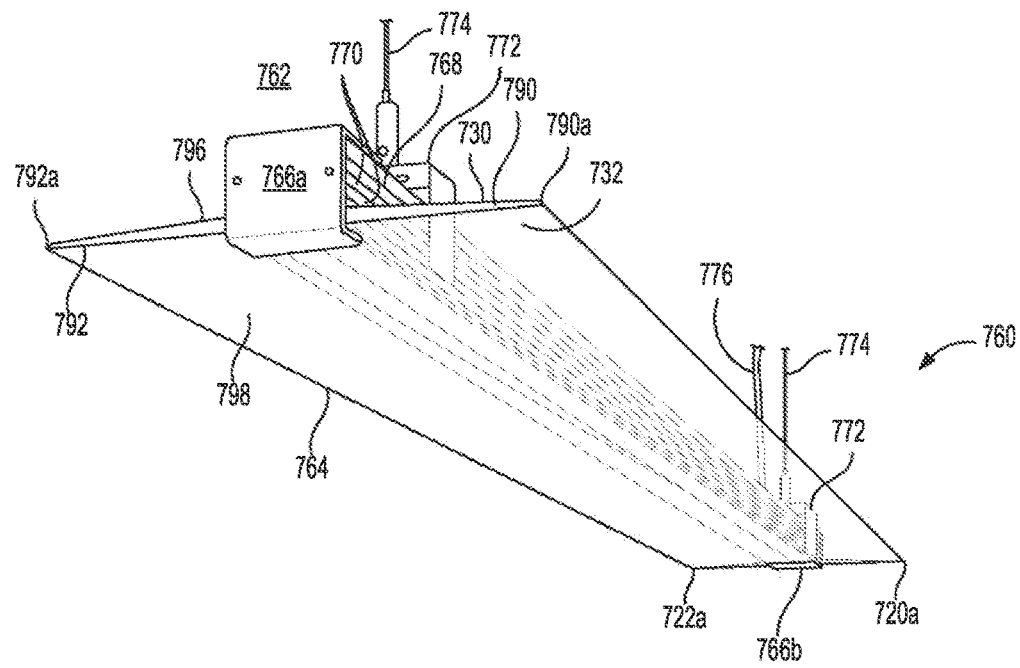

FIG. 47A is a perspective view of a further embodiment of a luminaire.

Figure 47B:
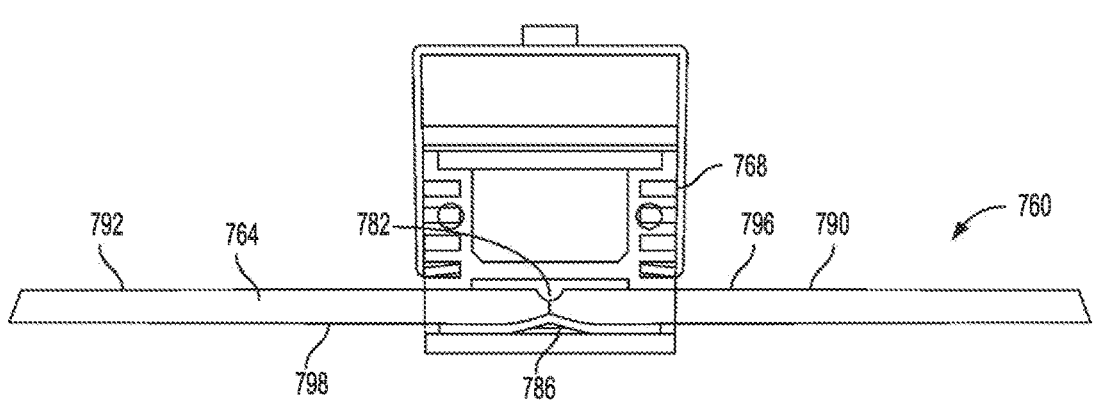

FIG. 47B is an end elevational view of a luminaire that is a modified version of that shown in FIG. 47A with an end cap removed.

Figure 47C:
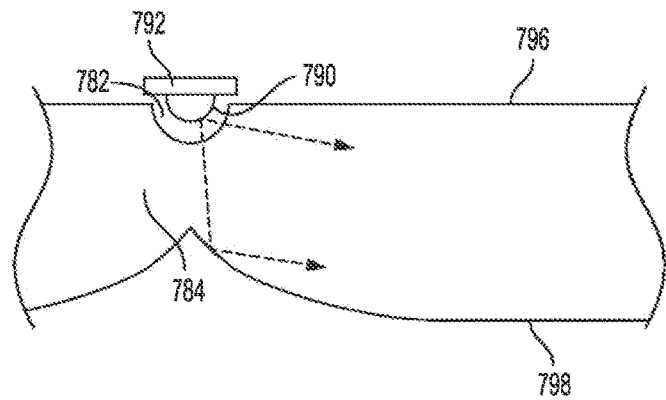

FIG. 47C is an enlarged, fragmentary side elevational view of the central section of the waveguide body of FIG. 47B.

Figure 48A:
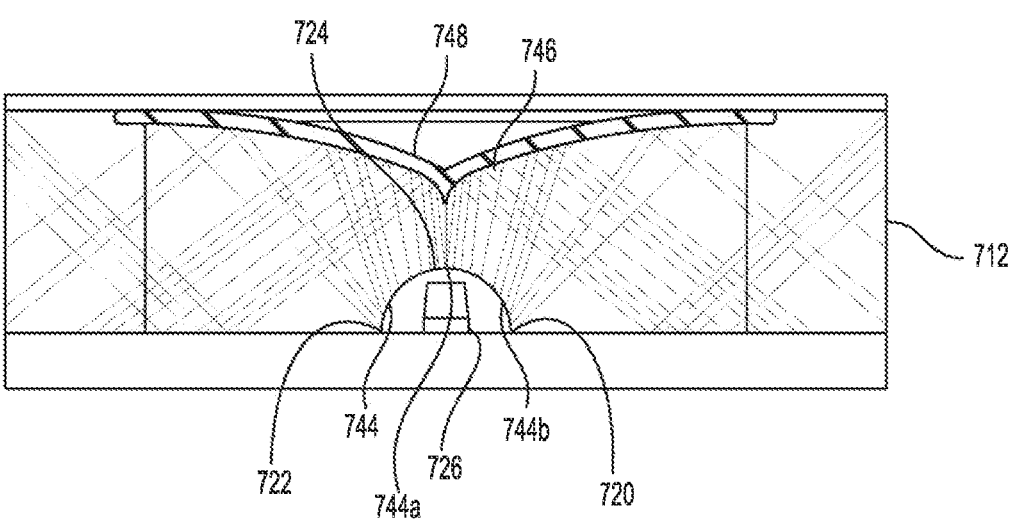

FIG. 48A is an enlarged, fragmentary cross-sectional view of a central section of any of the waveguide bodies described herein showing a light source located proximal the central section and a mirrored top reflector opposite the light source.

Figure 48B:
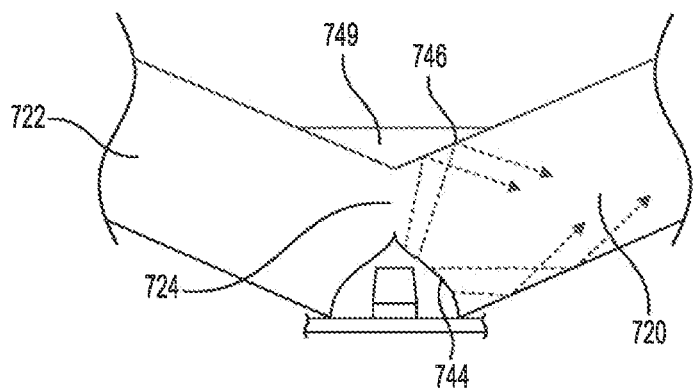

FIG. 48B is an enlarged, fragmentary end view of a central section showing a specular reflective body located in the V-shaped convergence between the first and second sides of the waveguide body.

Figure 49:
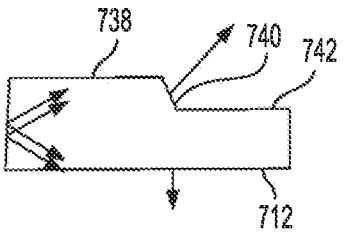

FIG. 49 is a diagram showing light rays traveling through a waveguide body having facets disposed at a first angle.

Figure 50:
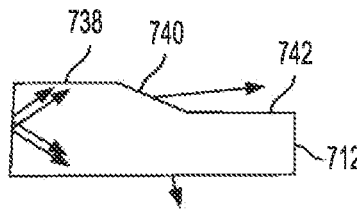

FIG. 50 is a diagram showing light rays traveling through a waveguide having facets disposed at a second angle shallower than the facets of FIG. 49.

Figure 51:
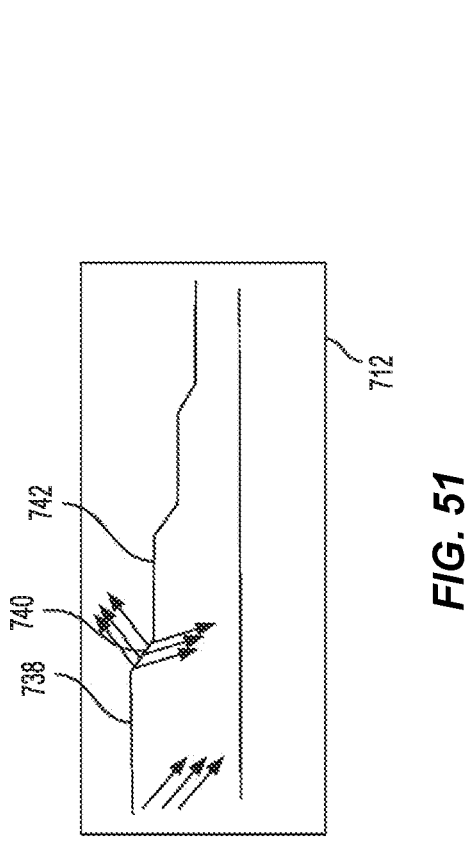

FIG. 51 is a diagram showing light rays traveling through the waveguide body in another embodiment of a disclosed luminaire.

Figure 52:
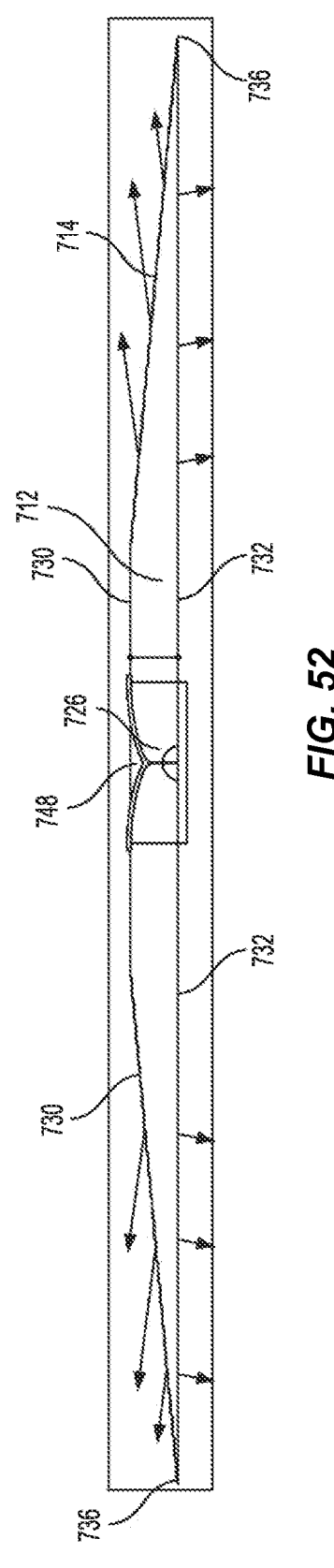

FIG. 52 is a side elevational view of a waveguide used in yet another embodiment of a disclosed luminaire.

Figures 53, 54, 55A, 55B, 56A, 56B:
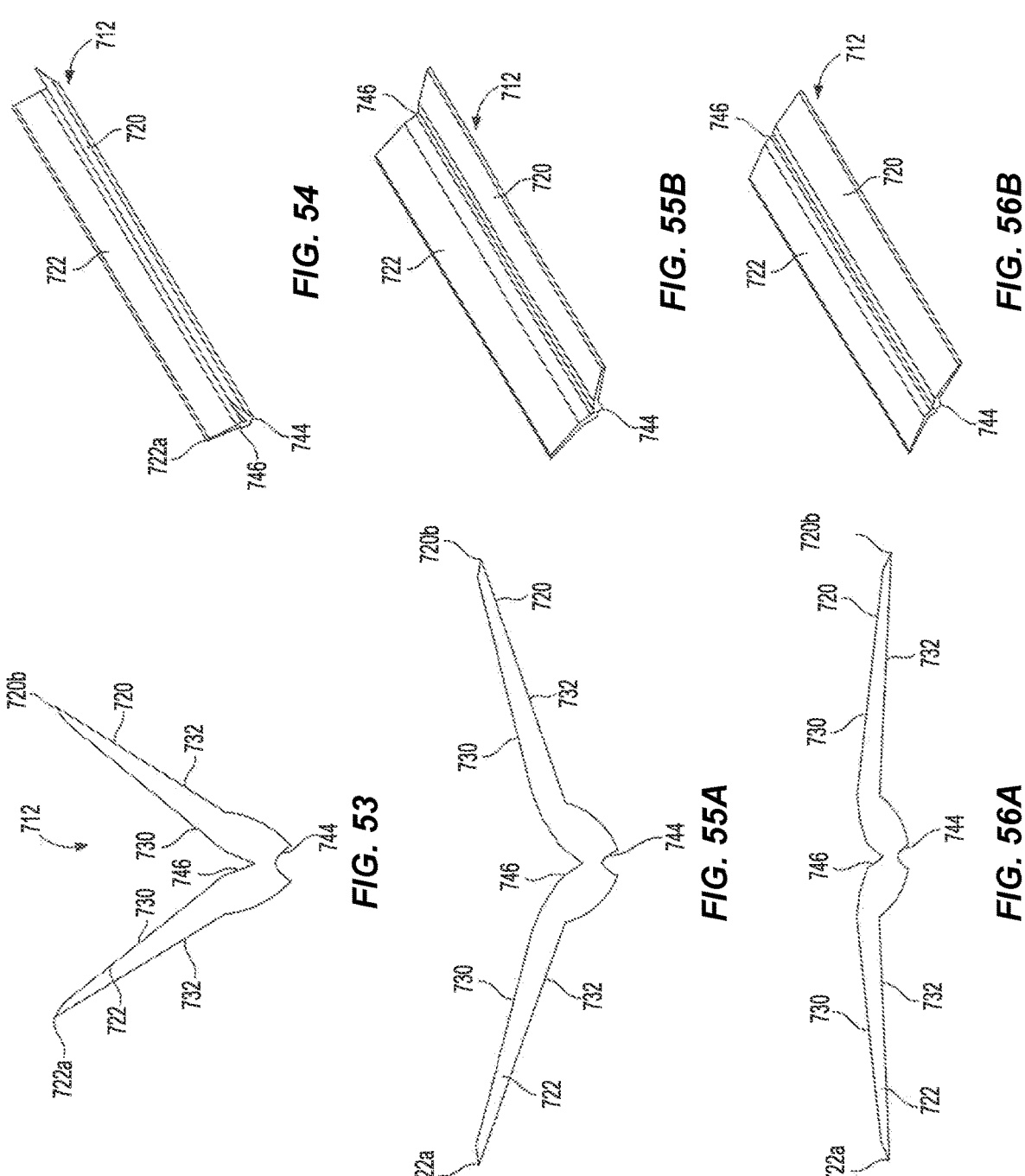

FIG. 53 is an end elevational view of a waveguide body usable in a still further embodiment of a luminaire.

FIG. 54 is an isometric view of the waveguide body of FIG. 53.

FIG. 55A is an end elevational view of another waveguide body usable in yet another embodiment of a disclosed luminaire.

FIG. 55B is an isometric view of the waveguide body of FIG. 55A.

FIG. 56A is an end elevational view of a waveguide body usable in a still further embodiment of a luminaire.

FIG. 56B is an isometric view of the waveguide body of FIG. 56A.

Figures 57A, 57B, 58A, 58B:
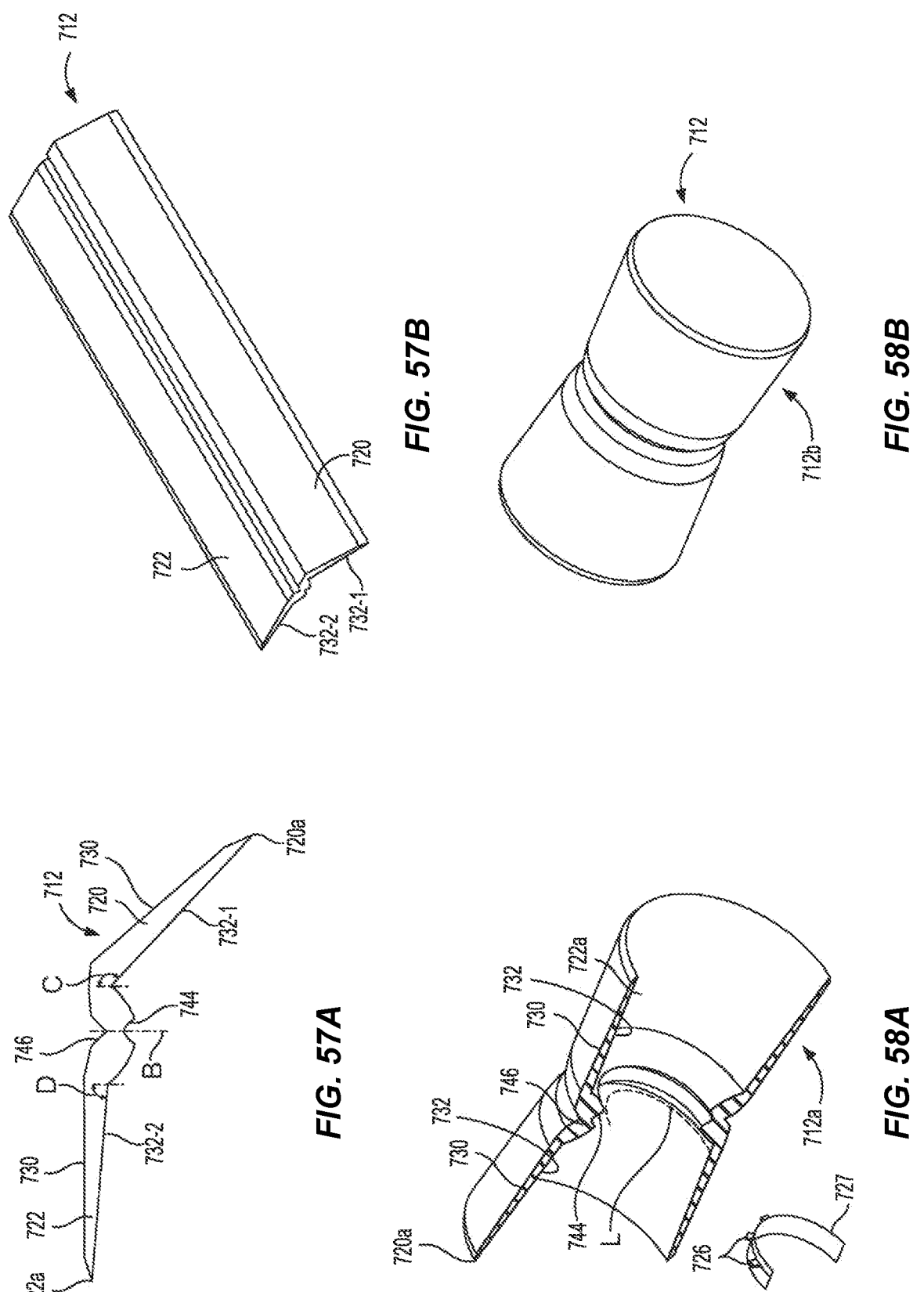

FIG. 57A is an end elevational view of a waveguide body usable in another embodiment of a luminaire.

FIG. 57B is an isometric view of the waveguide body of FIG. 57A.

FIG. 58A is an isometric view of yet another waveguide body usable in a still further embodiment of a luminaire.

FIG. 58B is an isometric view of a still further waveguide body usable in another embodiment of a luminaire.

FIG. 59A is an isometric view of yet another waveguide body usable in a still further embodiment of a luminaire.

FIG. 59B is an isometric view of a still further waveguide body usable in another embodiment of a luminaire.

FIG. 60A is an isometric view of yet another waveguide body usable in a still further embodiment of a luminaire.

FIG. 60B is an isometric view of a still further waveguide body usable in another embodiment of a luminaire.

Figure 61A:
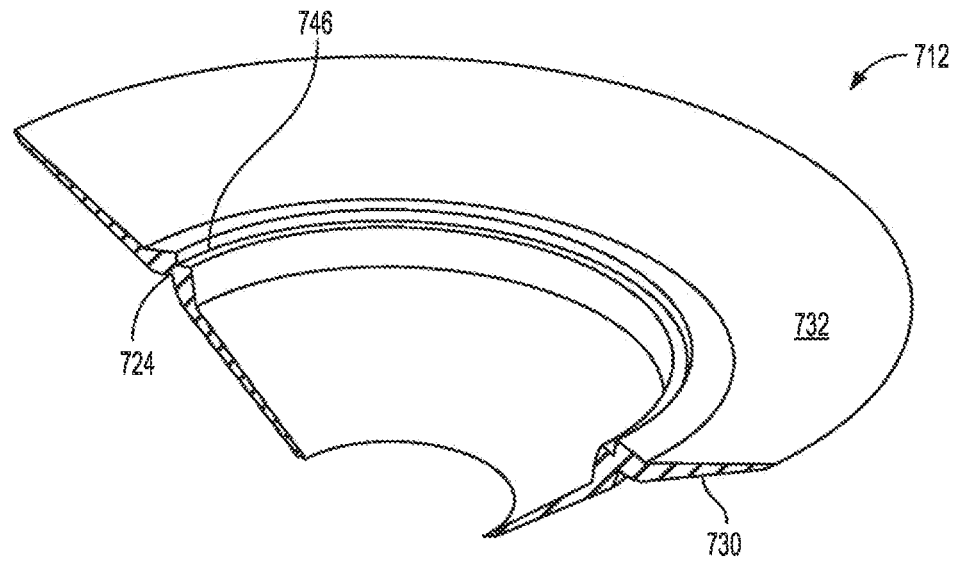

FIG. 61A is an isometric view of yet another waveguide body usable in a still further embodiment of a luminaire.

Figure 61B:
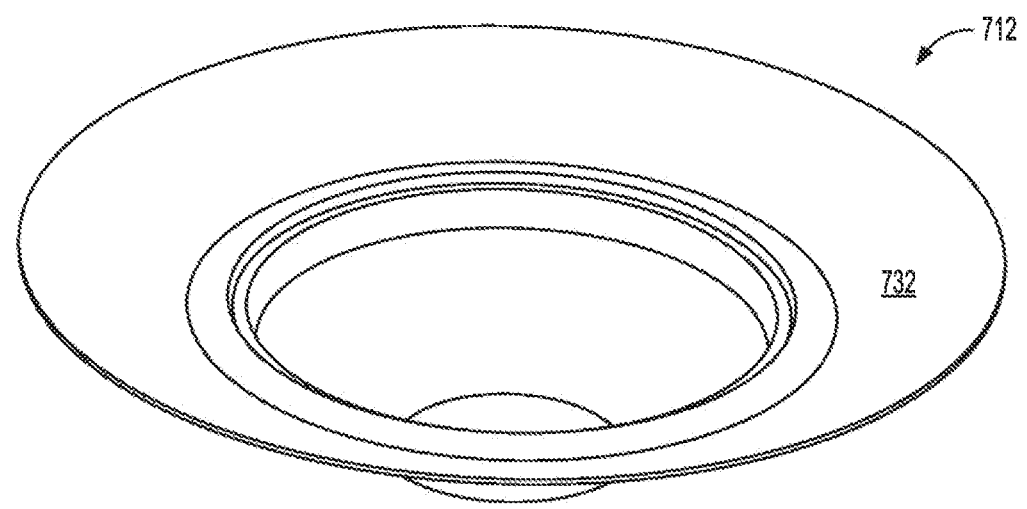

FIG. 61B is an isometric view of a still further waveguide body usable in another embodiment of a luminaire.

Figure 62:
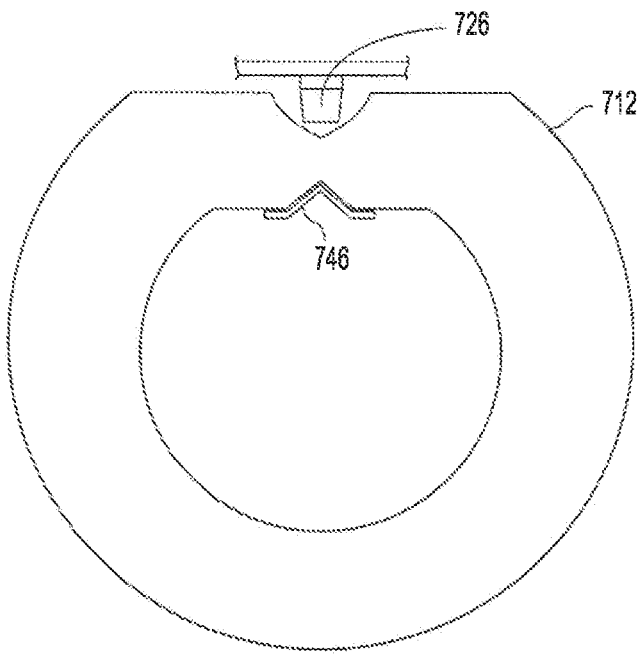

FIG. 62 is an end view of an embodiment of a luminaire.

10

Figure 63:
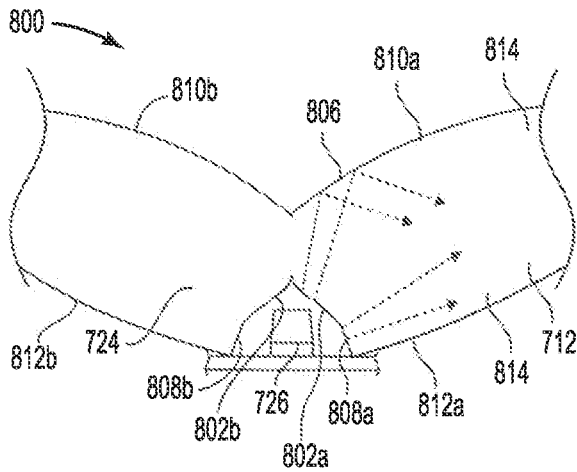

FIG. 63 is a side elevation view of an embodiment of a central section of a waveguide disclosed in the application.

Figure 64A:
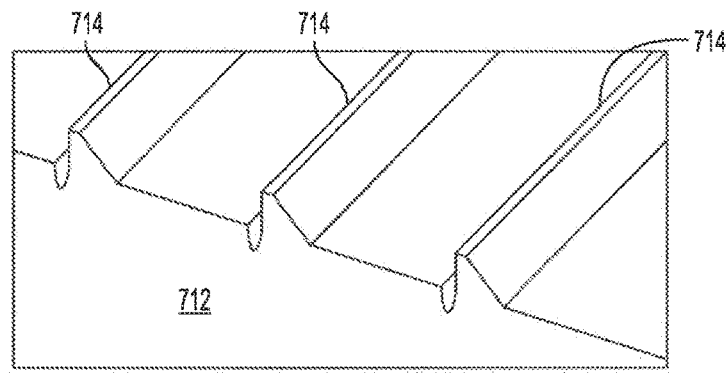

FIG. 64A is a fragmentary isometric of an embodiment of extraction features used in conjunction with the waveguide disclosed in the application.

Figure 64B:
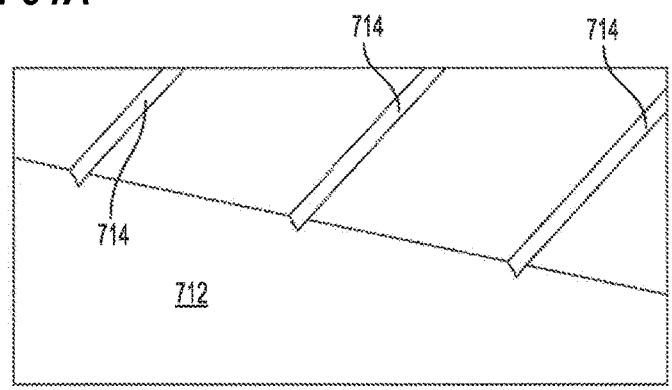

FIG. 64B is a fragmentary isometric of a second embodiment of extraction features used in conjunction with the waveguide disclosed in the application.

Figure 64C:
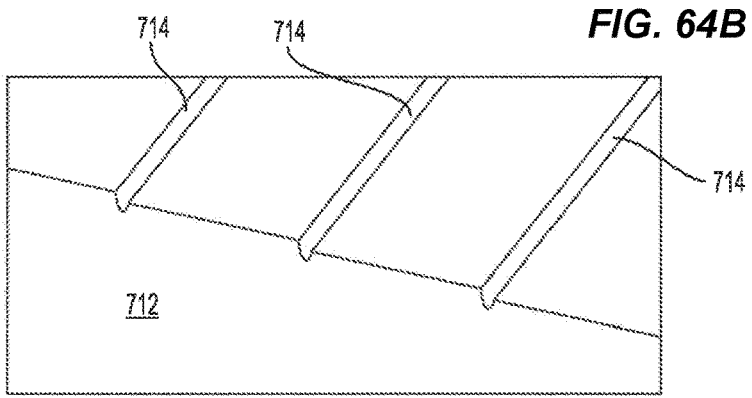

FIG. 64C is a fragmentary isometric of still another embodiment of extraction features used in conjunction with the waveguide disclosed in the application.

Figure 64D:
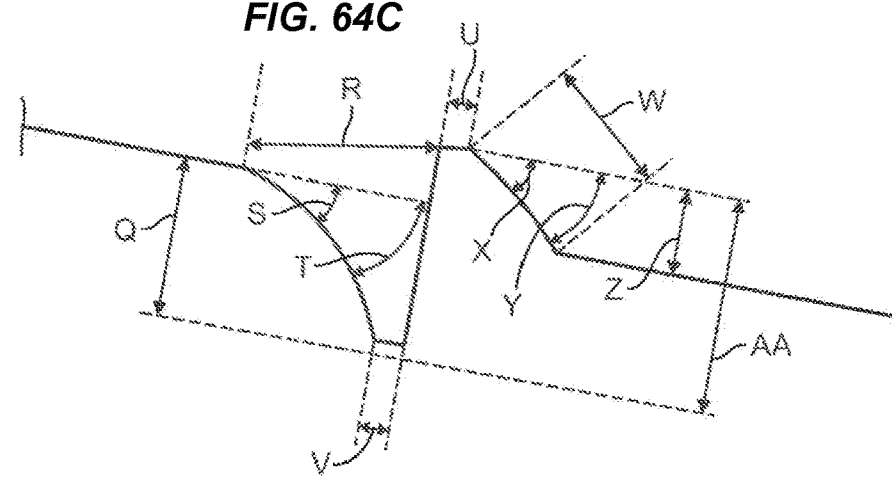

FIG. 64D is an enlarged, fragmentary, cross-sectional view of a further embodiment of extraction features used in conjunction with the waveguide disclosed in the application.

Figure 65A:
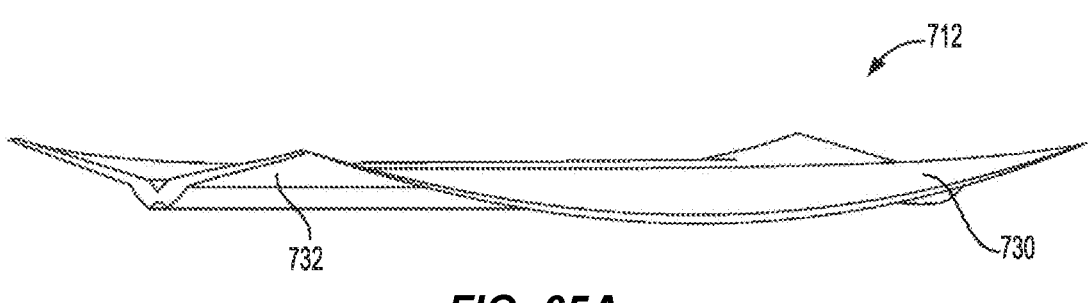

FIG. 65A is an isometric view of yet another waveguide body usable in a further embodiment of a luminaire.

Figure 65B:
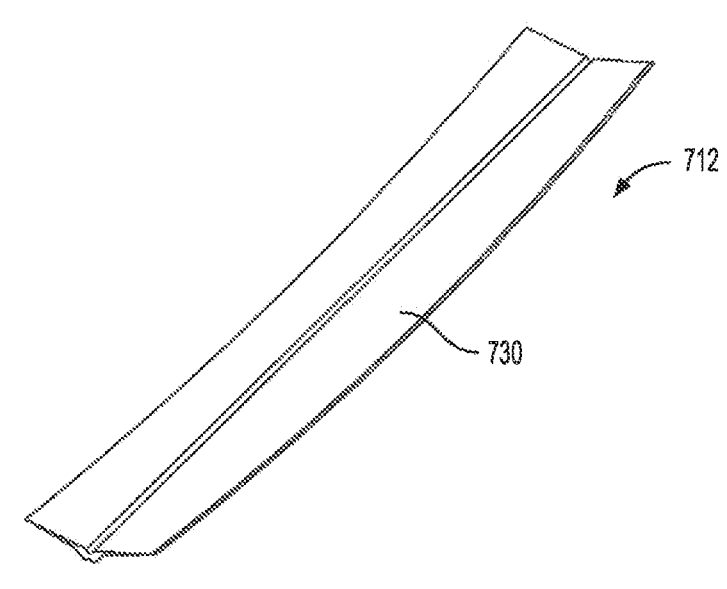

FIG. 65B is a second isometric view of the waveguide body shown in FIG. 65A.

Figure 65C:
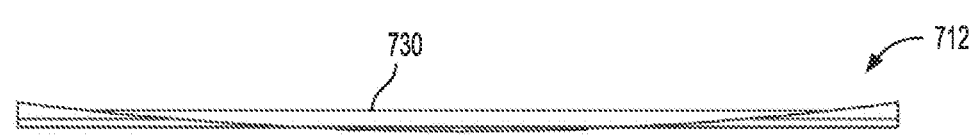

FIG. 65C is a side elevation of the waveguide body shown in FIG. 65A.

Figure 66A:
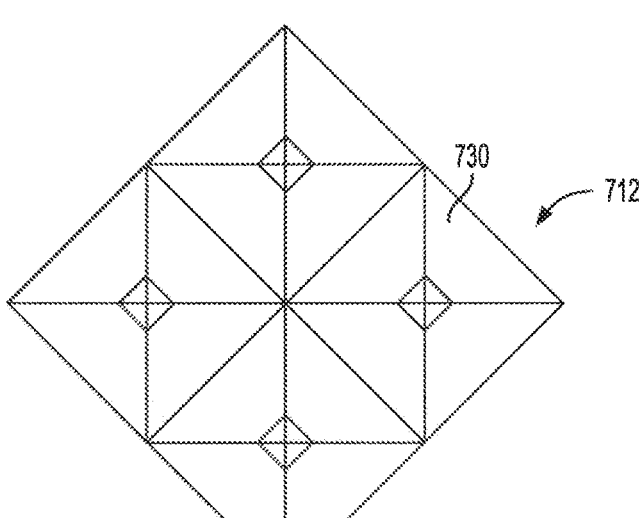

FIG. 66A is a lower elevation view of still another embodiment of a disclosed luminaire.

Figure 66B:
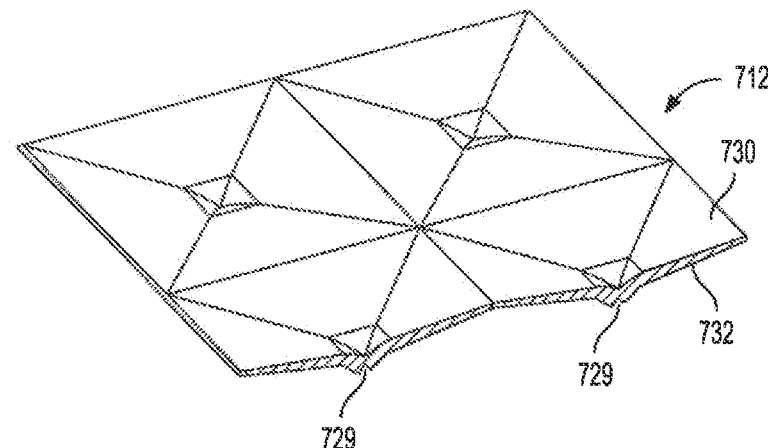

FIG. 66B is a sectional view of the luminaire shown in FIG. 66A.

Figure 66C:
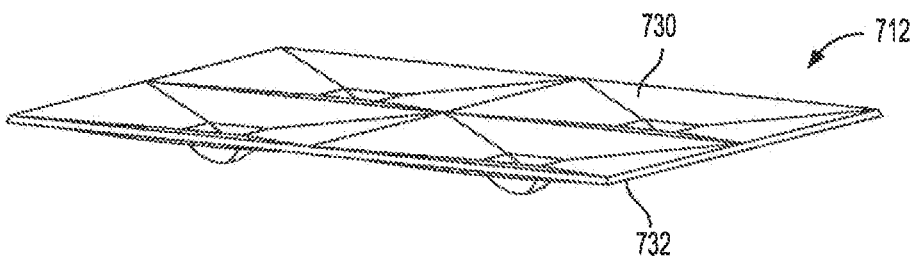

FIG. 66C is an isometric view of the luminaire shown in FIG. 66A.

FIG. 67A is a lower elevation view of yet another embodiment of a disclosed luminaire.

FIG. 67B is a side elevation of the luminaire shown in FIG. 67A.

FIG. 67C is a side elevation of one of the components of the luminaire shown in FIG. 67A.

FIG. 67D is an isometric view showing in dash lines the outline of one of the components of the luminaire shown in FIG. 67A and in solid line the cross section of the component.

Figure 68:
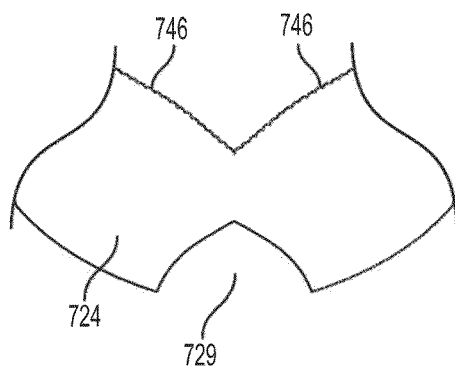

FIG. 68 is a side elevation view of an embodiment of a central section of a waveguide disclosed in the application showing a textured surface opposite the input surface.

Figure 69B:
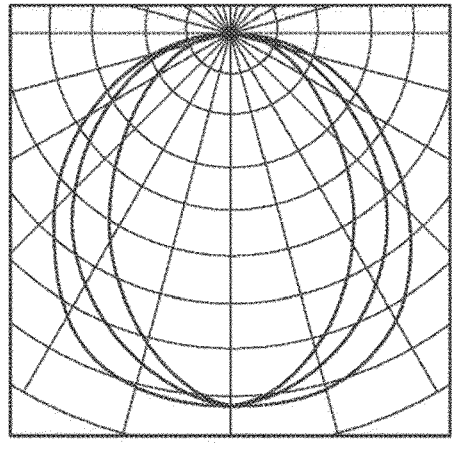
Figure 69A:
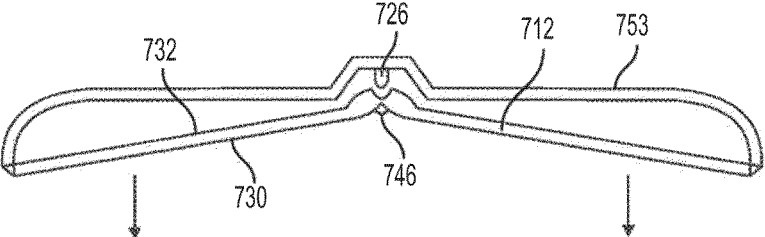

FIG. 69A is a side elevation view of an embodiment of a luminaire disclosed in the application and a reflector opposite one side of the luminaire.

FIG. 69B is a graph illustrating an alternative desired light distribution emitted from the luminaire of FIG. 69A.

Figure 70A:
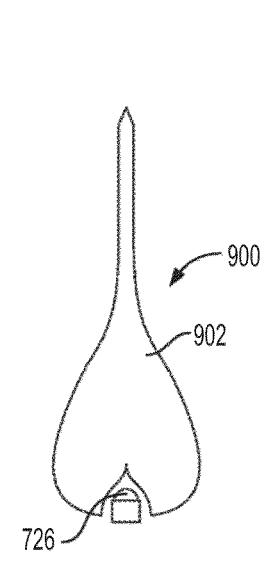

FIG. 70A is a side elevation view of another embodiment of a waveguide body.

Figure 70B:
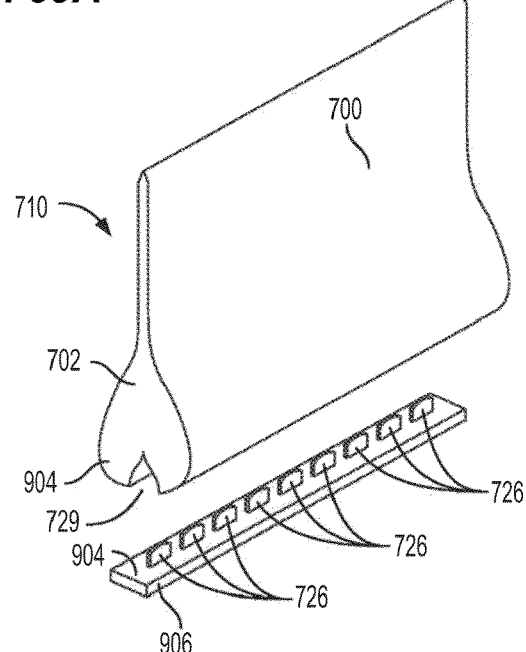

FIG. 70B is an exploded isometric view of the embodiment of FIG. 70A.

Figure 71:

FIG. 71 is a side elevation view of another embodiment of a waveguide body.

Figure 72A:
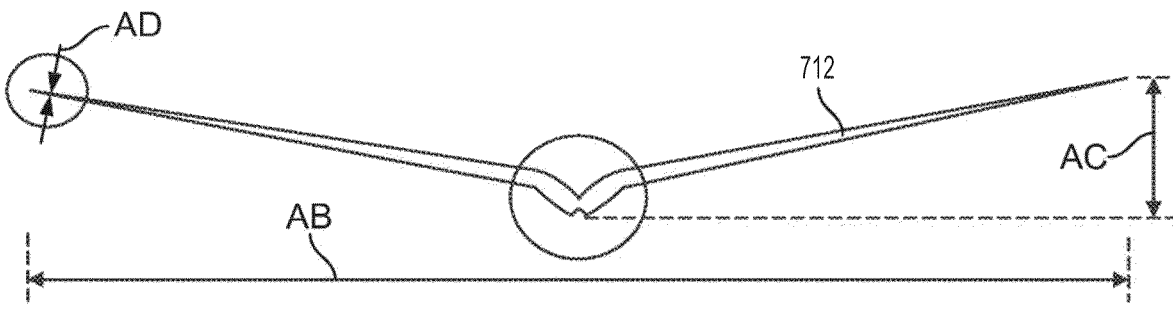

FIG. 72A is a further embodiment of a waveguide used in yet another embodiment of a disclosed luminaire.

Figure 72B:
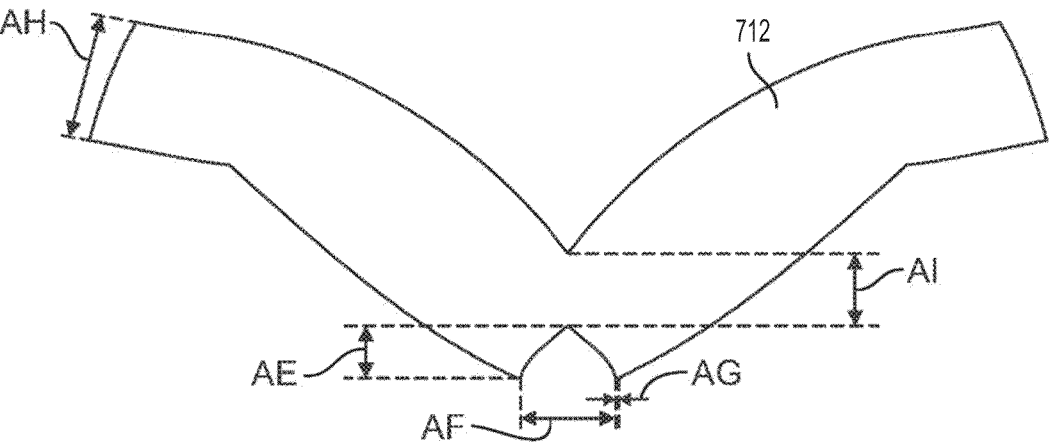

FIG. 72B is a side elevation view of a central section of the embodiment of FIG. 72A.

Figure 73:
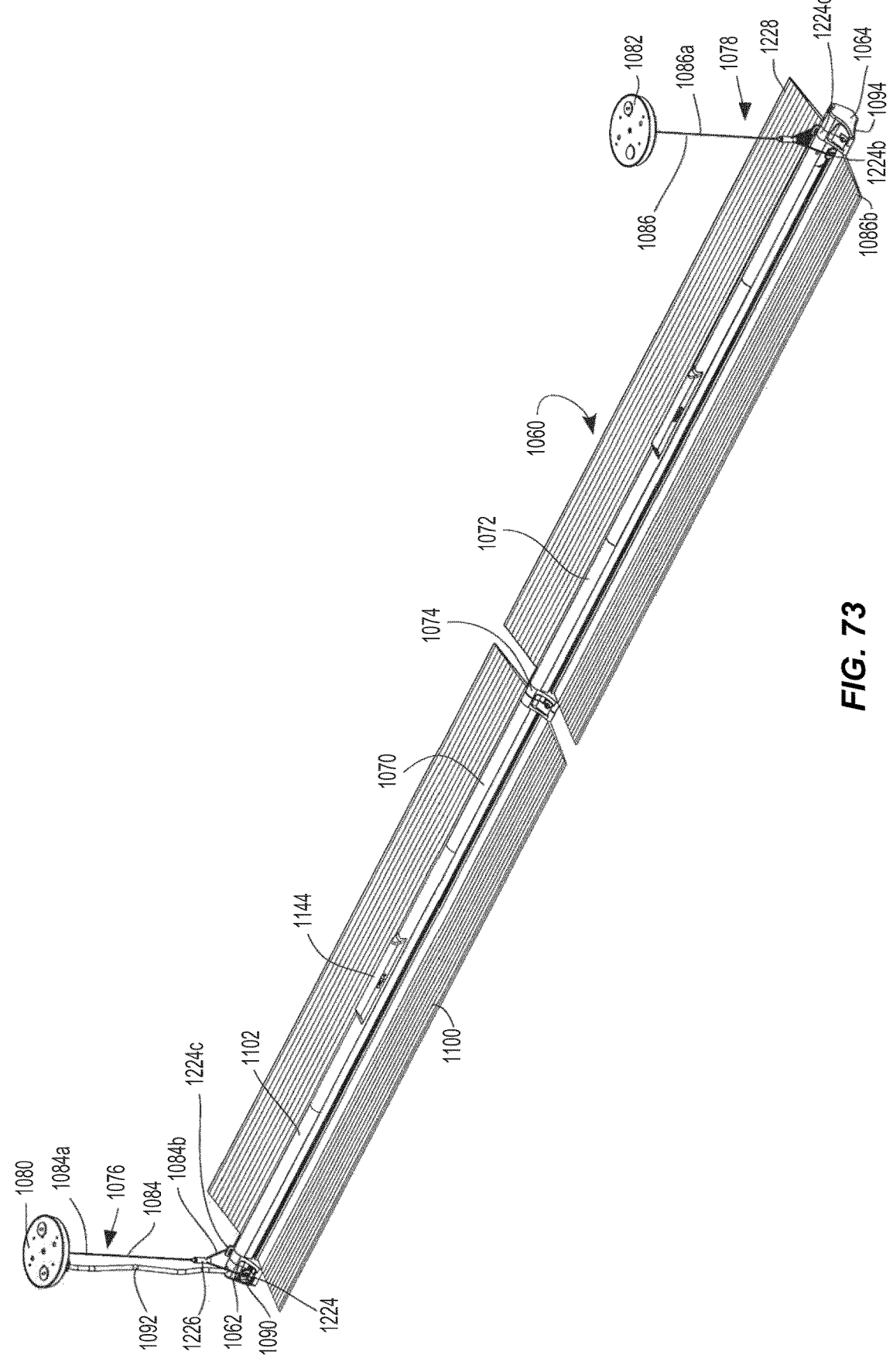

FIG. 73 is an isometric view of yet another embodiment of a luminaire.

Figure 74:
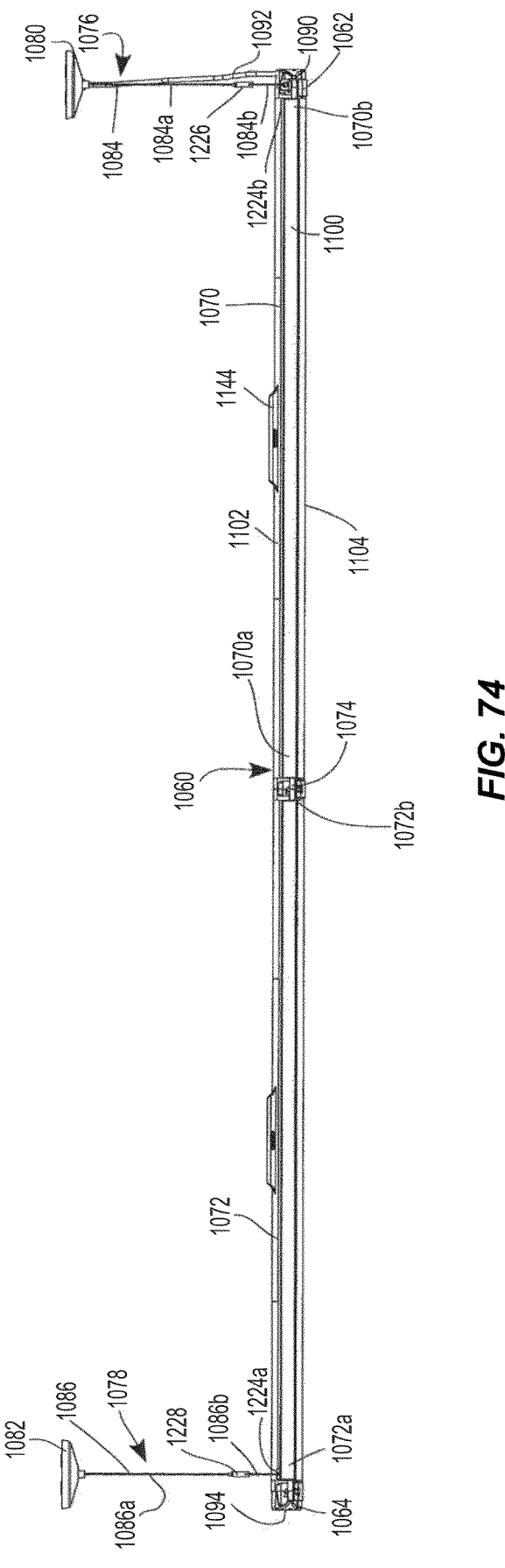

FIG. 74 is a side elevation view of the embodiment of FIG. 73.

Figure 75:
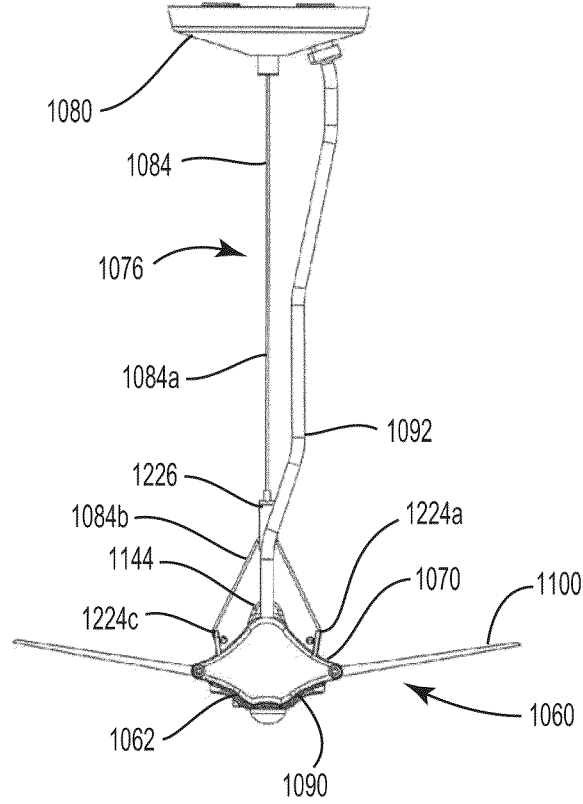

FIG. 75 is an end elevation view of the embodiment of FIG. 73.

Figure 76:
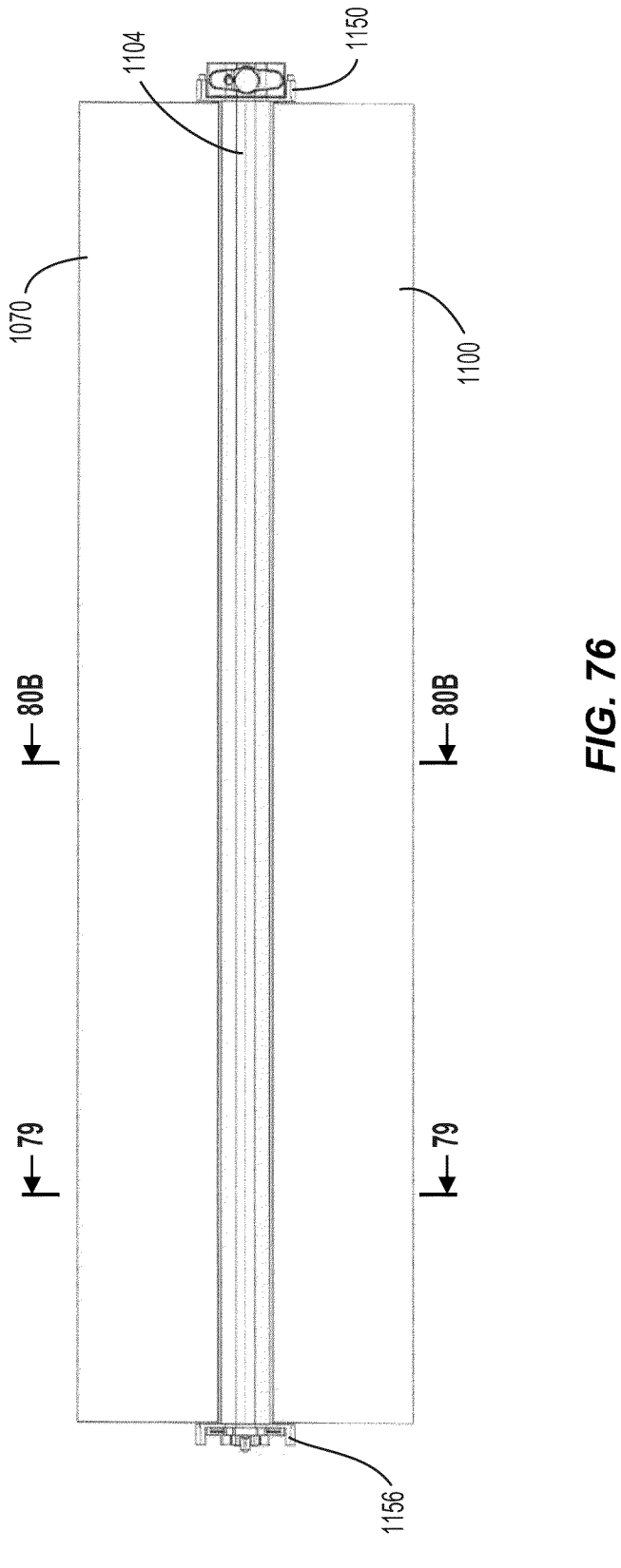

FIG. 76 is a bottom elevation view of one of the luminaire sections of the embodiment of FIG. 73.

Figure 77:
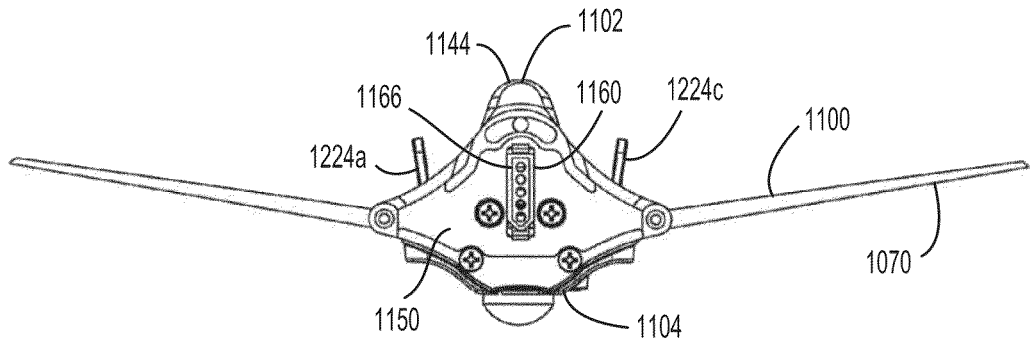

FIG. 77 is a right end view of the luminaire section of FIG. 76 with an end cap omitted therefrom.

Figures 78, 79:
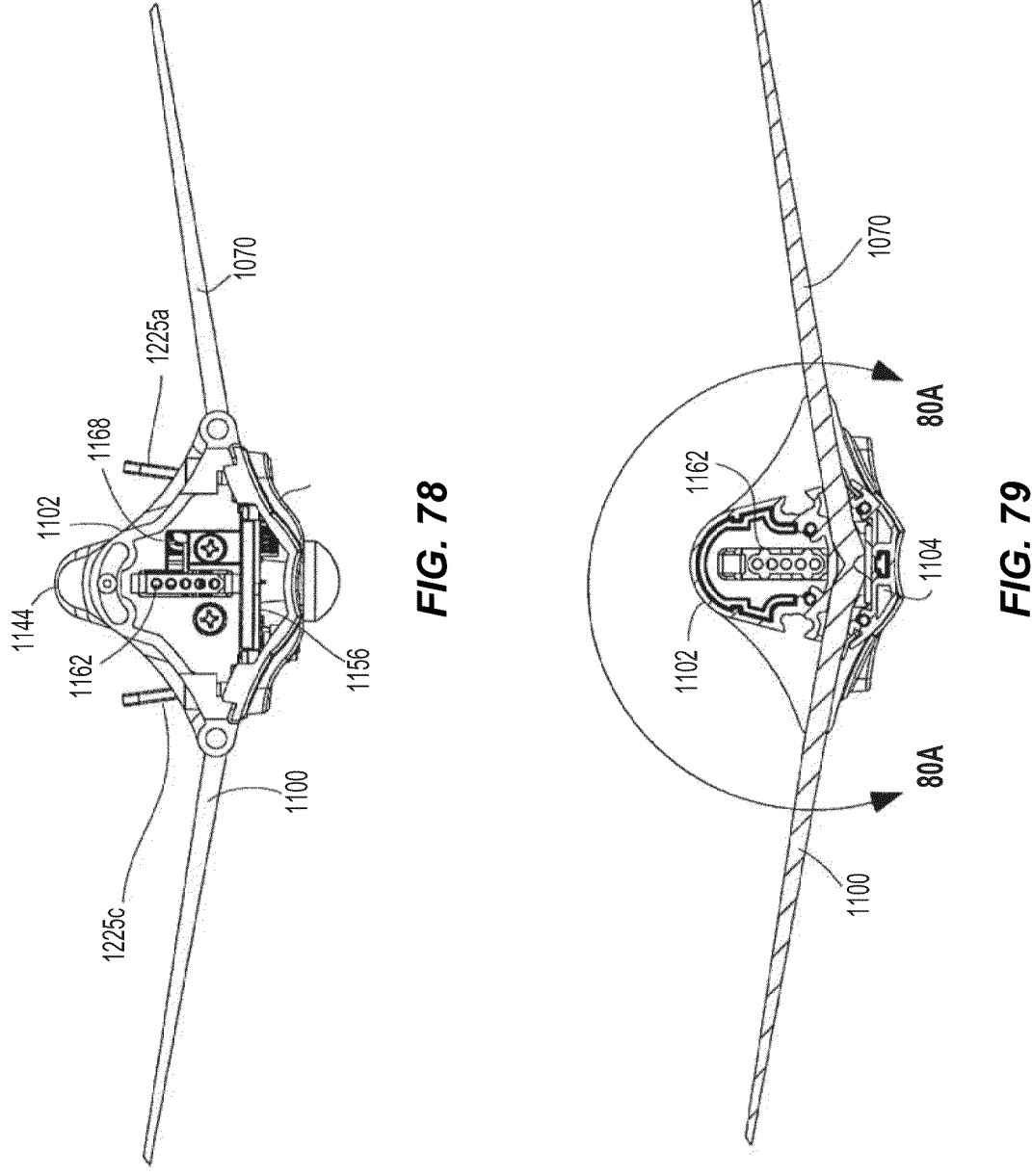

FIG. 78 is a left end view of the luminaire section of FIG. 76 with an end cap omitted therefrom.

FIG. 79 is a sectional view taken generally along the lines 79-79 of FIG. 76.

Figure 80A:
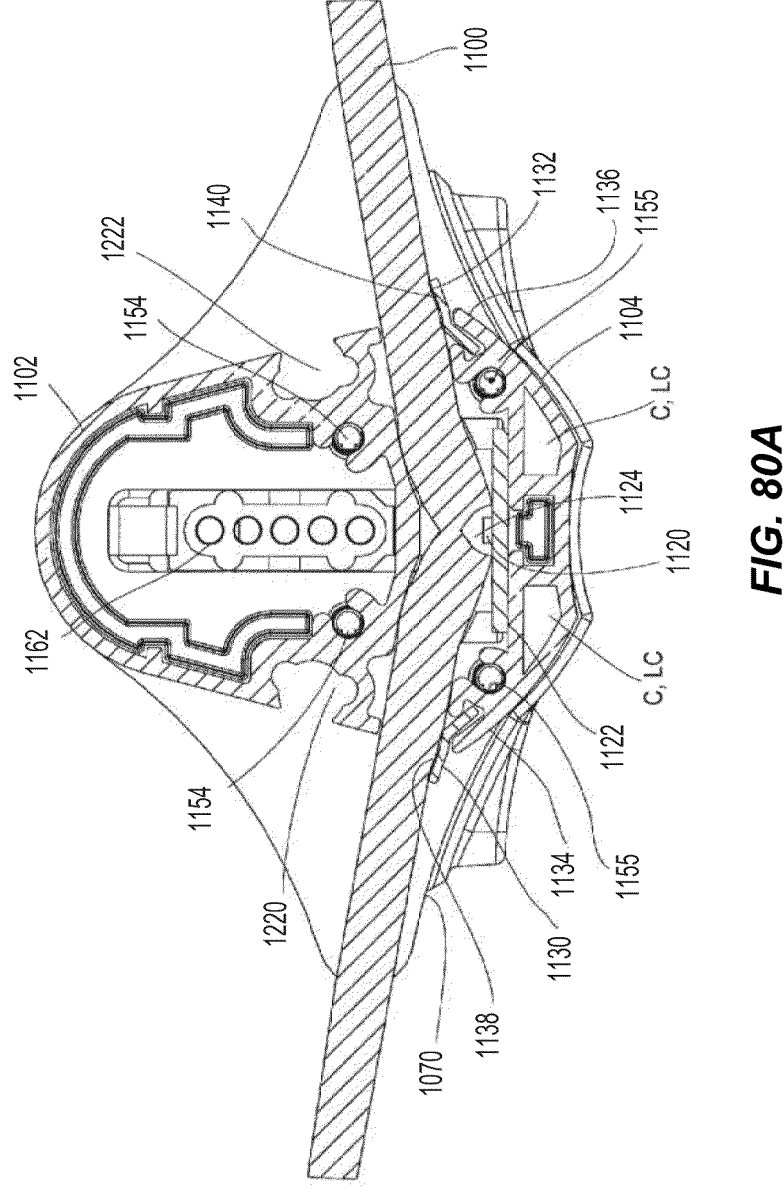

FIG. 80A is an enlarged fragmentary view illustrating the structure of FIG. 79 in greater detail.

Figure 80B:
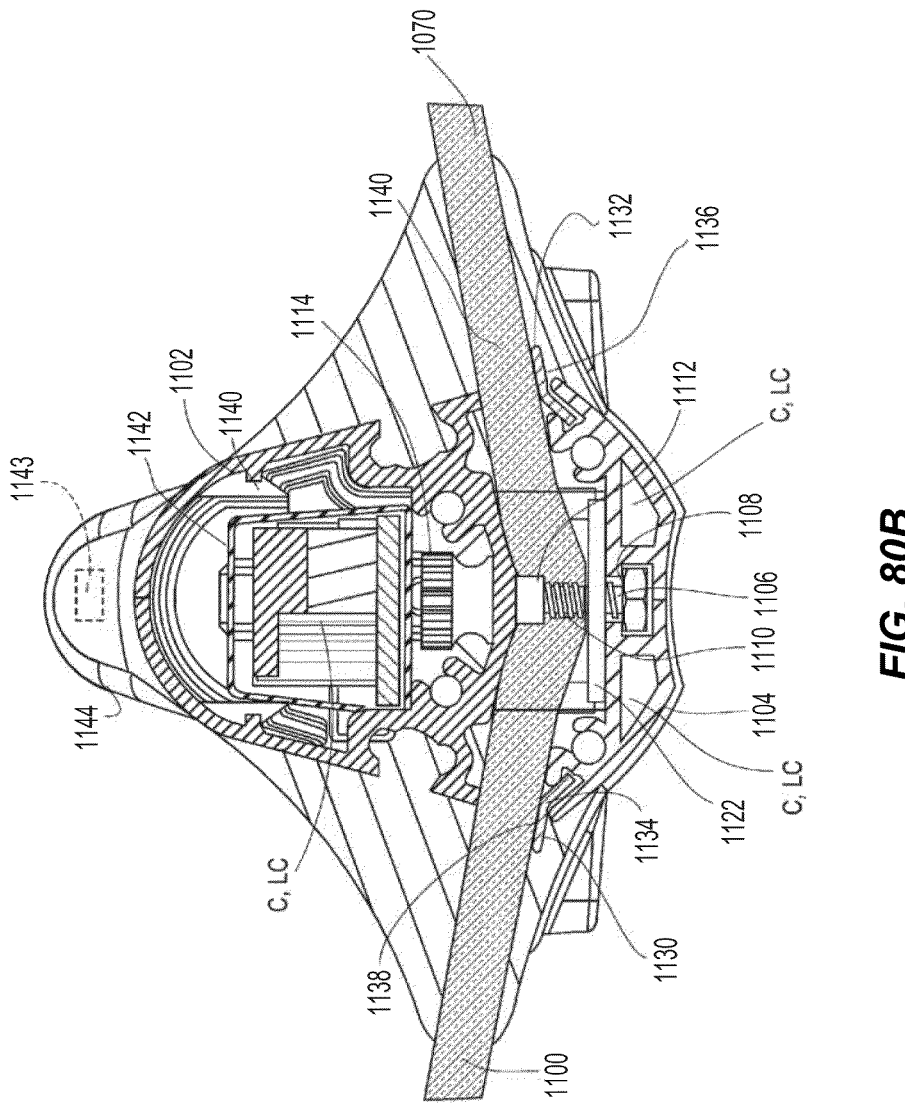

FIG. 80B is an enlarged fragmentary sectional view taken generally along the lines 80B-80B of FIG. 76.

Figure 81A:
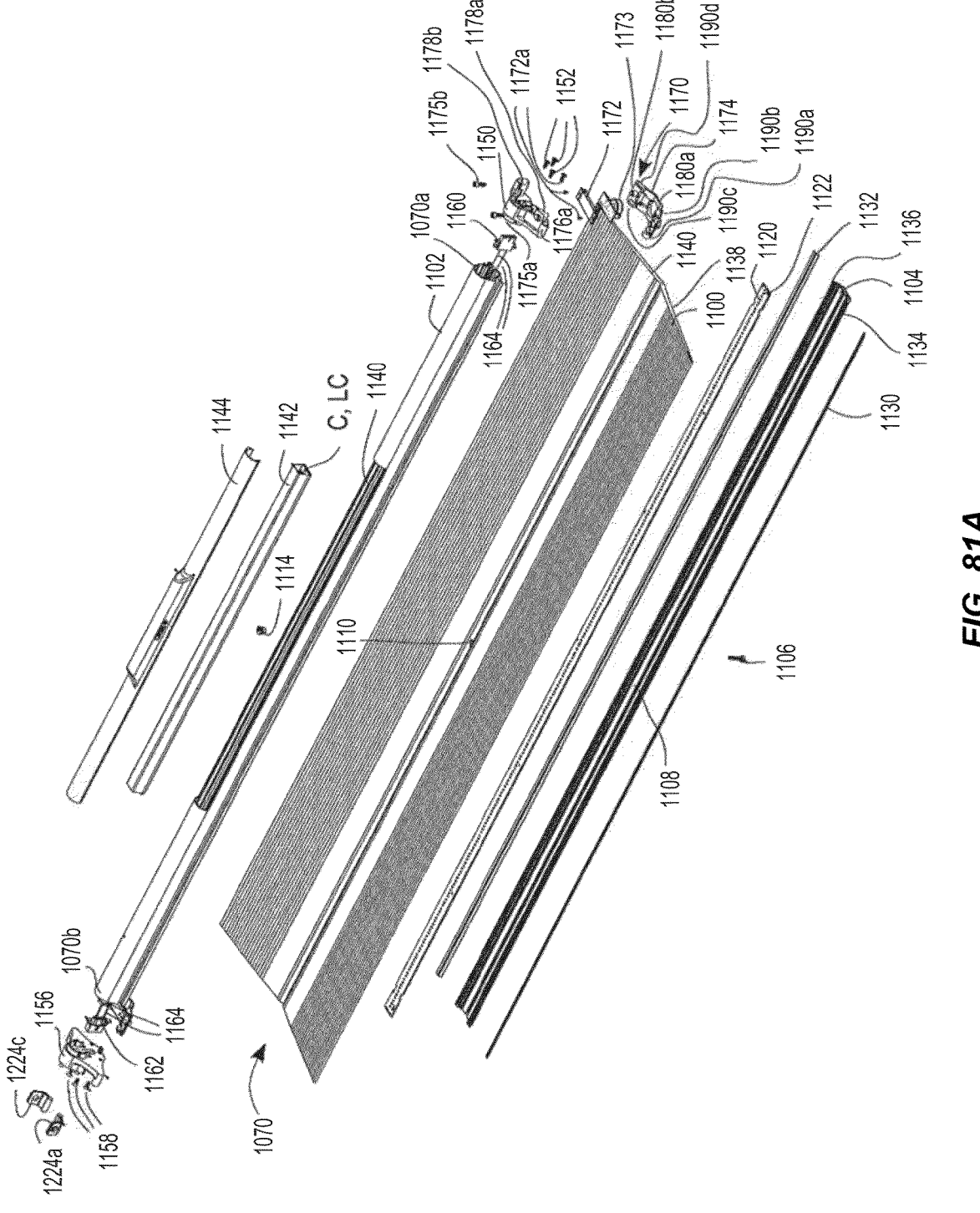

FIG. 81A is an exploded isometric view of the luminaire section of FIG. 76.

Figure 81B:
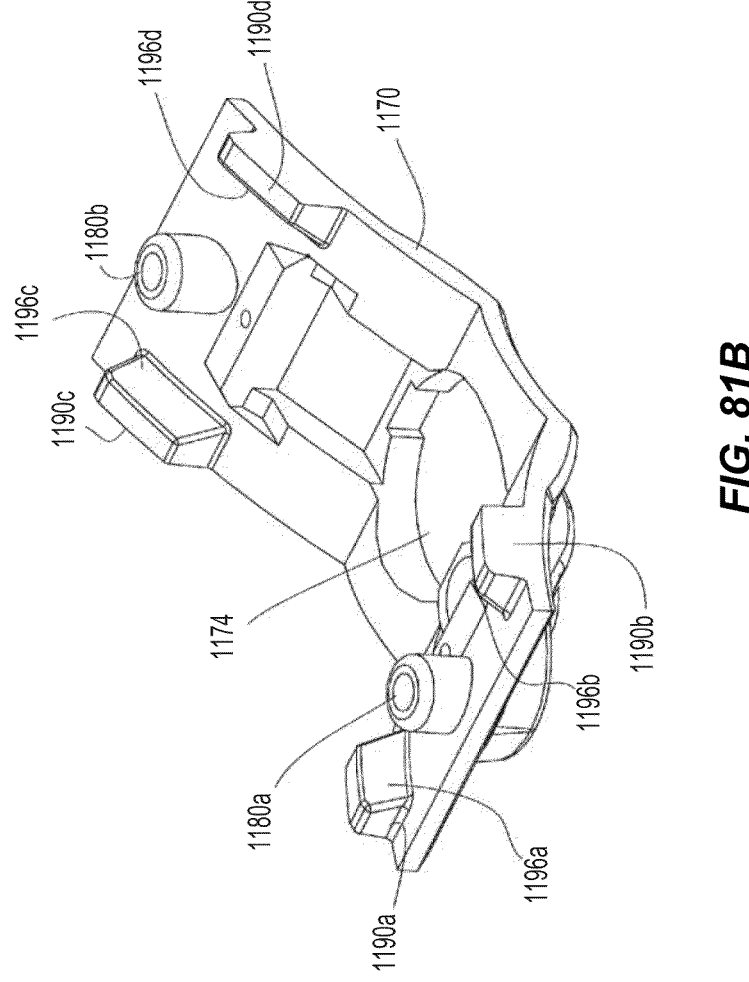

FIG. 81B is an enlarged isometric view of the clamping plate of FIG. 81A.

Figure 82:
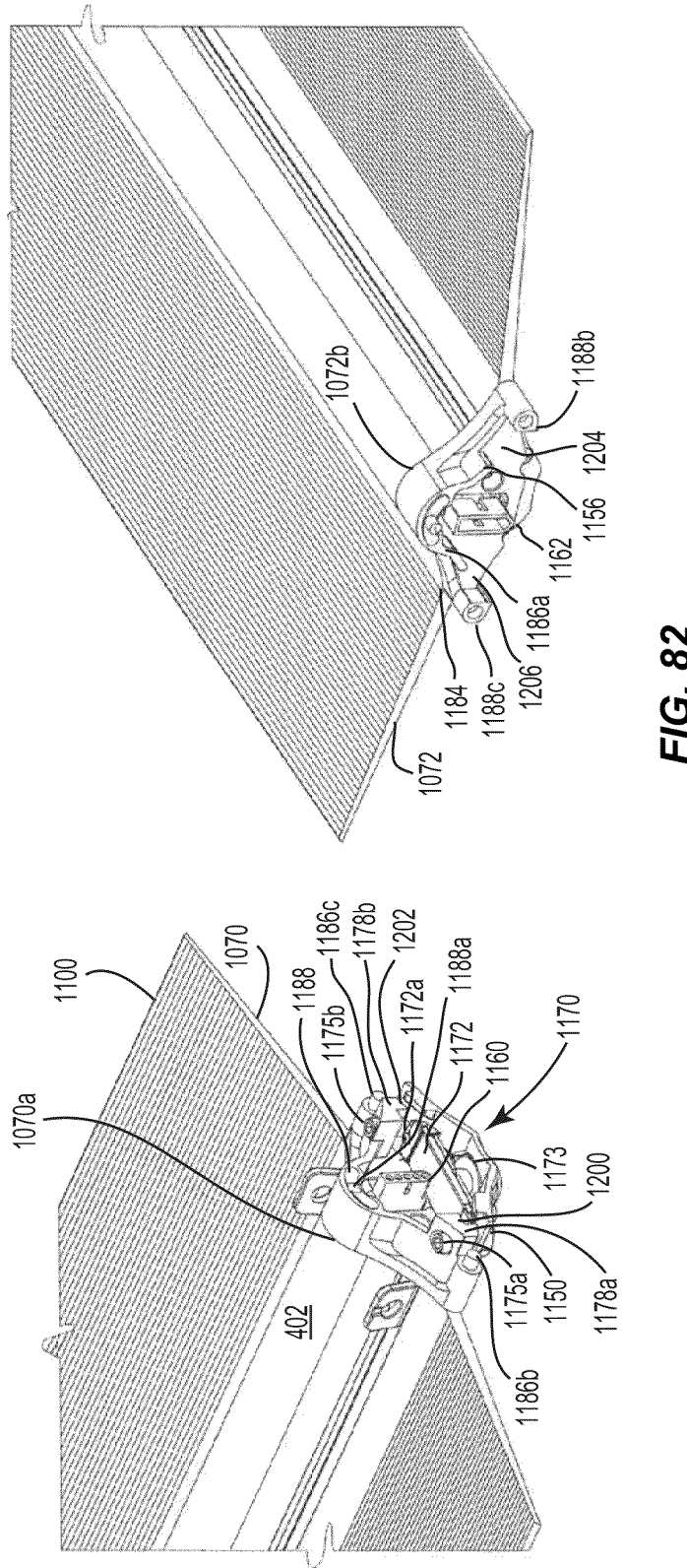
Figure 83:
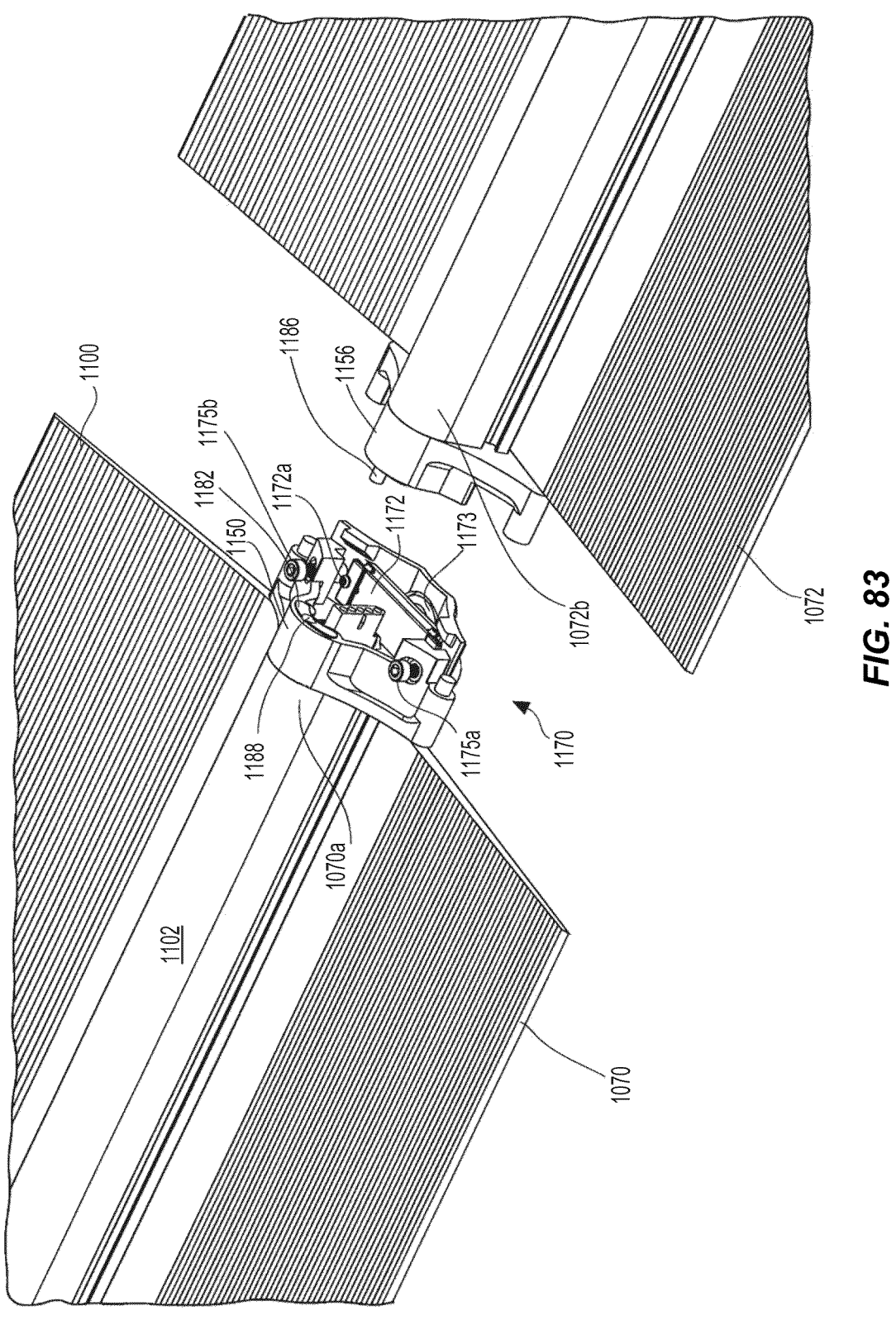
Figure 84:
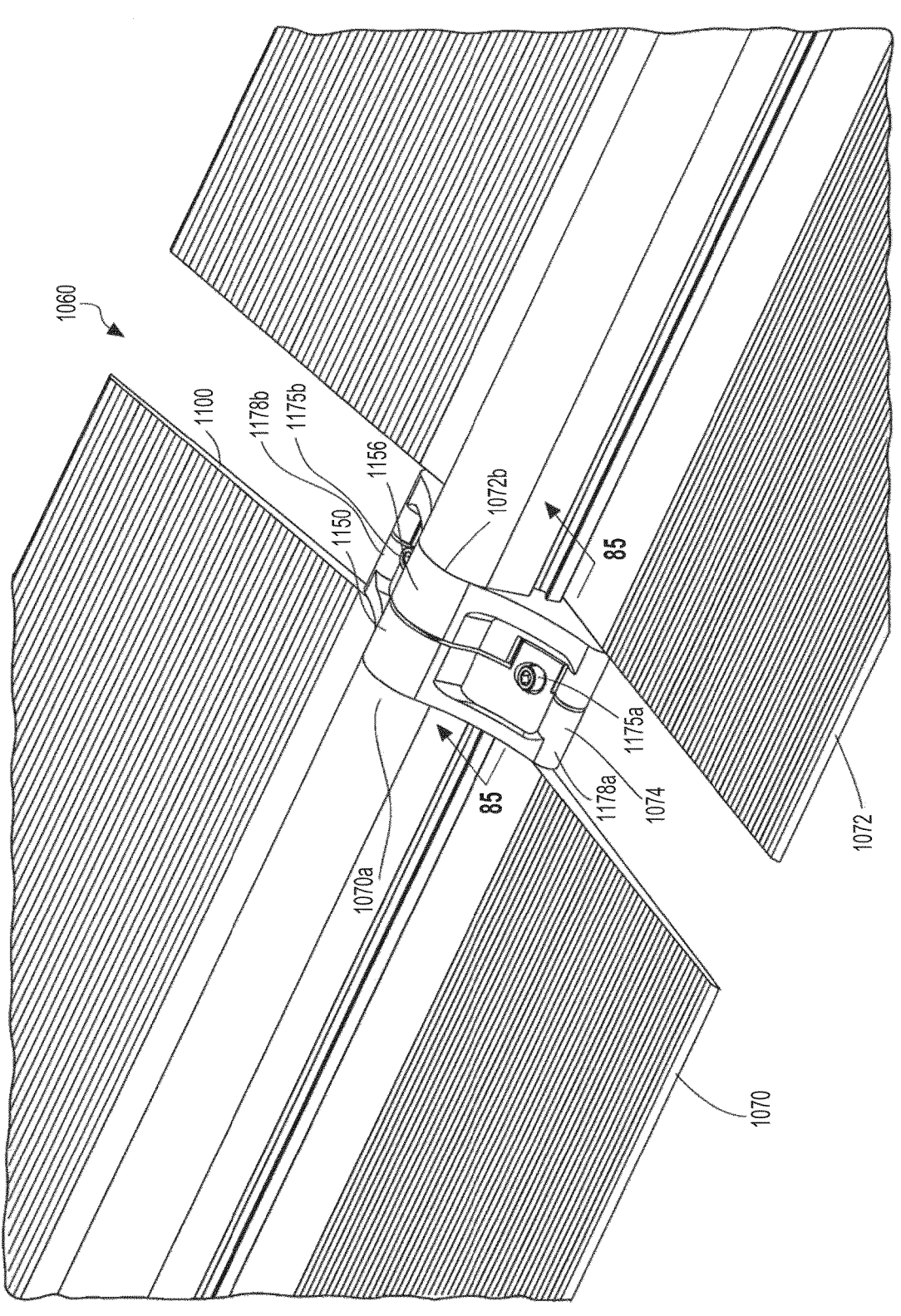

FIGS. 82-84 are isometric views illustrating a sequence of steps to assemble luminaire sections.

Figure 85:
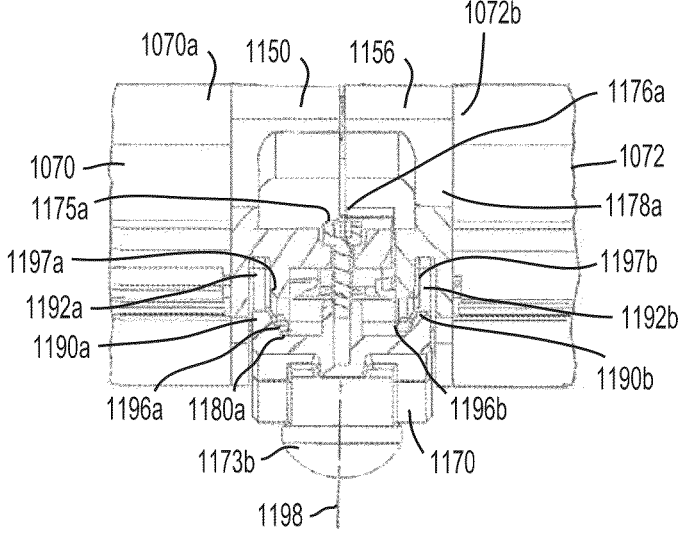
Figure 86:
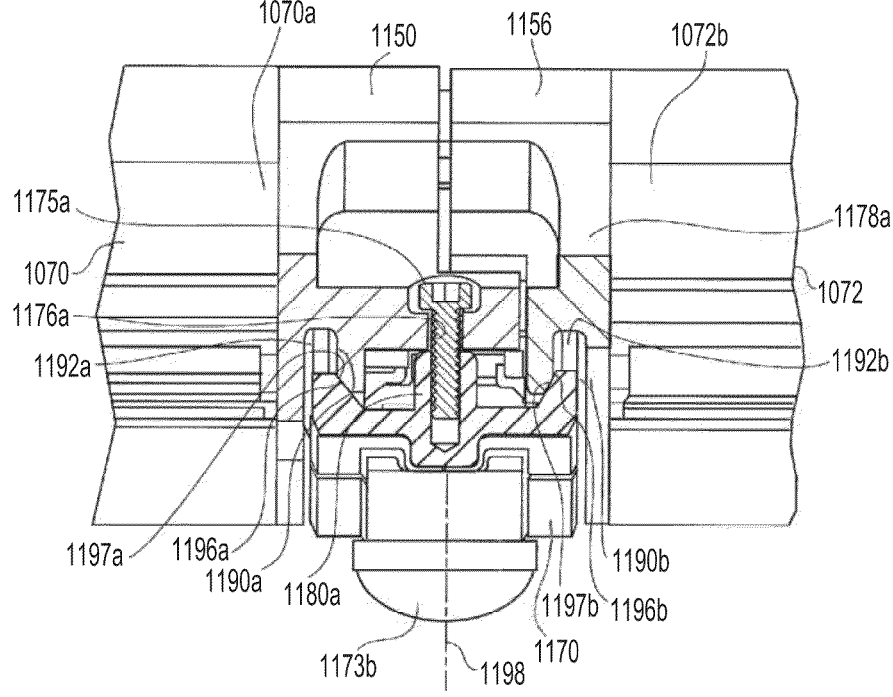

FIGS. 85 and 86 are sectional views taken generally along the lines 85-85 of FIG. 84 before and after tightening of the clamping fasteners, respectively.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

Throughout the drawings, identical reference numbers may designate similar, but not necessarily identical, elements. Use herein of a reference numeral without an index number, where such reference numeral is referred to elsewhere with an index number, may be a general reference to the corresponding plural elements, collectively or individually.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, components and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

As shown in the Figures, disclosed herein are embodiments of luminaires and light fixtures for general lighting, task lighting, or the like, more particularly, for illumination of spaces of varying size and floor plan such as a warehouse, office space, hallway, dwelling, or other space. Preferably, the space comprises an indoor space, although the luminaires disclosed herein may be used in other applications, such as an outdoor space or in a covered spaced exposed to the weather.

I. LUMINAIRES WITH OPTICAL WAVEGUIDES

Figure 1:
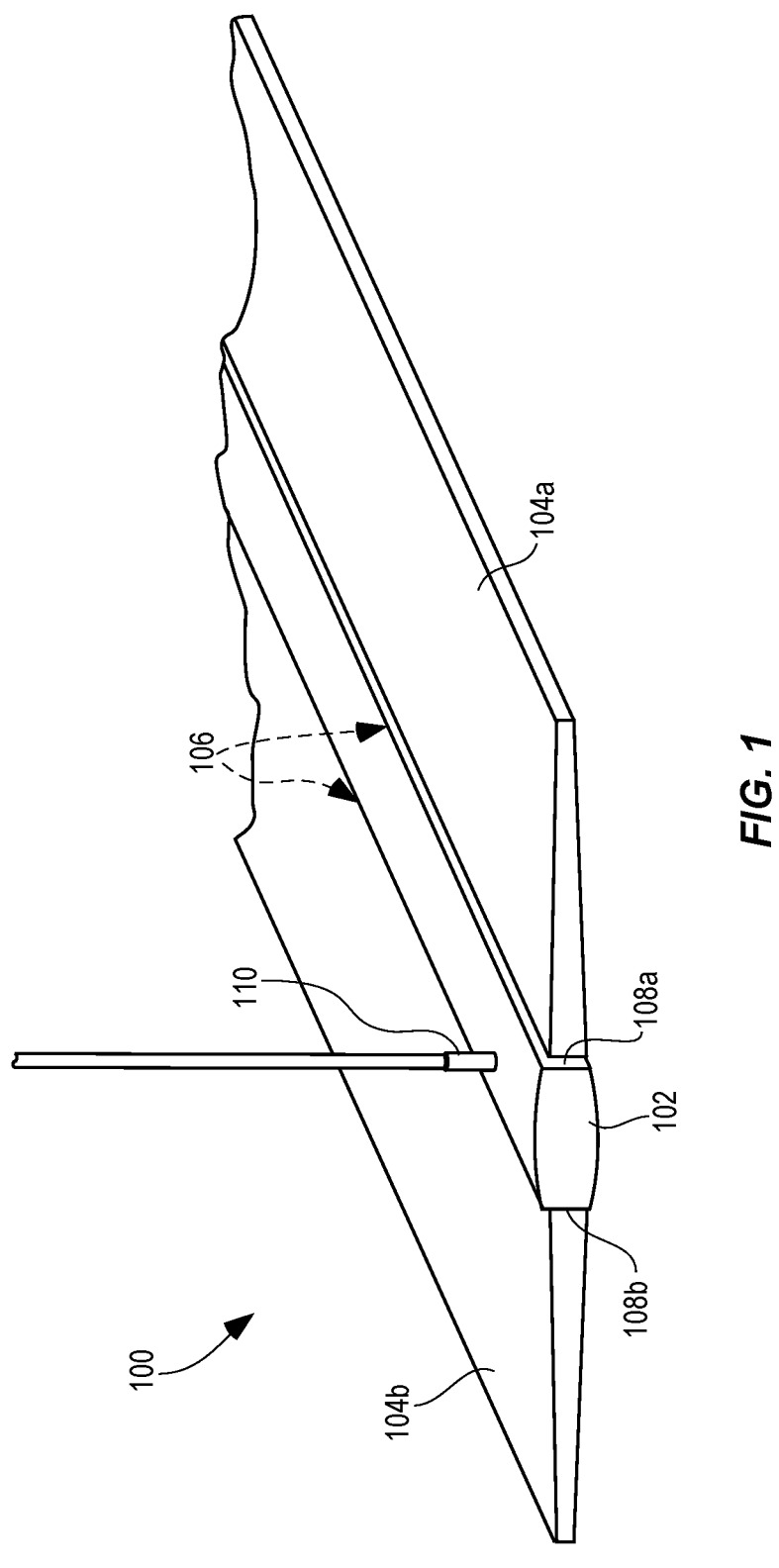
FIG. 1 is a partial isometric view from above of a luminaire comprising a suspended fixture that comprises a plurality of optical waveguides.

A luminaire 100 disclosed in FIG. 1 comprises an elongate housing 102 arranged between a plurality of optical waveguides 104a, 104b such as, for example, the optical waveguide described hereinafter with reference to FIGS. 2-4. The luminaire 100 may be suspended from a ceiling, wall, or post or, alternatively, may be mounted directly on a wall or post. In a further alternative, the luminaire 100 may be mounted or suspended from any other point of suitable structural integrity for supporting the luminaire 100. In the illustrated embodiment a suspension assembly 110 is coupled to the housing 102 for the purpose of suspending the luminaire 100.

The housing 102 may include, among other things, one or more of driver circuitry, light emitting diode(s), control circuitry, sensor(s), power circuitry, circuit board(s), or other components. Furthermore, luminaires described herein may be networked with other luminaires using wired connections or wireless technology and the operation (on/off and/or color and color temperature) may be controlled as desired, for example in coordinated or stand-alone fashion. In the embodiment shown in FIG. 1, one or more LED elements or modules 106 are disposed within the housing 102 adjacent each of the plurality of optical waveguides 104a, 104b such that light emitted by the LEDs is coupled into an edge surface of the optical waveguide along coupling ends 108a, 108b, respectively, thereof, as discussed with reference to FIGS. 2-4. The LED elements and modules 106 discussed herein throughout may be substantially the same or modified in size, shape, color, number, and/or other characteristics to fit housing and illumination specifications of particular luminaire applications/configurations described herein. The housing 102 further provides structural support to the optical waveguides 104a, 104b where said housing 102 meets the coupling ends 108a, 108b.

Each LED element or module 106 (FIGS. 4, 5C, and 5D) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 106 or a plurality of such elements or modules may include one or more blue shifted yellow LEDs and one or more red LEDs. The LEDs 106 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein. If desirable, a side emitting LED disclosed in U.S. Pat. No. 8,541,795, the disclosure of which is hereby incorporated by reference herein, may be utilized. In some embodiments, each LED element or module 106 may comprise one or more LEDs disposed within a coupling cavity with an air gap being disposed between the LED element or module 106 and a light input surface. In any of the embodiments disclosed herein each of the LED element(s) or module(s) 106 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source. Still further, any of the LED arrangements and optical elements disclosed in U.S. patent application Ser. No. 14/101,147, filed Dec. 9, 2013, now U.S. Pat. No. 9,869,432, entitled "Luminaires Using Waveguide Bodies and Optical Elements" by Keller et al., hereby incorporated by reference herein, may be used.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known TIR principles, light rays continue to travel through the waveguide(s) 104 until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

According to one aspect, a waveguide directs light into at least one up to an infinite number of beams or ray groups, wherein the rays of each group travel through the waveguide within a range of angles relative to one another. Each range may be narrow or broad within the TIR limits of the waveguide material.

According to another aspect, a waveguide arranges light into a plurality of groups that bounce at least once inside the waveguide by TIR off one or more surfaces of the waveguide. Each group comprises a plurality of light rays that travel at angles that are disposed within a narrow or broad range of angles relative to one another.

In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Each waveguide 104 (FIGS. 2-4) may have any suitable shape, and the shapes of the waveguides 104 may be different from one another or substantially or fully identical. For example, a first subset fewer than all of the waveguides 104 may be substantially or completely identical to one another, and some or all of the remaining waveguides 104 comprising a second subset may be different than the waveguides of the first subset. In this latter case, the waveguides of the second subset may be substantially or completely identical to each other or some or all may be different from one another. Any combination of substantially or completely identical and/or different waveguides 104 that develop identical or different light illumination distributions is contemplated. Also, although one, two, four, five, and eight waveguides 104 are illustrated in the Figures, a different number of waveguides could be used, as noted in greater detail hereinafter.

In some embodiments, two or more waveguides may be disposed at an angle α (FIGS. 23-27) relative to one another. In one such embodiment, the angle α may be approximately 90 degrees. In another embodiment, the angle α may be greater or less than 90 degrees to produce a desired distribution. In some embodiments, the waveguides may be arranged in a straight line, or may be arranged in a non-linear open or closed path. Still further, the material(s) of the waveguides 104 preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the waveguides 104 are all solid or some or all have one or more voids or discrete bodies of differing materials therein. The waveguides 104 may be fabricated using procedures such as hot embossing or molding, including injection/compression molding. Other manufacturing methods may be used as desired.

Figure 2:
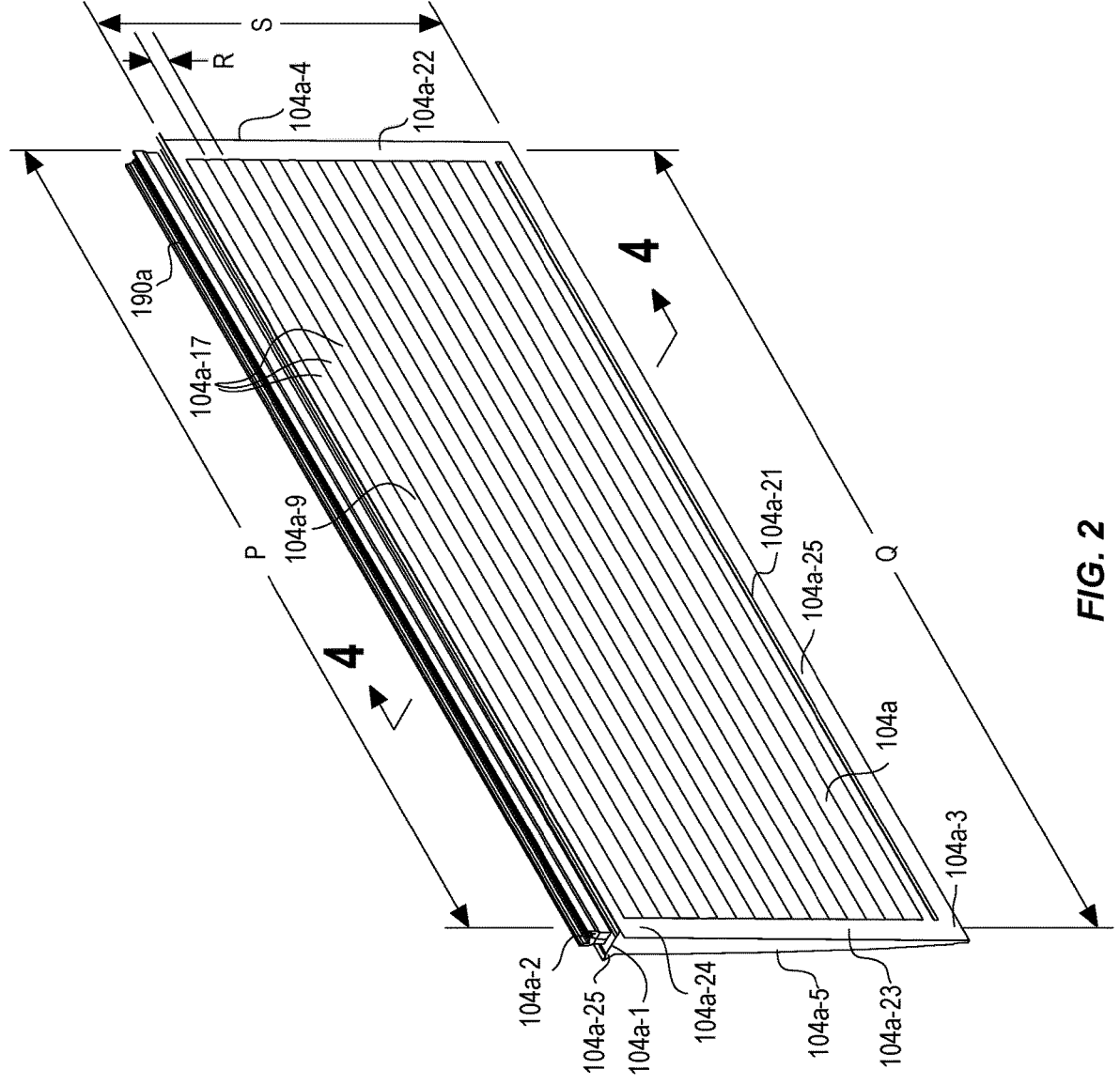
FIG. 2 is an isometric front view of one of the optical waveguides and coupling members of the luminaire of FIGS. 1, 5A, 5B, 50, 8, 9A, 10, 11A, 11B, 12A, 12B, 13A, 13B, 14A, 14B, 14C, and 23-27.

As seen in FIG. 2, the waveguide 104a includes an enlarged tapered portion 104a-1 adjacent a first or top end 104a-2. The waveguide 104a further includes a second or bottom end 104a-3 and side edge portions 104a-4 and 104a-5. Referring to FIG. 4, a light emitting portion 104a-6 is disposed between the portion 104a-1 and end 104a-3. The light emitting portion 104a-6 includes a plurality of light extraction features 104a-7 disposed on or in a first or rear surface 104a-8 opposite a second or front surface 104a-9. It should be noted that the light extraction features 104a-7 may be irregularly spaced or some may be regularly spaced and others irregularly spaced, etc. In the illustrated embodiment, the plurality of light extraction features 104a-7 includes a first set of features 104a-10 (FIG. 4) that are relatively large and widely spaced and disposed at an upper portion of the waveguide 104a relatively nearer the tapered portion 104a-1. Each of the extraction features 104a-10 may be generally of the shape disclosed in International Application Serial No. PCT/US14/13937, filed Jan. 30, 2014, entitled "Optical Waveguide Bodies and Luminaires Utilizing Same," the disclosure of which is hereby incorporated by reference herein. As seen in FIG. 4, each feature 104a-10 comprises an elongate wedge-shaped channel or groove 104a-11 disposed adjacent an elongate wedge-shaped ridge or protrusion 104a-12, both of which preferably extend partially between the side edge portions 104a-4 and 104a-5 transversely (preferably, although not necessarily, perpendicularly) with respect thereto. The wedge-shaped channel 104a-11 includes an extraction surface 104a-11a formed at an angle relative to the rear surface 104a-8. The angle may be constant, vary throughout the length of the extraction feature 104a-10, vary throughout the group of extraction features 104a-10, and/or vary throughout the groups of extraction features 104a-10, 104a-13, 104a-14, and/or 104a-15 described below. In some embodiments, the angle varies between about 25° and about 40°. Also preferably, although not necessarily, the channels and ridges of each feature 104a-10 are parallel to each other and to other channels and ridges of other features 104a-10.

The remaining waveguides 104*b*, 116*a*-116*h*, 132, 142, 166*a*-166*d*, 194*a*-194*h*, 208, 220*a*-220*d*, 256, 270, 282, 288*a*-288*d*, 298*a*-298*f*, 308*a*, 308*b*, 314*a*-314*d*, 320*a*, 320*b*, 326*a*, 326*b*, 332 described herein throughout may include corresponding elements/extraction features 360 that are substantially similar or identical to the elements 104*a*-1 through 104*a*-25. In at least the illustrated embodiment of FIG. 1, the waveguides 104*a*-104*b* are all disposed at the same, or substantially the same, elevation in the luminaire 100, although this need not be the case.

Referring now to FIGS. 5A-5D, an embodiment of a luminaire 112 with an elongate housing 114 is depicted. Similar to the luminaire 100 discussed with reference to FIG. 1, the luminaire 112 shown in FIGS. 5A and 5B comprises a plurality of optical waveguides 116*a*-116*h* disposed along left (L) and right (R) sides (FIG. 5A) of the housing 114 and supported by a combination of said elongate housing 114, gussets 118*a*-118*j*, and structural brackets 120*a*-120*j*. The elongate housing 114 provides structural support to the optical waveguides 116*a*-116*h* where said housing 114 meets coupling ends 122*a*-122*h* of each optical waveguide 116*a*-116*h*.

The elongate housing 114 may include, among other things, one or more of driver circuitry, light emitting diode (s), control circuitry, sensor(s), power circuitry, circuit board (s), or other components. These components are disposed between upper and lower housing portions 138, 135. The luminaire 112 comprises one or more LED elements or modules 106, as discussed hereinabove, disposed on the one or more PCBs 240 and arranged to direct light into the coupling ends 122*a*-122*h* of the optical waveguides 116*a*-116*h*. Each optical waveguide 116*a*-116*h* is supported along sides thereof in the embodiment shown in FIGS. 5A-5C, and each optical waveguide 116*a*-116*h* is substantially identical to each other waveguide.

Further, each of optical waveguides 116*a*-116*h* is supported by components of the luminaire 112 and coupled to LED elements or modules 106 in substantially identical fashion, save relative location. Also, such optical waveguides 116*a*-116*h* are preferably identical to one another (except possibly the size, placement, and/or arrangement of optical features, such as extraction features), and therefore interchangeable and/or modular. For example, one or more replacement optical waveguides (not shown) may be inserted into the luminaire 112 upon removal of one or more of the optical waveguides 116*a*-116*h* shown in the example luminaire 112 of FIGS. 5A-5D.

Because the optical waveguides 116*a*-116*h* are substantially identical to one another (with the possible exception of one or more optical elements as noted above) only the optical waveguide 116*a* will be described in detail herein. Referring once again to the waveguide embodiment shown in FIGS. 2-4, an optical coupling member 190*a* is disposed at an end of the waveguide 104*a*. The material of the optical coupling member 190*a* is preferably somewhat sticky so that a planar bottom surface 190*a*-6 of the member 190*a* adheres to and forms an optically transmissive bond with a planar top end 104*a*-2 of the waveguide 104*a*. In another embodiment, the optical coupling member 190*a* may comprise an acrylic material such as poly(methyl methacrylate) (PMMA) that is overmolded onto or otherwise optically coupled to the acrylic waveguide 104*a* during fabrication. In a further embodiment, the optical coupling member 190*a* and the waveguide 104*a* may be fabricated as a unitary piece of a single material using procedures such as hot embossing or molding, including injection/compression molding, or other suitable methods. Further, a tapered outer surface 190*a*-5 preferably, but not necessarily, contacts a rigid electrically conductive member comprising a printed circuit board (PCB) 240, and/or a flexible circuit element (not shown) carrying the LED element or module 106 when the optical coupling member 190*a* is fully inserted into a coupling position (FIGS. 5C and 5D).

In the illustrated embodiment, at least one, and more preferably more than one, LED elements or modules 106 are mounted on the PCB(s) 240 or a flexible circuit element, and the LED elements or modules 106 emit light toward the optical conducting members 190. The flexible circuit element and/or PCB(s) 240 may include one or more layers of aluminum and/or copper.

If desired, the flexible circuit conductor and/or PCB(s) 240 may include a surface (not shown) adjacent the LED elements or modules 106 that has a white or specular reflective coating or other member secured or otherwise applied thereto.

Still further, any of the mechanical structures, LED arrangements, circuits, and optical elements disclosed in U.S. patent application Ser. No. 14/671,512, filed Mar. 27, 2015, now U.S. Pat. No. 9,581,750, entitled "Outdoor and/or Enclosed Structure LED Luminaire" by Wilcox et al., U.S. patent application Ser. No. 14/583,415, filed Dec. 26, 2014, now U.S. Pat. No. 10,502,899, entitled "Outdoor and/or Enclosed Structure LED Luminaire" by Wilcox et al., and/or U.S. patent application Ser. No. 14/462,426, filed Aug. 18, 2014, now U.S. Pat. No. 10,379,278, entitled "Outdoor and/or Enclosed Structure LED Luminaire for General Illumination Application, Such as Parking Lots and Structures" by Wilcox et al., all of which are hereby incorporated by reference herein, may be used. Additionally, any of the mechanical structures, LED arrangements, circuits, and optical elements disclosed in International Application No. PCT/US2014/30017, filed Mar. 15, 2014, entitled "Optical Waveguide Body," U.S. patent application Ser. No. 14/485, 609, filed Sep. 12, 2014, now U.S. Pat. No. 9,952,372, entitled "Luminaire Utilizing Waveguide," U.S. Provisional Patent Application No. 62/005,965, filed May 30, 2014, entitled "Luminaire Utilizing Waveguide," U.S. Provisional Patent Application No. 62/025,436, filed Jul. 16, 2014, entitled "Luminaire Utilizing Waveguide," U.S. Provisional Patent Application No. 62/025,905, filed Jul. 17, 2014, entitled "Luminaire Utilizing Waveguide," U.S. patent application Ser. No. 14/657,988, filed Mar. 13, 2015, now U.S. Pat. No. 9,709,725, entitled "Luminaire Utilizing Waveguide," U.S. patent application Ser. No. 15/060,354, filed Mar. 3, 2016, now U.S. Pat. No. 9,835,317, entitled "Luminaire Utilizing Waveguide," U.S. patent application Ser. No. 15/060,306, filed Mar. 3, 2016, now U.S. Pat. No. 9,841,154, entitled "Luminaire Utilizing Light Emitting Diodes," U.S. Provisional Patent Application No. 62/301, 559, filed Feb. 29, 2016, entitled "Luminaire Utilizing Waveguide," U.S. Provisional Patent Application No. 62/301,572, filed Feb. 29, 2016, entitled "Luminaire Utilizing Light Emitting Diodes," U.S. Pat. No. 9,366,799, issued Jun. 14, 2016, entitled "Optical Waveguide Bodies and Luminaires Utilizing Same," and U.S. patent application Ser. No. 15/277,670, filed Sep. 27, 2016, now U.S. Pat. No. 10,422,939, entitled "Waveguide Having Unidirectional Illuminance," the disclosures of which are hereby incorporated by reference herein.

Referring again to FIGS. 5A-5D, optical waveguide 116*a* is supported by the elongated housing 114 along the coupling end 122*a* thereof, as noted above, as well as the structural brackets 120*a*, 120*b*. The structural brackets 120*a*, 120*b* support first and second edges 124*a*, 124*b* of the optical waveguide 116*a*, while an exterior edge 126 thereof is left open and uncovered by structural supports and/or housings. The gussets 118*a*, 118*b* support the associated structural arms 120*a*, 120*b*, which, in turn, support the respective waveguide edges 124*a*, 124*b*. The exterior edge 126 may emit a portion of light coupled into the waveguide 116*a* such that the uncovered, exterior edge 126 provides outward illumination or a glowing effect.

Optical waveguide 116*a* may have features disposed thereon for extracting light, as discussed with respect to FIGS. 2-4 hereinabove, such that, for example, an illumination pattern wherein about eighty percent of light is emitted downwards from a lower surface 128 thereof, and about twenty percent of light is emitted upwards from an upper surface 130. Alternatively, the ratio of light emitted out of the lower and upper surfaces 128, 130, respectively, may be customized for each optical waveguide 116*a*-116*h* in order to produce an overall illumination pattern for the luminaire 112 that is desirable for a particular application or setting.

In a further alternative, the optical waveguide 116*a* may have an arrangement of features disposed on the lower and upper surfaces 128, 130 thereof, such that, for example, the downward emitted light is distributed according to a directional pattern. Specifically, the downward light emitted from the lower surface 128 of the optical waveguide 116*a* may be directed straight down, outward, and away from the luminaire 112 and elongated housing 114, or concentrated downward such as for a task lighting or workstation lighting illumination pattern. Again, the directional component of light emitted from the optical waveguide 116*a* may be customized for each optical waveguide 116*a*-116*h* in order to produce an overall illumination pattern for the luminaire 112 that is desired for a particular application or setting.

Figure 5A:
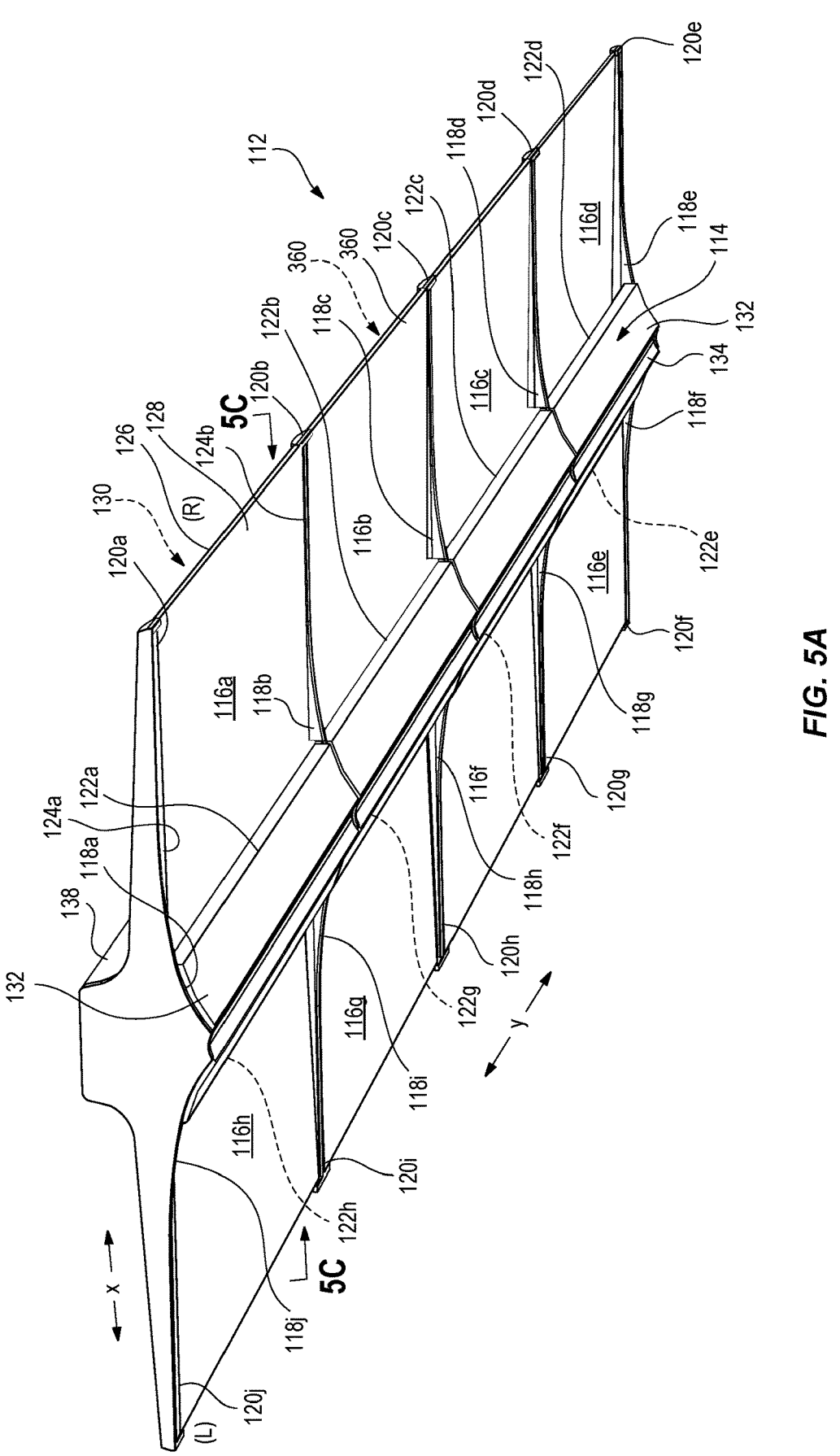
FIG. 5A is an isometric view from below of another embodiment of a suspended fixture that comprises a plurality of optical waveguides.

Moreover, one or more of the optical waveguides 116*a*-116*h* may develop an illumination distribution having a directional lighting component while one or more other of the optical waveguides 116*a*-116*h* may develop an illumination distribution having a different directional component or no directional component. By way of further example, waveguides 116*a*, 116*d*, 116*e*, 116*h* disposed on the ends of the luminaire 112 may develop directional components for lighting workstations under either end of said example luminaire 112. In still another example, the luminaire 112 may be disposed hanging from a ceiling (not shown) with a left side of the luminaire 112 proximal a vertical wall. In this example, the waveguides 116*e*-116*h* disposed along the left side (as seen in FIG. 5A) of the luminaire may have a generally downward illumination pattern while the waveguides 116*a*-116*d* disposed along the right side (not shown) of the luminaire may direct light away from the elongated housing 114, thereby directing light away from the vertical wall, and providing greater illumination to a room or indoor space associated with the wall and ceiling.

Given that each optical waveguide 116*a*-116*h* of the luminaire 112 may produce any customizable illumination pattern and that each optical waveguide 116*a*-116*h* is modular, such waveguides 116*a*-116*h* may be easily interchanged and selected to produce customizable overall illumination patterns for the luminaire 112, according to parameters suitable for a given indoor lighting application or simply according to desired characteristics.

With further reference to FIGS. 5A-6B, the elongate housing 114 may be formed from plastic, glass, metal, or some combination thereof. For example, the housing 114 may be fabricated from a single extrusion of one or more polymers to form the entire length thereof. As seen in FIG.

5A, the luminaire 112 may be in the range of about two feet in the y-dimension by about sixteen inches in the x-dimension. Further, each optical waveguide may be about one foot in the y-dimension and about six inches in the x-dimension. However, dimensions of the optical waveguides 116*a*-116*h* may be subject to modification, and further, may be customized to fit different suspended luminaire configurations, or the other luminaire configurations discussed hereinbelow.

Figure 7:
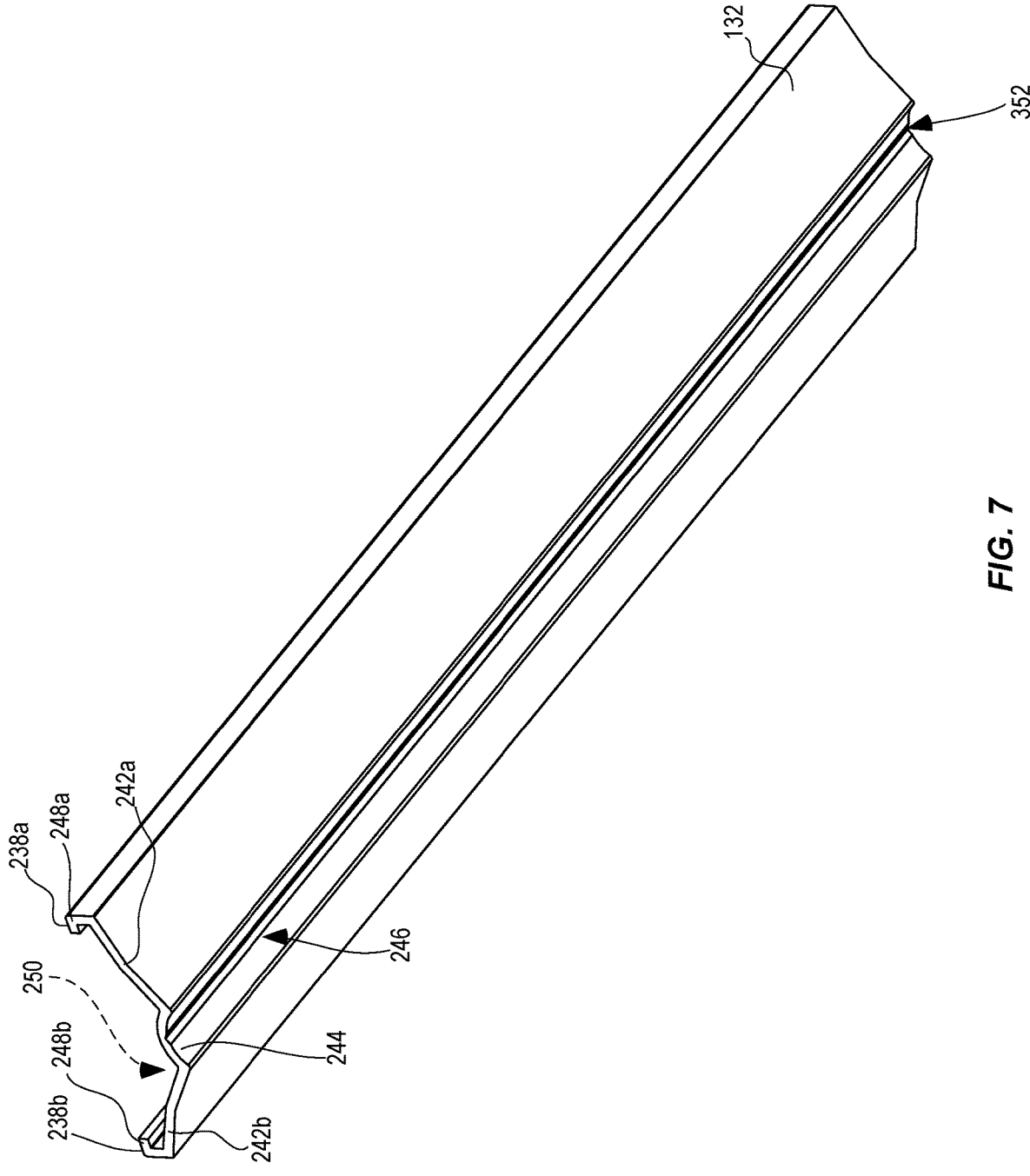
FIG. 7 is an isometric view from below of an optical waveguide housing cover piece from the suspended fixture shown in FIG. 5A.

The single extrusion elongate housing 114 may be painted any desired color or coated with a variety of reflective materials. In the example embodiment shown in FIGS. 5A, 5C, and 5D, the housing 114 has disposed along an underside thereof an elongate optical waveguide 132 (FIG. 7). The elongate optical waveguide 132 may be in optical communication with either one or more LED elements or modules 106 or with the optical waveguides 116*a*-116*h*.

Referring now to FIGS. 5C, 5D, and 7, light is directed out of the bottom surface 128 of each optical waveguide 116*a*-116*h* into coupling surfaces 238*a*, 238*b* of the elongate optical waveguide 132. Light coupled into the coupling surfaces 238*a*, 238*b* travels through first and second arcuate arms 242*a*, 242*b* of the elongate optical waveguide 132 until reaching an emission surface 244. The emission surface 244 is aligned with an indentation 134 on the lower portion 135 of the elongate housing 114. Light is directed out of the optical waveguide 132 through the emission surface 244 such that a small amount of emitted light develops a glowing appearance along the underside of the luminaire 112. The glowing appearance of the elongate optical waveguide 132 may improve the appearance of the luminaire 112 by lessening the contrast between the light emitting optical waveguides 116*a*-116*h* and the elongate housing 114, which typically would not emit light. The emission surface 244 may have disposed thereon one or more extraction feature(s) 246 or texturing to direct light out of the elongate optical waveguide 132.

The elongate optical waveguide 132 snaps into place over the indentation 134 and the lower portion 135 of the elongate housing 114 such that an interior surface 250 of elongate waveguide 132 enfolds the contour of said lower portion 135 of the housing 114. Such contour of the housing 114 defines the curve of the first and second arcuate arms 242*a*, 242*b*. In addition to contacting associated optical waveguides 116*a*-116*h*, the first and second coupling surfaces 238*a*, 238*b* form one side of respective first and second flanges 248*a*, 248*b* disposed at ends of either associated arcuate arm 242*a*, 242*b*. The flanges 248*a*, 248*b* engage with surfaces 252*a*, 252*b* of the lower portion 135 of the elongate housing 114 such that the elongate optical waveguide 132 is secured thereto. The elongate optical waveguide 132 partially surrounds a portion of the housing 114 such that the housing is covered thereby on one or more side(s); in this example the lower portion 135 of the housing 114 is covered by the elongate optical waveguide 132. Referring ahead to FIGS. 9A and 10-12A, an elongate optical waveguide 350 may cover a portion of respective housings of luminaires in said Figures. In embodiments disclosed herein, the elongate optical waveguide 350 comprises one side of the elongate optical waveguide 132, including for example, the first arcuate arms 242*a*, first coupling surface 238*a*, and first flange 248*a*. In such an embodiment, the structure of the elongate optical waveguide 350 (FIG. 12A) corresponds to one half of the elongate optical waveguide 132 if such waveguide 132 were to be sectioned along a center line 352 (FIGS. 5D and 7) disposed on the emission surface 244 thereof.

Figure 5B:
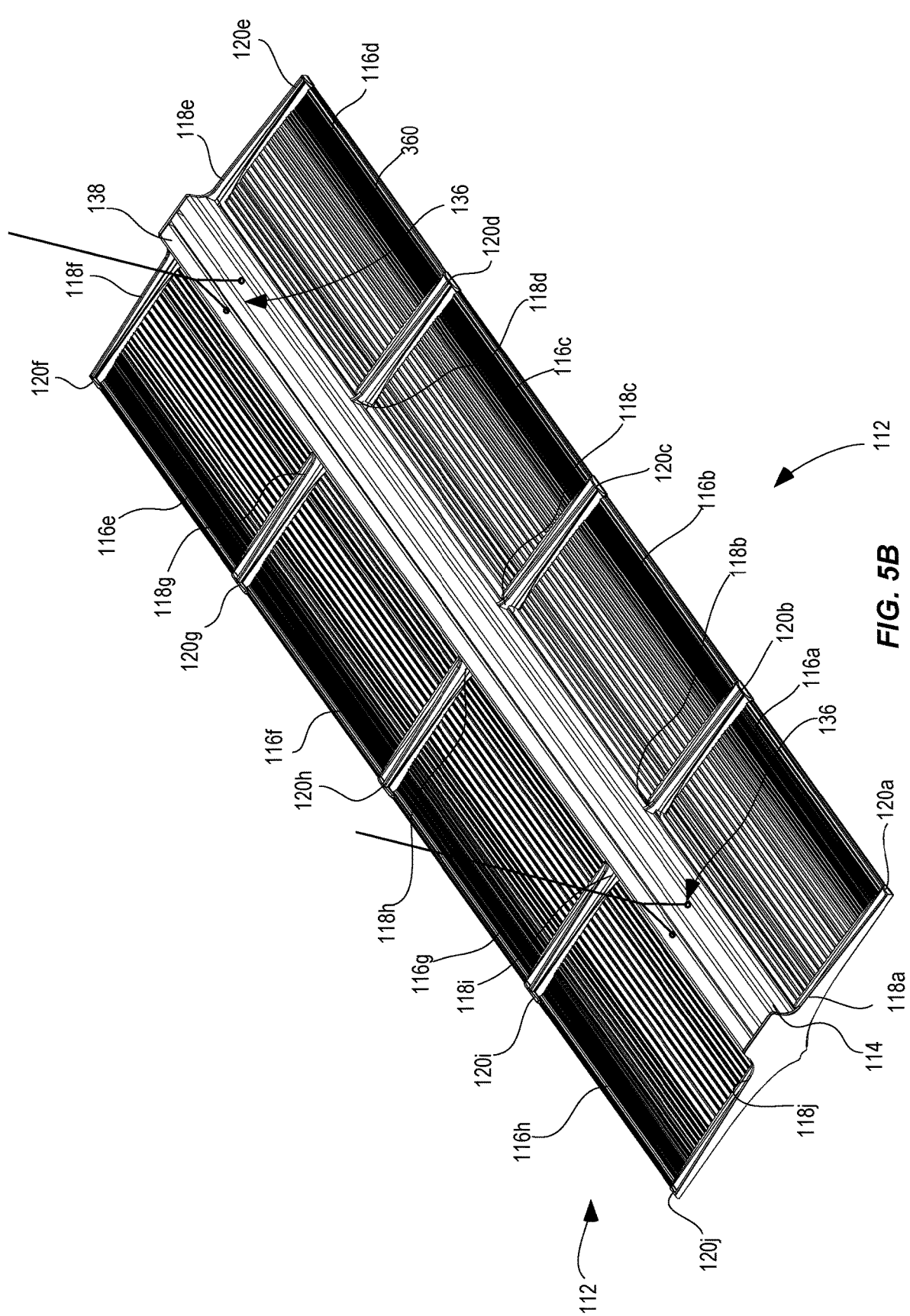
FIG. 5B is an isometric view from above of the suspended fixture shown in FIG. 5A.

The luminaire 112 may have one or more mounting or suspension assemblies 136 disposed on an upper housing portion 138 thereof (FIG. 5B). The mounting or suspension assemblies 136 may mechanically connect the luminaire 112 to a ceiling, pole, post, joist, or any other structurally suitable overhead mounting element(s). Alternatively, the mounting or suspension assemblies 136 may connect the luminaire to one or more wall(s), pole(s), post(s), stud(s), or any other structurally suitable horizontal mounting element (s). Electrical connections may be made in any manner to the luminaire.

Figure 8:
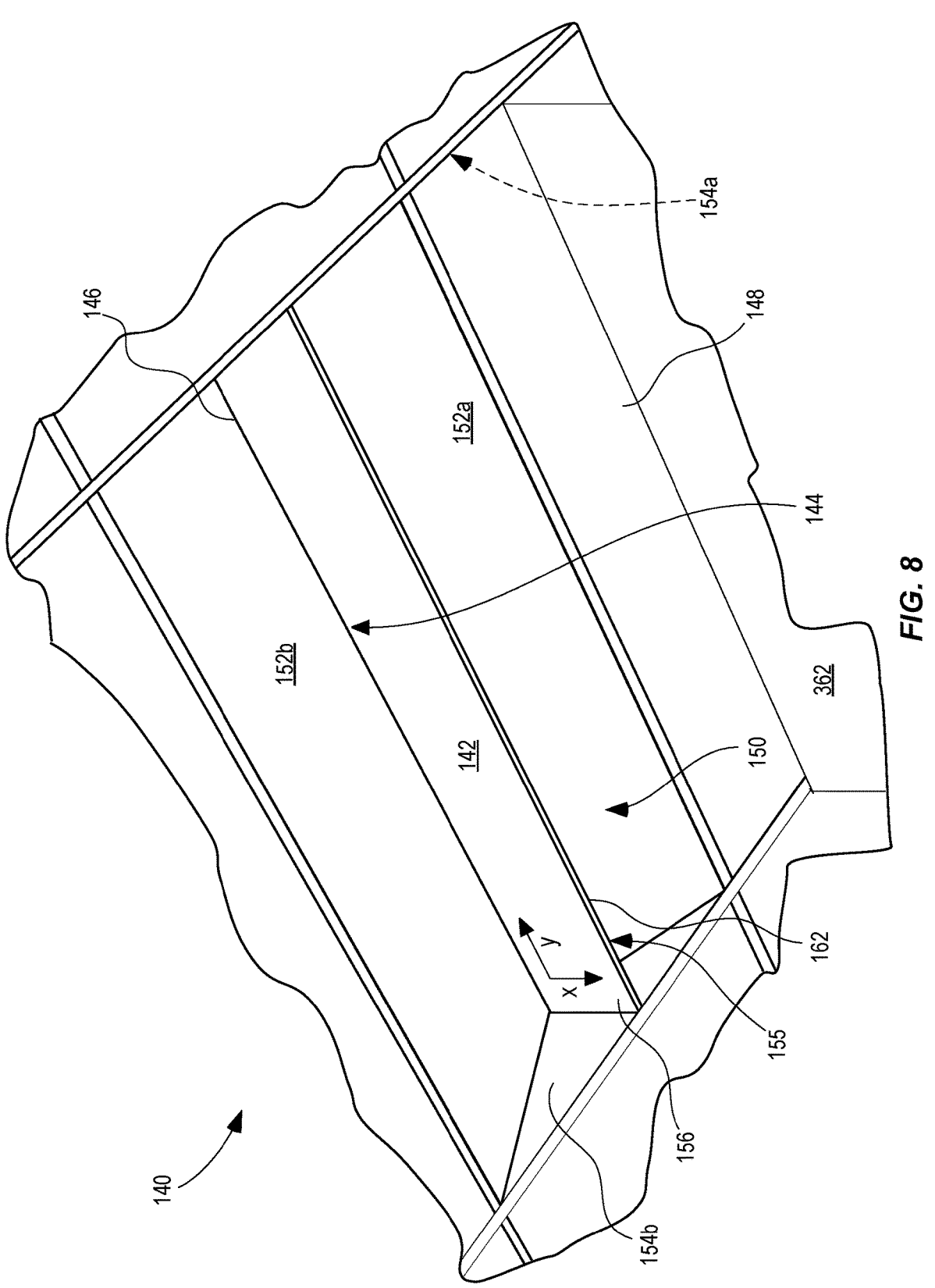
FIG. 8 is a perspective view from below of a troffer-style luminaire that comprises an optical waveguide in a vertical configuration.

Referring now to FIG. 8, an embodiment of a troffer-style luminaire 140 is depicted with an optical waveguide 142 arranged in a vertical position. A coupling end 144 of the optical waveguide 142 is disposed proximal a center line 146 of a troffer 148. The troffer 148, or troffers depicted in FIGS. 9A-10 and described hereinbelow, may be disposed at a partially recessed mounting position in a ceiling. An interior recess 150 of the troffer 148 having a pyramidal shape is formed by first and second top panels 152a, 152b meeting at the center line 146 along with first and second side panels 154a, 154b. The optical waveguide 142 may be about six inches in the x-dimension (FIG. 8), and the depth of the interior recess 150 may be approximately the same as the x-dimension of the waveguide 142. One or more LED element(s) or module(s) 106 are disposed within the troffer 148 along the center line 146 thereof for directing light into a coupling edge 144 of the optical waveguide 142.

As discussed above with reference to the embodiments of FIGS. 1-7, an illumination pattern developed by the luminaire 140 may be customized. Referring now to FIG. 8, the optical waveguide 142 includes on left and right sides 156, 155 thereof extraction features 360 having one or more of the characteristics discussed with reference to FIGS. 2-4 for developing desired distributions of emitted light. For example the luminaire 140 may develop an illumination pattern such that a ratio of emitted light may be one-to-one for the left and right sides 156, 155 of the optical waveguide 142. Other lighting parameters may be similarly customized between the left and right sides 156, 155 according to desired characteristics such as intensity, illumination pattern, directionality, etc. Additionally, the left and right sides 156, 155 of the optical waveguide 142 may emit substantially collimated light in selected directions, such as, for example, at thirty degrees or forty-five degrees downward and away from the luminaire 140 in order to create a desired lighting distribution and/or directionality pattern. In example embodiments, the bottom edge 162 of the optical waveguide 142 may also emit some portion of the light coupled into said waveguide 142 such that the bottom edge 162 thereof glows and/or directs some light downward.

Furthermore, the left and right sides 156, 155 of the optical waveguide 142 may have the same or different emission patterns. By way of further example, the luminaire 140 may be disposed such that the right side 155 of the optical waveguide 142 faces a vertical wall 362 and the left side 156 of the optical waveguide 142 faces into an open indoor space. In this example, it may be desirable for the right side 155 to emit less light and direct said light relatively more downward, while the left side 156 emits more light and directs said light relatively more horizontally outward into the open indoor space.

Figure 9A:
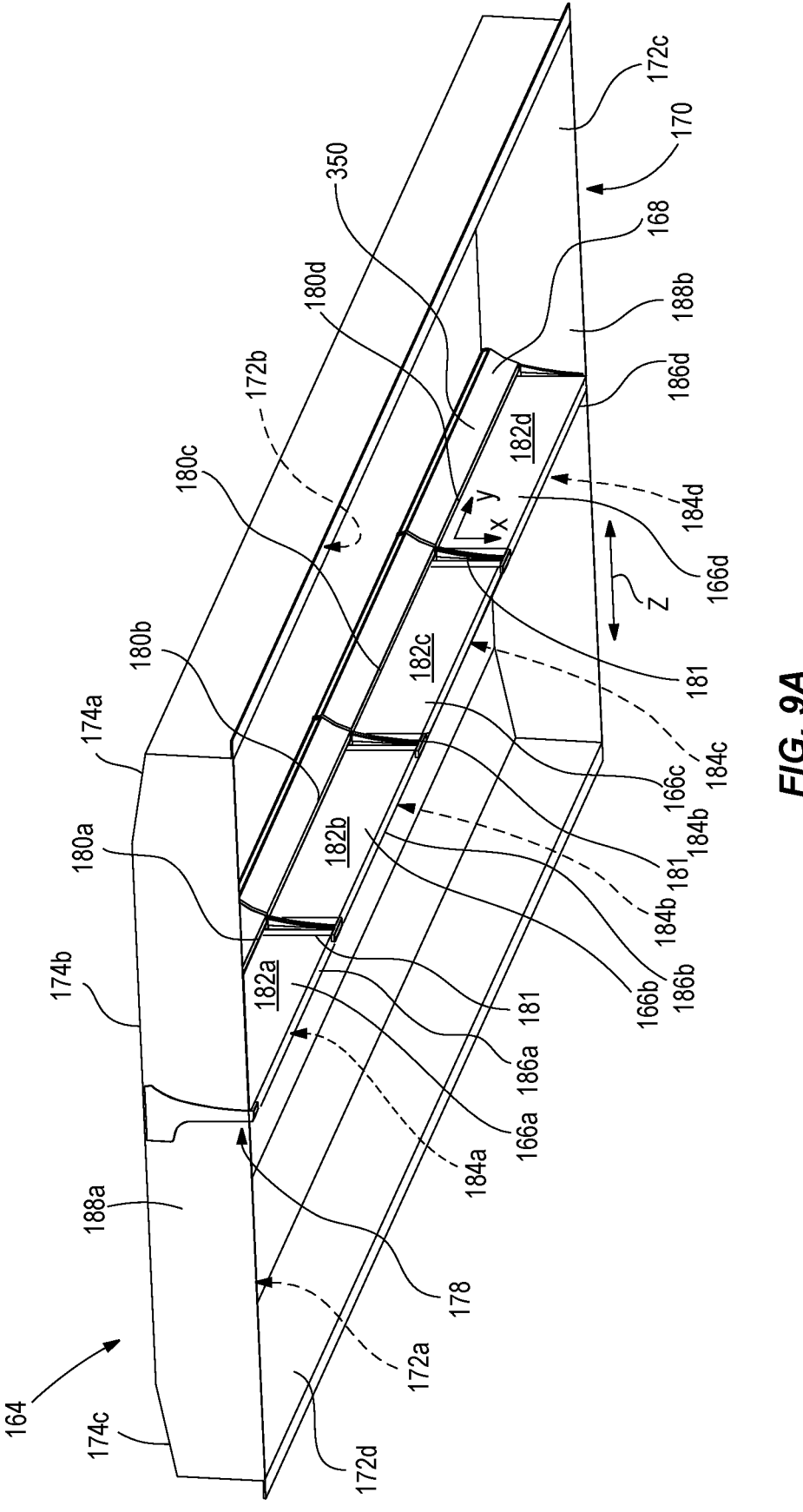
FIG. 9A is an isometric view from below of another embodiment of a troffer-style luminaire that comprises a plurality of optical waveguides in a vertical configuration.
Figure 9B:
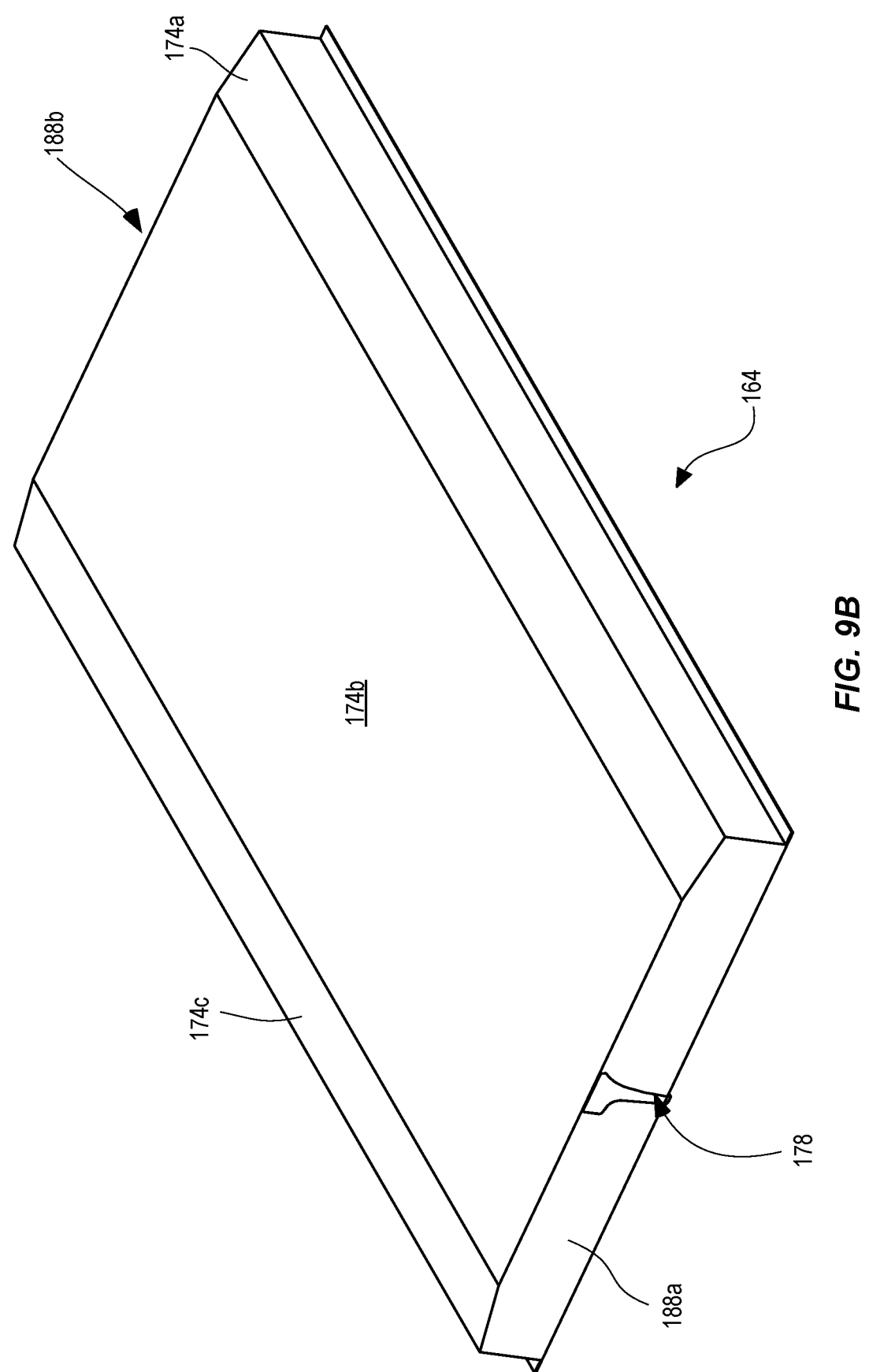
FIG. 9B is an isometric view from above of the troffer-style luminaire shown in FIG. 9A.
Figure 10:
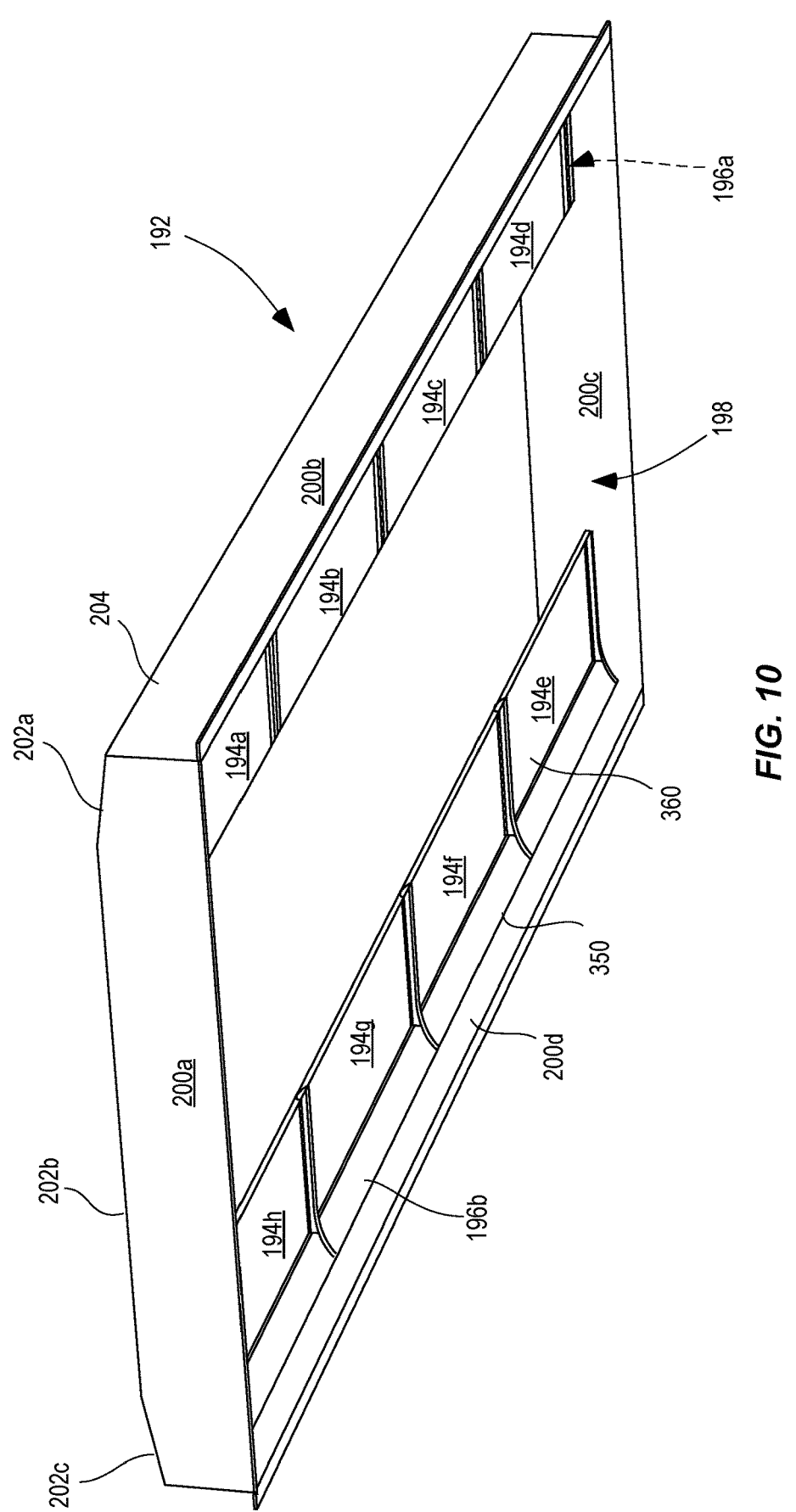
FIG. 10 is an isometric view from below of another embodiment of a troffer-style luminaire that comprises a plurality of optical waveguides in a horizontal configuration.

FIGS. 9A and 9B depict another embodiment of a troffer-style luminaire 164 with four optical waveguides 166a-166d arranged side-by-side in a vertical position and suspended from above. A single extrusion elongate housing 168 may be mounted proximal a center line 178 within an interior recess

170 formed by four side panels 172a-172d along with top panels 174a-174c of a troffer 176. Inner portions of such top panels 174a-174c and side panels 172a-172d may be painted or coated with a reflective material (specular or diffuse) or another desired covering to achieve a desired optical distribution. Each of the four optical waveguides 166a-166d may be suspended from a coupling edge 180a-180d thereof. Brackets 181 may be mounted to the elongate housing 168 and arranged between the individual optical waveguides 166a-166d to provide additional structural support and alignment thereto. One or more LED element(s) or module (s) 106 are disposed within the elongate housing 168 along the center line 178 of the troffer 176 for coupling light into coupling edges 180a-180d of the optical waveguides 166a-166d, respectively.

As seen in FIG. 9A, each optical waveguide 166a-166d may be about two inches in the x-dimension, about one foot in the y-dimension, and a depth of the interior recess 170 may be approximately the same or larger than the x-dimension of the waveguides 166a-166d. The elongate housing 168 may be formed from plastic, glass, metal, or some combination thereof. For example, the housing 168 may be fabricated from a single extrusion of one or more polymers to form the entire length thereof. The luminaire 164 may be about four feet in the y-dimension by about two feet in the z-dimension. Moreover, the dimensions of the optical waveguides 166a-166d may be subject to modification, and further, may be customized to fit different troffer-style luminaire configurations and/or sizes.

Each of the optical waveguides 166a-166d includes on left and right sides 182a-182d, 184a-184d thereof extraction features 360 having one or more of the characteristics discussed with reference to FIGS. 2-4 for developing desired distributions of emitted light. For example, in order to achieve a desired illumination distribution, a ratio of emitted light may be one-to-one for the respective left and right sides 182a-182d, 184a-184d of the optical waveguides 166a-166d. Additionally, the left and right sides 182a-182d, 184a-184d of the optical waveguides 166a-166d may emit light in selected directions, such as, for example, at thirty degrees or forty-five degrees downward and away from the luminaire 140. In example embodiments, the bottom edges 186a-186d of the optical waveguides 166a-166d may also emit some portion of light such that said bottom edges 186a-186d glow and/or direct some light downward.

Furthermore, the left and right sides 182a-182d, 184a-184d of the optical waveguides 166a-166d may have the same or different emission patterns having one or more directional components. By way of further examples, the luminaire 164 may be configured such that each of the individual optical waveguides 166a-166d has a different light emission pattern from all other waveguides, each of some of the waveguides (e.g., every other of the individual optical waveguides 166a-166d) has a first light emission pattern while each of one or more of the remaining waveguides 166 has a second light emission pattern different than the first light emission pattern, or only one of the optical waveguides 166a-166d has a different light emission pattern relative to the other optical waveguides 166a-166d. In a specific example, it may be desirable for the optical waveguides 166a, 166d on either end 188a, 188b of the troffer-style luminaire 164 to direct light relatively more horizontally outward from the luminaire 164 toward the nearest end thereof 188a, 188b, while the interior optical waveguides 166b, 166c direct light relatively more downward and below the luminaire 164. Such a configuration of optical waveguides may form a desirable illumination pattern for lighting an open indoor/outdoor/enclosed space such as an office or warehouse while also adequately lighting the floor immediately underneath the troffer-style luminaire 164.

As with other embodiments described herein, the optical waveguides 166a-166d are modular and interchangeable, such that one may be switched for another and/or such that the optical waveguides 166a-166d may be replaced with relative ease. Given that each optical waveguide 166a-166d of the luminaire 164 may produce any customizable illumination pattern and that each optical waveguide 166a-166d is modular, such waveguides may be easily interchanged and selected to produce customizable overall illumination patterns for the luminaire 164 according to parameters suitable for a given indoor/outdoor/enclosed lighting application or simply according to the desired characteristics.

Referring now to FIGS. 10A and 10B, another embodiment of a troffer-style luminaire 192 is illustrated with eight optical waveguides 194a-194h. Single extrusion elongate housings 196a, 196b may be mounted within an interior recess 198 formed by four side panels 200a-200d along with top panels 202a-202c of a troffer 204. In the depicted embodiment, the first and second elongate housings 196a, 196b are disposed on the opposing side panels 200b, 200d, respectively. These top panels 202a-202c and side panels 200a-200d may be painted or coated with reflective material or another desired covering as with previously described embodiments. The configuration of the optical waveguides 194a-194h and the elongate housings 196a, 196b respectively associated therewith is substantially identical to a wall fixture embodiment described hereinbelow with reference to FIGS. 12A and 12B. Additionally, as described hereinabove, the optical waveguides 194a-194b are interchangeable and modular, having the characteristics associated with such feature and described in detail with reference to previous embodiments.

Figure 11A:
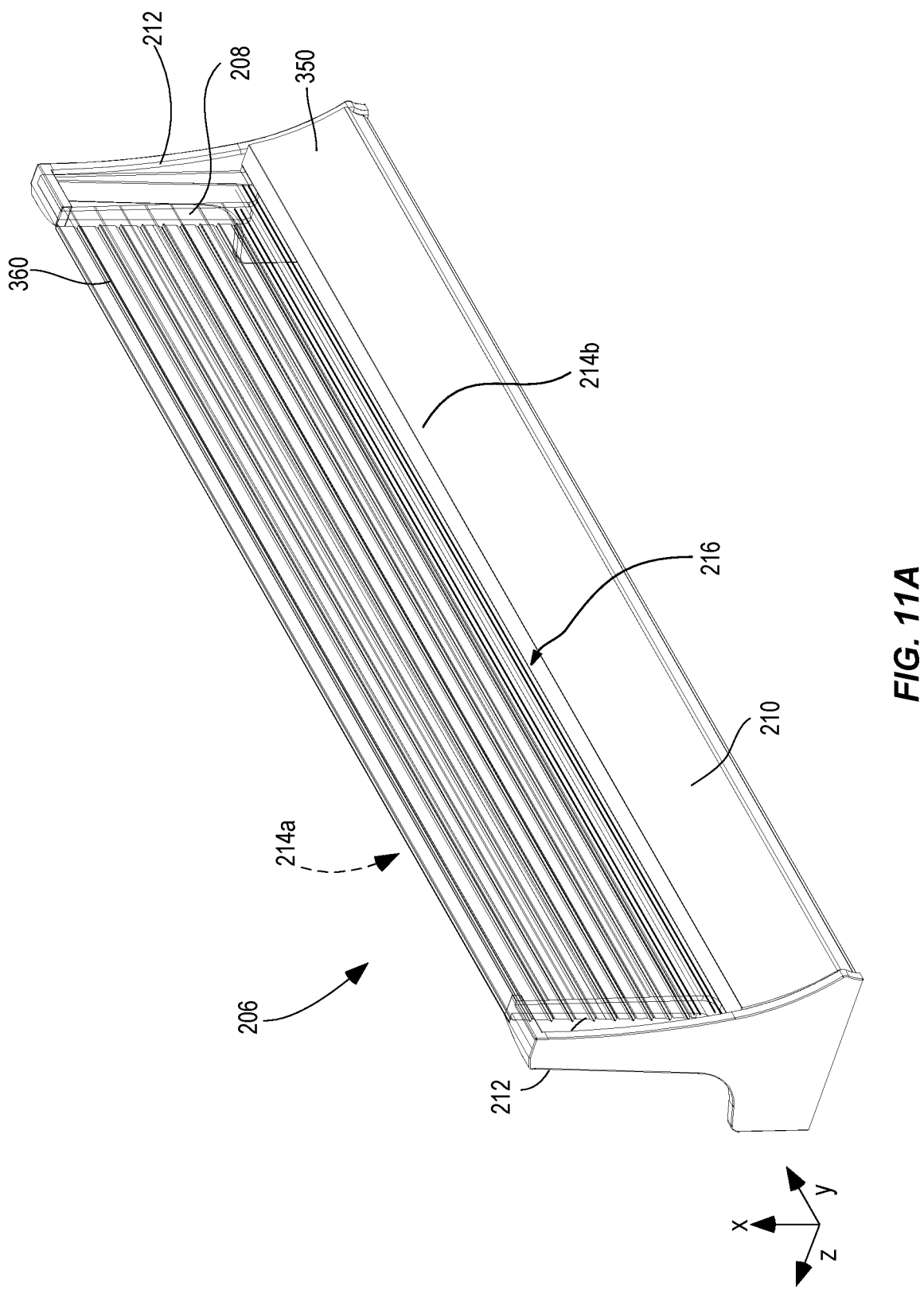
FIG. 11A is an isometric view from below of a luminaire that comprises an optical waveguide in a wall sconce configuration.
Figure 11B:
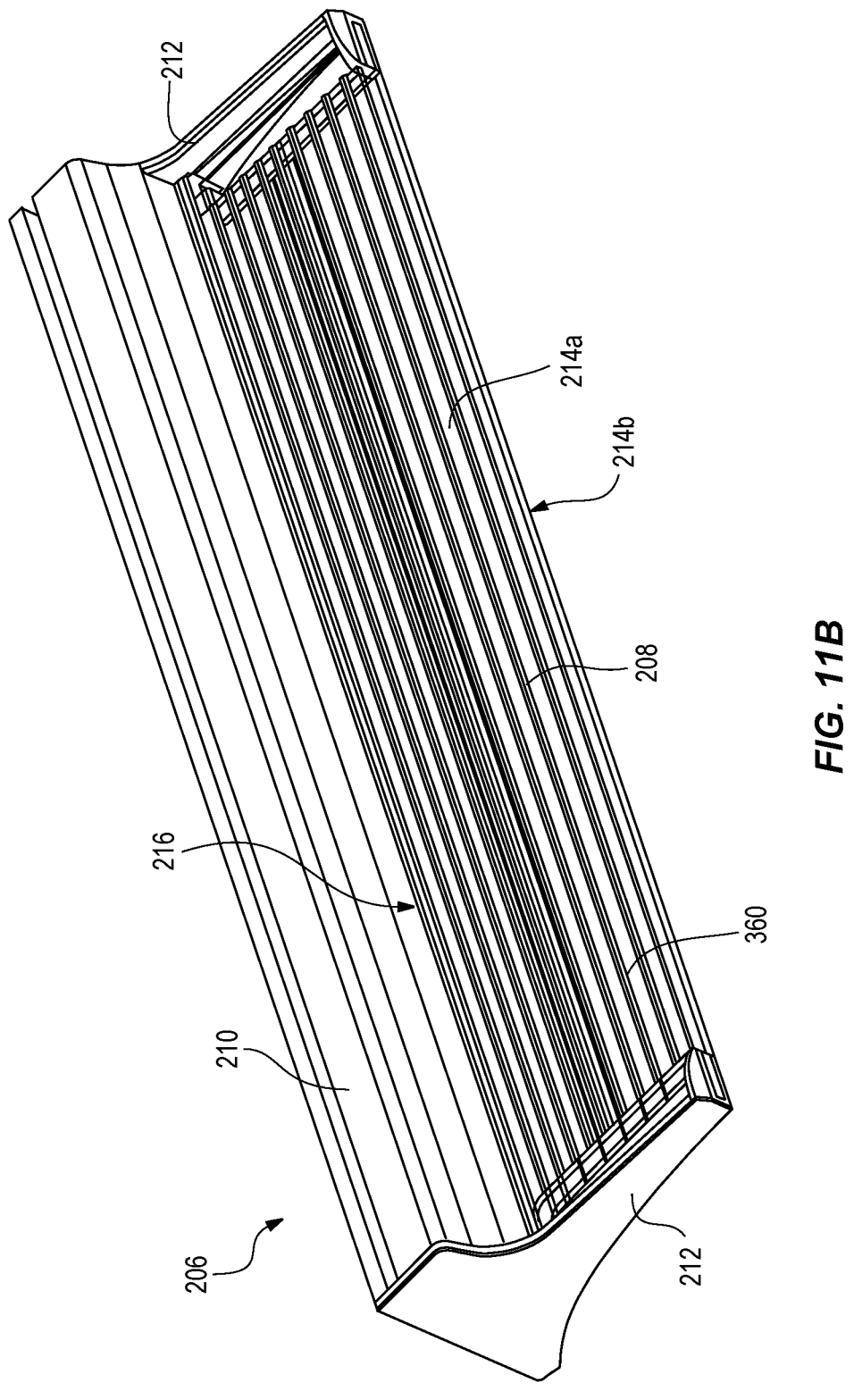
FIG. 11B is an isometric view from above of the luminaire shown in FIG. 11A.

Referring now to FIGS. 11A and 11B, an embodiment of a wall sconce luminaire 206 with a single optical waveguide 208 is shown. The wall sconce 206 and optical waveguide 208 may be mounted to a wall, stud(s), or other suitable structure in either a vertical or a horizontal orientation. The wall sconce 206 includes an elongate housing 210 with support brackets 212 disposed on either end thereof. The optical waveguide 208 may be about two inches in the x-dimension and about one foot in the y-dimension (FIG. 11A). The elongate housing 210 may be formed from plastic, glass, metal, or some combination thereof and/or may be fabricated from a single extrusion of one or more polymers to form the entire length thereof. However, dimensions of the optical waveguide 208 may be subject to modification, and further, may be customized to fit different wall sconce sizes and applications. As in the other embodiments disclosed herein, the elongate housing 210 may include, among other things, one or more of driver circuitry, light emitting diode(s), control circuitry, sensor(s), power circuitry, circuit board(s), or other components. The wall sconce 206 comprises one or more LED elements or modules 106, as discussed hereinabove, arranged to direct light into a coupling end 216 of the optical waveguide 208.

As with previous embodiments, the optical waveguide 208 includes on upper and lower sides 214a, 214b thereof extraction features 360 having one or more of the characteristics discussed with reference to FIGS. 2-4 for developing desired distributions of emitted light. The illumination patterns emitted by the single optical waveguide 208 may be symmetrical and equal in the example embodiment shown in FIGS. 11A and 11B. As with other embodiments described herein, the optical waveguide 208 is modular and interchangeable, such that it may be substituted for an alternative waveguide having different extraction features and/or may be replaced with relative ease. Therefore, the waveguide 208 may be easily changed and selected to produce customizable overall illumination patterns for the wall sconce 206 according to parameters suitable for a particular indoor/outdoor/enclosed lighting application or simply according to desired characteristics. By way of example, the optical waveguide 210 may include a directed illumination pattern suitable for task lighting such that the wall sconce 206 may be mounted above a desk or workstation to provide lighting therefor.

Figure 12A:
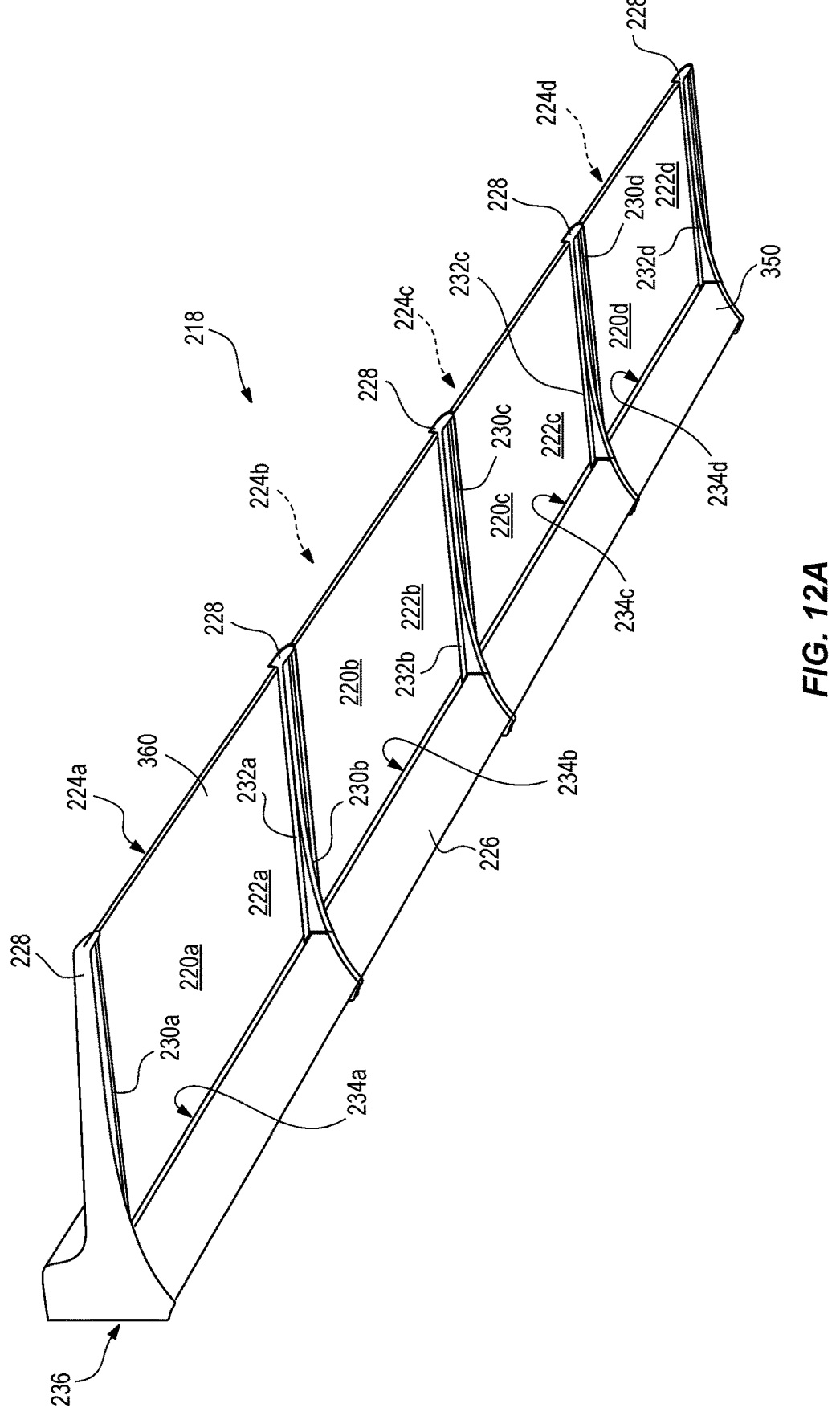
FIG. 12A is an isometric view from below of a luminaire that comprises a plurality of optical waveguides in a wall fixture configuration.
Figure 12B:
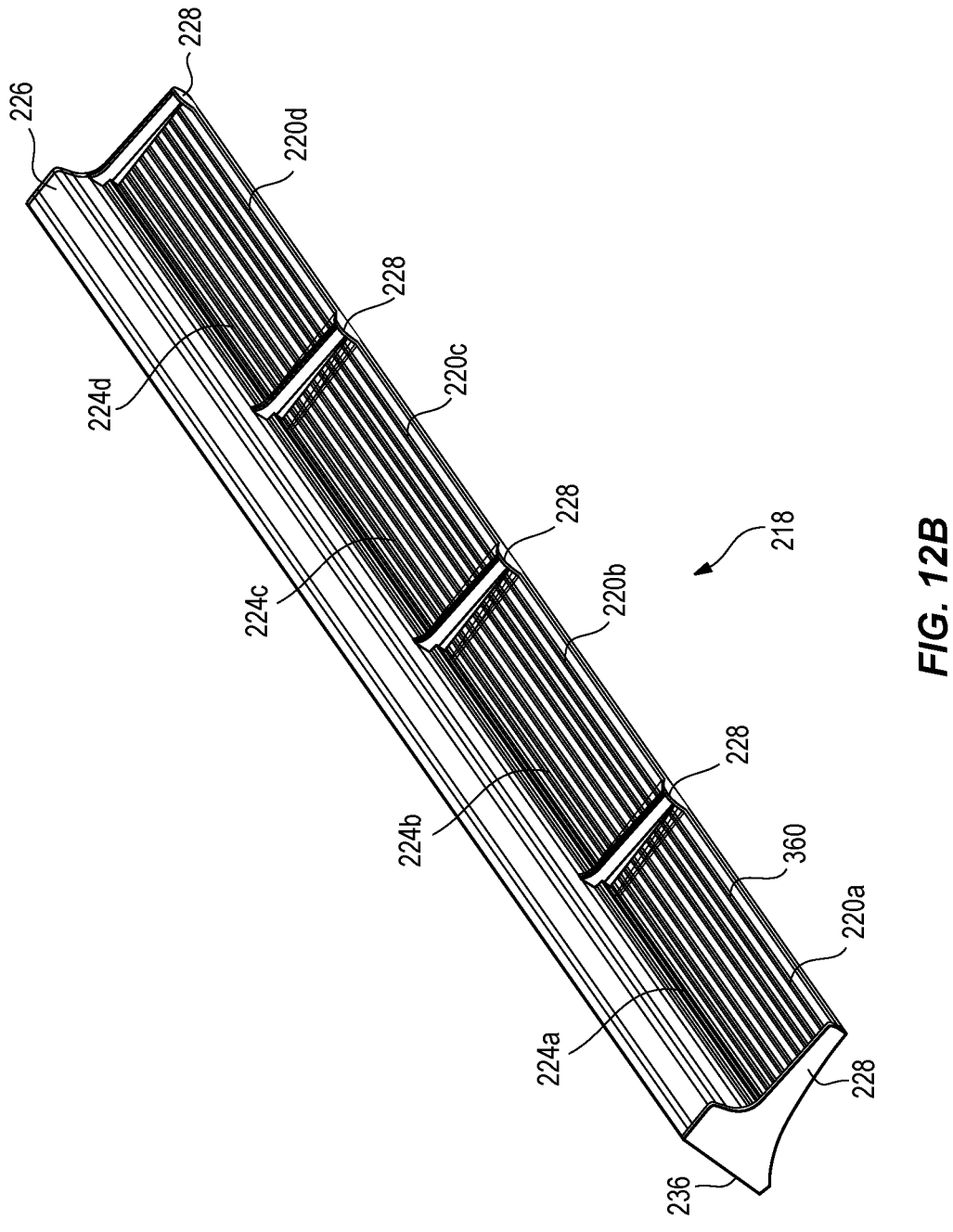
FIG. 12B is an isometric view from above of the luminaire shown in FIG. 12A.

FIGS. 12A and 12B depict an embodiment of a wall fixture luminaire 218 with four optical waveguides 220a-220d arranged in a horizontal configuration. The wall fixture 218 and the optical waveguides 220a-220d may be mounted to a wall, stud(s), or other suitable structural mounting point 236 and, in this example embodiment, configured with a horizontal orientation such that a lower side 222a-222d of each optical waveguide 220a-220d faces generally downwards towards a floor or ground, and an upper side 224a-224d of each optical luminaire 220a-220d faces generally upwards, perhaps toward a ceiling, if indoors. The wall fixture 218 includes an elongate housing 226 with brackets 228 mounted thereto and arranged between the individual optical waveguides 220a-220d to provide additional structural support and alignment to first and second edges 230a-230d, 232a-232d of each waveguide 220a-220d. The optical waveguides 220a-220d may have dimensions similar or identical to or different than the optical waveguides 116a-116h described hereinabove with reference to FIG. 5. As in the other embodiments disclosed herein, the elongate housing 226 may be formed from plastic, glass, metal, or some combination of materials and/or may be fabricated from a single extrusion of one or more polymers to form the entire length thereof. However, dimensions of the optical waveguides 220a-220d may be subject to modification, and further, may be customized to fit different wall fixture sizes and configurations. The elongate housing 226 may enclose, among other things, one or more of driver circuitry, light emitting diode(s), control circuitry, sensor(s), power circuitry, circuit board(s), or other components. The wall fixture 218 comprises one or more LED elements or modules 106, as discussed hereinabove, arranged to direct light into a coupling end 234a-234d of each optical waveguide 220a-220d. Further, the housing 226 and brackets 228 provide support to the coupling ends 234a-234d and first and second edges 230a-230d, 232a-232d, respectively, to hold each optical waveguide 220a-220d out horizontally from the mounting point 236.

As with the other embodiments disclosed herein, the optical waveguides 220a-220d include extraction features 360 on the lower and upper surfaces 222a-222d, 224a-224d thereof, having one or more of the characteristics discussed with reference to FIGS. 2-4, for developing desired distributions of emitted light. For example, the illumination patterns emitted by the optical waveguides 220a-220d of the wall fixture luminaire 218 may provide an overall illumination pattern that directs about eighty percent of the emitted light downward and away from the luminaire 218 and about twenty percent of the emitted light upward and away from the luminaire 218. Such an example illumination pattern may be suitable for mounting the wall fixture luminaire 218 on one or more vertical walls surrounding a large, indoor/outdoor/enclosed space, and/or for mounting along vertical walls of a hallway.

As with other embodiments described herein, the optical waveguides 220a-220d are modular and interchangeable, such that each may be switched for an alternative waveguide having different extraction features and/or may be replaced with relative ease. Therefore, the waveguides 220a-220d may be easily changed and selected to produce customizable overall illumination patterns for the wall fixture luminaire 218 according to parameters suitable for a particular indoor lighting application or simply according to desired characteristics.

Figures 13A, 13B:
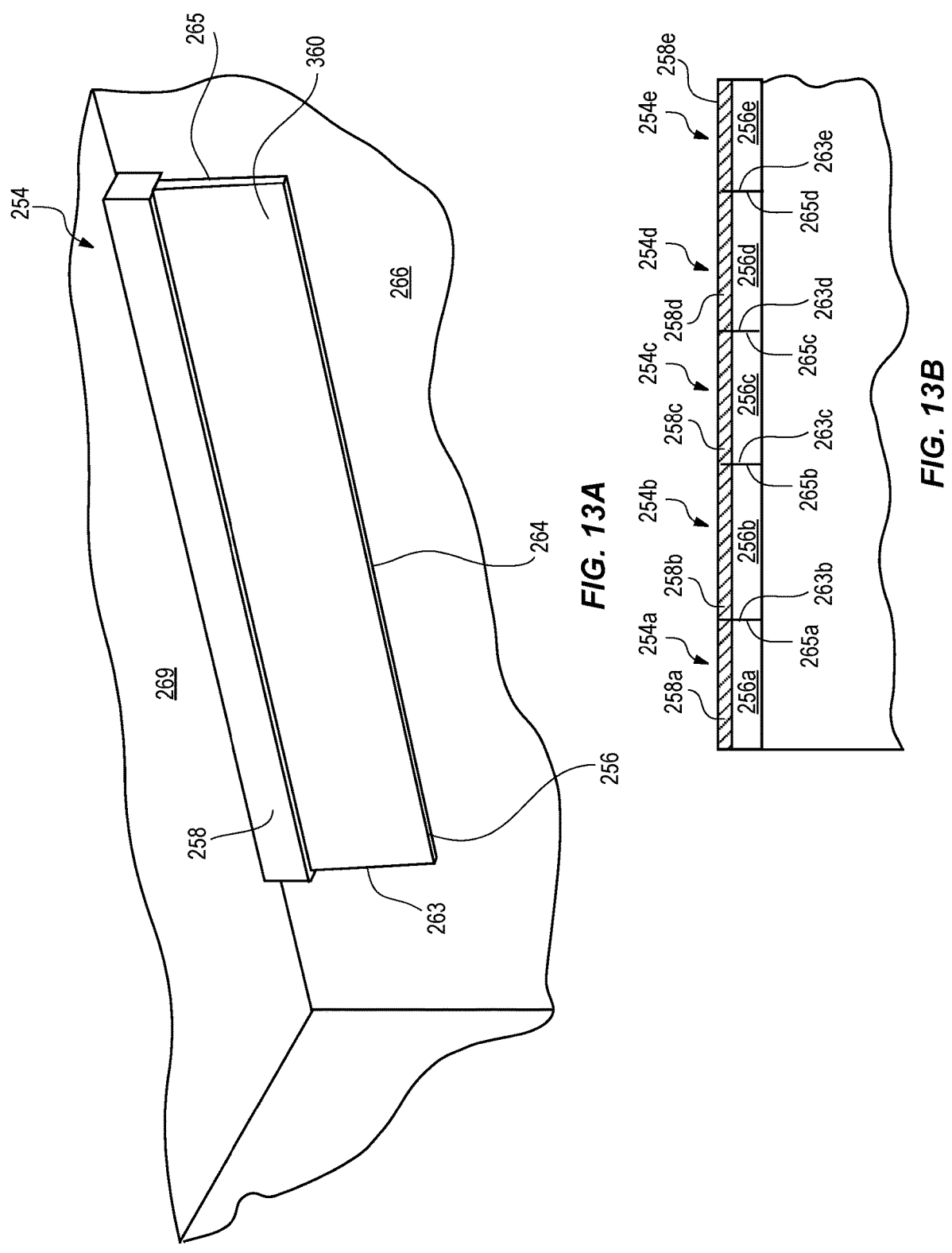
FIG. 13A is an isometric view from below of an embodiment of a luminaire that comprises another wall mounted configuration with an optical waveguide in a vertical configuration.
FIG. 13B is a side elevational view of a plurality of the luminaires shown in FIG. 13A depicted in a side-by-side configuration.

Referring now to FIG. 13A, an embodiment of a luminaire 254 with one optical waveguide 256 is disposed in a vertical configuration. This luminaire embodiment 254 may be similar to the wall sconce luminaire 206 (FIG. 11A) and housing and mounting features thereof are substantially or completely the same, except as noted hereafter. The luminaire 254 may have a housing 258 that is elongate and rectangular in cross section. In the absence of structural arms or brackets as described with reference to previous embodiments, the housing 258 comprises the sole support for the optical waveguide 256. The resulting luminaire 254 presents the optical waveguide 256 as unrestricted on edge surfaces 263, 264, 265 thereof, except for a coupling end 260 that is disposed within the housing 256 and supported thereby. The remaining edge surfaces 263, 264, 265 of the optical waveguide are exposed and a portion of light coupled into the waveguide 256 may be emitted from said edge surfaces 263, 264, 265. The exposed edge surfaces 263, 264, 265 may be desirable for architectural purposes.

The housing 258 may be mounted from a ceiling 269 or wall 266 in the depicted embodiment. FIG. 13B depicts a plurality of luminaires 254a-254e arranged side-by-side. In this embodiment, the edge surfaces 265a, 263b, 265b, 263c, 265c, 263d, 265d, 263e may abut one another or may have a small gap disposed therebetween. An example embodiment wherein adjacent optical waveguides 256a, 256b, 256c . . . , are in optical communication with one another is also contemplated. In such an embodiment, light may not be exclusively emitted from edge surface 263, 265 of each optical waveguide 256, but instead may be coupled into the adjacent optical waveguide 256a, 256b, 256c . . . , for eventual emission. Similarly, the housings 258a, 258b, 258c . . . , may abut one another. Alternatively, the housings 258a, 258b, 258c . . . , may instead be formed as a single housing having a plurality of optical waveguides arranged therealong similar or identical to the embodiment of FIGS. 12A and 12B.

Figure 14A:
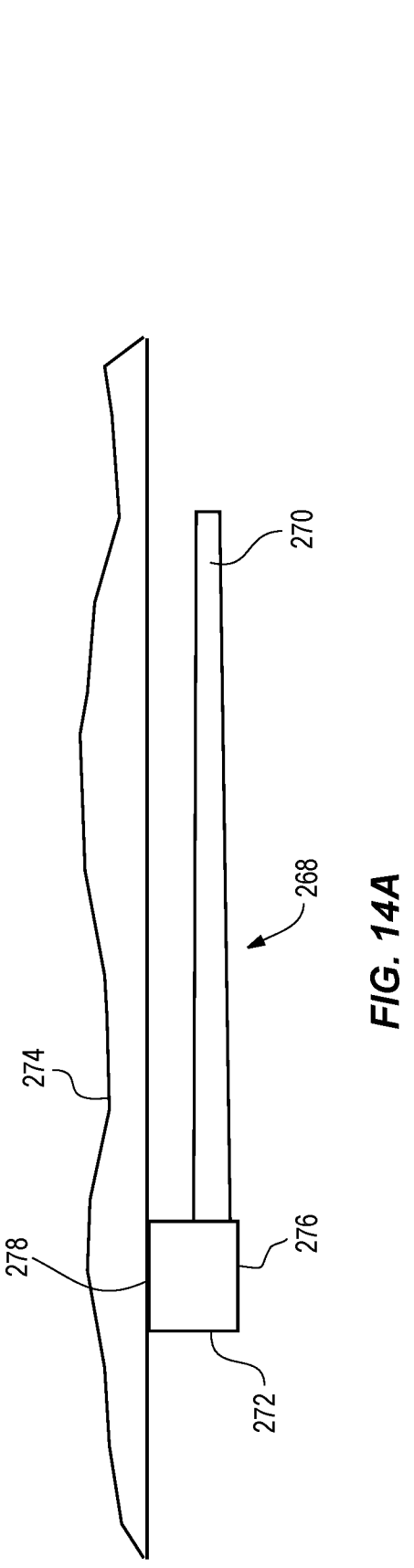
FIG. 14A is an end elevational view of a luminaire that comprises a ceiling mounted fixture with an optical waveguide in a horizontal configuration.
Figure 14B:
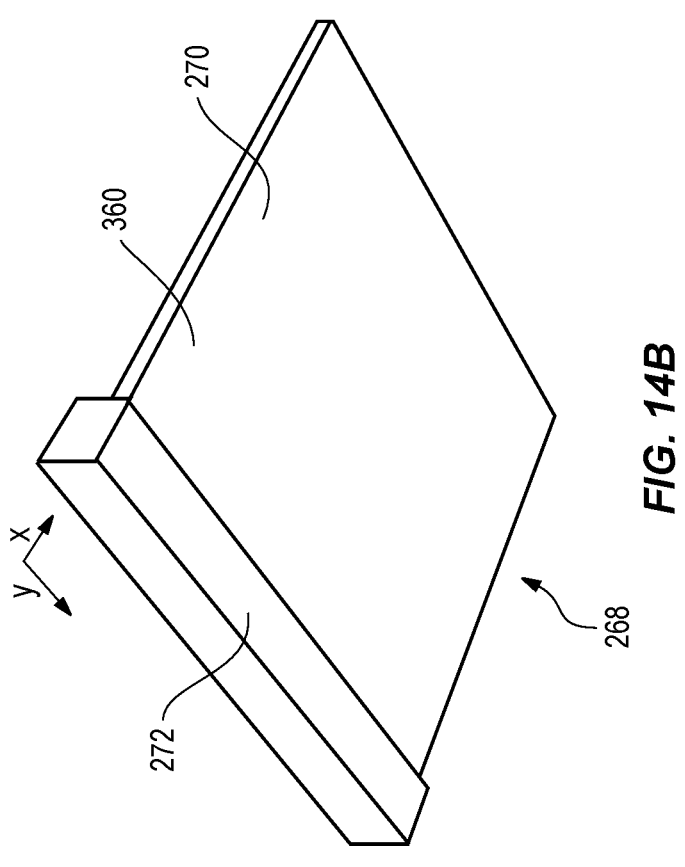
FIG. 14B is an isometric view from below of the luminaire shown in FIG. 14A.
Figure 14C:
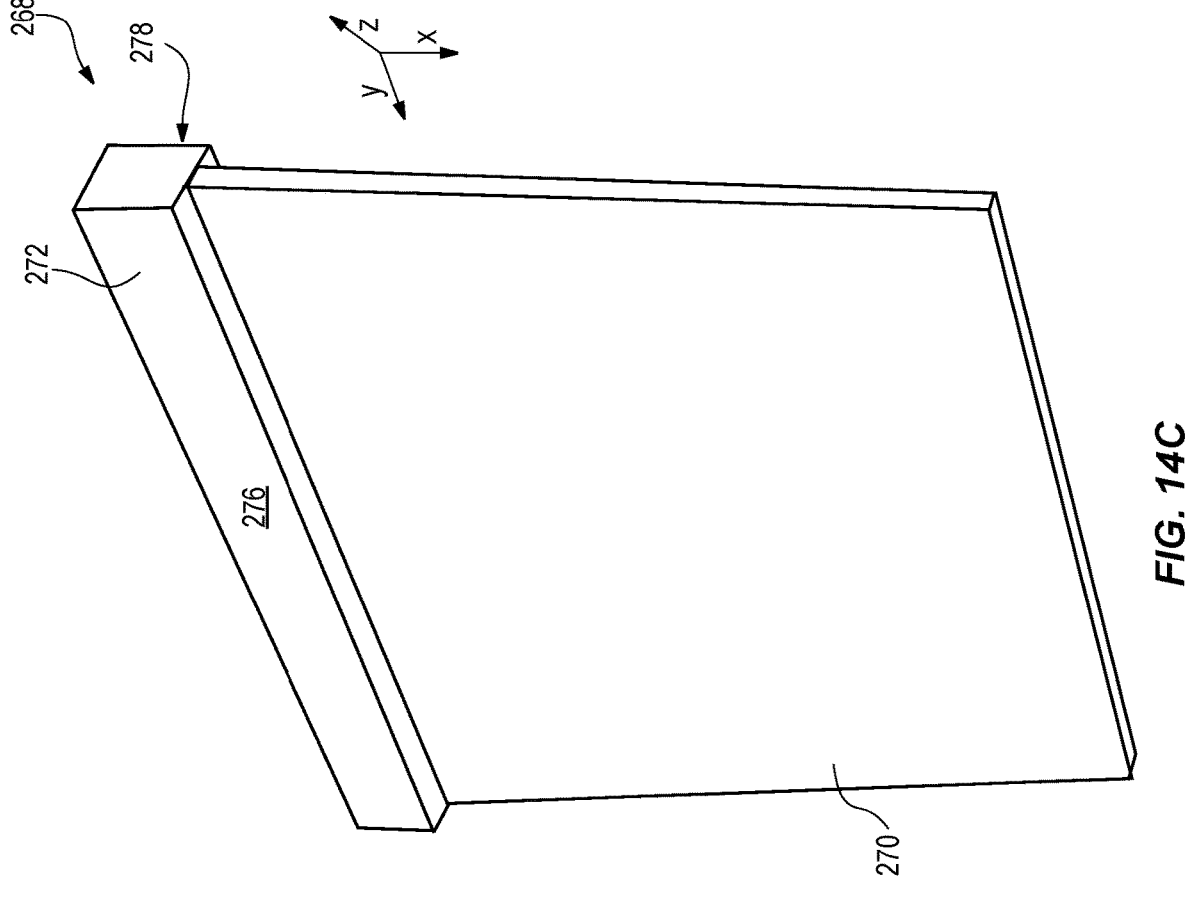
FIG. 14C is a side isometric view of an embodiment of a luminaire similar to that shown in FIG. 14A that comprises a tapered optical waveguide.

FIGS. 14A and 14B depict an embodiment of a luminaire 268 with one optical waveguide 270, similar in configuration to the luminaire 254 of FIG. 13A. The luminaire 268 includes an elongate housing 272 that is rectangular in cross section; however, the optical waveguide 270 in this example is disposed off-center within the housing 272. As depicted, the luminaire 268 is mounted to a ceiling 274, and the optical waveguide 270 is mounted to the housing 272 proximal a first side 276 thereof opposite a second side 278 of the housing 272 that is mounted to the ceiling 274. The overall shape of the luminaire 268 may be relatively less elongate as compared with the luminaire 254 of FIG. 13A. To achieve such a difference in format, the housing 272 as shown in FIGS. 14A and 14B is relatively shorter along a y-dimension (FIG. 14B) thereof. Moreover, the optical waveguide 270 is relatively shorter along the same y-dimension, while being relatively longer along the x-dimension. As previously mentioned, modification of the overall size and shape of waveguides and housings is contemplated throughout this disclosure. FIG. 14C depicts an embodiment of the luminaire 268 wherein the optical waveguide 270 is disposed nearly centered between the first side 276 and the second side 278 of the housing 272. The luminaire 268 may be mounted to a wall or ceiling with the optical waveguide 270 arranged in either a horizontal or vertical orientation. Further, the optical waveguide 270 shown in FIGS. 14A-14C may be of substantially uniform thickness throughout (z-dimension) or, instead, may taper with increasing distance from the housing 272.

Figures 15A, 15B, 16:
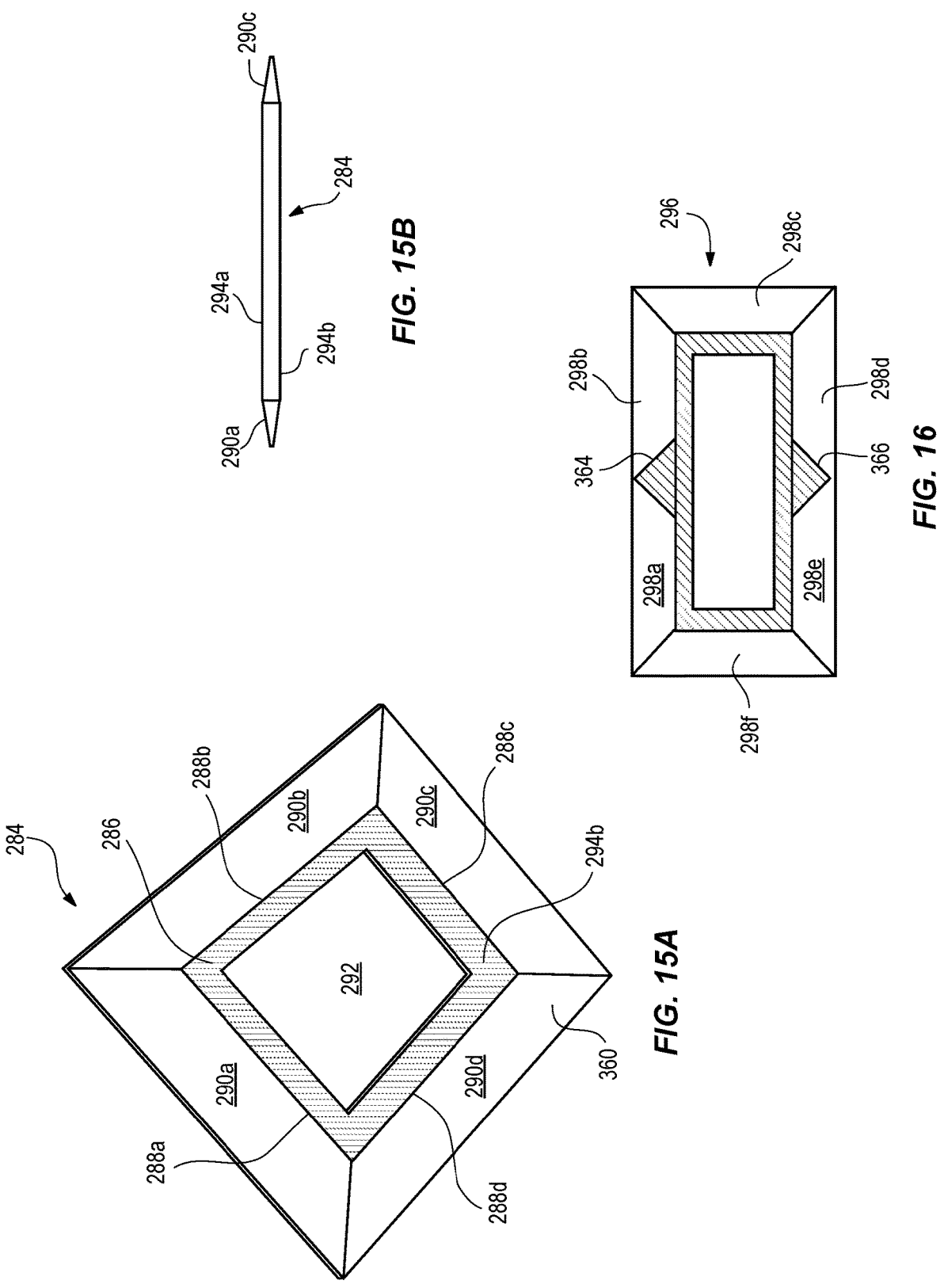
FIG. 15A is an isometric view from below of a luminaire that comprises a plurality of optical waveguides arranged in a square configuration.
FIG. 15B is an elevational view of the luminaire shown in FIG. 15A.
FIG. 16 is a bottom elevational view of a luminaire that comprises a plurality of optical waveguides arranged in an elongated configuration.
Figures 17, 18:
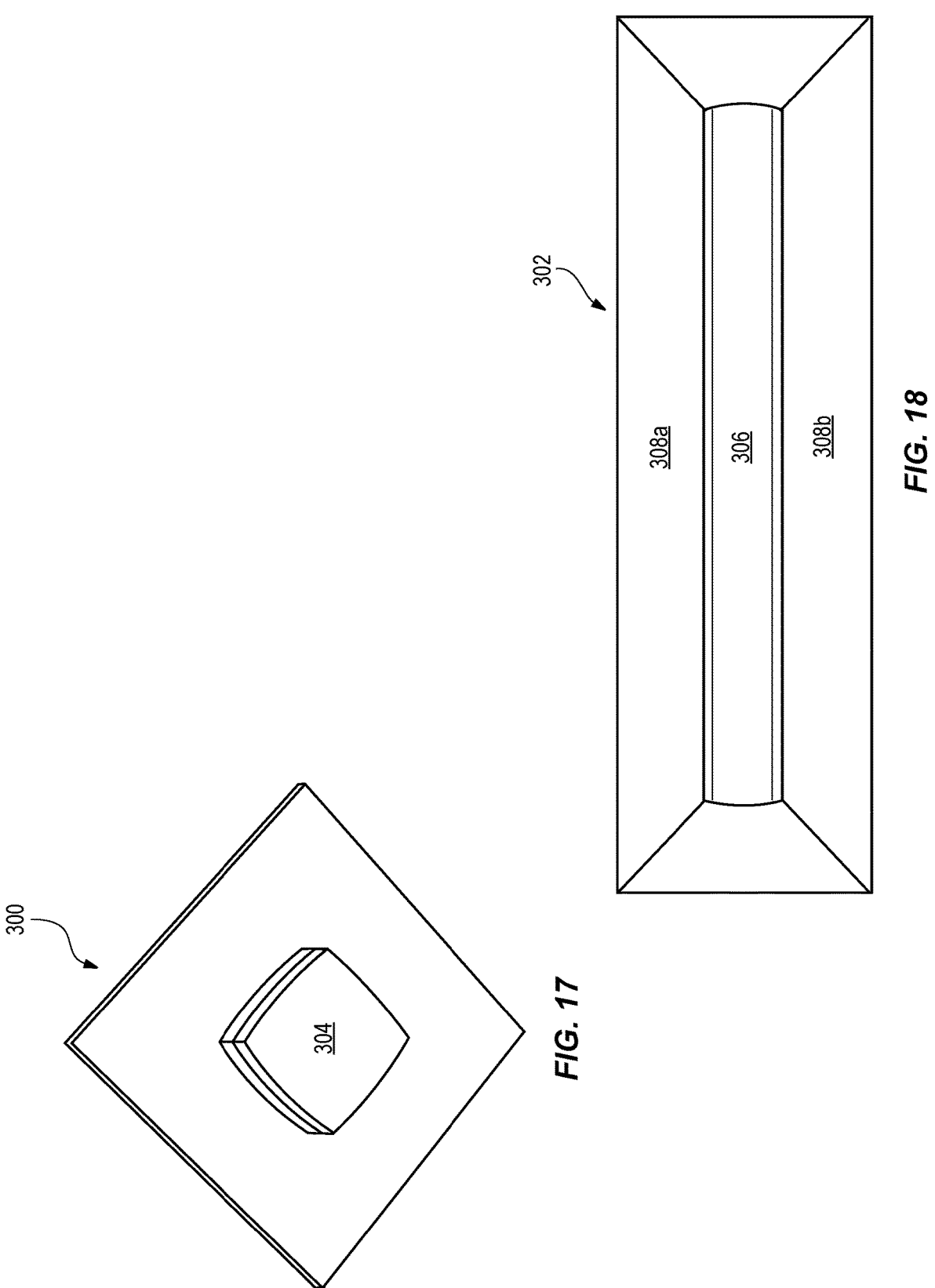
FIG. 17 is an isometric view from below of another embodiment of a luminaire that comprises a plurality of optical waveguides arranged in a square configuration.
FIG. 18 is a bottom elevational view of another embodiment of a luminaire that comprises a plurality of optical waveguides arranged in an elongated configuration.
Figure 23:
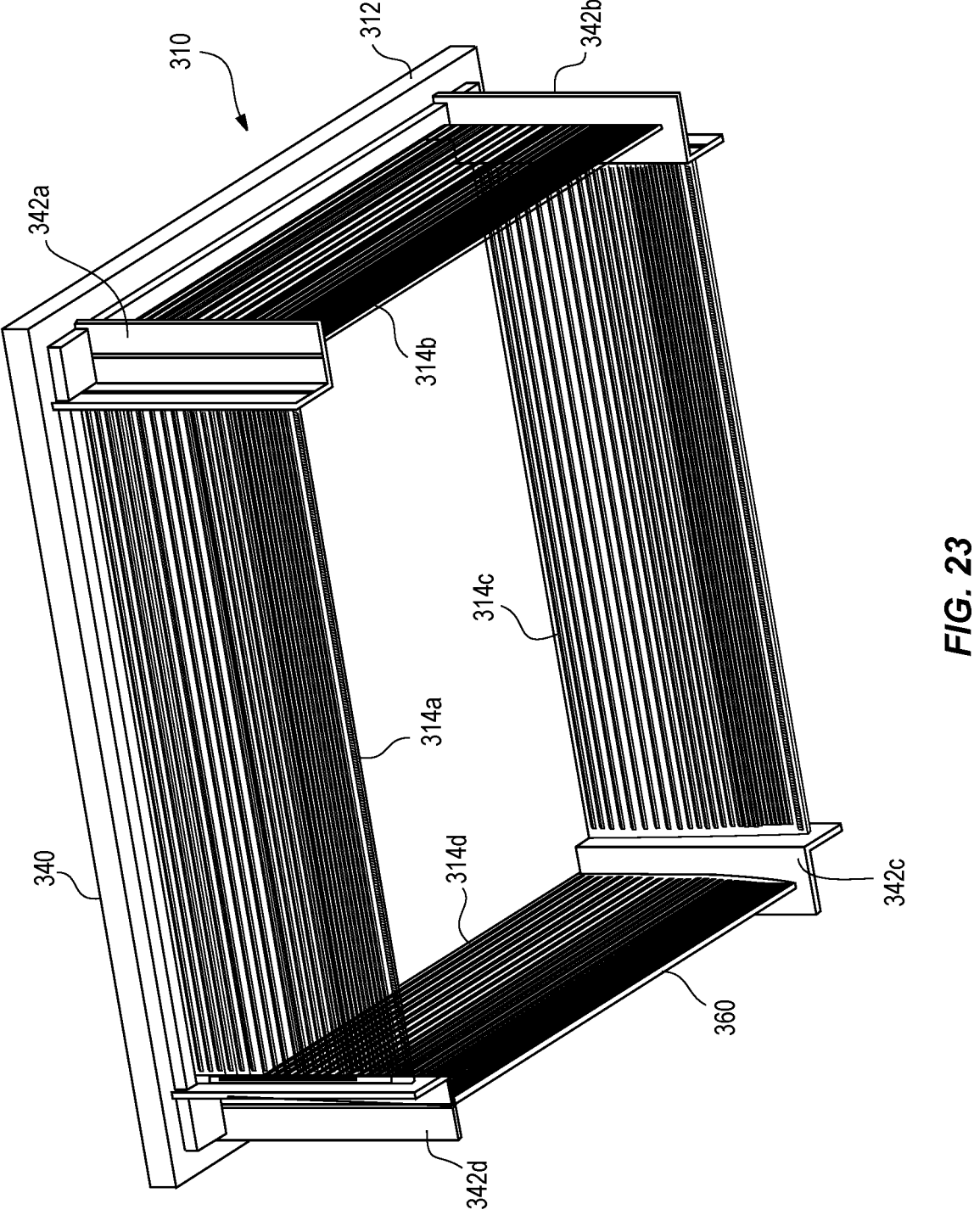
FIG. 23 is an isometric view from below of an indoor luminaire comprising a plurality of optical waveguides in a square configuration.
Figure 24:
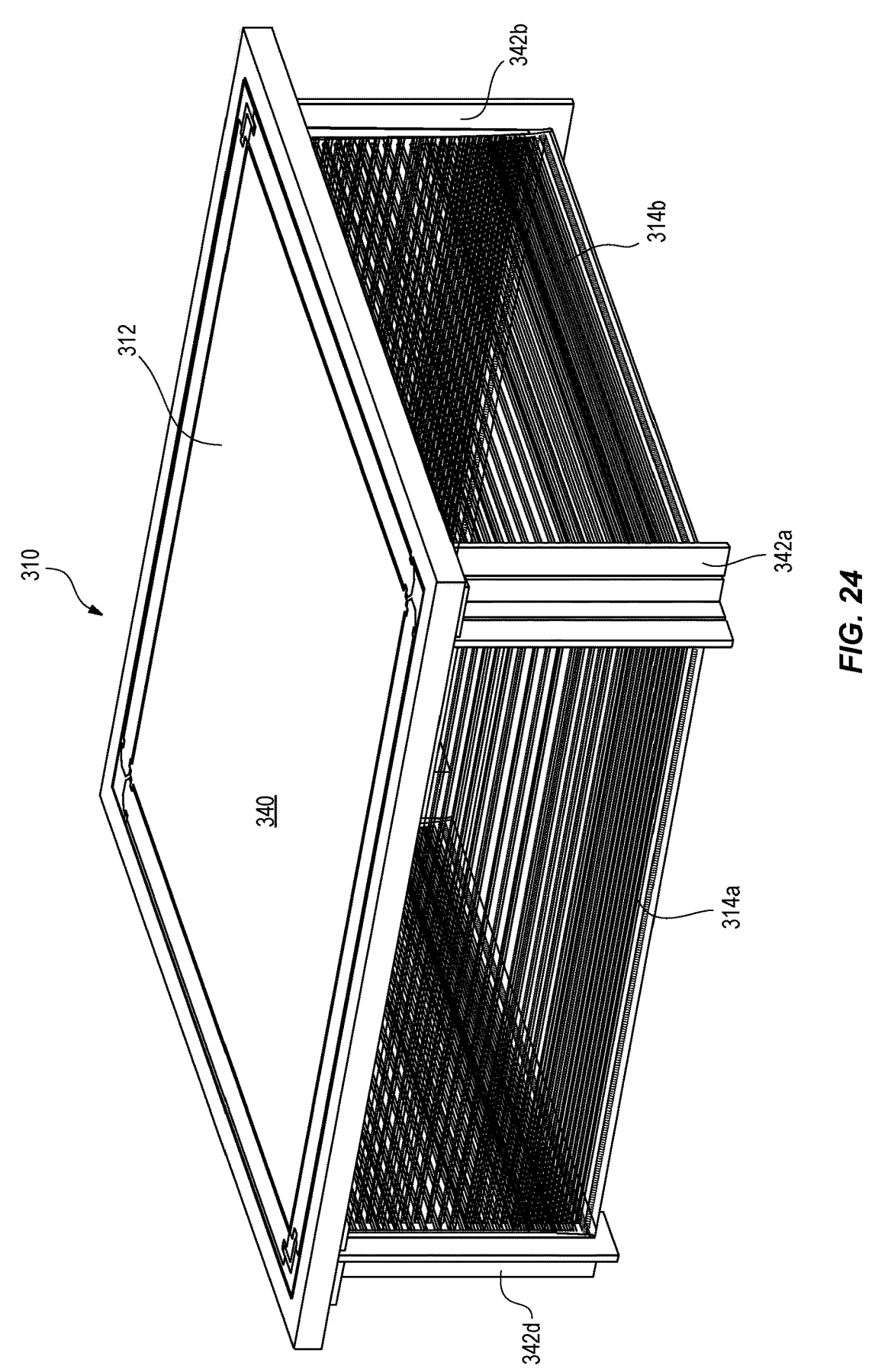
FIG. 24 is an isometric view from above of the luminaire of FIG. 23.
Figure 25:
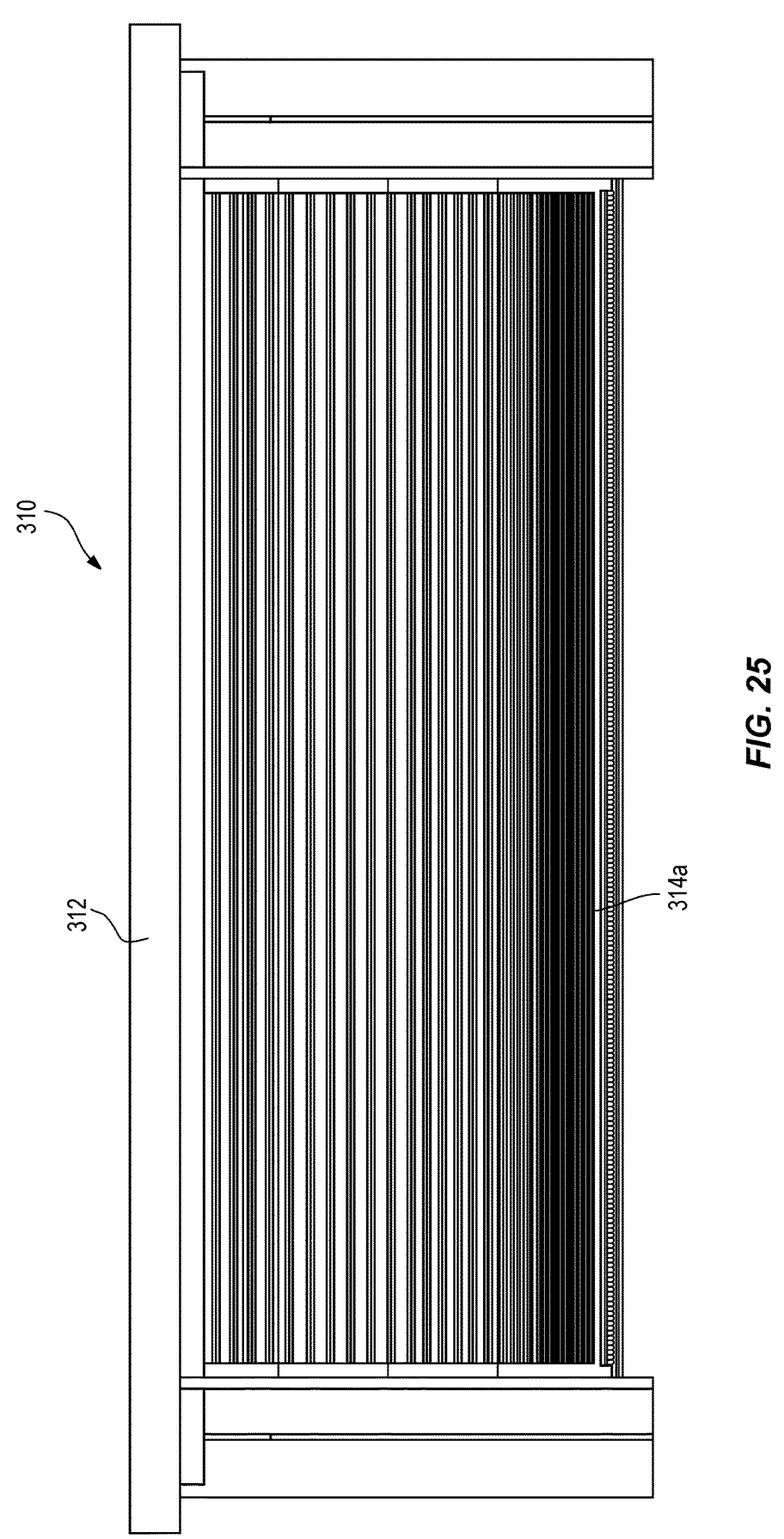
FIG. 25 is a front elevational view of the luminaire of FIG. 23, the back elevational, right side elevational, and left side elevational views of such luminaire being identical or similar thereto.
Figure 26:
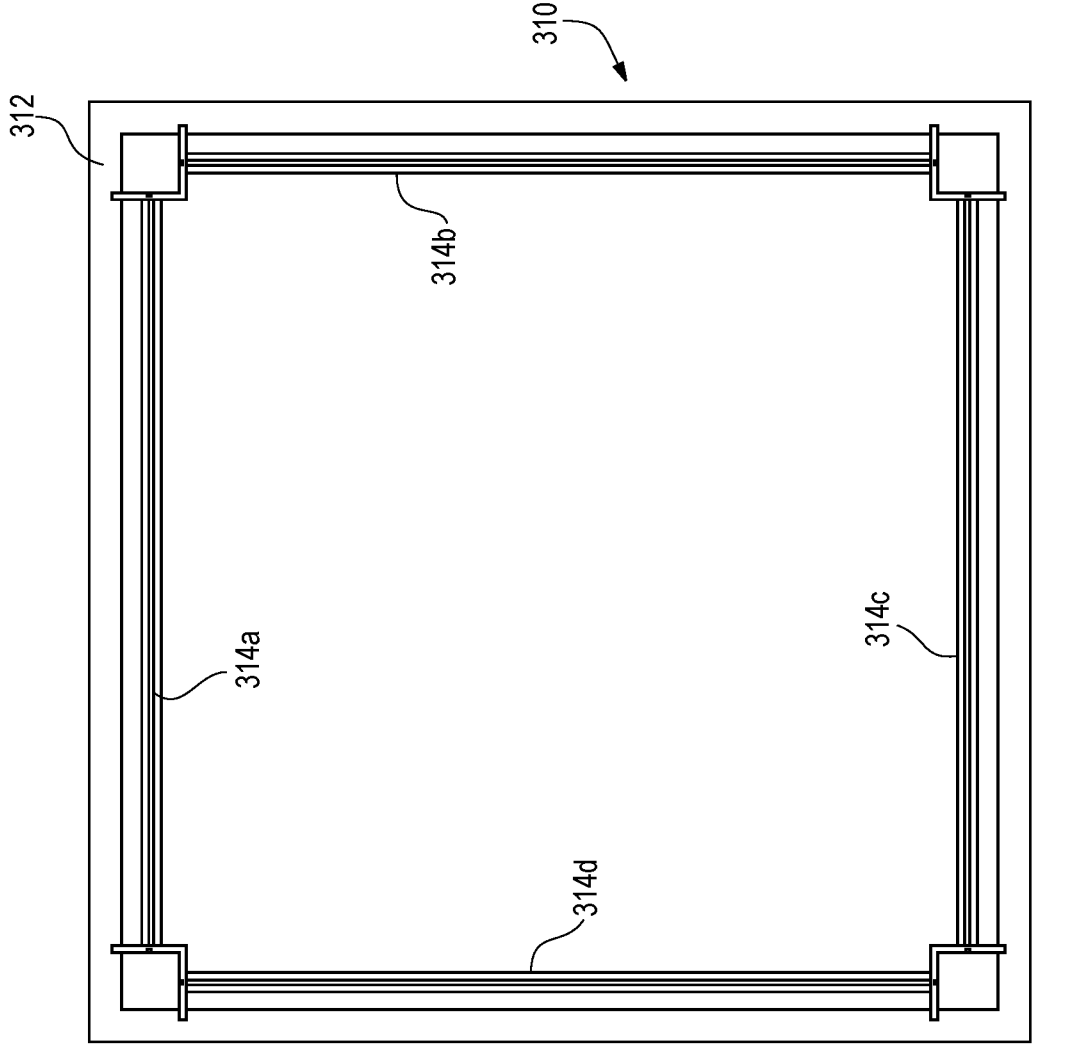
FIG. 26 is a bottom elevational view of the luminaire of FIG. 23.
Figure 27:
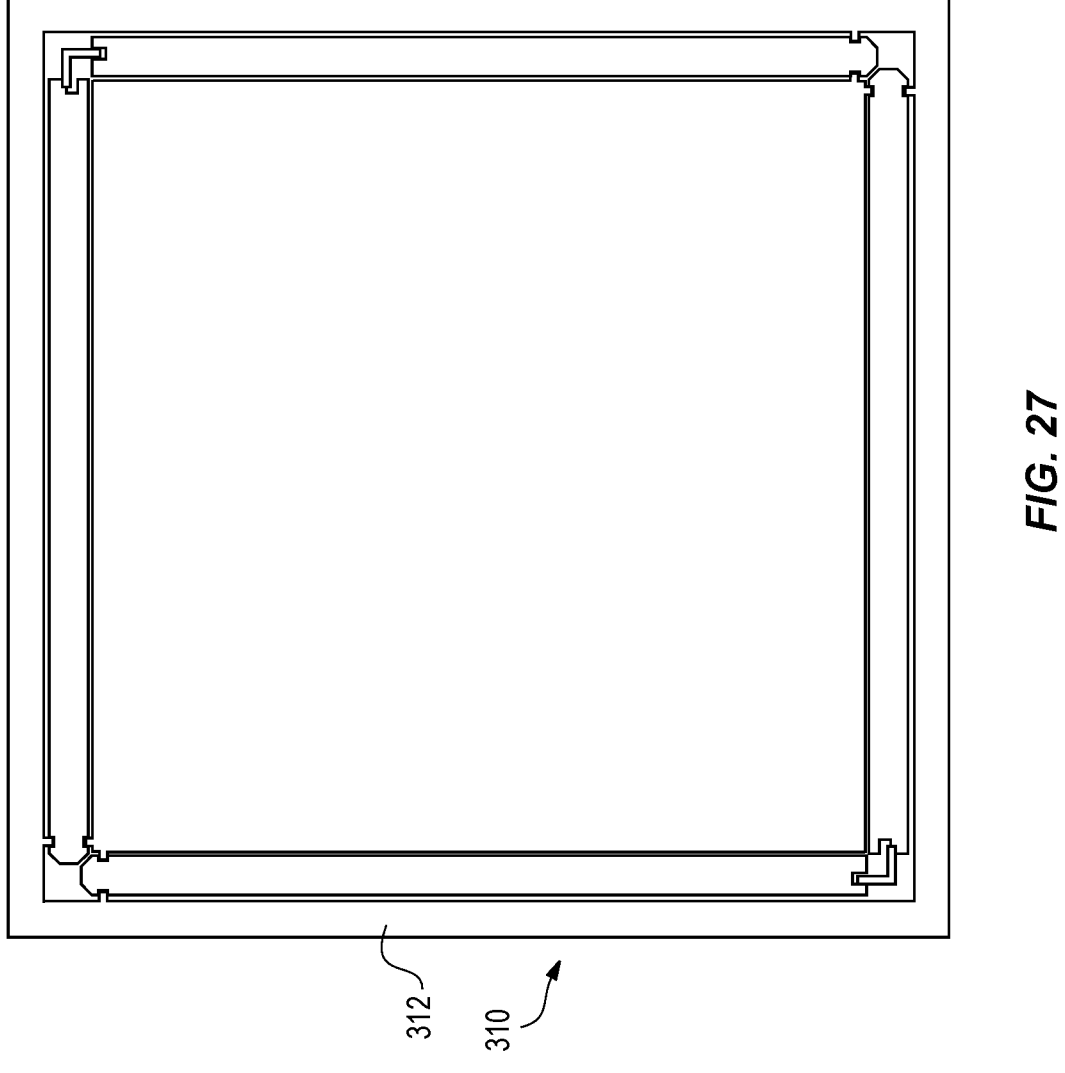
FIG. 27 is a plan view of the luminaire of FIG. 23.

A luminaire 284 depicted in FIGS. 15A and 15B includes a square and/or rectangular housing 286 having exterior sides 288a-288d. Optical waveguides 290a-290d are disposed along the respective exterior sides 288a-288d of the housing 286. As with other embodiments, the housing 286 may include, among other things, one or more of driver circuitry, light emitting diode(s), control circuitry, sensor(s), power circuitry, circuit board(s), or other components. In the embodiment shown in FIG. 15A, one or more LED elements or modules 106 are disposed within the housing 286 adjacent each of the plurality of optical waveguides 290a-290d such that light emitted by the LEDs is directed outwardly from the sides 288a-288d and into coupling members of the optical waveguides 290a-290d along coupling ends, respectively, thereof.

With specific reference to FIG. 15A, the housing 286 has an open interior portion 292 such that space in the center of the housing is open to a ceiling or wall providing a unique aesthetic. The open interior portion 292 further provides for unique illumination patterns, if desirable. Equipment for suspension or mounting (not shown) the luminaire 284 may be included on one or more of upper and lower surfaces 294a, 294b of the housing 286 (FIG. 15B). The upper and lower surfaces 294a, 294b may be substantially planar, or instead may be arcuate depending on spatial constraints for components disposed within the housing 286 or for architectural purposes.

In the example of FIGS. 15A, 15B, given that optical waveguides 290a-290d are disposed along each of the exterior sides 288a-288d, the housing components 286 of the luminaire 284 are surrounded by optical waveguides 290a-290d. Such an arrangement provides for a desirable aesthetic as well as desirable illumination patterns wherein no housing portion blocks the outward distribution of light from the luminaire 286. As discussed with reference to the remaining embodiments, the optical waveguides 290a-290d may have extraction features and/or texturing disposed thereon to produce a variety of desirable light emission patterns. Further, the optical waveguides 290a-290d shown in the example embodiments of FIGS. 15A-18, while generally having many of the qualities of optical waveguides discussed hereinabove; such waveguides 290a-290d have a generally trapezoidal shape, or, more particularly as depicted, each of the waveguides 290a-290d may have the shape of an isosceles trapezoid. The optical waveguides 290a-290d may either abut one another, a gap may be present between each optical waveguide, or a structural member extending from the housing 286 may be disposed therebetween. As with all the embodiments disclosed herein, the optical waveguides 290a-290d may be interchangeable and modular such that one may be switched with or replaced by another.

Referring now to FIG. 16, the luminaire 284 may be elongate along a dimension thereof to form a rectangular luminaire 296 having six optical waveguides 298a-298f disposed thereabout. Along the elongate dimension, smaller housing portions 364, 366, which may include LED element(s) or modules(s) and/or circuitry and/or may have architectural purposes, are arranged between the optical waveguides 298a, 298b, 298d, 298e providing spacing therebetween. Such a configuration may provide for alternative illumination distributions by including additional optical waveguides. Further luminaire configurations including any further number of optical waveguides are also contemplated. The specifications of a particular lighting application may be used to dictate the size of a luminaire, in the spirit of those embodiments depicted herein, as well as the number of optical waveguides disposed thereabout.

Luminaire 300 (FIG. 17) and luminaire 302 (FIG. 18) are similar or identical to the embodiments shown in FIGS. 15A-16, except that the open interior portion is not present. Specifically, the housing 304 of luminaire 300 is either solid throughout or includes an enclosure therein that provides additional space within the housing for circuitry, LED driver(s), sensors, controller(s), etc. A housing 306 of luminaire 302 is an elongate embodiment of the housing 304. Further shown in the embodiment of FIG. 18, optical waveguides 308a, 308b disposed thereabout may be elongate along with the associated housing 306. As with the embodiments of FIGS. 15A-16, these example luminaires 300, 302 feature optical waveguides disposed in a single plane.

FIG. 19 depicts a luminaire 316 in a wall sconce configuration with a housing 318 having first and second waveguides 320a, 320b extending therefrom. The first and second waveguides 320a, 320b may (but need not) be tapered if desirable for aesthetic or light emission purposes. The extraction features 360 may be disposed on one or both sides of said optical waveguides 320a, 320b. The housing 318 includes components such as those discussed hereinabove with respect to other housing embodiments, including one or more LED element(s) or module(s) 106. In this embodiment, the first waveguide 320a points relatively upward from the horizontally aligned housing 318, while the second waveguide 320b points relatively downward from the housing 318. The first waveguide 320a directs light relatively upward while the second waveguide 320b directs light relatively downward. According to such a configuration, the luminaire 316 provides general lighting to a floor and a room from a wall mounted position. The optical waveguides 320a, 320b may have rounded exterior edges 322a, 322b and an arcuate profile in cross section. The rounded features may contribute to light distribution properties of the luminaire 316 as well as aesthetic or architectural properties thereof. A luminaire 324 depicted in FIG. 21 has a configuration similar to the luminaire 316, except that optical waveguides 326a, 326b disposed thereon are rectangular, tapered panels such as the optical waveguides depicted in FIGS. 14A-14C.

FIG. 20 depicts a luminaire 328 in a wall sconce configuration with first and second housings 330a, 330b disposed on either end of an elongate optical waveguide 332. Light may be coupled into the optical waveguide 332 from one or both ends thereof by one or more LED module(s) or element(s) disposed in the first and/or second housings 330a, 330b. The luminaire 328 in FIG. 20 may be mounted to a wall or ceiling by one or both of the first and second housings 330a, 330b.

The luminaire 334 depicted in FIG. 22 is a relatively smaller luminaire. The configuration of the luminaire 334 may be substantially identical to previous configurations described hereinabove except that all components thereof are scaled down. This luminaire 334 may be suitable for path lighting such as along a walkway or hallway, either indoors or outdoors. The luminaire 334 may be mounted to walls, baseboards, poles, and/or other suitable mounting locations.

FIGS. 23-27 depict another embodiment of a luminaire 310 comprising a housing 312 that includes support structures. A first plurality of optical waveguides 314a-314d is disposed on and supported by the housing 312. A second plurality of LED elements or modules 106 is supported by the housing 312 in a generally square sidewall-type configuration. A lid 340 and four structural corner members 342a-342d provide support to the optical waveguides 314a-314d. Suspension and/or mounting components may be located on the lid 340 or elsewhere on the housing 312.

In summary, the plurality of waveguides is disposed in and/or on the housing. A flex conductor or circuit boards are placed adjacent the top edges of the waveguides and the flex conductor or circuit boards are enclosed by the housing.

The housing and waveguides are joined to form the sides of the luminaire and integrate the enclosure for the power supply, sensor, operating circuits, and wire connection area. The continuous flex conductor or circuit boards present the LEDs to the waveguide coupling members.

The housing provides a unique aesthetic in which optical waveguides serve as substantial components, e.g., the sides, of the luminaire. Material and costs associated with the luminaire are minimized. The design results in superior lighting with minimal glare. The optic feature of the fixture is integrated onto and/or into the main housing, which results in a more robust structure and aids in the sealing between components.

The waveguide optics allow high lumen output with low glare. This is accomplished by directing the light downward at an angle and spreading the illumination across a large area. The light from the LED's is pointed directly into each waveguide as opposed to being bounced off a reflective surface of a reflector (i.e., indirect illumination). This optical solution is more efficient than current indirect systems and allows the glare value to be adjusted by changing the illuminated area.

In an embodiment, each waveguide is made of optical grade acrylic and the LEDs are optically coupled to the waveguide using a liquid silicone rubber ("LSR") member or other coupling member. The coupling member is shaped to serve as the entrance geometry for the optical system by directing light from the LEDs directly into the waveguide.

If desired, the waveguides (with or without the optical coupling members) may be insert molded with the housing, thereby making the waveguide and housing a single piece and eliminating the need for seals between the waveguides and the housing. This reduces assembly time and makes for a more robust luminaire structure. In a specific version of the embodiment, a thermoplastic elastomer ("TPE") seal is molded onto the housing to seal the fixture and protect the LEDs and related circuitry from the environment. In yet another embodiment, the TPE seal is molded onto a top plate or lid that is placed on top of the housing. In still further embodiments discussed herein, the fixture is not sealed and the waveguides thereof are modular and interchangeable, increasing the relative ease with which waveguides are replaced, such as if broken or worn, and/or overall illumination patterns are developed, customized, and/or changed.

The luminaire can be used with several installation options (e.g., pendant, trunnion, junction box, pole). The housing also results in ease of installation because waveguides may be easily removed and/or replaced.

Any of the embodiments disclosed herein may include a power circuit that may further be used with light control circuitry that controls color temperature of any of the embodiments disclosed herein in accordance with viewer input such as disclosed in patent application Ser. No. 14/292, 286, filed May 30, 2014, now U.S. Pat. No. 10,278,250, entitled "Lighting Fixture Providing Variable CCT" by Pope et al., the disclosure of which is hereby incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Application No. 61/932,058, filed Jan. 27, 2014, entitled "Enhanced Network Lighting," the disclosures of which are hereby incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

II. MODULAR WAVEGUIDES

Figure 28:
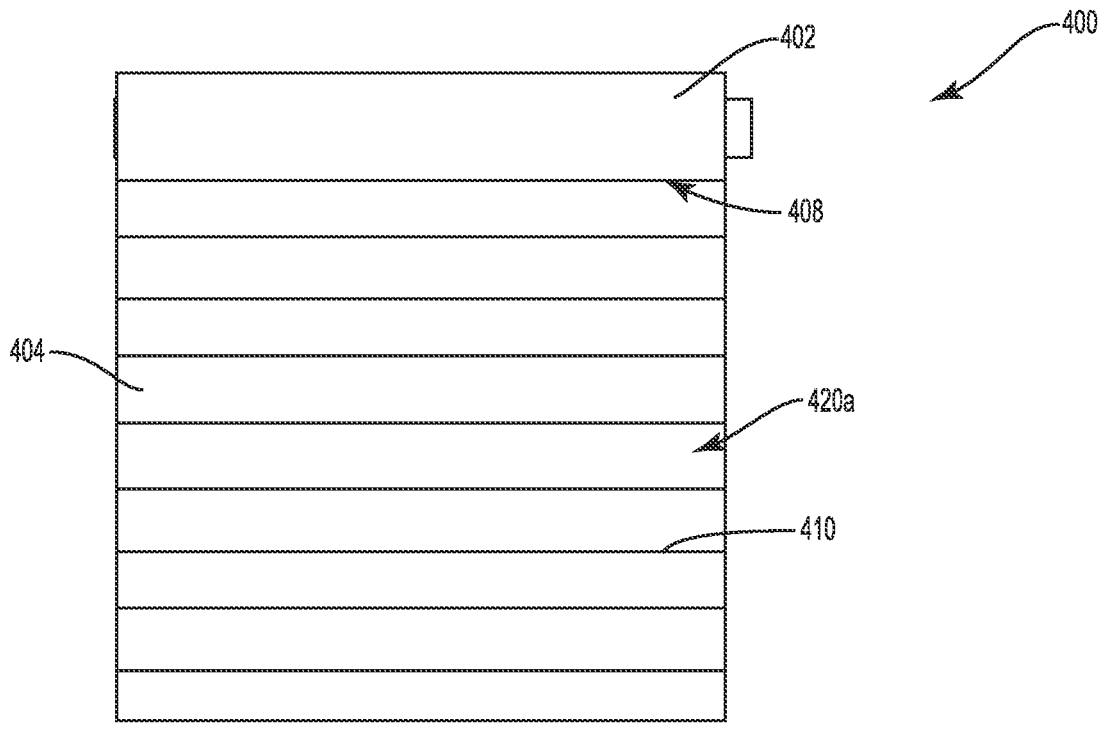
FIG. 28 is a plan view of a luminaire with an elongate housing and one or more optical waveguides suspended therefrom.

A luminaire 400 disclosed in FIG. 28 comprises an elongate housing 402 with one or more optical waveguide(s) 404 such as, for example, the optical waveguide 104 described above with reference to FIGS. 2-4. The luminaire 400 may be suspended from a ceiling, wall, or post, or, alternatively, may be mounted directly on a wall or post. Also in example embodiments, the luminaire 400 may be mounted or suspended from any other point of suitable structural integrity for supporting the luminaire 400. The optical waveguide(s) 404 may be suspended from and/or mounted along the elongate housing 402.

The housing 402 may include, among other things, one or more of driver circuitry, light emitting diode(s), control circuitry, sensor(s), power circuitry, circuit board(s), or other components. Furthermore, luminaires described herein may be networked with other luminaires using wired connections or wireless technology and the operation (on/off and/or color and color temperature) may be controlled as desired, for example in coordinated or stand-alone fashion. In the embodiment shown in FIG. 28, one or more LED elements or modules 406 are disposed within the housing 402 adjacent the optical waveguide 404 such that light emitted by the LEDs is coupled into an edge surface of the optical waveguide along coupling end 408 thereof, as discussed further with reference to FIGS. 2-4. The LED elements and modules 406 discussed herein throughout may be substantially the same or modified in size, shape, color, number, and/or other characteristics to fit housing and illumination specifications of particular luminaire applications/configurations described herein. The housing 402 further provides structural support to the optical waveguide 404 where said housing 402 meets the coupling end 408.

Each LED element or module 406 (shown, at least, in FIGS. 4, 31A, and 31B) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 406 or a plurality of such elements or modules may include one or more blue shifted yellow LEDs and one or more red LEDs. The LEDs 406 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein. If desirable, a side emitting LED disclosed in U.S. Pat. No. 8,541,795, the disclosure of which is hereby incorporated by reference herein, may be utilized. In some embodiments, each LED element or module 406 may comprise one or more LEDs disposed within a coupling cavity with an air gap being disposed between the LED element or module 406 and a light input surface. In any of the embodiments disclosed herein each of the LED element(s) or module(s) 406 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source. Still further, any of the LED arrangements and optical elements disclosed in U.S. patent application Ser. No. 14/101,147, filed Dec. 9, 2013, now U.S. Pat. No. 9,869,432, entitled "Luminaires Using Waveguide Bodies and Optical Elements" by Keller et al., hereby incorporated by reference herein, may be used.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve; the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known total internal reflection (TIR) principles, light rays continue to travel through the waveguide(s) 404 until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

According to one aspect, a waveguide directs light into at least one and up to an infinite number of beams or ray groups, wherein the rays of each group travel through the waveguide within a range of angles relative to one another. Each range may be narrow or broad within the TIR limits of the waveguide material. According to another aspect, a waveguide arranges light into a plurality of groups that bounce at least once inside the waveguide by TIR off one or more surfaces of the waveguide. Each group comprises a plurality of light rays that travel at angles that are disposed within a narrow or broad range of angles relative to one another. In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Figures 29A, 29B, 29C:
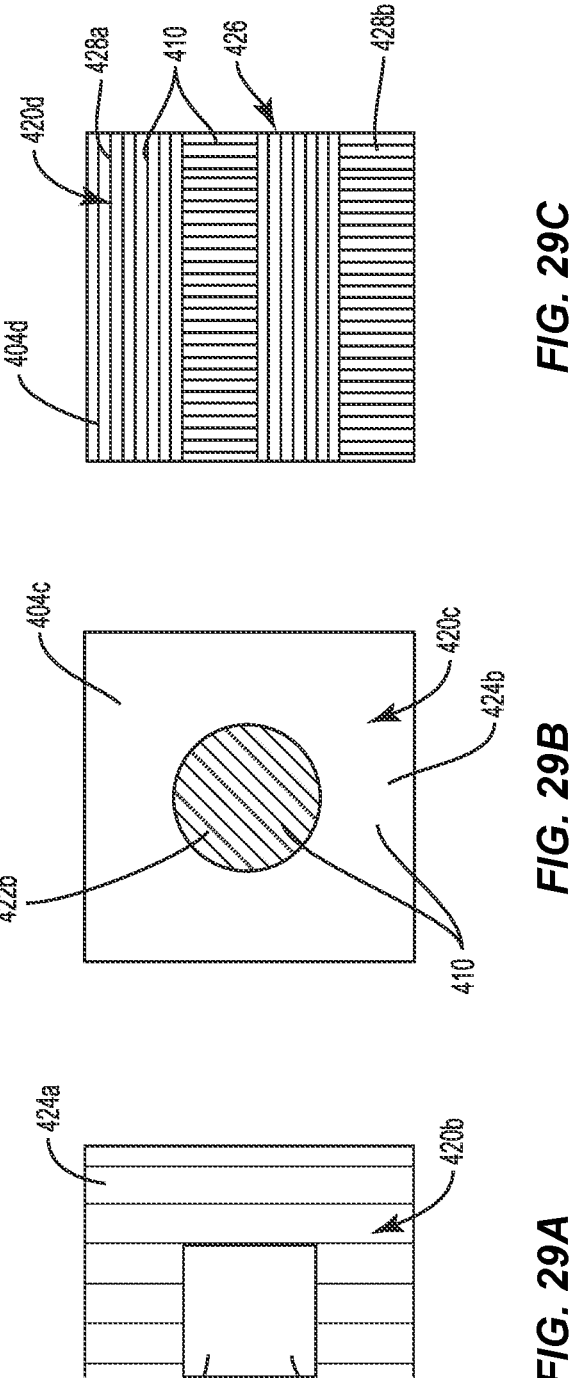
FIGS. 29A-29C are plan views of example optical waveguides comprising differing extraction feature patterns.

Referring now to FIGS. 29A-29C, embodiments of the one or more waveguide(s) 404 are shown with arrangements for the light emitting portion 404-6 varying therebetween. In these Figures, the plurality of light extraction features 410 are configured to produce different illumination patterns, and the waveguide(s) 404 are depicted in side elevation as if mounted such that said waveguide(s) 404 are suspended vertically parallel to a wall (the same view images may depict a plan view, if the luminaire(s) 400 associated therewith are mounted such that said waveguide(s) 404 project horizontally perpendicular to a wall). In example embodiments, the plurality of light extraction features may be configured to develop an illumination distribution having a different directional component or no directional component. A pattern 420b of light extraction features 410 depicted on a waveguide 404b (of the waveguide(s) 404) of FIG. 29A includes an interior portion 422a (shown here as generally square in shape) that develops directionally downward lighting, such as might be suitable for direct or task lighting, while an exterior portion 424a develops an illumination pattern for general lighting. The illumination pattern of the exterior portion 424a may direct light mostly upwards and with a wide distribution, such as might be suitable for illuminating an open indoor space such as an office, warehouse, or other enclosed space.

FIG. 29B depicts the waveguide 404c (of the waveguide(s) 404) with a pattern 420c of light extraction features 410 for developing an illumination pattern similar to that produced by FIG. 29A. The extraction feature pattern 420c illustrated in FIG. 29B may direct light relatively more light directionally downward by interior portion 422b (shown here as generally circular in shape), such as might be suitable for spotlighting or task lighting, while an exterior portion 424b develops an illumination pattern for general lighting, as described earlier with respect to FIG. 29A.

A waveguide 404d (of the waveguide(s) 404) in FIG. 29C has disposed thereon a pattern 420d of light extraction features 410 for developing pathway or hallway lighting. The pattern 420d shown in FIG. 29C includes a middle portion 426 as well as first and second outer portions 428a, 428b. The middle portion 426 may direct light in a relatively downward direction with a relatively broad horizontal distribution, such as might be suitable for illuminating a walkway situated beneath and in front of the vertically suspended waveguide 404d. The first and second outer portions 428a, 428b may direct light towards a wall disposed on the opposite side of a pathway relative a wall wherefrom the waveguide 404d is mounted/suspended, according to the particular luminaire configuration of which the waveguide is a component. Alternatively, the first and second outer portions 428a, 428b may direct light relatively upwards and outwards such as might be suitable to develop indirect lighting for a general illumination pattern.

Referring once again to FIG. 28, the waveguide 404 depicted therein comprises an extraction feature pattern 420a of light extraction features 410 for developing an illumination pattern for general lighting. The general lighting pattern produced by the extraction feature pattern 420a in FIG. 28 directs light relatively more horizontally outward into an open indoor space, but may also direct some light in a relatively upwards direction to provide indirect lighting of the room or enclosed space being illuminated.

The optical waveguide(s) 404 may have features disposed thereon for extracting light, as discussed with respect to FIGS. 2-4 hereinabove, such that, for example, an illumination pattern wherein about eighty percent of light is emitted downwards from a lower surface thereof, and about twenty percent of light is emitted upwards from an upper surface. Alternatively, the ratio of light emitted out of the lower and upper surfaces, respectively, may be customized for each of the optical waveguide(s) in order to produce an overall illumination pattern for the luminaire(s) and lighting system/luminaires described herein, depending on the needs of a particular application or setting.

In a further alternative, the optical waveguide(s) 404 may have an arrangement of features disposed on the lower and upper surfaces thereof, such that, for example, the downward emitted light is distributed according to a directional pattern. Specifically, the downward light emitted from the lower surface of the optical waveguide(s) 404 may be directed straight down, outward, and away from the luminaire 400 and elongated housing 402, or concentrated downward such was for a task lighting, workstation lighting, and/or spotlighting illumination pattern. Again, the directional component of light emitted from the optical waveguide(s) 404 may be customized for each optical waveguide 404 in order to produce an overall illumination pattern for the luminaire(s) 400 and/or lighting system/luminaire(s) that is desired for a particular application or setting.

The waveguide(s) 404, comprising any one of the light extraction feature patterns 420a, 420b, 420c, 420d detailed with reference to FIGS. 28 and 29A-29C, may be suspended from the elongate housing 402 described with reference to the luminaire 400 depicted in FIG. 28. Additionally, the waveguide(s) 400 may be interchangeably configured with any of the extraction feature patterns 420a-d and/or other suitable light extraction feature patterns for producing illumination patterns desirable for particular lighting applications.

Figures 30A, 30B:
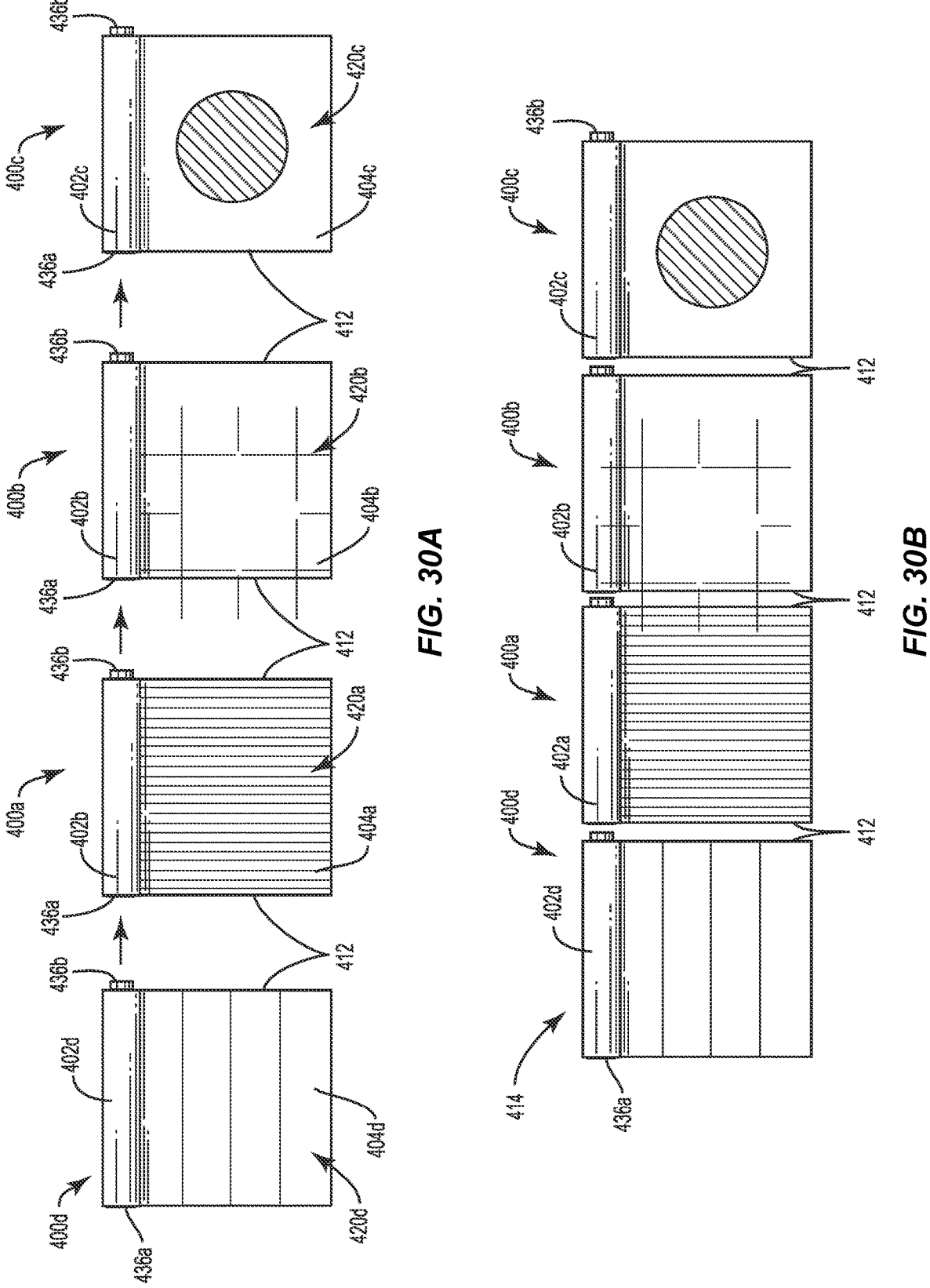
FIGS. 30A and 30B are plan views of example luminaires, similar to the luminaire of FIG. 28, comprising differing extraction feature patterns, exploded and combined as a lighting system, respectively.

FIG. 30A illustrates the example luminaires 400a-d comprising elongate housings 402a-d and optical waveguides 404 with the extraction feature patterns shown in FIGS. 28 and 29A-29C. The luminaire 400a is substantially the same as the luminaire 400 depicted in FIG. 28. Arrows depict coupling of one elongate housing to the next and, thereby, one luminaire to the next. Further, the waveguides 404a-d may couple one to the next along edge surfaces 412 thereof. The luminaires 400a-400d may be modular and interchangeable. Referring now to FIG. 30B, a lighting system/luminaire 414 is formed by the coupled modular luminaires 400a-400d. The modular luminaires 400a-400d may be decoupled, rearranged, and re-coupled, in any desirable order. Further, contemplated embodiments of the lighting system/luminaire 414 are not limited to four modular luminaires but, instead, may comprise any more or fewer modular luminaires selectable to fit the specifications of particular lighting applications.

Moreover, one or more of the optical waveguides 404 may develop an illumination distribution having a directional lighting component while one or more other of the optical waveguides 404 may develop an illumination distribution having a different directional component or no directional component. By way of further example, waveguides 404a, 404b, 404c, 404d disposed, respectively, on the elongate housings 402a, 402b, 420c, 402d of the lighting system/luminaire 414 may develop directional components for lighting workstations under any of the modular luminaires 400a-d that form the lighting system/luminaire 414. In still another example, the lighting system/luminaire 414 may be mounted and/or suspended from a ceiling (not shown).

Given that each optical waveguide 404a-d of the lighting system/luminaire 414 may produce any customizable illumination pattern and that each luminaire 400a, 400b, 400c, 400d is modular, such modular luminaires 400a-d may be easily interchanged and selected to produce customizable overall illumination patterns for the lighting system/luminaire 414 according to parameters suitable for a given indoor lighting application or simply according to desired characteristics. Still further, the optical waveguides 404a, 404b, 404c, 404d may also be modular and interchangeable as described in previously-incorporated U.S. patent application Ser. No. 15/890,272, filed Feb. 6, 2018, now U.S. Pat. No. 11,536,894, entitled "Modular Waveguides and Fixtures Utilizing Same."

As discussed hereinabove with reference to the embodiments of FIGS. 28-30B, an illumination pattern developed by the lighting system/luminaire 414 may be customized. The optical waveguides 404a-d include on left and/or right sides thereof the extraction features 410 having one or more of the characteristics discussed with reference to FIGS. 2-4 for developing desired distributions of emitted light. For example the lighting system/luminaire 414 may develop an illumination pattern such that a ratio of emitted light may be one-to-one for the left and right/upper and lower sides of the optical waveguide(s) 404a-d. Other lighting parameters may be similarly customized between the left and right/upper and lower sides according to desired characteristics such as intensity, illumination pattern, directionality, etc. Additionally, the optical waveguide(s) 404a-d may emit substantially collimated light in selected directions, such as, for example, at thirty degrees or forty-five degrees downward and away from the lighting system/luminaire 414 (when mounted perpendicular to a wall) in order to create a desired lighting distribution and/or directionality pattern.

Furthermore, the optical waveguide(s) 404a-d may have the same or different emission patterns. Furthermore, the optical waveguides 404a-d may have the same or different emission patterns having one or more directional components. By way of further examples, the lighting system/luminaire 414 may be configured such that each of the individual optical waveguides 404a-d has a different light emission pattern from all other waveguides, each of some of the waveguides (e.g., every other of the individual optical waveguides 404a, c) has a first light emission pattern while each of one or more of the remaining waveguides 404b, d has a second light emission pattern different than the first light emission pattern, or only one of the optical waveguides 404a-d has a different light emission pattern relative to the other optical waveguides 404a-d. In a specific example, it may be desirable for the optical waveguides 404c, 404d on either end of the lighting system/luminaire 414 to direct light relatively more horizontally outward from the luminaire, while the interior optical waveguides 404a, 404b direct light relatively more downward and below the lighting system/luminaire 414. Such a configuration of optical waveguides may form a desirable illumination pattern for lighting an open indoor/outdoor/enclosed space such as an office or warehouse while also adequately lighting the floor immediately underneath the modular lighting system/luminaire 414.

As with other embodiments described herein throughout, the optical waveguides 404a-404d in combination with the elongate housings 402a-402d comprise modular luminaires 400a-400d, which are modular and interchangeable, such that one may be switched for another and/or such that the luminaires 400a-400d may be replaced with relative ease. Given that each optical waveguide 404a-d of the lighting system/luminaire 414 may produce any customizable illumination pattern and that each luminaire 400a-d is modular, such luminaires may be easily interchanged and selected to produce customizable overall illumination patterns for the lighting system/luminaire 414 according to parameters suitable for a given indoor/outdoor/enclosed lighting application or simply according to the desired characteristics.

Figures 31A, 31B, 31C, 32:
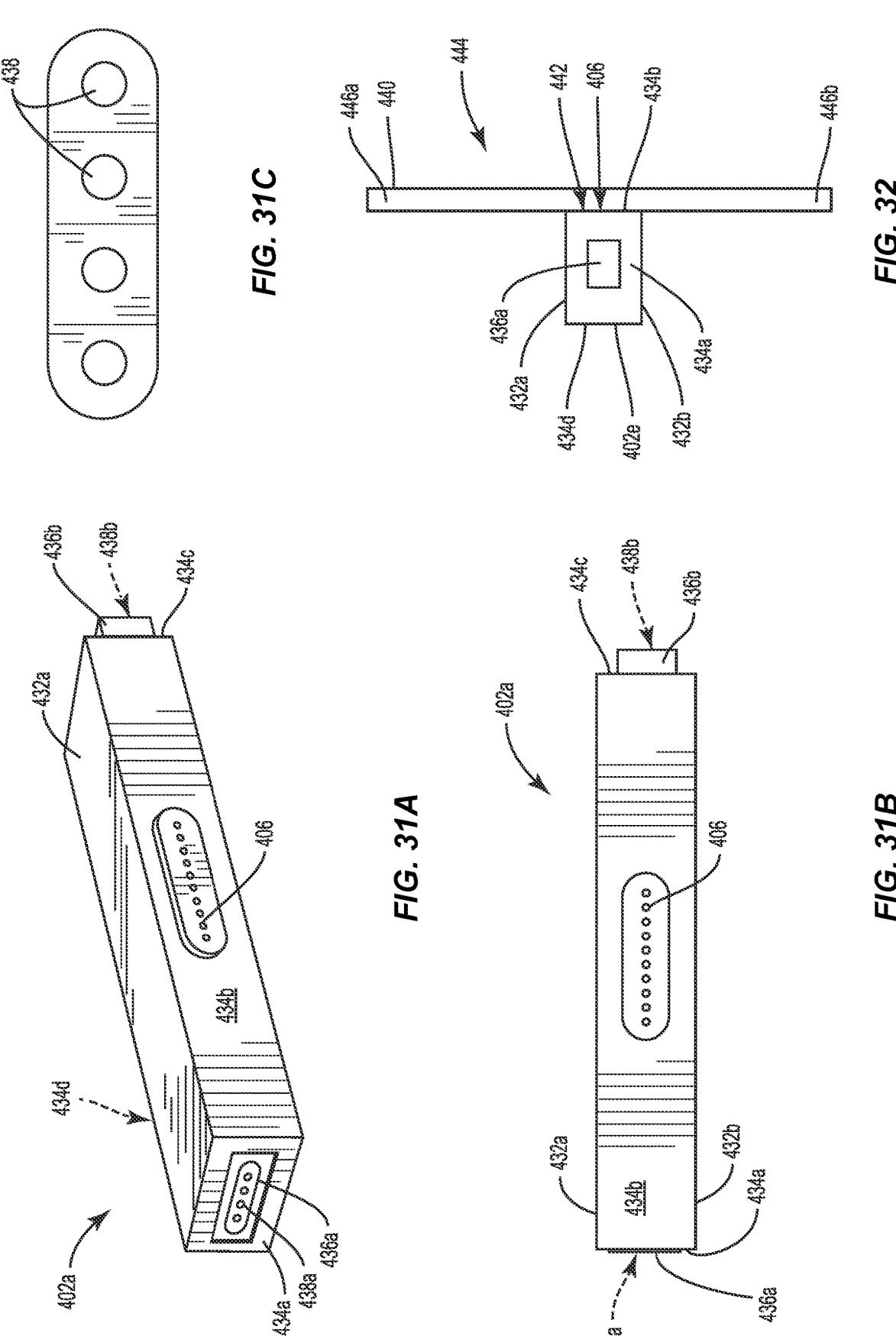
FIG. 31A is an isometric view of the elongate housing of the luminaire of FIGS. 28, 30A, and 30B.
FIG. 31B is an elevational view of the elongate housing of the luminaire of FIG. 31B.
FIG. 31C is an elevational view of the electrical contacts of the elongate housing of FIGS. 31A and 31B.
FIG. 32 is an elevational view of the elongate housing coupled to an example optical waveguide at an interior coupling location.

The elongate housings 402a, 402b, 402c, 402d (FIGS. 30A and 30B) are substantially identical to one another and, therefore, only the elongate housing 402a will be described and shown in detail with reference to FIGS. 31A-31C. FIG. 31A is an isometric view of the example elongate housing 402a. The elongate housing 402a may include, among other things, one or more of driver circuitry, light emitting diode(s), control circuitry, sensor(s), power circuitry, circuit board(s), and/or other components. These components are disposed between upper and lower housing portions 432a, 432b. Sidewalls 434a, 434b, 434c, 434d are disposed between the upper and lower housing portions 432a, 432b. The elongate housing 402a comprises the one or more LED elements or modules 406, as discussed hereinabove, disposed on one or more printed circuit boards (PCBs) and arranged to direct light into the coupling end(s) 408 of the optical waveguide(s) 404.

Further, each optical waveguide(s) 404 is supported by components of the housing 402a and coupled to the LED elements or modules 406 in substantially identical fashion, save relative location. Also, the optical waveguides 404 are preferably identical to one another (except possibly the size, placement, and/or arrangement of optical features, such as extraction features), and therefore interchangeable and/or modular. For example, one or more replacement optical waveguides (not shown) may be inserted into the luminaire 412 upon removal of one or more of the optical waveguides 404 shown in the example lighting system/luminaire 414 of FIG. 30B. Further, one or more replacement luminaire (not shown) may be inserted into the lighting system/luminaire 414 upon removal of one or more of the luminaires 400 shown in the example lighting system/luminaire 414 of FIG. 30B because the luminaires 400 may be modular, interchangeable, and/or replaceable.

Figure 3:
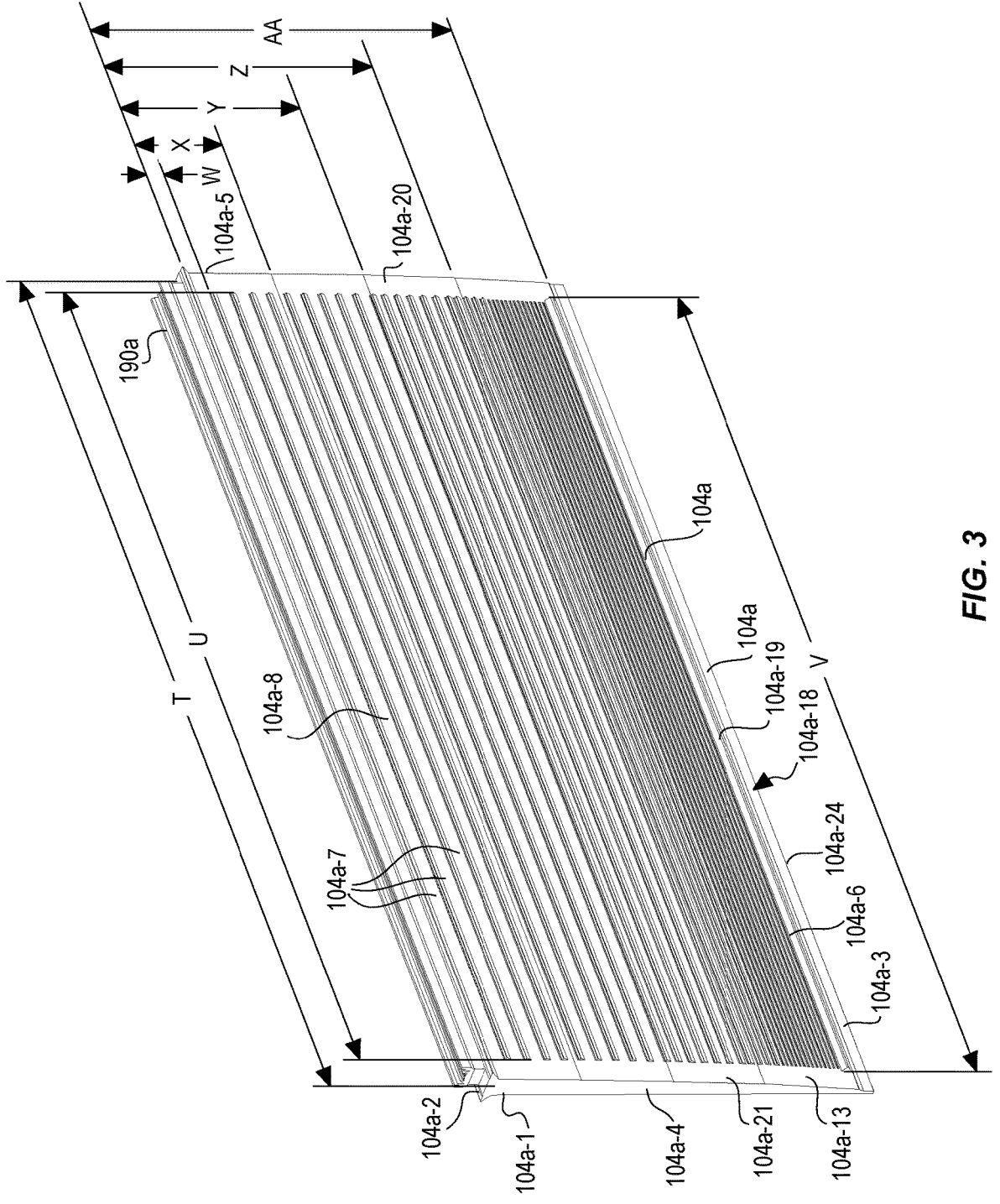
FIG. 3 is an isometric rear view of one of the optical waveguides and coupling members of the luminaire of FIGS. 1, 5A, 5B, 50, 8, 9A, 10, 11A, 11B, 12A, 12B, 13A, 13B, 14A, 14B, 14C, and 23-27.
Figure 4:
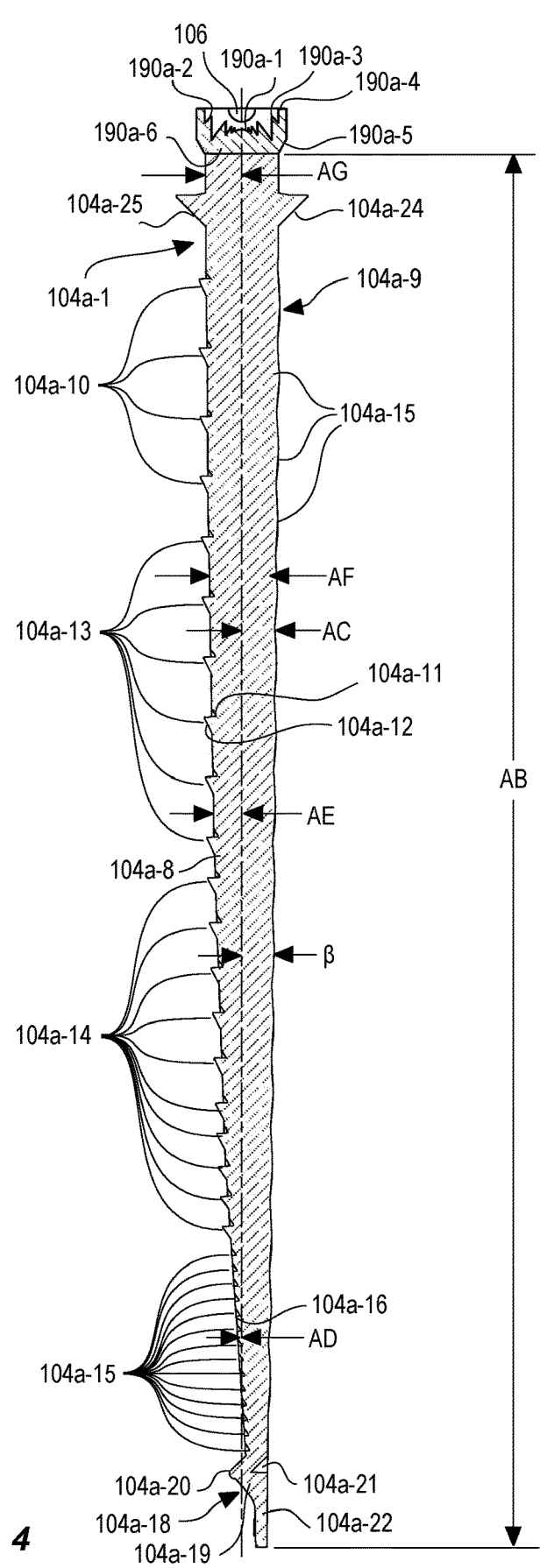
FIG. 4 is a sectional view taken generally along the lines 4-4 of FIG. 2.
Figure 5C:
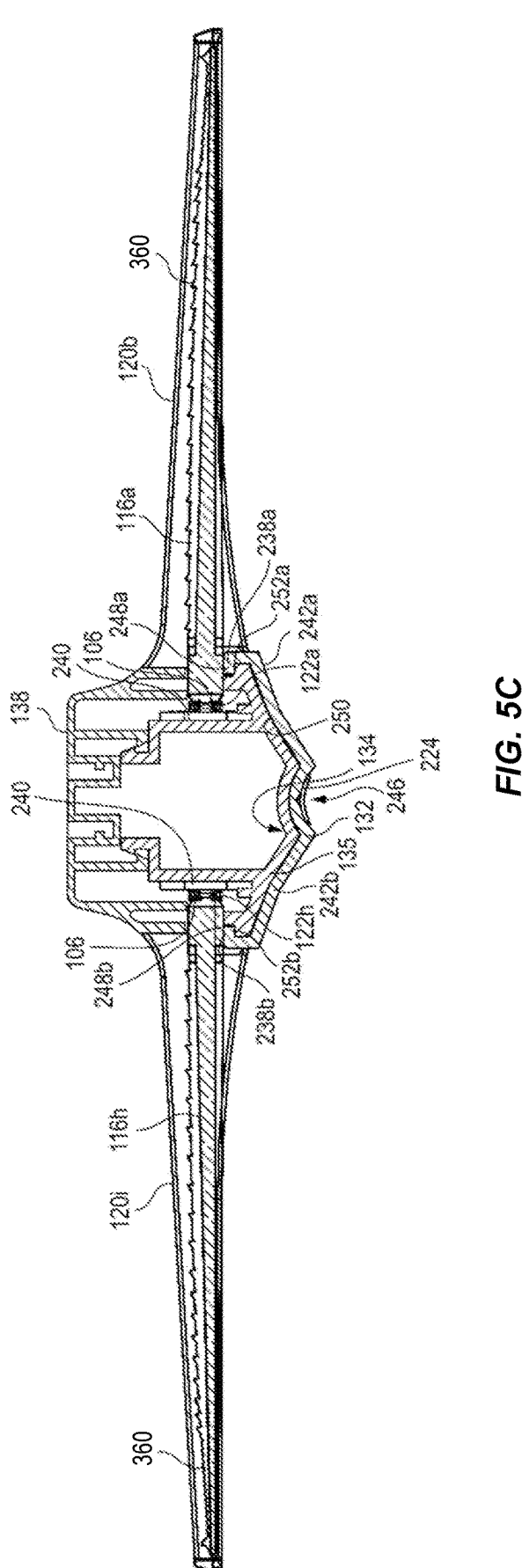
FIG. 5C is sectional view taken generally along the lines 50-5C of FIG. 5A.
Figure 5D:
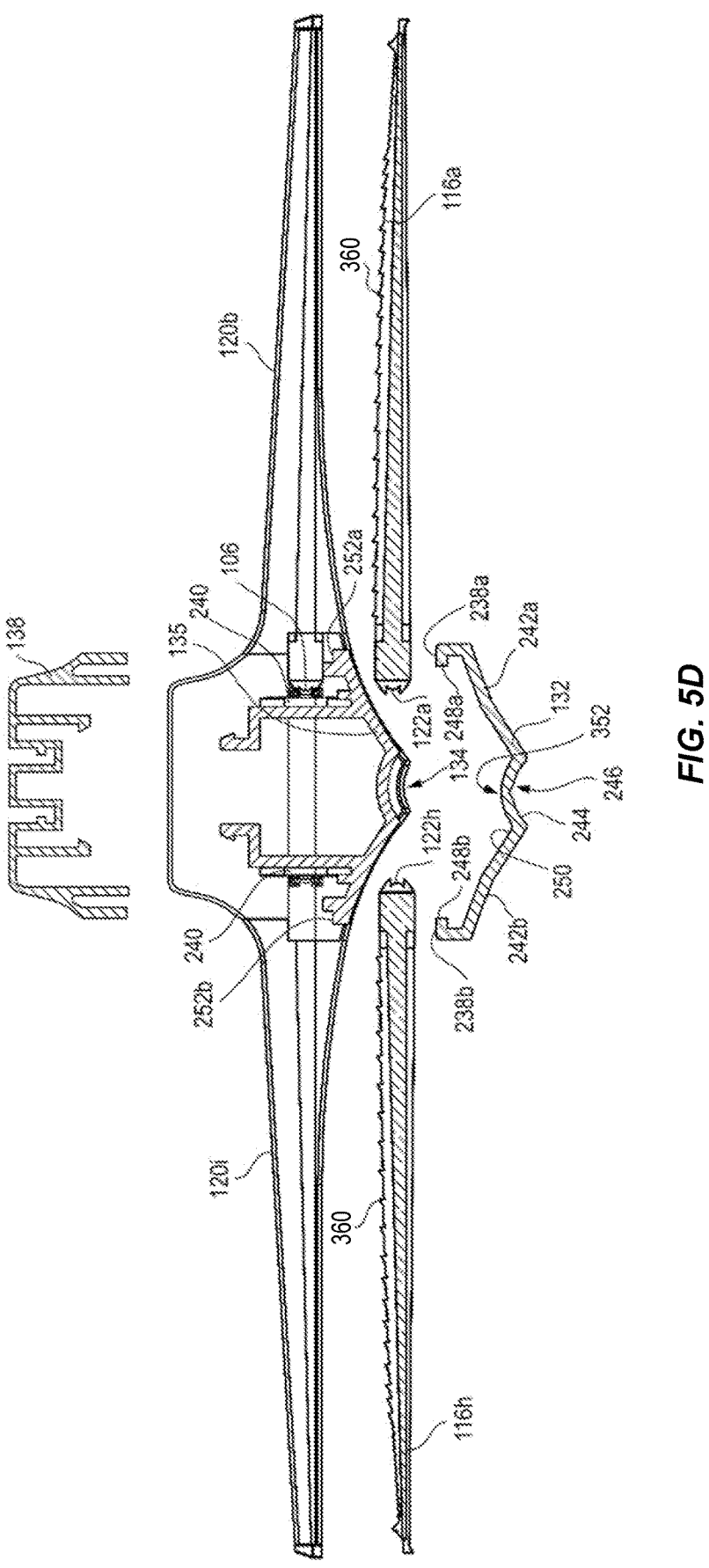
FIG. 5D is a sectional exploded view taken generally along the same lines as FIG. 5C.
Figure 6A:
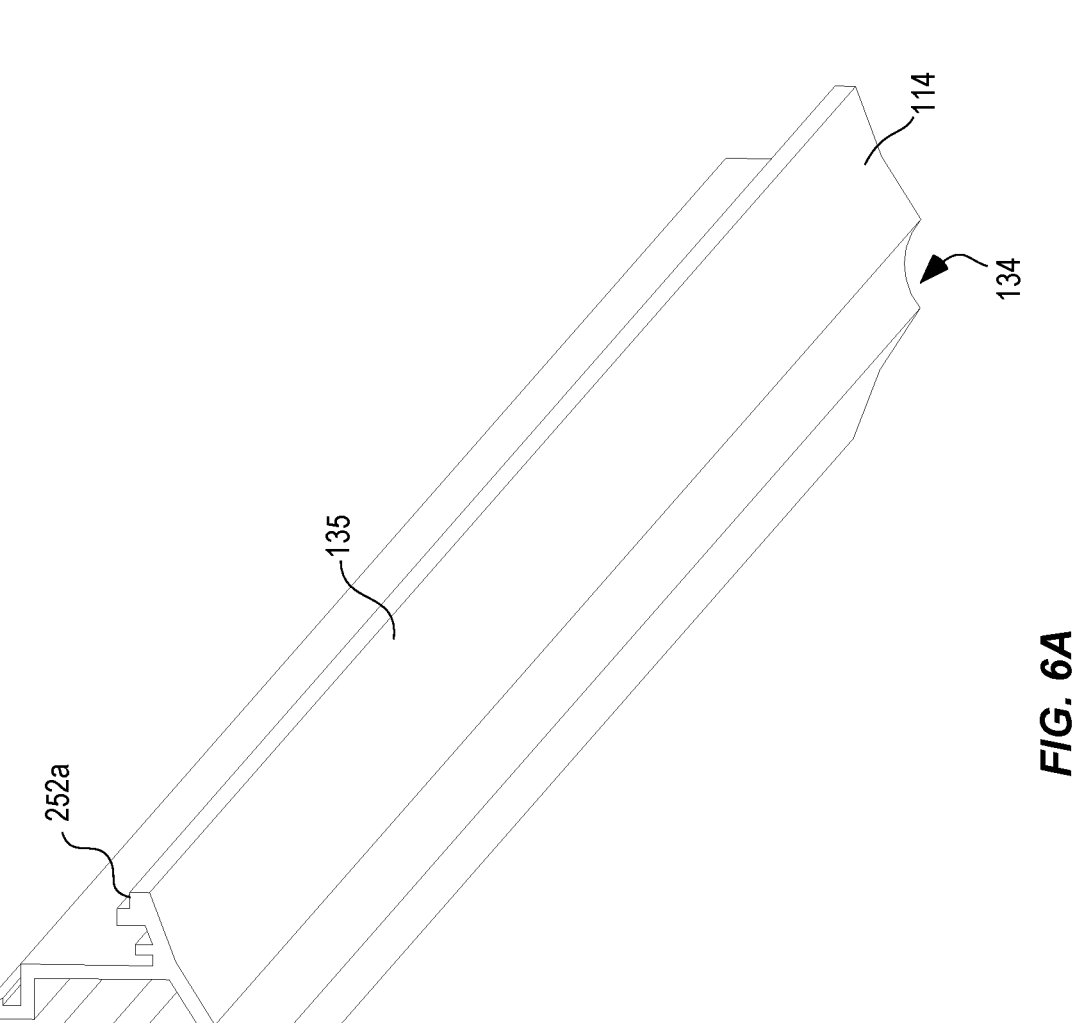
FIG. 6A is an isometric view from below of a lower portion of the single extrusion housing of the suspended fixture shown in FIG. 5A.
Figure 6B:
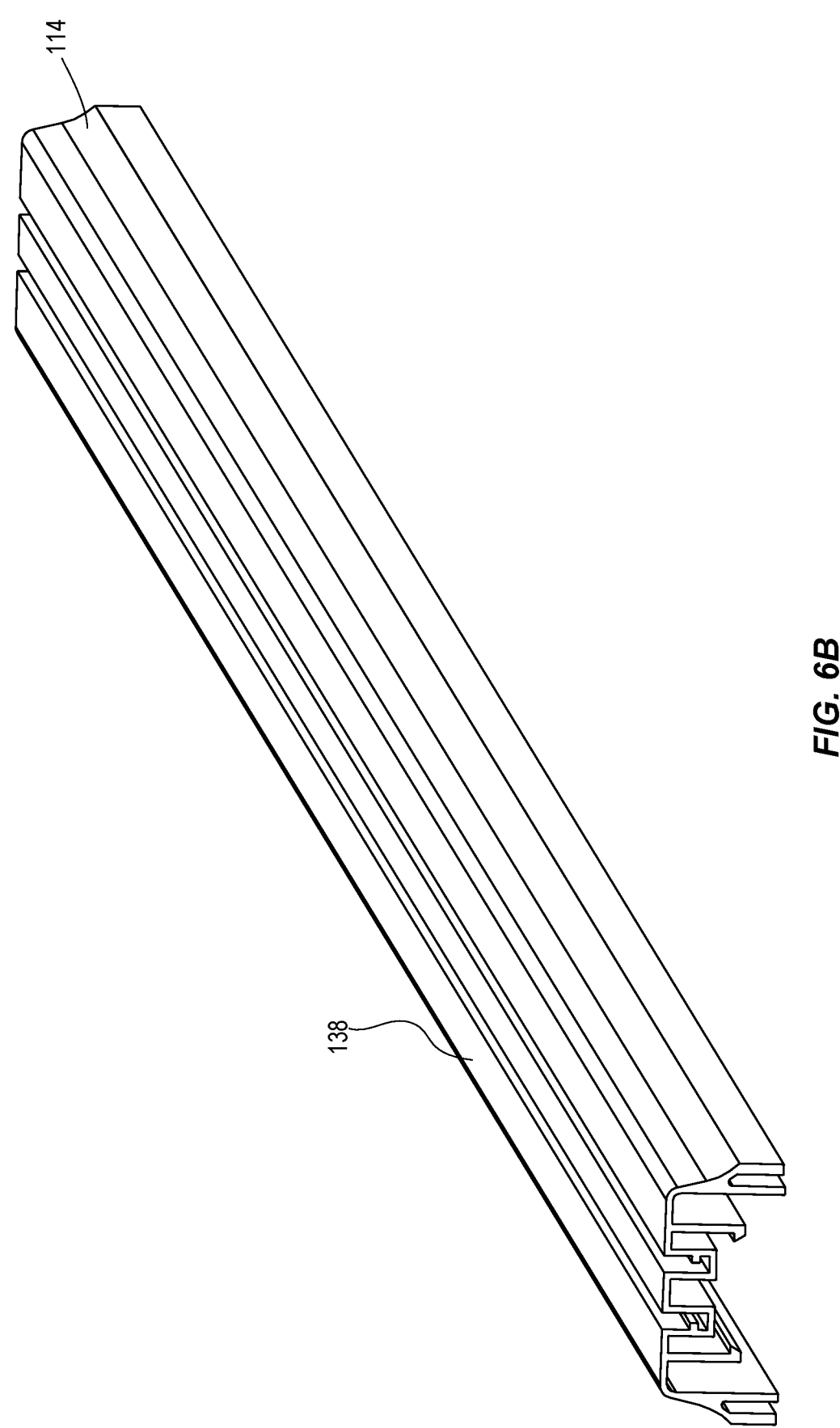
FIG. 6B is an isometric view from above of an upper portion of the single extrusion housing of the suspended fixture shown in FIG. 5A.

Referring once again to the waveguide embodiment shown in FIGS. 2-4, an optical coupling member 405 is disposed at a coupling end 408 of the waveguide 404. The material of the optical coupling member 405 is preferably somewhat sticky so that a planar bottom surface 405-6 of the member 405 adheres to and forms an optically transmissive bond with a planar top end 404-2 of the waveguide 404. In another embodiment, the optical coupling member 405 may comprise an acrylic material such as poly(methyl methacrylate) (PMMA) that is overmolded onto or otherwise optically coupled to the acrylic waveguide 404 during fabrication. In a further embodiment, the optical coupling member 405 and the waveguide 404 may be fabricated as a unitary piece of a single material using procedures such as hot embossing or molding, including injection/compression molding, or other suitable methods. Further, a tapered outer surface 405-5 preferably, but not necessarily, contacts a rigid electrically conductive member comprising a printed circuit board (PCB), and/or a flexible circuit element (not shown) carrying the LED element or module 406 when the optical coupling member 405 is fully inserted into a coupling position (FIGS. 28, 30A, and 30B).

Still further, any of the mechanical structures, LED arrangements, circuits, and optical elements disclosed in U.S. patent application Ser. No. 14/671,512, filed Mar. 27, 2015, now U.S. Pat. No. 9,581,750, entitled "Outdoor and/or Enclosed Structure LED Luminaire" by Wilcox et al., U.S. patent application Ser. No. 14/583,415, filed Dec. 26, 2014, now U.S. Pat. No. 10,502,899, entitled "Outdoor and/or Enclosed Structure LED Luminaire" by Wilcox et al., and/or U.S. patent application Ser. No. 14/462,426, filed Aug. 18, 2014, now U.S. Pat. No. 10,379,278, entitled "Outdoor and/or Enclosed Structure LED Luminaire for General Illumination Application, Such as Parking Lots and Structures" by Wilcox et al., all of which are hereby incorporated by reference herein, may be used. Additionally, any of the mechanical structures, LED arrangements, circuits, and optical elements disclosed in International Application No. PCT/US2014/30017, filed Mar. 15, 2014, entitled "Optical Waveguide Body," U.S. patent application Ser. No. 14/485,609, filed Sep. 12, 2014, now U.S. Pat. No. 9,952,372, entitled "Luminaire Utilizing Waveguide," U.S. Provisional Patent Application No. 62/005,965, filed May 30, 2014, entitled "Luminaire Utilizing Waveguide," U.S. Provisional Patent Application No. 62/025,436, filed Jul. 16, 2014, entitled "Luminaire Utilizing Waveguide," U.S. Provisional Patent Application No. 62/025,905, filed Jul. 17, 2014, entitled "Luminaire Utilizing Waveguide," U.S. patent application Ser. No. 14/657,988, filed Mar. 13, 2015, now U.S. Pat. No. 9,709,725, entitled "Luminaire Utilizing Waveguide," U.S. patent application Ser. No. 15/060,354, filed Mar. 3, 2016, now U.S. Pat. No. 9,835,317, entitled "Luminaire Utilizing Waveguide," U.S. patent application Ser. No. 15/060,306, filed Mar. 3, 2016, now U.S. Pat. No. 9,841,154, entitled "Luminaire Utilizing Light Emitting Diodes," U.S. Provisional Patent Application No. 62/301,559, filed Feb. 29, 2016, entitled "Luminaire Utilizing Waveguide," U.S. Provisional Patent Application No. 62/301,572, filed Feb. 29, 2016, entitled "Luminaire Utilizing Light Emitting Diodes," U.S. Pat. No. 9,366,799, issued Jun. 14, 2016, entitled "Optical Waveguide Bodies and Luminaires Utilizing Same," and U.S. patent application Ser. No. 15/277,670, filed Sep. 27, 2016, now U.S. Pat. No. 10,422,939, entitled "Waveguide Having Unidirectional Illuminance," the disclosures of which are incorporated by reference herein.

Referring still to FIGS. 31A and 31B, first and second power ports 436a, 436b are disposed on the end sidewalls 434a, 434c. The power ports 436a, 436b may comprise a keying shape and/or otherwise fit together suitably. The first power port 436a may be a female power port while the second power port 436b may be a male power port. The male power port 436b fits partially into the female power port 436a so as to complete an electrical connection between first and second individual housings of the elongate housings 402. Referring once again to FIG. 30A, the arrows therein indicate the male power ports 436b of the elongate housings 402a-c directed into the corresponding female power ports 436a of the next elongate housings 402b-d. For example, the male housing 436b of the first elongate housing 402a follows the arrow to insertion and coupling with the female housing 436a of the elongate housing 402b. Accordingly, the first and second luminaires 400a, 400b may be physically and electrically coupled by the male and female power ports 436b, 436a.

Referring also now to FIG. 31C, one or more electrical contacts 438 may be disposed in and/or on the power ports 436a, 436b. Electrical contact(s) 438b disposed on the male power ports 436b may align and contact electrical contacts 438a disposed within the female power ports 436a. When the electrical contacts 438a, 438b contact one another electrical power is conducted from the first elongate housing 402a to the second elongate housing 402b. Accordingly, the first luminaire 400a transfers power to the second luminaire 400b. The electrical contact(s) 438 may further provide for transfer of control signals. Also in example embodiments, the power port(s) 436 may provide a controls connection that is spaced apart from and/or separate from the electrical contacts 438. Also shown in FIGS. 31A and 31B, the elongate housing 402 has disposed along at least the sidewall 434b, whereto the optical waveguide 404 may be attached, the LED element(s) and/or module(s) 406, such that the coupling portion 408 of the optical waveguide 404 aligns with the LEDs 406.

With further reference to FIGS. 31A and 31B, the elongate housing 402 may be formed from plastic, glass, metal, or some combination thereof. For example, the housing 402 may be fabricated from a single extrusion of one or more polymers to form the entire length thereof. Each of the modular luminaires 400 may be in the range of about one to three feet in the y-dimension by about one to three inches in the x-dimension. Further, each optical waveguide may be about one foot in the y-dimension and about six inches in the x-dimension. However, dimensions of the optical waveguides 404 and the elongate housings 402 may be subject to modification, and further, may be customized to fit different suspended luminaire configurations, or the other luminaire configurations discussed hereinbelow. The single extrusion elongate housing 402 may be painted any desired color or coated with a variety of reflective materials.

Referring now to FIG. 32, elongate housing 402e is operatively coupled to an optical waveguide 440 with an interior coupling portion 442 to form another embodiment of a modular luminaire 444. The interior coupling portion 442 may be disposed near a middle of the optical waveguide 440 and/or offset nearer one of first and second ends 446a, 446b thereof. The modular luminaire 444 depicted in FIG. 32 may be coupled with other modular luminaires 444, 400 to form modular luminaire light systems/luminaires similar to that shown and described with reference to FIG. 30B, save the relative location and orientation of the optical waveguide(s) 440, 404.

Figures 33A, 33B:
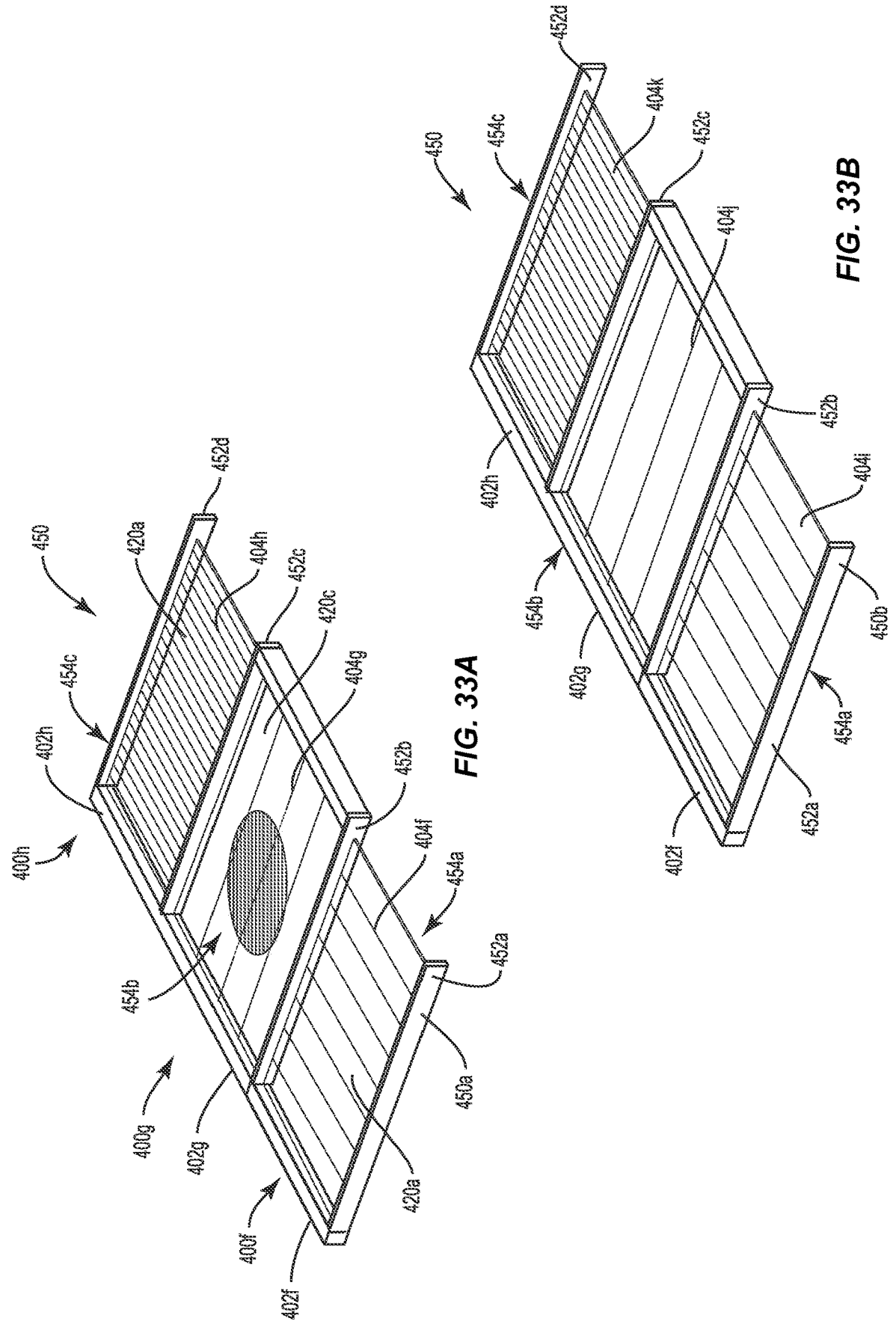
FIGS. 33A and 33B are isometric views of an example luminaire comprising a plurality of optical waveguides coupled one to the next.

Referring now to FIGS. 33A and 33B, an example embodiment of a modular luminaire lighting system 450 is formed by three edge-lit modular luminaires 400f, 400g, 400h. Each of the modular luminaires 400f-h comprises a corresponding elongate housing 402f-h. FIG. 33A depicts a modular luminaire lighting system 450a with corresponding optical waveguides 404f-h coupled to the elongate housings 402f-h. The end optical waveguides 404f, 404h comprise the extraction feature patterns 420a (FIG. 28), while the middle optical waveguide 404g comprises the extraction feature pattern 420c (FIG. 29B). FIG. 33B depicts a modular luminaire lighting system 450b comprising three optical waveguides 404i-k coupled to the elongate housings 402f-h. These optical waveguides 404i-k comprise the extraction feature pattern 420a (FIG. 28) for general lighting purposes but with varying directionality so as to produce a desirable illumination pattern.

The modular illumination lighting systems 450a, 450b of FIGS. 33A and 33B comprise additional structural support components 452a, 452b, 452c, 452d for connecting and supporting the respective optical waveguides 404f-h, 404i-k. The structural support components 452a-452d facilitate connections between the optical waveguides 404f-h. Further, the structural support components 452a, 452b, 452c, 452d may be attached to the respective elongate housings 402f-h to form one or more frame portions 454a, 454b, 454c. Each of the one or more frame portions 454a-c support the associated optical waveguides 404f-h, 404i-k along more than one edge thereof. As noted hereinabove, the elongate housings 402f-h of this example embodiment may fit, clip, and/or snap together by male and female ports of adjacent elongate housings.

Figures 34A, 34B:
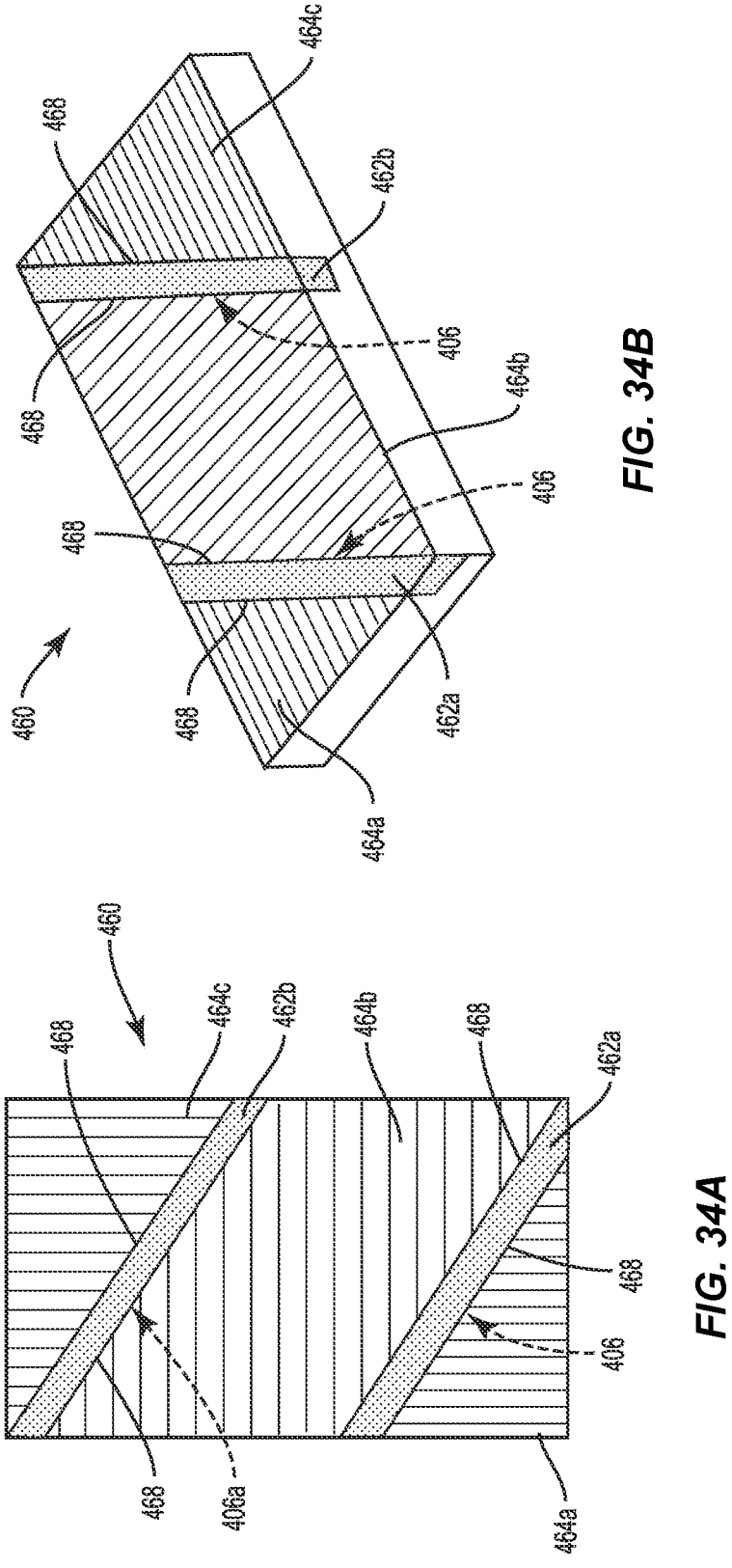
FIGS. 34A and 34B depict an example luminaire comprising a plurality of optical waveguides comprising differing shapes and coupled one to the next.

A generally rectangular example embodiment of a modular luminaire lighting system 460 is illustrated in FIGS. 34A and 34B. In these example embodiments, elongate housings 462a, 462b are disposed at an angle relative one or more exterior edge of the optical waveguide(s) 464a, 464b, 464c. The elongate housings 462a, 462b traverse an interior portion 466 of the modular luminaire lighting system 460. Accordingly, the optical waveguides 464a, 464b, 464c are edge lit from interior edges 468 thereof rather than along exterior perimeter(s) of the respective waveguides 464a, 464b, 464c. The example embodiment of FIGS. 34A and 34B may omit housing and/or support structures along the exterior perimeter of the waveguides 464a, 464b, 464c and, therefore, the modular luminaire lighting system 460. The exposed edges of the waveguides 464a, 464b, 464c may provide a unique aesthetic effect or appearance of the modular luminaire lighting system 460. For example, light my exit the waveguides 464a, 464b, 464c through the exterior perimeter(s) thereof. Such an effect may cause the modular luminaire lighting system 460 to glow or otherwise illuminate from edge surfaces. Further, disposing the elongate housings 462a, 462b at an angle relative the exterior perimeter(s) of the waveguides 464a, 464b, 464c may be aesthetically desirable. The LED modules 406 may be disposed along one or more sides of the elongate housings 462a, 462b so as to introduce light into one or more of the optical waveguides 464a, 464b, 464c.

Figures 35A, 35B:
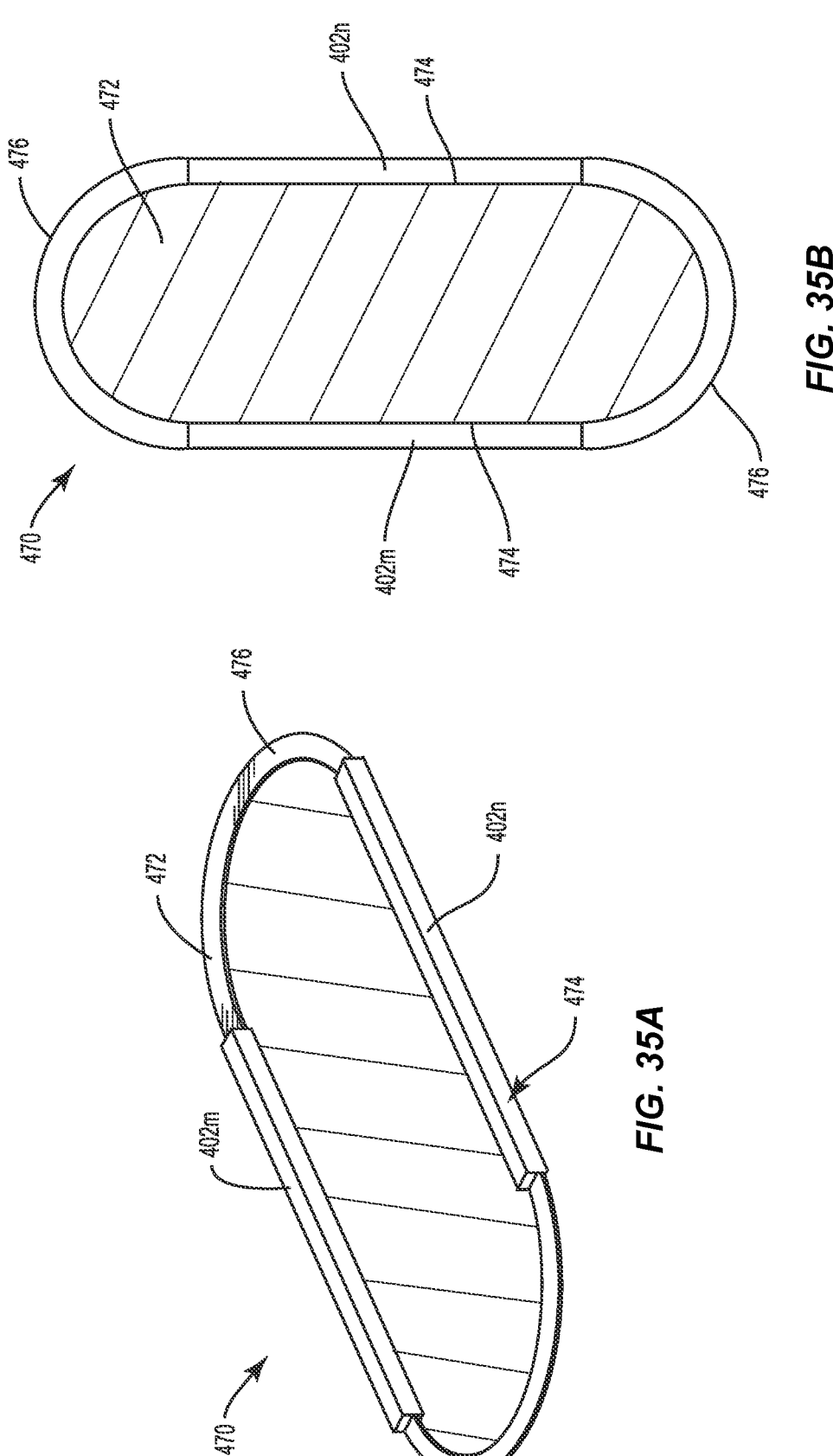
FIGS. 35A and 35B depict an example luminaire comprising one or more optical waveguides comprising an overall racetrack shape.

Referring now to FIGS. 35A and 35B, a generally curved, elliptical, racetrack, and/or oval example embodiment of a modular luminaire lighting system 470 is illustrated. The lighting system 470 may comprise one or more arcuate optical waveguide 472 comprising a combination of straight and curved edges 474, 476. The curved modular luminaire lighting system 470 may further comprise first and second elongate housings 402m, 402n disposed along the straight edges 474 of the arcuate optical waveguide 472. The first and second elongate housings 402m, n direct light into the arcuate optical waveguide 472. Similar to the operation of the optical waveguide(s) 402 discussed hereinabove, the arcuate optical waveguide 472 may comprise the extraction features 410 forming an extraction feature pattern 420e for directing and distributing light through one or more surfaces 478a, 478b of the arcuate optical waveguide 472. In an example embodiment, the curved modular luminaire lighting system 470 may be suspended from a ceiling and/or mounted as a wall sconce. The curved edges 476 of the arcuate optical waveguide 472 may emit light therefrom, where the waveguide 472 is not obscured by placement of the first and second elongate housings 402m, n. The emission of light from the curved edge surfaces 476 of the arcuate optical waveguide 472 as well as the overall curved shape of the curved modular luminaire lighting system 470 may provide desirable aesthetic appeal for particular applications.

Figures 36A, 36B, 37A, 37B:
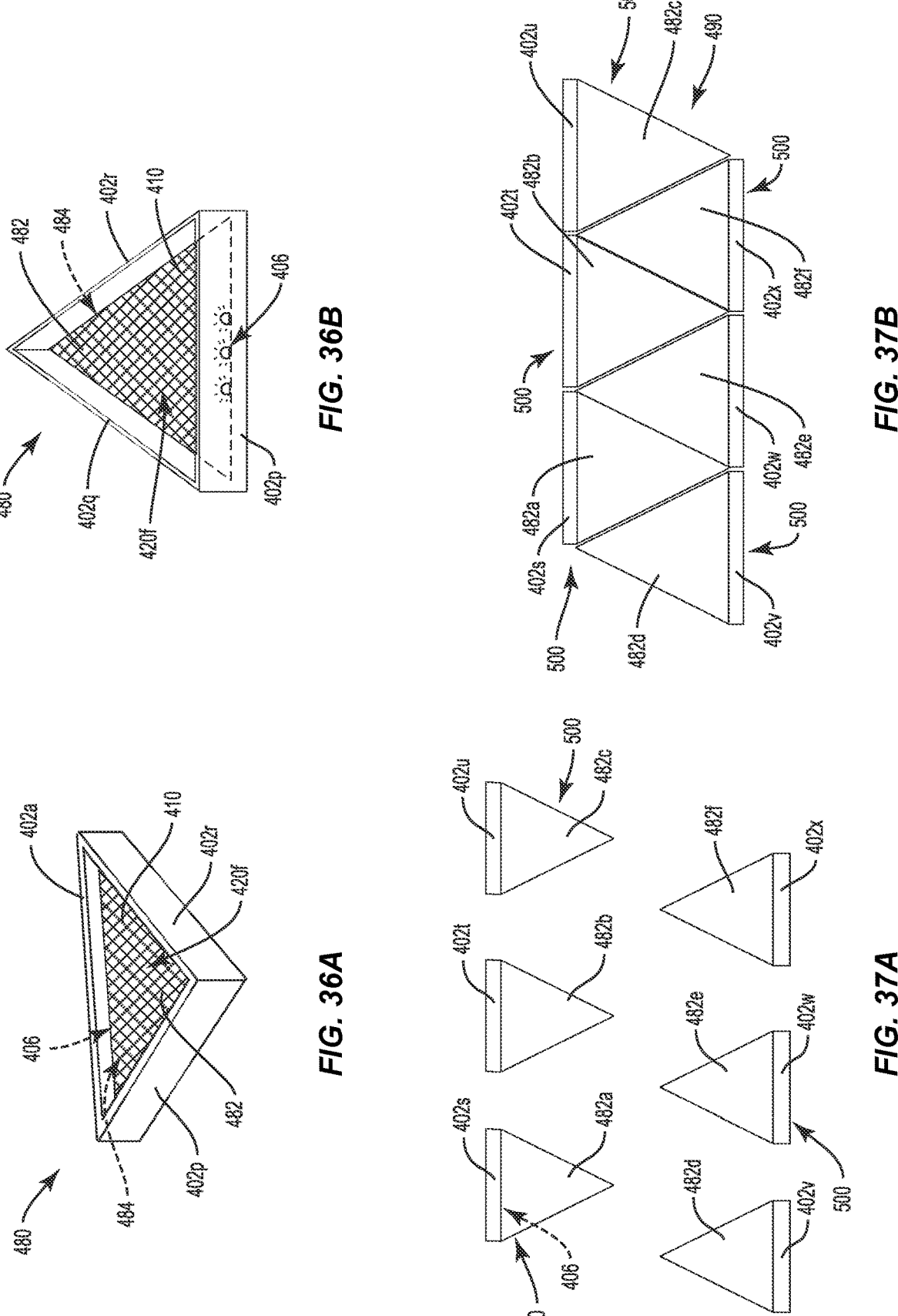
FIGS. 36A and 36B are isometric views from above of an example luminaire comprising one or more optical waveguides comprising generally triangular shapes.
FIG. 37A depicts a plurality of optical waveguides comprising generally triangular shapes.
FIG. 37B depicts an example luminaire comprising the plurality of optical waveguides of FIG. 37A and comprising a generally trapezoidal shape.

In FIGS. 36A and 36B, a generally triangular example embodiment of a modular luminaire lighting system 480 is illustrated. The triangular modular luminaire lighting system 480 comprises first, second, and third elongate housings 402p, 402q, 402r disposed about a generally triangular optical waveguide 482. In this example embodiment, the LED elements and/or modules 406 may be disposed in each of the elongate housings 402p, q, r, and/or only within a selection of the elongate housings 402p, q, r. The LED elements and/or modules 406 introduce light into the triangular optical waveguide 482 through one or more edge surfaces 484 of the triangular optical waveguide 482. In an example embodiment, the elongate housings 402q, 402r may be omitted such that the triangular optical waveguide 482 is mounted from and/or extends from the single elongate housing 402p. Similar to the operation of the optical waveguide(s) 402 discussed hereinabove, the triangular optical waveguide 482 may comprise the extraction features 410 forming an extraction feature pattern 420f for directing and distributing light through one or more surfaces 486a, 486b of the triangular optical waveguide 482. In an example embodiment, the triangular modular luminaire lighting system 480 may be suspended from a ceiling and/or mounted as a wall sconce. The inclusion or omission of the elongate housings 402p, q, r may be customizable to achieve a desirable appearance and/or aesthetic appeal for particular applications.

FIG. 37A depicts a plurality of the triangular optical waveguides 482a, b, c, d, e, f, which may be operatively coupled to comprise a generally trapezoidal example embodiment of a modular luminaire lighting system 490 illustrated in FIG. 37B. Each of the triangular optical waveguides 482a-f in FIGS. 37A and 37B is associated with an elongate housing 402s-402x. The LED elements and/or modules 406 may be disposed in each of the elongate housings 402s-402x. Each of the triangular optical waveguides 482a-f in combination with the respective elongate housings 402s-402x comprise generally triangular modular luminaire lighting systems 500. The trapezoidal modular luminaire lighting system 490 may be formed from a plurality of the triangular modular luminaire lighting systems 500. The example embodiment of FIG. 37B depicts the trapezoidal modular luminaire lighting system 490 as comprising six of the triangular modular luminaire lighting systems 500. Embodiments of the trapezoidal modular luminaire lighting system 490 may comprise more or fewer of the triangular luminaire lighting systems 500. In this way the size and shape of the trapezoidal modular luminaire lighting system 490 may be customized. The trapezoidal modular luminaire lighting system 490 may form an isosceles trapezoid, if, for example, five triangular modular luminaire lighting systems 500 are included. In a further example, the trapezoidal modular luminaire lighting system 490 may form a parallelogram, if six triangular modular luminaire lighting systems 500 are included as shown in FIG. 37B. The number and size of the triangular modular lighting systems 500 may be further customizable in order to provide the desired general size and shape of the trapezoidal modular luminaire lighting system 490. The elongate housings 402s-402x of the triangular modular lighting systems 500 operatively couple through male and female power ports as described hereinabove with reference to FIGS. 31A-31C.

Figures 38A, 38B, 39A, 39B:
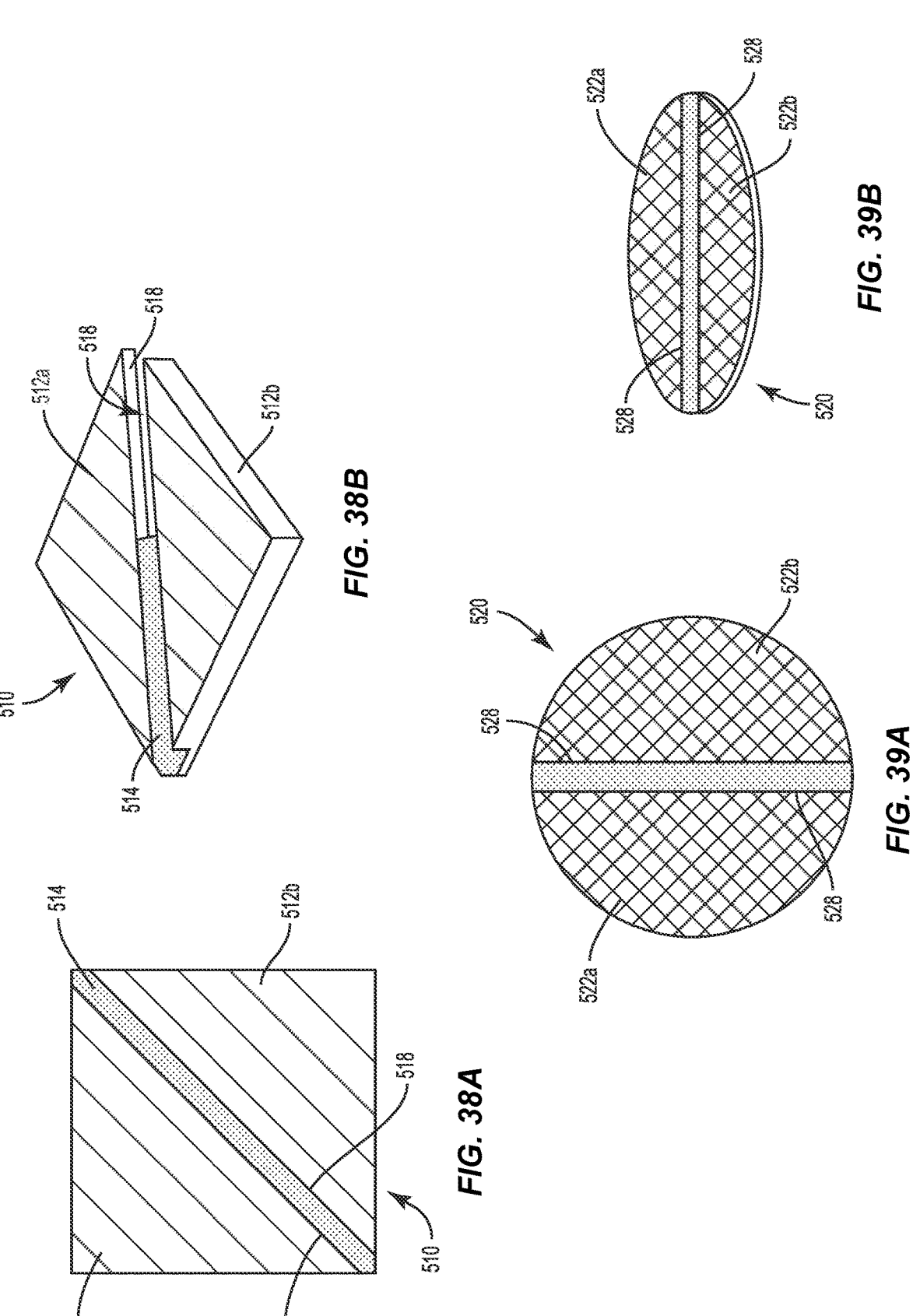
FIG. 38A is a plan view of an example luminaire comprising a plurality of optical waveguides each comprising a triangular shape.
FIG. 38B is an isometric view of the example luminaire of FIG. 38A.
FIG. 39A is a plan view of an example luminaire comprising a plurality of optical waveguides each comprising a generally half-circle shape.
FIG. 39B is an isometric view of the example luminaire of FIG. 39A.

Referring now to FIGS. 38A and 38B, a generally square example embodiment of a modular luminaire lighting system 510 is depicted. The square modular luminaire lighting system 510 comprises first and second triangular optical waveguides 512a, 512b, similar to the triangular waveguides 482a-f of the trapezoidal modular luminaire lighting system 490 (FIGS. 37A and 37B). Further, in this example embodiment, elongate housing 514 is disposed at an angle relative one or more exterior edge of the triangular optical waveguides 512a, 512b. The elongate housing 514 traverses an interior portion of the square modular luminaire lighting system 510. Accordingly, the triangular optical waveguides 514a, 514b are edge lit from interior edges 518 thereof rather than along exterior perimeter(s) of the respective waveguides 512a, 512b. FIGS. 39A and 39B depict a circular example embodiment of a modular luminaire lighting system 520. In the circular modular luminaire lighting system 520, first and second half circle optical waveguides 522a, 522b are operatively coupled to an elongate housing 524 disposed across an interior portion of the circular modular luminaire lighting system 520. Accordingly, the circular optical waveguides 522a, 522b are edge lit from interior edges 528 thereof rather than along exterior perimeter(s) of the respective waveguides 522a, 522b.

Figure 40A:
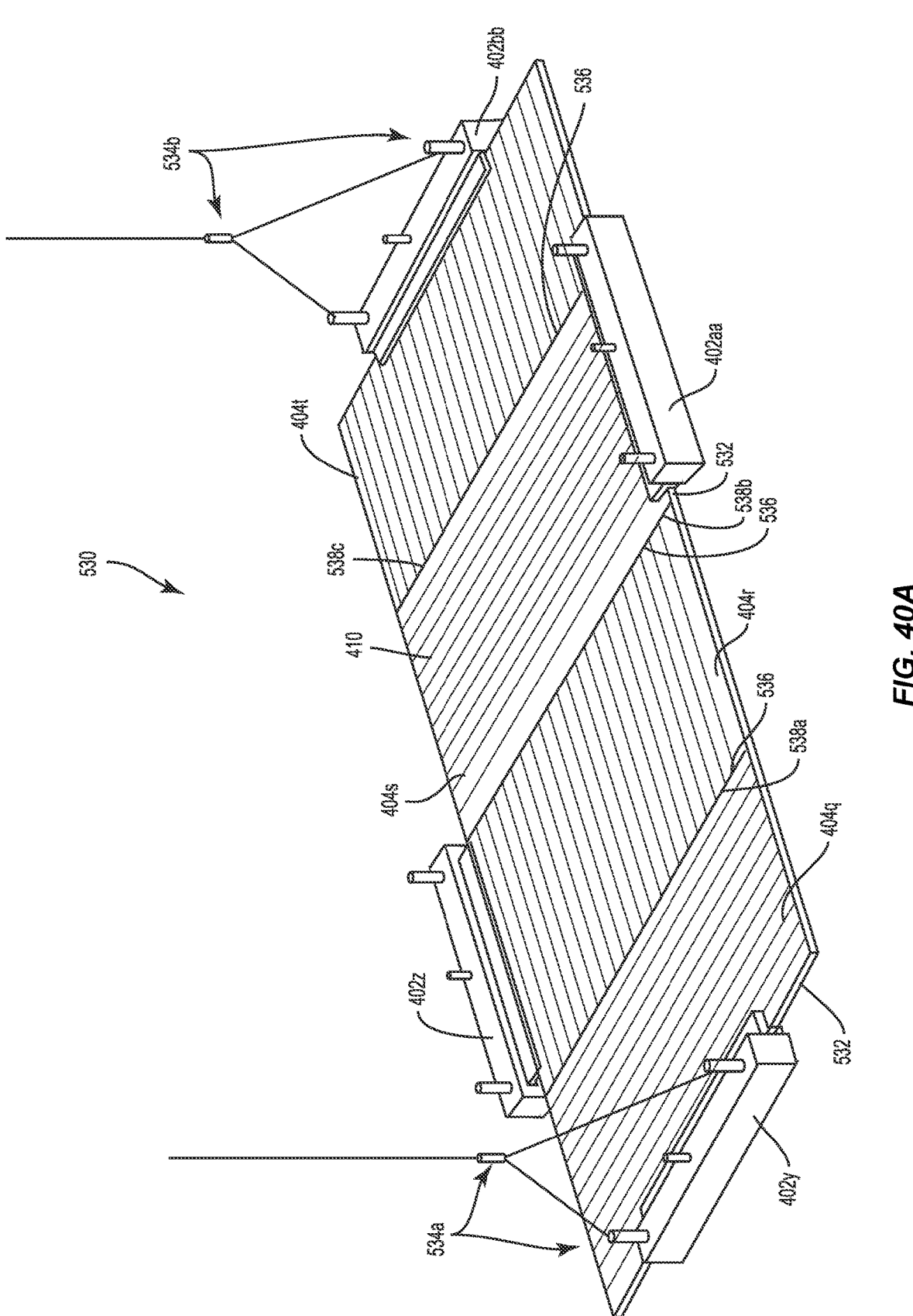
FIG. 40A is an isometric view of an example suspended luminaire comprising a plurality of optical waveguides coupled one to the next.
Figure 40B:
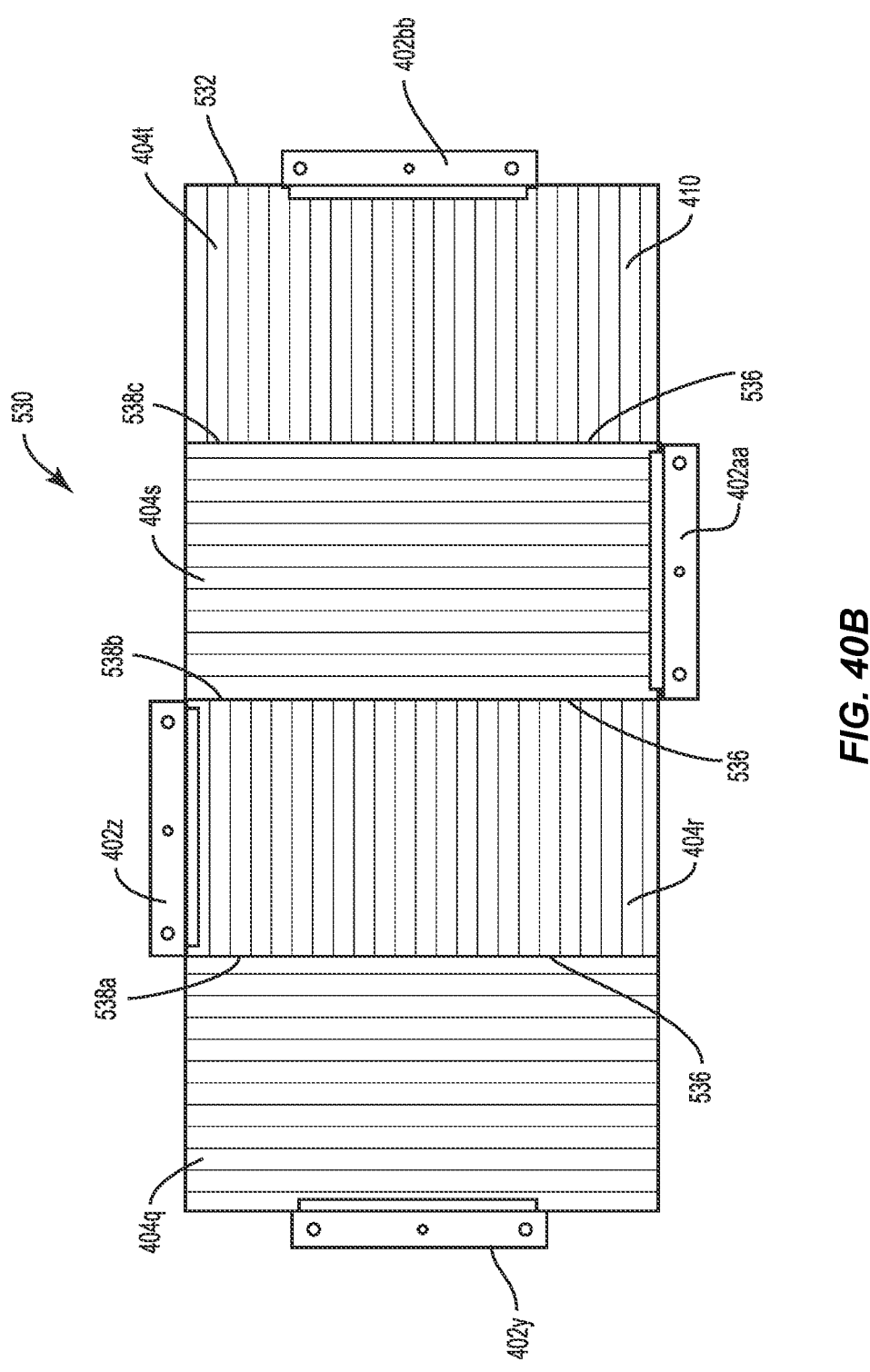
FIG. 40B is a plan view of the example luminaire of FIG. 40A.

FIGS. 40A and 40B depict first, second, third, and fourth rigid optical waveguides 404q, 404r, 404s, 404t arranged to form an edge lit, suspended modular luminaire lighting system 530. Elongate housings 402y, 402z, 402aa, 402bb, are disposed along a perimeter edge surface 532 of the first to fourth rigid optical waveguides 404q, 404r, 404s, 404t. The LED elements and/or modules 406 may be disposed in the elongate housings 402y, z, aa, bb such that light is directed into the edge surfaces 532 of the optical waveguides 404q-t. Similar to the operation of the optical waveguide(s) 404 discussed hereinabove, the rigid optical waveguides 404q-t may comprise the extraction features 410 forming the extraction feature patterns 420a-d as depicted in FIGS. 28 and 29A-29C. In an example embodiment, the suspended modular luminaire lighting system 530 may be suspended from a ceiling by first and second suspension assemblies 534a, 534b. The one or more mounting or suspension assemblies 534a, 534b may mechanically connect the suspended modular luminaire lighting system 530 to a ceiling, pole, post, joist, and/or any other structurally suitable overhead mounting element(s). Alternatively, the mounting or suspension assemblies 534a, 534b may connect the suspended modular luminaire lighting system 530 to one or more wall(s), pole(s), post(s), stud(s), or any other structurally suitable horizontal mounting element(s). Electrical connections may be made in any manner to the luminaire, including through the suspension assemblies 534a, 534b.

The edge surfaces 532 of the rigid optical waveguides 404q, 404r, 404s, 404t may emit light therefrom, where not obscured by placement of the elongate housings 402y, 402z, 402aa, 402bb. Further, the optical waveguides 404q, 404r, 404s, 404t may operatively couple to one another along interior edge surfaces 536 thereof to form interior connection points 538a, 538b, 538c. The interior connection points 538a, 538b, 538c may provide a desirable aesthetic appeal due to the omission of additional, non-light emitting structural components between the optical waveguides 404q, 404r, 404s, 404t. Further, the rigid optical waveguides 404q, 404r, 404s, 404t may create a light path between and amongst the rigid optical waveguides 404q, 404r, 404s, 404t. Light travelling within the rigid optical waveguides 404q, 404r, 404s, 404t may move from one waveguide to the next through the interior connection points 538a, 538b, 538c. The suspended modular luminaire lighting system 530 may comprise a customizable size and shape. One or more of the rigid optical waveguides 404q, 404r, 404s, 404t may be omitted and/or additional rigid optical waveguides may be included in the suspended luminaire lighting system 530. In customizable embodiments, the rigid optical waveguides 404q, 404r, 404s, 404t may be connected and disconnected at the interior connection points 538a, 538b, 538c. Still further, example embodiments of the suspended luminaire lighting system 530 may comprise L-shape, T-shape, and/or other shapes with one or more arms extending therefrom.

Figures 41A, 41B:
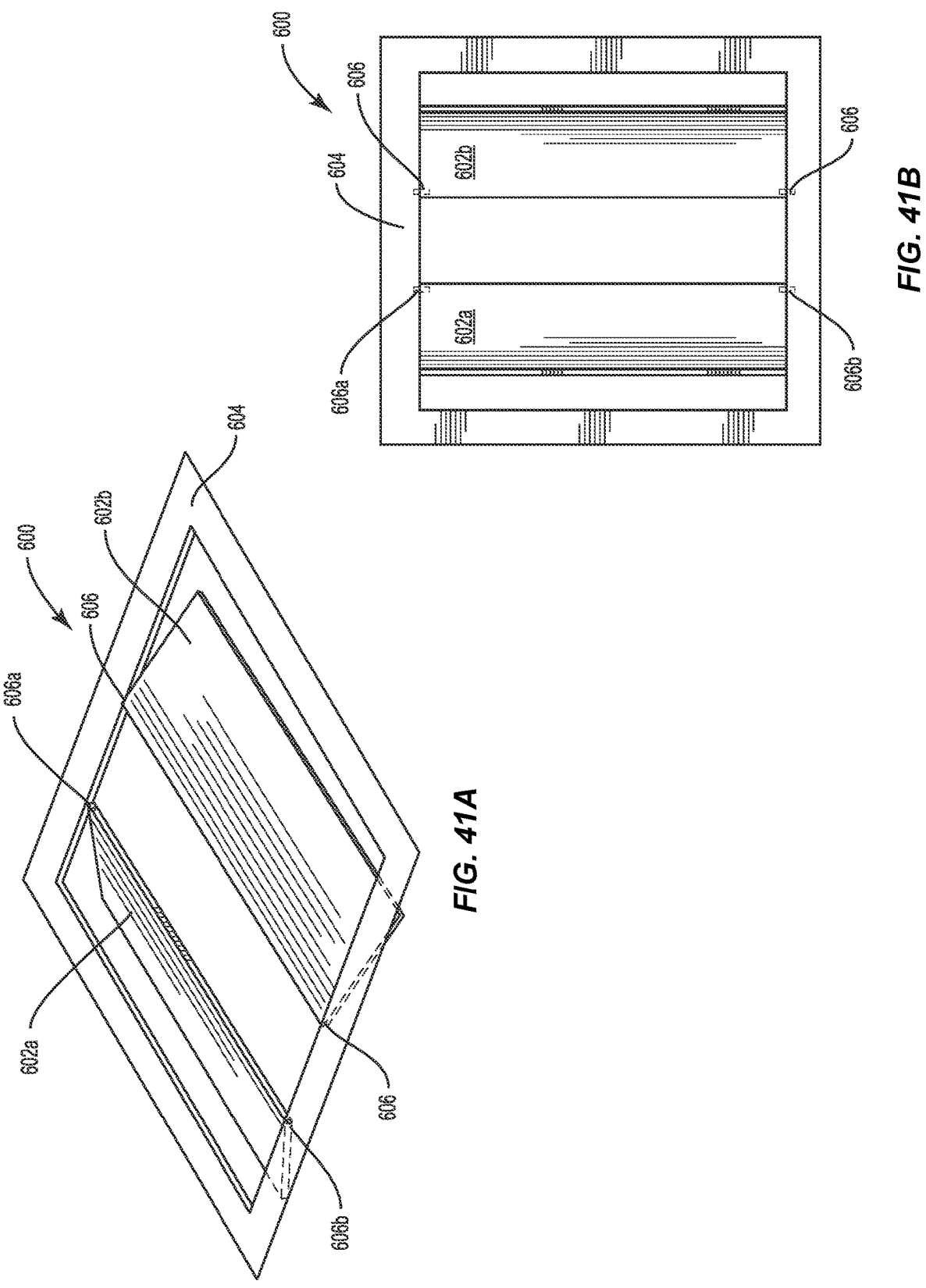
FIG. 41A is an isometric view of an example luminaire with one or more moveable waveguides.
FIG. 41B is a plan view of the example luminaire of FIG. 41A.

Referring now to FIGS. 41A and 41B, an adjustable waveguide luminaire 600 is depicted with first and second adjustable optical waveguides 602a, 602b. The first and second optical waveguides 602a, 602b are disposed in a frame housing 604. The LED elements and/or modules 406 are disposed within the frame housing 604 such that light is directed into the first and second optical waveguides 602a, 602b. The dimensions of the frame housing 604 and the adjustable optical waveguides 602 may be subject to modification, and further, may be customized to fit different wall sconce and/or suspended fixture sizes and applications. As in the other embodiments disclosed herein, the frame housing 604 may include, among other things, one or more of driver circuitry, light emitting diode(s), control circuitry, sensor(s), power circuitry, circuit board(s), or other components.

Further, as with other contemplated example embodiments, the optical waveguides 602a, 602b are modular and interchangeable, such that each may be switched for an alternative waveguide having different extraction features and/or may be replaced with relative ease. Therefore, the waveguides 602a, 602b may be easily changed and selected to produce customizable overall illumination patterns for the adjustable waveguide luminaire 600 according to parameters suitable for a particular indoor lighting application or simply according to desired characteristics.

The adjustable optical waveguides 602a, 602b may be operatively coupled with the frame housing 604 by one or more pivot/connection points 606 for each of the adjustable optical waveguides 602a, 602b. The pivot/connection points 606 may provide for rotation and/or free movement of the respective adjustable optical waveguides 602a, 602b thereabout. Additionally, the LED elements/modules 406 may be aligned with the one or more pivot/connection points 606 such that light is introduced into the respective adjustable optical waveguide 602a, 602b through the associated one or more pivot/connection points 606.

In an example embodiment, the adjustable optical waveguide 602a is operatively coupled to the frame housing 604 by first and second pivot/connection points 606a, 606b. The adjustable optical waveguide 602a may comprise a neutral position that is in alignment with the frame housing 604. From the neutral position, the adjustable optical waveguide 602a may move/adjust/pivot at the first and second pivot/connection points 606a, 606b such that a free end 608 of the adjustable optical waveguide 602a moves out of alignment with the frame housing 604 and the adjustable optical waveguide 602a is disposed at an angle relative a plane defined by the frame housing 604. The free end 608 of the adjustable optical waveguide 602a may move to either side of the plane defined by the frame housing 604. Also in example embodiments, the adjustable optical waveguide 602a may be operatively coupled to the frame housing 604 by more or fewer pivot/connection points 606, including a single pivot/connection point 606. In an example embodiment with a single pivot/connection point, the adjustable optical waveguide 602*a* may pivot in two directions thereby extending out and away from the frame housing 604. The second adjustable optical waveguide 602*b* may operate in any of the manners described hereinabove with respect to the first adjustable optical waveguide 602*a*. Additionally, in example embodiments, the adjustable waveguide luminaire 600 may comprise more or fewer of the adjustable optical waveguides 602. The specifications of a particular lighting application may be used to dictate the size of the adjustable waveguide luminaire 600, in the spirit of those embodiments depicted herein, as well as the number of optical waveguides disposed thereabout.

Figures 42A, 42B:
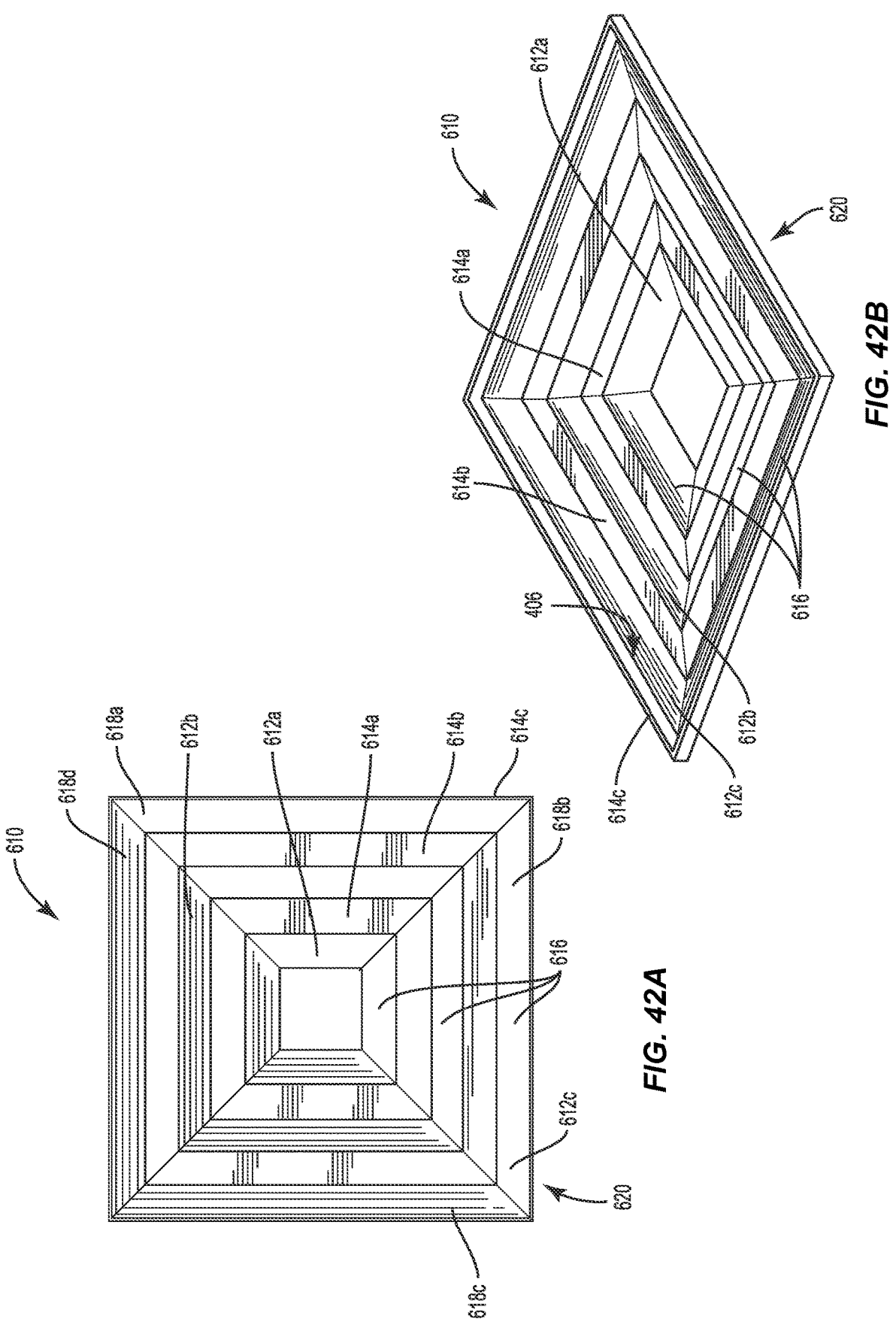
FIG. 42A is a plan view of an example luminaire with one or more waveguides performing a non-lighting function.
FIG. 42B is an isometric view of the example luminaire of FIG. 42A.

With reference to FIGS. 42A and 42B, an apparatus forming a combined luminaire and non-lighting fixture 610 is shown and described. Specifically, the non-lighting fixture incorporates waveguides and LED elements therein. An example embodiment of the apparatus 610 comprising a non-lighting function, shown in FIGS. 42A and 42B, is a ventilation fixture wherein one or more optical waveguides 612*a*, 612*b*, 612*c* replace air directing components of the ventilation fixture that would otherwise direct air flow as the air exits a conventional ventilation fixture. Thereby the one or more optical waveguides 612*a*, 612*b*, 612*c* perform a non-lighting function by directing air flow in addition to emitting light. Also in this example embodiment, the LED elements and/or modules 406 may be incorporated into other air directing components that are not replaced by the optical waveguides 612*a*, 612*b*, 612*c*. Accordingly, the other air directing components may be air directing housings 614*a*, 614*b*, 614*c*. The LED elements and/or modules 406 housed within one or more of the air directing housings 614*a*, 614*b*, 614*c* introduce light into the one or more optical waveguides 612*a*, 612*b*, 612*c*. The light introduced into the one or more optical waveguides 612*a-c* travels through the optical waveguide(s) 612*a-c* by TIR and is emitted from one or more surfaces, such as an outward facing surface 616, of each of the waveguides 612*a*, 612*b*, 612*c*. In example embodiments, more or fewer optical waveguides may replace more or fewer air directing components of the non-lighting fixture. Further, the one or more optical waveguides 612*a*, 612*b*, 612*c* shown in the example embodiment of FIGS. 42A and 42B may instead be separated into a plurality of elongate optical waveguides. For example, the outer waveguide 612*c* may comprise elongate optical waveguides 618*a*, 618*b*, 618*c*, 618*d* arranged to form a square and/or rectangular optical waveguide.

In example embodiments, the overall shape of the combination fixture 610 may be different, and, therefore, the shapes and sizes of the optical waveguides 612, 618 may differ accordingly. For example, the combination fixture 610 may be a circular ventilation fixture requiring one or more circular optical waveguides and one or more circular air directing housings. The combination fixture 610 may also be generally oval, triangular, elongate rectangular, and/or shapes and sizes suitable for desired lighting and/or ventilating applications. As with other embodiments described herein, the optical waveguides 612*a-c* and/or 618*a-d* are modular and interchangeable. Further, the optical waveguides 612, 618 in combination with the associated air directing housings 614 may form air directing luminaires 620 that are customizable and interchangeable such that one may be switched for another and/or such that the optical waveguides 612, 618 and/or the air directing luminaires 620 may be replaced with relative ease. Given that each optical waveguide 612, 618 of the combination fixture 610 may produce any customizable illumination pattern and that each optical waveguide 612, 618 and/or air directing luminaire 620 is modular, such waveguides/luminaires may be easily interchanged and selected to produce customizable overall illumination patterns for the combination fixture 610 according to parameters suitable for a given indoor/outdoor/enclosed lighting application or simply according to desired characteristics.

The combination fixture 610 may provide a unique and desirable aesthetic by combining the LED lighting elements into a non-lighting fixture. The combination fixture 610 may be formed by combining of LED lighting elements into ventilation fixtures, such as those used to provide heating and cooling air flow, ventilation hoods, crown molding, mirrors and/or other wall fixtures, and/or other suitable non-lighting ceiling or wall fixtures. The combination fixture 610 provides for unique illumination patterns, if desirable, and may provide for aesthetically pleasing incorporation of lighting elements into spaces that might otherwise warrant separate lighting fixtures.

In summary, in the contemplated example embodiments described herein throughout, the plurality of waveguides is disposed in and/or on the housing. A flex conductor or circuit boards are placed adjacent the top edges of the waveguides and the flex conductor or circuit boards are enclosed by the housing. The housing and waveguides are joined to form the luminaire and integrate the enclosure for the power supply, sensor, operating circuits, and wire connection area. The continuous flex conductor or circuit boards present the LEDs to the waveguide coupling members. The housing provides a unique aesthetic in which optical waveguides serve as substantial components, e.g., the sides and/or body of the luminaire. Material and costs associated with the luminaire are minimized. The design results in superior lighting with minimal glare. The optic feature of the fixture is integrated onto and/or into the main housing, which results in a more robust structure and aids in the sealing between components.

The waveguide optics allow high lumen output with low glare. This is accomplished by directing the light downward at an angle and spreading the illumination across a large area. The light from the LED's is pointed directly into each waveguide as opposed to being bounced off a reflective surface of a reflector (i.e., indirect illumination). This optical solution is more efficient than current indirect systems and allows the glare value to be adjusted by changing the illuminated area.

In an embodiment, each waveguide is made of optical grade acrylic and the LEDs are optically coupled to the waveguide using a liquid silicone rubber ("LSR") member or other coupling member. The coupling member is shaped to serve as the entrance geometry for the optical system by directing light from the LED's directly into the waveguide.

If desired, the waveguides (with or without the optical coupling members) may be insert molded with the housing, thereby making the waveguide and housing a single piece and eliminating the need for seals between the waveguides and the housing. This reduces assembly time and makes for a more robust luminaire structure. In a specific version of the embodiment, a thermoplastic elastomer ("TPE") seal is molded onto the housing to seal the fixture and protect the LEDs and related circuitry from the environment. In yet another embodiment, the TPE seal is molded onto a top plate or lid that is placed on top of the housing. In still further embodiments discussed herein, the fixture is not sealed and the waveguides thereof are modular and interchangeable, increasing the relative ease with which waveguides are replaced, such as if broken or worn, and/or overall illumination patterns are developed, customized, and/or changed.

The luminaire(s) can be used with several installation options (e.g., pendant, trunnion, junction box, pole, sconce). The housing also results in ease of installation because waveguides may be easily removed and/or replaced.

Any of the embodiments disclosed herein may include a power circuit that may further be used with light control circuitry that controls color temperature of any of the embodiments disclosed herein in accordance with viewer input such as disclosed in U.S. patent application Ser. No. 14/292,286, filed May 30, 2014, now U.S. Pat. No. 10,278, 250, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Application No. 61/932,058, filed Jan. 27, 2014, entitled "Enhanced Network Lighting," the disclosures of which are incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

III. WAVEGUIDES WITH JOINED SIDE SECTIONS

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known TIR principles, the light rays of the groups $791a$, $791b$ continue to travel through the arm portions $762$, $764$, respectively, until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape, as seen in FIGS. 49 and 50.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

Still further, the waveguide bodies contemplated herein are made of any suitable optically transmissive material, such as an acrylic material, a silicone, a polycarbonate, a glass material, a cyclic olefin copolymer, air, or other suitable material(s), or combinations thereof to achieve a desired effect and/or appearance.

According to one aspect, a waveguide directs light into at least one up to an infinite number of beams or ray groups, wherein the rays of each group travel through the waveguide within a range of angles relative to one another. Each range may be narrow or broad within the TIR limits of the waveguide material.

According to another aspect, a waveguide arranges light into a plurality of groups that bounce at least once inside the waveguide by total internal reflection ("TIR") off one or more surfaces of the waveguide. Each group comprises a plurality of light rays that travel at angles that are disposed within a narrow or broad range of angles relative to one another.

In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

FIGS. 43-45A show a luminaire 710 comprising a waveguide having a waveguide body 712 including a central section 718 and first and second separate side sections 720, 722 extending away from the central section 718 along first and second directions, respectively, and terminating at first and second outer ends 720a, 722a, respectively (FIG. 44A). The side sections 720, 722 in the illustrated embodiment are preferably mirror images of one another. The central section 718 includes a coupling portion 724, and a light source 725 in the form of one or more LED element(s) 726 are disposed adjacent the coupling portion 724, as shown in FIG. 44A, and the light source 725 is adapted to produce light that is directed into the waveguide body 712 via the coupling portion 724. A power circuit C (FIG. 44A) provides power to the light source 725, and the waveguide body 712 includes a plurality of light extraction features 714 (FIGS. 46A, 46C, 46D, 46E, 46F, and 46H show various embodiments of such features 714) that extract light out of the side sections 720, 722, for example as shown in FIGS. 49 and 50.

Figure 44B:
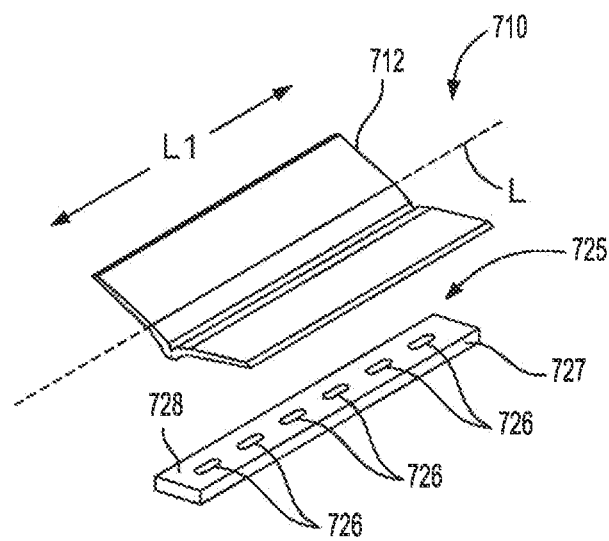
FIG. 44B is an exploded isometric view of the luminaire of FIGS. 43 and 44A.

More specifically, as seen in FIG. 44B, the luminaire 710 includes a base element in the form of a substrate 727 having a base surface 728. If desired, the base surface 728 may be covered or coated by a reflective material, which may be a white material or a material that exhibits specular reflective characteristics. LED elements 726 are mounted on the base surface 728. The substrate 727 is secured in fixed relation to the waveguide body 712 in any suitable fashion such that the LED elements are preferably equally spaced along a longitudinal axis L (FIG. 44B) and further extend into a cavity 729 (FIG. 45A) of the coupling portion 724. Each LED element 726 may be a single white LED or multiple white LEDs or each may comprise multiple LEDs either mounted separately or together on a single substrate or package including a phosphor-coated LED either alone or in combination with a color LED, such as a green LED, etc. In those cases where a soft white illumination is to be produced, each LED element 726 typically includes one or more blue shifted yellow LEDs and one or more red LEDs. Different color temperatures and appearances could be produced using other LED combinations, as is known in the art. In one embodiment, the light source comprises any LED, for example, an MT-G LED module incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein. In any of the embodiments disclosed herein the LED(s) have a particular emission distribution, as necessary or desirable. For example, a side emitting LED disclosed in U.S. Pat. No. 8,541,795, the disclosure of which is incorporated by reference herein, may be utilized inside the waveguide body. More generally, any lambertian, symmetric, wide angle, preferential-sided, or asymmetric beam pattern LED(s) may be used as the light source. Still further, any of the LED arrangements and optical elements disclosed in U.S. patent application Ser. No. 14/101,147, filed Dec. 9, 2013, now U.S. Pat. No. 9,869,432, entitled "Luminaires Using Waveguide Bodies and Optical Elements" by Keller et al., incorporated by reference herein, may be used.

The power circuit C may be disposed on the substrate 727 or may be located remotely, or a portion of the power circuit C may be disposed on the substrate and the remainder of the power circuit C may be remotely located. In any event, the power circuit C is designed to operate the light source 725 with AC or DC power in a desired fashion to produce light of a desired intensity and appearance. If necessary or desirable, a heat exchanger (not shown) is arranged to dissipate heat and eliminate thermal crosstalk between the LEDs and the power circuit C. Preferably, the light source 725 develops light appropriate for general illumination purposes including light that may be generated in a down light, a light that produces a wall washing effect, a task light, a troffer, or the like. The power circuit C may include a buck regulator, a boost regulator, a buck-boost regulator, a SEPIC power supply, or the like, and is used in any of the embodiments disclosed herein and may comprise a driver circuit as disclosed in U.S. patent application Ser. No. 14/291,829, filed May 30, 2014, now U.S. Pat. No. 9,791,110, entitled "High Efficiency Driver Circuit with Fast Response" by Hu et al. or U.S. patent application Ser. No. 14/292,001, filed May 30, 2014, now U.S. Pat. No. 9,303,823, entitled "SEPIC Driver Circuit with Low Input Current Ripple" by Hu et al. incorporated by reference herein. The circuit C may further be used with light control circuitry LC that controls color temperature of any of the embodiments disclosed herein in accordance with user input such as disclosed in U.S. patent application Ser. No. 14/292,286, filed May 30, 2014, now U.S. Pat. No. 10,278,250, entitled "Lighting Fixture Providing Variable CCT" by Pope et al. incorporated by reference herein.

In the embodiment of FIGS. 43-45A each of the first and the second side sections 720, 722 has an upper and a lower surface 730, 732 and includes a first end 720b, 722b proximal to the coupling portion 724 and a second end 720a, 722a, respectively, distal to the coupling portion 724. The first end 720b, 722b has a first thickness $T_1$, the second end 720a, 722a has a second thickness $T_2$, and the first thickness $T_1$ is greater than the second thickness $T_2$, and hence, the side sections 720, 722 are tapered. In a particular embodiment, for example, the first thickness $T_1$ is no greater than about 6 millimeters and the second thickness is no less than about 2 millimeters. In an embodiment, a center portion of each of the first and the second side sections 720, 722 also has a thickness equal to the second end 720a, 722a in that, for example, it is no less than about 2 millimeters. It should be noted that the minimum thickness is only limited by structural strength considerations, while maximum thickness is currently only limited by manufacturing considerations. In an embodiment, the ratio of the maximum to minimum thickness of the waveguide body is 10:1 or less. In a more particular version of the embodiment, the ratio is about approximately 3:1. In a particular embodiment, as shown in FIG. 69A, a reflector 753 may be placed above the upper surface 730 of the waveguide 712. If desired, the reflector 753 can be replaced by a specular or reflective coating disposed on the surface 730. (In the embodiment of FIG. 69A, the surface 732 is disposed above the surface 730, opposite to previous illustrated embodiments.) FIG. 69B illustrates an example light distribution of the embodiment of FIG. 69A, where the concentric circles mark the magnitude of intensity (candelas: lumens/steradian), and the lines extending radially from the center mark the angle of the exiting light with 0° pointing straight down, 90° to the right and 180° straight up. Other desired light distributions may be realized.

In still another embodiment, a flat waveguide body 712 is used in which the first thickness $T_1$ is equal to the second thickness $T_2$, as shown in FIG. 47B.

Also in the illustrated embodiment of FIGS. 43-45A, the coupling portion 724 curves upward away from the LED elements 726 toward one or both of the second ends 720a, 722a. The upper surface 730 of the first and second sections 720, 722 may be textured. Each textured surface 730 may comprise a plurality of light extraction features 714, one of which is shown in FIG. 46A. In a more particular embodiment, each of the plurality of light extraction features 714 comprises an intermediate surface 740 that extends from a first surface 738 to a second surface 742. All or some of the intermediate surfaces 740 may be planar or curved, as shown in FIGS. 46A, 46C, 46D, 46E, 46F, 46H, 46I, and 46K. In an embodiment, the angle of curvature of the intermediate surface 740 may range from 10° to 80°. In a more particular version of the embodiment, the angle of curvature is about approximately 30° to 60°. In still another version of the embodiment, the angle of curvature of the intermediate surface 740 is approximately 42.5° to 50°. The intermediate surfaces 740 may, but need not, have a constant radius of curvature. Furthermore, the edges 747 of the coupling portion 724 can be of any shape including, but not limited to, planar curved, angled, tapered, etc.

Also preferably, each first surface 738 is displaced from an associated adjacent second surface 742 by a particular distance $D_1$, as shown in FIG. 46A, wherein the distances $D_1$ are constant or vary along the length and width of each surface 730. The disposition of the center of the radius of curvature, the magnitude of the radius of curvature, and the arcuate extent of each intermediate surface 740 affect the distribution of light from the waveguide body 712. In another embodiment, as seen in FIGS. 49 and 50, the intermediate surfaces 740 are planar, and the intermediate surfaces 740 are all parallel to one another, although the surfaces 740 need not all be planar or parallel. In an embodiment, the perpendicular distance between the first surface 738 and the adjacent second surface 742 (i.e., the length of a line extending from and normal to the surface 738 to an imaginary projection of the plane 742 below the surface 738) is preferably less than 100 microns, and more preferably between about 720 and about 100 microns. In another embodiment, the intermediate surfaces 740 are parallel to one another and are disposed at non-zero angles with respect to associated first and second surfaces 738, 740. The angle between each intermediate surface 740 and a line tangent to an adjacent associated surface 738 or 742 where the surface 738 or 742 meets the surface 740 may be relatively steep (for example, as seen in FIG. 49) or may be relatively shallow (e.g., as seen in FIG. 50). Thus, for instance, the angle between each intermediate surface 740 and a line tangent to an adjacent associated surface 738 where the surface 738 meets the surface 740 may be in a range between about 5 degrees and 90 degrees, and more particularly, may be between about 40 degrees and about 60 degrees, and, most preferably, about 50 degrees. This angle (or any other related angle, such as the angle between the intermediate surface 740 and a line tangent to an adjacent associated surface 742 where the surface 742 meets the surface 740) and the size of each intermediate surface 740 affect the output distribution of light from the waveguide body 712.

It should also be noted that the extraction features may be of differing size, shape, and/or spacing over the surface(s) of the waveguide body 712 so that an asymmetric emitted light distribution is obtained. For example, the extraction features may include a combined notch and step extraction that leads to a tapered edge, as shown in FIGS. 64A-64D. The extraction features shown in FIG. 64D may have dimensions noted in the following table, although such dimensions are exemplary only and not limiting.

TABLE 1

| FIG. 64D | NOMINAL DIMENSION (Millimeters-unless otherwise specified) |
|---|---|
| Q | 0.100 |
| R | 0.134 |
| S | 20 degrees |
| T | 65 degrees |
| U | 0.020 |
| V | 0.020 |
| W | 0.092 |
| X | 30 degrees |
| Y | 50 degrees |
| Z | 0.060 |
| AA | 0.140 |

Additionally, as seen in U.S. patent application Ser. No. 14/101,086, filed Dec. 9, 2013, now U.S. Pat. No. 9,690,029, entitled "Optical Waveguides and Luminaires Incorporating Same" by Keller et al., the extraction features may comprise small indents or protrusions and a relatively large number of such extraction features may be disposed to the left of the coupling portion 724 and a relatively small number of such extraction features may be disposed to the right of the coupling portion 724. In such an embodiment, as should be evident, more light is extracted from the left side of the waveguide body 712 and relatively less light is extracted from the right side of the waveguide body 712.

In another embodiment, the lower surface 732 is textured. This texturing may be affected by a roughened surface that creates a diffusion effect, and/or by a plurality of extraction features 714. These extraction features 714 may be identical or similar to those described above.

Referring again to FIGS. 44A and 44B, in the illustrated embodiment, the waveguide body 712 has a length $L_1$ parallel to the longitudinal axis L, the waveguide body 712 further has a width W transverse to the length $L_1$. The width W can be as little about 3 inches or as wide as manufacturing allows. In one embodiment, the width W is about 12 inches and in another embodiment the width W is about 24 inches. The length $L_1$ can be as little as about 2 inches or as long as manufacturing allows. In an embodiment, the length $L_1$ is preferably at least about 12 inches, and, more preferably, at least about 48 inches. In the embodiment shown in FIG. 44A, the waveguide disclosed herein may have the dimensions noted in the following table. It should be noted that the dimensions in the following table as exemplary only and not limiting:

TABLE 2

| FIG. 44A | NOMINAL DIMENSION (Millimeters—unless otherwise specified) |
|---|---|
| A | 2.0 |
| B | 3.2 |
| C | 3.0 |
| D | 7.6 |
| E | 2.0 |
| F | 10 degrees |
| G | 300 |

Figure 45A:
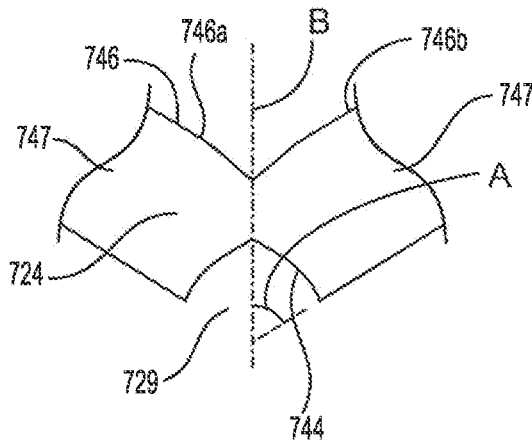
FIG. 45A is an enlarged, fragmentary side elevational view of the central section as referenced by the view lines 45A-45A of FIG. 44A.

As shown in FIG. 45A, the coupling portion 724 has a concave first surface 744 defining the cavity 729 and a curved V-shaped second surface 746 disposed opposite the concave first surface 744. The concave surface 744 may be textured so as to allow for better color mixing of the light, as shown in FIG. 68. In one embodiment, the V-shaped second surface 746 is smooth and uncoated. In an alternative embodiment seen in FIG. 48A, an optional layer of specular material 748 is disposed on the V-shaped second surface 746. In still another version of the embodiment seen in FIG. 48B, an optional specular reflective body 749 is located in the V-shaped convergence between the first and second sides 720, 722. The material 748 or the body 749 may be used in any of the embodiments discussed herein.

Figure 45B:
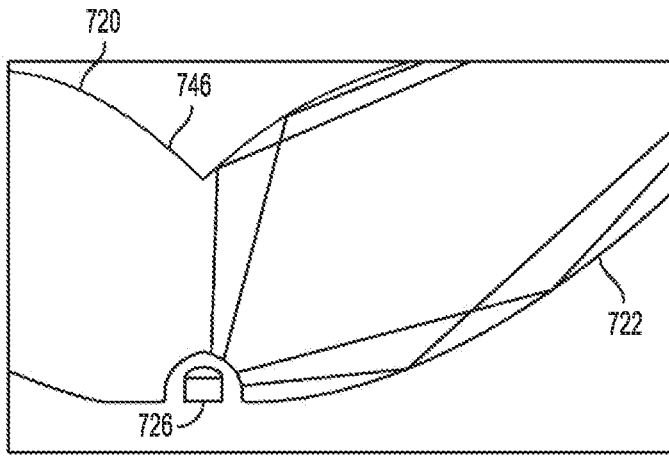
FIG. 45B is an enlarged, fragmentary side elevation of a central section.
Figure 45C:
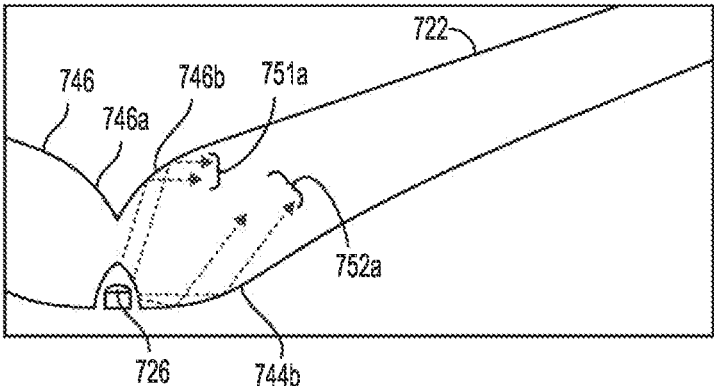
FIG. 45C is an enlarged, fragmentary side elevation of a luminaire that generates two independent light beams.

While redirecting rays of a light source 726 into one or more ray groups or beams each having a ray angle distribution range typically requires an optic substantially larger than the light source, such redirection can also be accomplished by using a thick waveguide 712, as shown in FIG. 45B. However, it may be preferable for costs reasons to undertake such light redirection using a relatively thin waveguide. For example, as seen in FIG. 45C, light developed by the light source 726 can be redirected into two independent sets of light rays. Each set of rays have a very narrow distribution range or may be substantially or fully collimated in order to achieve the desired light distribution out of the waveguide 712. Specifically, and with reference to FIG. 48A, the primarily lambertian distribution of light developed by the LED element(s) 726 is incident on the walls defining the concave surface 744, and light incident on an upper surface 744a travels through the coupling portion 724 and strikes the curved V-shaped second surface 746. The surfaces 746a, 746b that make up the second surface 746 redirect the light by TIR (and/or specular reflection if the material 748 on the body 749 is present) into the sides 720, 722 as first sets of ray groups 751a, 751b that bounce due to total internal reflection between the upper and lower surfaces 730, 732 until such rays exceed the critical angle of the material of the waveguide body 712 and escape, as seen in FIGS. 49-51. Light incident on lower surfaces 744b of the concave surface 744 travels through the coupling portion 724 directly into the portions 720, 722 without striking the curved V-shaped second surface 746. In the embodiment of FIG. 45C the lower surfaces 744b are curved in a manner that causes the light passing through the surfaces 744b to be redirected second sets of ray groups 752a, 752b. This light also bounces between the upper and lower surfaces 730, 732 until such rays exceed the critical angle of the material of the waveguide body 712 and escape, as also seen in FIGS. 49-51. In the illustrated embodiment of FIG. 45C, the ray groups 751a, 751b, 752a, and 752b have narrow ray angle distributions (i.e., the ray groups are substantially or fully collimated). In some embodiments, the surfaces 746a, 746b may be parabolic in shape and centered on the light source 726. The extraction features 714 cause the light to exit the waveguide 712 in a controlled fashion such that light is directed out of the upper and lower surfaces 730, 732. Because the light rays are at least substantially collimated they experience minimal spreading as they propagate through the waveguide body 712. This results in highly controlled beams which can be either extracted in a colli-mated fashion, or spread into a wide distribution.

Specifically, as shown in FIGS. 48A-50, the collimated light rays repeatedly bounce through the guide 712 by total internal reflection until they strike an extraction feature 714 and are redirected into the waveguide 712 or escape into the space or room to be illuminated. The light that strikes the extraction features 714 and is reflected back into the wave-guide body 712 may strike the opposing waveguide body surface and escape out of the waveguide body 712 or may further reflect off the opposing surface and continue to travel within the waveguide body 712, depending upon the inci-dent angle of the light striking such opposing surface. The light eventually leaves the waveguide body 712, preferably before reaching outer ends 720a, 722a. This escape is facilitated by the extraction features 714 which have stepped surfaces parallel to one another. This arrangement gives a tapered appearance to side sections 720, 722. The extracted light may have the light distribution illustrated in FIG. 46B or 46K where the concentric circles mark the magnitude of intensity (candelas: lumens/steradian), and the lines extend-ing radially from the center mark the angle of the exiting light with 0° pointing straight down, 90° to the right and 180° straight up. Any desired light distribution may be realized, however.

In an embodiment, extraction features 714 form an out-wardly extending protrusion as shown in FIG. 46E. The use of such an extraction feature 714 limits the distribution of light to either an upward or downward direction depending upon which surface of the waveguide body 712, the protru-sions extend from. For example, an extraction feature 714 comprised of an outwardly extending protrusion, such as one in the shape of a dome, located on the upper surface of the waveguide body 712 as shown in FIG. 46E would only allow light to emit in an upward direction. The opposite would be true if the outwardly protruding extraction features were featured on the lower surface of the waveguide body 712. These extraction features 714 are particularly useful when combined with the coupling features discussed above.

In an embodiment, the light produced from the LED 726 is reflected from a ceiling in an illuminance maximum to minimum ratio of no greater than about 4:1. More prefer-ably, the light is reflected from the ceiling in an illuminance maximum to minimum ratio between about 1:1 to about 3:1. Most preferably, the light is reflected in an illuminance maximum to minimum ratio of no greater than about 2:1.

The illuminance obtained for the disclosed luminaire is such that, in one embodiment, that use of the luminaire can result in a spacing criteria of about 1:3. In other words, a series of luminaires 710 could each be mounted 710 feet apart at a height of 7 feet above a surface to be illuminated and still achieve an acceptable level of luminance. Up lighting spacing may range from spacing criteria of 1:16 or lower. In other words, luminaires mounted 16 feet apart at a distance of 1 foot from the ceiling will still achieve an acceptable level of illuminance and uniformity. The illus-trated embodiment has upward spacing criteria of 1:10 or less. Down light spacing may range from spacing criteria of 1:2 or lower. That is, at 16 feet apart, luminaries may be mounted 8 feet from the task surface and deliver the accept-able level of illuminance and uniformity. In an embodiment, the luminaire may have spacing criteria of 1:3 or less.

FIGS. 47A-47C, 52, 71, and 72A illustrate another embodiment as assembled into a complete luminaire 760 suspended from a ceiling 762. A waveguide body 764 is disposed between end caps 66A, 66B that are, in turn, secured to a housing 768. The housing 768 encloses a driver circuit, although the driver circuit may be disposed at another location. Also, the housing 768 may be made of a thermally conductive material, such as aluminum, and may include heat dissipating structures 770 that radiate heat away from the driver circuit components. The housing 768 may be suspended by brackets 772 and wire rope (i.e., aircraft cable) 774 from appropriate ceiling mounting structures, as is conventional. The luminaire 760 may receive electrical power via an electrical connection cord 776.

The waveguide body 764 may be oriented in any direction (e.g., horizontally, vertically, or diagonally). As seen in FIGS. 47B and 47C, the waveguide body 764 is inverted (i.e., flipped over) relative to the waveguide body 712. Thus, a cavity 782 similar or identical to the cavity 729 of a coupling portion 784 that is similar or identical to the coupling portion 724 is disposed above a V-shaped curved surface 786 similar or identical to the V-shaped surface 746. As in the previous embodiment, the V-shaped surface may be smooth and uncoated, or may be coated with a specular material or a specular reflective body may be disposed adjacent and abutting the V-shaped surface 786 as in the previous embodiment. LED element(s) (FIG. 47C) 790 mounted on a substrate 792 may be secured relative to the waveguide body 764 such that the LED element(s) extend into the cavity 782. The waveguide body 764 otherwise differs from the waveguide body 712 in that side sections 790, 792 corresponding to the side sections 720, 722 are disposed substantially 180 degrees relative to one another, extraction features (not shown) similar or identical to any of the extraction features 714 disclosed herein are disposed in surfaces 796 adjacent the coupling portion 784, and surfaces 798 opposite the surfaces 796 have a greater lateral extent than the surfaces 796. The surfaces 796 are preferably smooth, although such surfaces may be textured as noted with respect to the surfaces 732.

As shown in the various embodiments of the Figures, the lower surfaces 732 of the waveguide body 712 or 764 may be disposed at any angle A relative to an axis B (FIG. 46A) lying in a plane normal to the longitudinal axis L and bisecting the coupling portion 724. More preferably, this angle A is between about 45° and about 135° (see, e.g., FIGS. 53-56B). In another embodiment, the lower surface 732 is disposed at an angle A of between about 70° and about 90° relative to the axis B. In the embodiment illustrated in FIGS. 43-46A, the lower surface 732 is disposed at an angle A of about 85° relative to the axis B.

FIGS. 57A and 57B illustrate an embodiment in which the side sections 720, 722 are disposed at different angles, and hence, the embodiment is asymmetric. More particularly, lower surfaces 732-1 and 732-2 of the side sections 720, 722, respectively, form angles C and D, respectively, with respect to lines parallel to the axis B. In the preferred embodiment, the angles C and D are about 85 degrees and about 135 degrees, respectively, although these angles may have any magnitude. The embodiment of FIGS. 57A and 57B may have particular utility when used in a ceiling-suspended luminaire that is used adjacent an area where a wall meets the ceiling. In this case, the section 720 may be directed toward the intersection of the wall and ceiling such that the surface 730 illuminates such intersection and the inside of the room, and the section 722 may be directed away from such intersection to illuminate inner portions of the ceiling and the work spaces inside the room.

Referring next to FIGS. 58A and 58B, the waveguide body may be partially or fully curved to define a curved longitudinal axis L. For example, FIG. 58A illustrates a waveguide body 712a that is partially curved about itself, but which is otherwise identical to the waveguide body 712 of any of the embodiments disclosed herein. The embodiment of FIG. 58A is illustrated as being curved 180 degrees, although the waveguide body may be curved any other arcuate extent, as desired. FIG. 58B illustrates an embodiment where a waveguide body 721b is fully curved about and joined to itself (i.e., the waveguide body is curved 360 degrees) to define a circular longitudinal axis L (not shown) and thereby form a circular cylinder. (It should be noted that FIG. 58A also illustrates the waveguide body of FIG. 58B in cross section). If desired, either of the waveguide bodies 712a, 712b may define other than a partial or full circle in a plane that includes the curved longitudinal axis L. Thus, for example, an ellipse or other shape may be defined. The waveguide body 721b may be otherwise identical to any of the embodiments disclosed herein and may be used in a luminaire. In such a case, LED elements 726 may be disposed on a curved substrate 727 wherein the latter is secured to the waveguide body 712a, 712b in any suitable fashion such that the LED elements 726 extend into the cavity 729 defined by the surfaces 744.

FIGS. 59A-62 and 65A-67D illustrate still further embodiments of waveguides that utilize the coupling portion 724 and the V-shaped surface 746. (As in the case of FIGS. 58A and 58B, FIGS. 59A and 60A not only illustrate alternative embodiments, but also show the embodiments of FIGS. 59B and 60B, respectively). The embodiments of these Figures are symmetric about a plane P (seen in FIGS. 59A and 59B) passing through the centers of the coupling sections and have a coupling portion 724 of limited size that can accommodate one or at most several LED elements. FIGS. 59A and 59B illustrate half and full circular waveguide bodies 712c, 712d, respectively, whereas FIGS. 60A and 60B depict half and full square waveguide bodies 712e, 712f, respectively. In the illustrated embodiments, the waveguide bodies 712c-712f have cross-sectional shapes similar or identical to the embodiments of FIGS. 43-46A, although any of these embodiments may have a different cross-sectional shape, if desired. Other similar shapes are also possible, such as quarter circular or quarter square shapes, or shapes that are other than circular or square.

The alternate embodiments distribute light in the fashion noted in connection with FIGS. 43-45A, and may be used in any luminaire, for example as disclosed herein, with suitable modifications as may be necessary or desirable to accommodate the different waveguide body shape. For example, any of the waveguide bodies disclosed herein may be used in the luminaire 760.

FIGS. 43, 44A, and 44B also disclose a waveguide body 712 having a central section 718 and a first and a second separate side sections 720, 722 that extend away from the central section 718 along first and second directions, respectively. The central section 718 includes a coupling portion 724 located in the central section 718.

In an embodiment, the waveguide body 712 includes a plurality of light extraction features 714 that extract out of the side sections 720, 722 of the waveguide body 712, emitted light generated by an LED light source proximal to the waveguide body 712. In another embodiment, each of the first and the second side sections 720, 722 has an upper and a lower surface 730, 732 and a first end 734 proximal to the coupling portion 724 and a second end 720a, 722a distal to the coupling portion 724. The first end 734 has a first thickness $T_1$, the second end has a second thickness $T_2$, and the first thickness $T_1$ is greater than the second thickness $T_2$. In a particular embodiment, for example, the first thickness $T_1$ is no greater than about 6 millimeters and the second thickness $T_2$ is no less than about 2 millimeters.

In still another embodiment, the coupling portion 724 of the waveguide body 712 curves upward towards the second end 720a.

In an embodiment, the upper surface 730 of the waveguide body 712 is textured. In a more particular embodiment, each of the plurality of light extraction features 714 is defined by a first surface 738, and an intermediate surface 740 extends from the first surface 738 to a second surface 742, as shown in FIGS. 46C, 46D, 46F, and 46H. All or some of the intermediate surfaces 740 may be planar or curved with each intermediate surface 740 having a curve of constant radius. In the latter case the surface 740 is preferably, although not necessarily, convex in cross section as seen in FIG. 46D. In some embodiments, the surface 740 may include a planar portion as well as a curved portion as shown in FIG. 46F. In other embodiments, all or some of the intermediate surfaces 740 may be scalloped as shown in FIGS. 46H-46K, in combination with the planar or constant radius curvature noted above. Additionally, all or some of the intermediate surfaces 740 may be textured while both or one of the surfaces 730, 742 are smooth, as seen in FIGS. 46F and 46H. Such texturing may be accomplished by cutting the surface with a polycrystalline diamond, or by any other suitable means. Surfaces 740 and/or extraction features 714 may be molded, embossed, or otherwise formed in one or both of the upper and lower surfaces 730, 732 of the waveguide 712. Alternatively, or in addition to, a film (not shown) including extraction features may be adhered, laminated, or otherwise secured to one or both of the upper and lower surfaces 730, 732 to effectuate light extraction.

In the embodiments shown in FIGS. 46F, 46G, 46H, and 46I, the surface 740 disclosed herein may have the dimensions noted in the following table. It should be noted that the dimensions in the following table as exemplary only and not limiting:

TABLE 3

| | NOMINAL DIMENSION (Millimeters—unless otherwise specified) |
| --- | --- |
| FIG. 46G | |
| H | 0.05 |
| I | 45 degrees |
| J | 0.005 (radius of curvature) |

TABLE 3-continued

| | NOMINAL DIMENSION (Millimeters—unless otherwise specified) |
|---|---|
| FIG. 46I | |
| K | 0.340 |
| L | 27.5 degrees |
| M | 0.175 (radius of curvature) |
| FIG. 46J | |
| N | 37.5 degrees |
| P | 0.050 |

In another embodiment, as seen in FIGS. 49 and 50, the intermediate surfaces 740 are planar, and the intermediate surfaces 740 are all parallel to one another, although the surfaces 740 need not all be planar or parallel. In another embodiment, the intermediate surfaces 740 are parallel to one another and are disposed at non-zero angles with respect to associated first and second surfaces 738, 740. The angle between each intermediate surface 740 and a line tangent to an adjacent associated surface 738 or 742 where the surface 738 or 742 meets the surface 740 may be relatively steep (for example, as seen in FIG. 49) or may be relatively shallow (e.g., as seen in FIG. 50). This angle (or any other related angle, such as the angle between the intermediate surface 740 and a line tangent to an adjacent associated surface 742 where the surface 742 meets the surface 740) and the size of each intermediate surface 740 affect the output distribution of light from the waveguide body 712.

In a more particular version of this embodiment, the first surface 738 is displaced from the second surface 742 by a particular distance and all of the distances between the first and the second surface of each of the plurality of light extraction features are equal. In a still more particular version of this embodiment, the intermediate surface 740 of each step of each of the plurality of extraction features 714 is angled at the same angle.

In one embodiment, the lower surface 732 of the first and the second side sections 720, 722 of the waveguide body 712 are textured. In a particular version of this embodiment, the lower surface 732 includes a plurality of extraction features 714, as discussed above.

As shown in FIG. 45A, the coupling portion 724 has a concave first surface 744 defining the cavity 729, and a curved V-shaped second surface 746 disposed opposite the concave first surface 744. The concave surface 744 may be textured so as to allow for better color mixing of the light. In one embodiment, the V-shaped second surface 746 is smooth and uncoated. In still another embodiment, the V-shaped second surface 746 may be a textured surface and, in a more particular embodiment, an optional layer of specular material 748 may be disposed on the V-shaped second surface 746, as shown in FIG. 48A.

The concave first surface 744 may include both a curved and linear portion, as shown as 802 and 808 in FIG. 63. Also, the surface of the central section 718 opposite the V-shaped second surface 746 may be curved in a gentle, parabolic manner as shown, for example in FIGS. 55A-57B and 63-64, in order to aid in collimating the reflected rays as the greater the curvature, the more collimated the rays. Referring to FIG. 63, the first surface 744 includes curved and linear portions 802a, 808a opposite respective curved and linear portions 802b, 808b. Such surfaces 802a, 808a and respective surfaces 802b, 808b may be mirror images of one another or have different geometries.

In the embodiments shown in FIGS. 72A and 72B, the waveguide 712 disclosed herein may have the dimensions noted in the following table. It should be noted that the dimensions in the following table as exemplary only and not limiting.

TABLE 4

| | NOMINAL DIMENSION (Millimeters—unless otherwise specified) |
|---|---|
| FIG. 72A | |
| AB | 563.355 |
| AC | 66.338 |
| AD | 1.956 |
| FIG. 72B | |
| AE | 2.850 |
| AF | 5.60 |
| AG | 0.20 |
| AH | 7.0 |
| AI | 3.965 |

In yet another embodiment, the waveguide body 712 may be made of a transparent acrylic.

Also disclosed is a coupling optic 800 for a waveguide body 712. As shown in FIG. 63, the coupling optic 800 includes a first coupling section 802 disposed in an input region 804 of the coupling optic 800, a first reflection portion 806 remote from the input region 804 and adapted to reflect light entering the first coupling section 802 into the waveguide body 712, and a second coupling section 808 disposed at the input region 804 and distinct from the first coupling section 802 and adapted to refract light entering the second coupling section 802 directly into the waveguide body 712.

In an embodiment, the coupling optic 800 has a first surface 810 that curves outward from a center of the coupling portion 724, and a second surface 812 that curves outward from the center of the coupling portion 724 wherein the second surface 812 is opposite the first surface 810. In one embodiment, both or one of the first and second surfaces 810, 812 may be parabolic in shape and centered on the light source 726. In another embodiment, one or both of the first and second surfaces 810, 812 may be "free formed" in that it is specifically designed to control the angles of the light rays or the spread of the collimated group of rays that are directed through the waveguide 712. In other embodiments, one or both of the first and second surfaces 810, 812 may be a combination of a parabolic and free formed shape. Additionally, referring to FIG. 63, the coupling optic 800 includes third and fourth surfaces 810b, 812b opposite respective first and second surfaces 810a, 812a. First and third surfaces 810a, 810b may be mirror images of each other or have different shapes. Similarly, second and fourth surfaces 812a, 812b may be mirror images of each other or have different shapes. The coupling optic 800 also has an end 814 distal to the center of the coupling portion 724, and a waveguide 712 is attached to the end 814. In a more specific version of the embodiment, the ends 814 of the first and second surfaces 810, 812 define a line that is approximately perpendicular to the first surface 810 and the second surface 812. Each of the first and second surfaces 810, 812 may be textured surfaces.

When in operation, the primarily lambertian distribution of light emitted from the LED element(s) 726 travels through the first coupling section 802 where it then strikes the first reflection portion 806. The surface of the first coupling section 802 redirects the light by TIR toward the second surface 812 or into the waveguide 712 as one set of substantially collimated or parallel rays of light that bounce due to total internal reflection between the upper and lower surfaces of the waveguide 712 until such rays exceed the critical angle of the material of the waveguide body 712 and escape.

FIGS. 70A and 70B illustrate a waveguide 900 comprising a waveguide body 902 and a series of LEDs 726 of any suitable type, including the types disclosed herein, disposed on a surface 904 of a substrate 906. The surface 904 may be coated with a specular or white reflective surface. The waveguide body 902 includes a coupling portion 908 similar or identical to the coupling portion 724 disclosed above. The side sections of previous embodiments are replaced by a single light emitting section 904 that may include stepped (or other shaped) extraction features, as disclosed previously. As in other embodiments light rays may be arranged into groups wherein the light rays of each group travel at angles within a desired range of one another, within the TIR limits of the waveguide body material, so that the light rays TIR at least once within the waveguide body.

FIGS. 73-86 illustrate yet another embodiment of a luminaire 1060 suspended from a ceiling. The luminaire 1060 includes one or more luminaire sections that are assembled together in end to end fashion as noted in greater detail hereinafter. The luminaire sections are preferably identical (with the exception of end caps as described below) and, while the drawings illustrate the use of two sections, any number of luminaire sections may be joined together to obtain a luminaire of desired length, with the only limitation on the number of sections being the electrical power available to energize the sections. Also, while the drawings illustrate that the luminaire 1060 is suspended from a ceiling at two ends 1062, 1064 thereof and that electrical power is supplied to the luminaire 1060 at the end 1062, it should be noted that the luminaire 1060 may be suspended from or mounted to any surface other than a ceiling, including a vertical or horizontal or inclined surface, and that the luminaire may have at least one, and preferably more than one suspension or mounting points located at the ends and/or intermediate portions of the luminaire 1060 and/or may receive power at more than one portion thereof, as necessary or desirable.

Referring specifically to FIGS. 73-75, the illustrated luminaire 1060 includes first and second luminaire sections 1070, 1072 that are joined together at an intermediate coupling section 1074. First and second suspension members 1076, 1078 include mounting plates 1080, 1082, respectively, adapted to be mounted to ceiling junction boxes (not shown) and aircraft cables 1084, 1086, respectively, that are secured as described hereinafter to the luminaire 1060. The first luminaire section 1070 includes a power input end cap 1090 disposed at the end 1062 and adapted to receive electrical power via a cord 1092. A further end cap 1094 is disposed at the end 1064.

Referring to FIGS. 76-80A and 80B, the section 1070 is hereinafter described in detail, it being understood that the section 1072 is identical thereto. The section 1070 includes a waveguide body 1100, a first hollow structural member 1102 disposed on a first side of the waveguide body 1100, and a second hollow structural member 1104 disposed on a second side of the waveguide body opposite the first side. Preferably, each of the first and second structural members is made of extruded aluminum, although any suitable material or combinations of materials could be used. The first and second structural members 1102, 1104 and the waveguide body 1100 are secured to one another by one or more fasteners, such as a bolt 1106 (FIG. 81A) that extends through a bore 1108 in the second structural member 1104, and further extends through aligned bores 1110, 1112 in the waveguide body 1100 and the first structural member 1102 (the bore 1112 is visible in FIG. 80B). A nut 1114 is threaded onto the bolt 1106.

A plurality of LEDs 1120 as described in connection with the preceding embodiments is disposed on a circuit board 1122 carried by the second structural member 1104 (FIGS. 80A and 81A). Referring specifically to FIG. 80A, the LEDs 1120 extend into the coupling cavity 1124 of the waveguide body 1100. The waveguide body 1100 is similar or identical to any of the waveguide bodies described hereinabove. Two optional elongate reflective strips 1130, 1132 (seen in FIGS. 80A, 80B, and 81A) are disposed between first and second side flanges 1134, 1136, respectively, and bottom surfaces 1138, 1140, respectively, of the waveguide body 1100. The reflective strips 1130, 1132 obscure the LEDs 1120 so that the LEDs 1120 cannot be directly observed.

The first structural member 1102 includes an opening 1140 (FIGS. 80B, 81A) that permits access to the hollow interior of the member 1102. A housing 1142 that contains one or more components of the circuit C and/or the circuit LC described above is disposed within the first structural member 1102 and the housing 1142 is secured therein in any suitable fashion. One or more communication components forming a part of the light control circuit LC, such as an RF antenna 1143 (FIG. 80B) that senses RF energy, may be disposed above the housing 1102 and a cover 1144 is secured by, for example, a snap fit, in the opening 1140 above the housing 1142 and the communication components. The communication components may be included, for example, to allow the luminaire 1060 to communicate with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Patent Application No. 61/932,058, filed Jan. 27, 2014, entitled "Enhanced Network Lighting," the disclosures of which are incorporated by reference herein. More generally, the control circuit LC includes at least one of a network component, an RF component, a control component, and a sensor. The cover 1144 may be made of plastic or any other non-electrically conductive material that allows transmission of electromagnetic waves therethrough.

Referring to FIGS. 81A-86, a male junction member 1150 is secured to a first end 1070a of the section 1070 by fasteners in the form of screws 1152 (FIG. 81A) that threadedly engage cylindrical surfaces 1154, 1155 formed in the first structural member 1102 and the second structural member 1104, respectively. A female junction member 1156 is secured to a second end 1072b of the section 1072 by further fasteners in the form of screws 1158 that are threaded into the cylindrical surfaces 1154, 1155 (the surfaces 1154, 1155 are visible in FIG. 80A and extend the full length of the section 1070, but need not do so, in which case the fasteners may engage other surfaces, as should be evident). Complementary first and second electrical connectors 1160, 1162 are electrically coupled to conductors in the form of wires 1164 that extend into the first structural member 1102 and interconnect with components of the circuit C and further extend into the second structural member 1104 and connect to the circuit board 1122. The first electrical connector 1160 is secured within an opening 1166 (FIG. 77) extending through the male junction member 1150 by any suitable means, such as a snap fit. Similarly, the second electrical connector 1162 is secured within an opening 1168 (FIG. 78)

extending through the female junction member 1156 by any suitable means, such as a snap fit.

Referring next to FIGS. 81A-86, a clamping member 1170 (FIGS. 81A-83, 85, and 86) includes an insulator plate 1172 that is secured by bolts or other fasteners 1172a to threaded bores, thereby capturing a circuit board 1173a and one or more optional sensors, such as a knob-shaped sensor 1173b, inside an opening 1174 (FIGS. 81A, 81B, 85, and 86). The circuit board 1173a and the sensor 1173b comprise an optional part of the control circuit LC and provide an indication of ambient lighting levels thereto. The insulator plate 1172 electrically isolates the circuit board 1173a. First and second clamping fasteners 1175a, 1175b extend through bores 1176a, 1176b in side portions 1178a, 1178b of the male junction member 1150 and into threaded bosses 1180a, 1180b (FIGS. 81A and 81B) of the clamping member 1170. The luminaire section 1070, as well as other sections, such as the section 1072, are preferably (although not necessarily) shipped with the clamping fasteners 1175a, 1175b only partially threaded into the threaded bosses 1180a, 1180b to facilitate assembly by an end user.

FIGS. 82-84 illustrate the process of assembling the sections 1070, 1072. FIG. 82 illustrates the male junction member 1150 disposed on the end 1070a of the section 1070 and the female junction member 1156 disposed on an end 1072b of the section 1072. Prior to assembly, the clamping member 1170 is loosely disposed on the male junction member 1150 due to the partial threading of the clamping fasteners 1175a, 1175b in the threaded bosses 1180a, 1180b, respectively. (The clamping fasteners 1175 are partially unthreaded out of the bosses 1180 if the fasteners are initially fully threaded therein so that the clamping member 1170 is allowed to move away from the male junction member 1150 before assembly.) Referring next to FIG. 83, the sections 1070 and 1072 are then aligned as shown and the sections 1070 and 1072 are then brought together and mated as seen in FIG. 84 such that two compression surfaces 1182 and 1184 (FIGS. 82 and 83) of the male junction member 1150 and the female junction member 1156, respectively, contact one another and such that locating pins 1186a-1186c are received within bores 1188a-1188c, respectively. The mating of the sections 1070 and 1072 causes the electrical connectors 1160, 1162 in the sections 1070, 1072 to engage with one another, and thereby cause the conductors 1164 to become interconnected so that electrical power can transfer between the sections 1070, 1072.

As seen in FIGS. 75, 76 and 81B, tightening the clamping fasteners 1175a, 1175b after mating of the sections 1070, 1072 causes upwardly facing projections 1190a-1190d of the clamping member 1170 to move upward as seen in the Figures and enter recesses 1192a-1192d in lower surfaces 1194, 1195 of the male and female junction members 1150, 1156 (the recesses 1192c, 1192d are not visible, but are mirror images of the recesses 1192a, 1192b, respectively, and are disposed on either side of the bore 1176b). Continued tightening of the clamping fasteners 1175a, 1175b causes angled surfaces 1196a-1196d of the projections 1190a-1190d to engage and slide upwards relative to angled surfaces 1197a-1197d that define the recesses 1192a-1192d. The angled surfaces 1196a-1196d and the angled surfaces 1197a-1197d are inclined at angles relative to a center line 1198 of the clamping member 1170 so that tightening of the clamping fasteners 1175a, 1175b results in placement of the clamping member 1170 in tension and placement of the surfaces 1182, 1184 in compression. Additional surfaces 1200, 1202 of the male junction member 1150 and surfaces 1204, 1206 of the female junction member 1156 (FIGS.

82-84) are also placed in compression as a result of tightening of the clamping fasteners 1175a, 1175b. The tolerances of the various parts and the degree to which the fasteners 1175 can be threaded into the bosses 1180 are such that the relative placement of the sections 1070 and 1072 can be adjusted. For example, tightening of one or both of the fasteners 1175a, 1175b to particular positions in the bosses 1180 may result in substantial horizontal alignment of the sections 1070, 1072. Tightening to other position in the bosses 1180 may result in a horizontal V-shape or horizontal inverted V-shape disposition of the sections 1070, 1072. Differential tightening of the fasteners 1175a, 1175b in the bosses 1180 may result in a side-to-side alignment or misalignment of the sections 1070, 1072. This adjustability permits installation in situations where vertical and side to side section placement must be controlled. Also, the locations of the locating pins 1186 and bores 1188, the surfaces 1182, 1184, 1200, 1202, 1204, and 1206 are such that substantial resistance against deflection forces in multiple planes is provided. The sections 1070, 1072 are thereby rigidly locked together in multiple planes, and sagging at such location is minimized, in turn minimizing overall sagging of the luminaire 1060.

Referring again to FIGS. 73-75, the power input end cap 1090 disposed at the end 1062 at least partially encloses the coupling section of the waveguide body and includes a mating electrical connector (not shown) identical to the electrical connector 1160 wherein the connector in the cap 1090 engages with the electrical connector 1162 in the end 1070b to receive electrical power via the cord 1092. In the illustrated embodiment the further end cap 1094 further encloses the coupling section of the waveguide body and is disposed at the end 1072a of the section 1072 and may include an electrical connector (also not shown) identical to the connector 1162 that engages the connector 1160 disposed at the end 1072a. The electrical connector 1212 in the end cap 1094 may complete a circuit as required to supply power to the LEDs 1120. Alternatively, if electrical connection(s) are not required at the end cap 1094, the electrical connector therein may be omitted.

As seen in FIG. 80A, the first structural member 1102 includes two elongate side slots 1220, 1222 that are adapted to receive and retain therein mounting apparatus including apertured tabs 1224a-1224d (FIGS. 73-75, 77, 78, and 81A). As seen in FIGS. 73-75, ends of main sections 1084a, 1086a of the aircraft cables 1084, 1086 may be secured to tubular members 1226, 1228 and auxiliary sections 1084b, 1086b of aircraft cables 1084, 1086 extend through aligned holes in the walls of the tubular members 1226, 1228 and are secured to the apertured tabs 1224a-1224d to mount the luminaire 1060.

In the preferred embodiment, each of the sections 1070, 1072 is 4 feet in length, although each section may be of any other length. Sections of the preferred size are easy to transport, do not noticeably sag, and are readily manufactured and handled. The shapes of the first and second structural members are such that the members do not significantly obstruct emitted light and are light and strong. Strength is further enhanced by the concave shape of the lower portion of the second structural member, which also adds aesthetic appeal and further allows sections to be nested together during shipment. The side slots 1220, 1222 may serve as a wire routing feature so that wire visibility is minimized. The side slots 1220, 1222 can also accommodate alternative mounting devices as desired, so that the luminaire 1060 can be mounted in other orientations, and/or to other structures.

Preferably, the angled surfaces 1196a-1196d have a length between about 4.82 mm and about 4.98 mm, and, more preferably between about 4.85 mm and about 4.95 mm. Further, the angled surfaces 1196a-1196d are disposed at angles between about 29 degrees and about 31 degrees, and, more preferably between about 29.5 degrees and about 30.5 degrees relative to the center line 1198. Still further, the angled surfaces 1197a-1197d preferably have a length between about 2.12 mm and about 2.28 mm, and, more preferably between about 2.15 mm and about 2.25 mm. Further, the angled surfaces 1197a-1197d are disposed at angles between about 34 degrees and about 36 degrees, and, more preferably between about 34.5 degrees and about 35.5 degrees relative to the center line 1198.

The present embodiment has an aspect ratio (i.e., the ratio of luminaire width to height excluding mounting components) of at least about 1.0, and more preferably at least about 2.0, and most preferably about 4.8. Also, the overall width of the mechanical components (excluding mounting components and optical components) as a ratio of the overall width of the luminaire (excluding mounting components) is desirably low, preferably no more than about 30 percent, more preferably no more than about 20 percent, and most preferably about 14.5 percent. Further, much of the light distribution is directed upwardly toward a ceiling, and the large optical component size results in low luminance and, therefore, less objectionable glare. Still further, the illumination of the optical surface of the luminaire is desirably close to the appearance of a ceiling illuminated by the luminaire, when viewed from below. In fact, luminance variations of about 6:1 or less are preferable, with luminance variations of less than about 3:1 being more preferable and luminance variations of less than about 2:1 being most preferable such that extreme observed variations are minimized. In addition, the use of LEDs results in a low power luminaire.

It should be noted that other alternatives are possible. For example, LEDs may be disposed on the bottom of the luminaire, but may not be disposed in a structural member, such as a housing, and the electronics including the power circuit C and/or the light control circuit LC may be disposed above the luminaire within or outside of a structural member, such as in or outside a housing. Alternatively, one or more components of the circuits C and/or LC and/or one or more other components may be disposed in the second structural member (see FIGS. 80A, 80B) and one or more LEDs may be disposed in the first structural member (in which case the waveguide body may be inverted), or all of the components of the circuits C, LC and all of the LEDs may be disposed in one of the first and second structural members, in which case the other of the first and second structural members may be omitted. The luminaire may be suspended from a top structural member, such as a top housing, and/or above a bottom structural member, such as a housing, or may be suspended from any other component or structure.

IV. INDUSTRIAL APPLICABILITY

In summary, the disclosed luminaire provides an aesthetically pleasing, sturdy, cost effective lighting assembly for use in lighting a large area such as an office or warehouse spaces. The lighting is accomplished with reduced glare as compared to conventional lighting systems.

The extraction features disclosed herein efficiently extract light out of the waveguide. At least some of the luminaires disclosed herein are particularly adapted for use in installations, such as, replacement or retrofit lamps, outdoor products (e.g., streetlights, high-bay lights, canopy lights), and indoor products (e.g., downlights, troffers, a lay-in or drop-in application, a surface mount application onto a wall or ceiling, a suspended fixture, a wall sconce, etc.) preferably requiring a total luminaire output of at least about 800 lumens or greater, and, in some embodiments, a total luminaire output of at least about 7000 lumens, although the total luminaire output depends in part on the desired application. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 4000 degrees Kelvin and about 5000 degrees Kelvin. Also, at least some of the luminaires disclosed herein preferably exhibit an efficacy of at least about 100 lumens per watt, and more preferably at least about 120 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 80 being more preferable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present disclosure, light is coupled into the optic, where primarily TIR is used for re-direction and collimation. This coupling allows the full range of angular emission from the source, including high-angle light, to be re-directed and collimated, resulting in higher optical efficiency in a more compact form factor.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of mixing features, extraction features, and redirection features necessary to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

In further summary, it has been found that when using a single color or multicolor LED element in a luminaire, it is desirable to mix the light output developed by the LEDs thoroughly so that the intensity and/or color appearance emitted by the luminaire is uniform. When the LED element is used with a waveguide, opportunities have been found to exist to accomplish such mixing during the light coupling and light guiding or distributing functions. Specifically, bending the light rays by refraction can result in improvement in mixing. In such a case, this refractive bending can be accomplished by providing interfaces in the waveguide between materials having different indices of refraction. These interfaces may define coupling features where light developed by the LED elements enters the waveguide and/or light redirection features at portions intermediate the coupling features and waveguide extraction features or areas where light is otherwise extracted (such as by bends) from the waveguide. It has further been found that directing light into a wide range of refraction angles enhances light mixing. Because the angle $A_r$ of a refracted light ray is a function of the angle $A_i$ between the incident light ray and the interface surface struck by the incident light ray (with refractive angle $A_r$ increasing as $A_i$ approaches zero, i.e., when the incident light ray approaches a parallel condition with respect to the interface surface), a wide range of refracted light ray angles can be obtained by configuring the interface surfaces to include a wide range of angles relative to the incident light rays. This, in turn, means that the interfaces could include a significant extent of interface surfaces that are nearly parallel to the incident light rays, as well as other surfaces disposed at other angles to the incident light rays. Overall waveguide shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) can be further improved by providing an increased number of interface surfaces and/or more complex interface shapes in the light path. Also, the spacing of coupling features and light redirection features affect the degree of mixing. In some embodiments a single light coupling feature and/or a single light redirection feature may be sufficient to accomplish a desired degree of light mixing. In other embodiments, multiple coupling features and/or multiple light redirection features might be used to realize a desired degree of mixing. In either event, the shapes of multiple coupling features or multiple redirection features may be simple or complex, they may be the same shape or of different shapes, they may be equally or unequally spaced, or distributed randomly or in one or more arrays (which may themselves be equally or unequally spaced, the same or different size and/or shape, etc.) Further, the interfaces may be disposed in a symmetric or asymmetric pattern in the waveguide, the waveguide itself may be symmetric or asymmetric, the waveguide may develop a light distribution that is symmetric, asymmetric, centered or non-centered with respect to the waveguide, the light distribution may be on-axis (i.e., normal to a face of the waveguide) or off-axis (i.e., other than normal with respect to the waveguide face), single or split-beam, etc.

Still further, one or more coupling features or redirection features, or both, may be disposed anywhere inside the waveguide, at any outside surface of the waveguide, such as an edge surface or major face of the waveguide, and/or at locations extending over more than one surface or portion of the waveguide. Where a coupling or light redirection feature is disposed inside the waveguide, the feature may be disposed in or be defined by a cavity extending fully through the waveguide or in or by a cavity that does not extend fully through the waveguide (e.g., in a blind bore or in a cavity fully enclosed by the material of the waveguide). Also, the waveguide of any of the embodiments disclosed herein may be planar, non-planar, irregular-shaped, curved, other shapes, suspended, etc.

While specific coupling feature and light redirection feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Thus, any one of the coupling cavities, plug members, LED elements, masking element(s), redirection features, extraction features, etc. as described herein may be used in a luminaire, either alone or in combination with one or more additional elements, or in varying combination(s) to obtain light mixing and/or a desired light output distribution. More specifically, any of the features described and/or claimed in U.S. patent application Ser. No. 13/842,521, now U.S. Pat. No. 9,519,095, U.S. patent application Ser. No. 13/839,949, now U.S. Pat. No. 9,581,751, U.S. patent application Ser. No. 13/841,074, filed Mar. 15, 2013, now U.S. Pat. No. 9,625,638, entitled "Optical Waveguide Body", U.S. patent application Ser. No. 13/840,563, U.S. patent application Ser. No. 14/101,086, now U.S. Pat. No. 10,436,969, filed Dec. 9, 2013, entitled "Optical Waveguides and Luminaires Incorporating Same" by Keller et al., U.S. patent application Ser. No. 14/101,099, filed Dec. 9, 2013, now U.S. Pat. No. 9,411,086, entitled "Optical Waveguide Assembly and Light Engine Including Same" by Yuan et al., U.S. patent application Ser. No. 14/101,132, filed Dec. 9, 2013, now U.S. Pat. No. 9,442,243, entitled "Waveguide Bodies Including Redirection Features and Methods of Producing Same" by Tarsa, U.S. patent application Ser. No. 14/101,147, filed Dec. 9, 2013, now U.S. Pat. No. 9,869,432, entitled "Luminaires Using Waveguide Bodies and Optical Elements" by Keller et al., U.S. patent application Ser. No. 14/101,129, filed Dec. 9, 2013, now U.S. Pat. No. 10,234,616, entitled "Simplified Low Profile Module with Light Guide for Pendant, Surface Mount, Wall Mount, and Stand Alone Luminaires" by Tarsa et al., U.S. patent application Ser. No. 14/101,051, filed Dec. 9, 2013, now U.S. Pat. No. 9,366,396, entitled "Optical Waveguide and Lamp Including Same" by Yuan et al. and International Application No. PCT/US14/13931, filed Jan. 30, 2014, entitled "Optical Waveguides and Luminaires Incorporating Same", incorporated by reference herein, may be used in the devices disclosed herein. Thus, for example, any of the waveguides or luminaires disclosed herein may include one or more coupling features or optics, a modified LED arrangement, one or more light redirection features, one or more extraction features, and/or particular waveguide or overall luminaire shapes and/or configurations as disclosed in such applications, as necessary or desirable. Other luminaire and waveguide form factors than those disclosed herein are also contemplated.

The coupling features disclosed herein efficiently couple light into the waveguide, and the redirection features uniformly mix light within the waveguide and the light is thus conditioned for uniform extraction out of the waveguide. At least some of the luminaires disclosed herein are particularly adapted for use in installations, such as, replacement or retrofit lamps (e.g., LED PAR bulbs), outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 800 lumens or greater, and, more preferably, a total luminaire output of at least about 3000 lumens, and most preferably a total lumen output of about 10,000 lumens. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably about 2700 degrees Kelvin. Also, at least some of the luminaires disclosed herein preferably exhibit an efficacy of at least about 100 lumens per watt, and more preferably at least about 120 lumens per watt, and further exhibit a coupling efficiency of at least about 92 percent. Further, at least some of the luminaires disclosed herein preferably exhibit an overall efficiency (i.e., light extracted out of the waveguide divided by light injected into the waveguide) of at least about 85 percent. A color rendition index (CRI) of at least about 80 is preferably attained by at least some of the luminaires disclosed herein, with a CRI of at least about 88 being more preferable. A gamut area index (GAI) of at least about 65 is achievable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

| | State-of-the Art Standards | Improved Standards Achievable by Present Embodiments |
|---|---|---|
| Input (coupling + waveguide) | 90% | Almost 95%: improved through color mixing, source mixing, and control within the waveguide. |
| Output (extraction) | 90% | About 95%: improved through extraction efficiency. |
| Total system | ~80% | About 90%: greater control, many choices |

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

All references, including publications, patent applications, and patents, cited herein are hereby incorporated by reference to the same extent as if each reference were individually and specifically indicated to be incorporated by reference and were set forth in its entirety herein.

The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The use of the terms "a" and "an" and "the" and similar references in the context of the present disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A luminaire, comprising:
a housing configured for mounting in a structural surface;
a waveguide coupled to the housing and positioned transverse to the structural surface, the waveguide comprising a light input end, a bottom end, a first side and an opposing second side extending from the light input end to the bottom end, the first side forming a primary light output side of the waveguide and the second side oriented to face toward a first top panel in the direction of a wall such that first side outputs more light than the second side; and
one or more light-emitting elements disposed at the light input end of the waveguide;
wherein;
the primary light output side of the waveguide comprises a plurality of light extraction features forming an array extending from the light input end to the bottom end;
the primary light output side is angled relative to a height of the housing in a vertical direction; and
the bottom end of the waveguide defines at least a portion of a bottom edge of the luminaire.

2. The luminaire of claim 1, wherein the housing comprises a first top panel and a second top panel opposite the first top panel, wherein the primary light output side faces the second top panel.

3. The luminaire of claim 1, wherein the waveguide is oriented in a vertical position.

4. The luminaire of claim 1, wherein the light input end is positioned at a top of the waveguide.

5. The luminaire of claim 1, wherein the housing is configured for mounting in a ceiling.

6. The luminaire of claim 1, wherein an additional plurality of light extraction features are on the second side of the waveguide.

7. The luminaire of claim 1, wherein the plurality of light extraction features comprises a pattern of regularly spaced light extraction features.

8. The luminaire of claim 1, wherein the plurality of light extraction features comprises a pattern of irregularly spaced light extraction features.

9. The luminaire of claim 1, wherein the plurality of light extraction features comprises elongated grooves on the primary light output side of the waveguide.

10. The luminaire of claim 1, further comprising a reflective material to redirect light that exits the waveguide.

11. The luminaire of claim 1, wherein the primary output side is angled in a range from 25 to 46 degrees from the vertical direction.

12. A troffer-style luminaire, comprising:
a troffer housing defining an interior recess, the troffer housing comprising a first side panel, and a second side panel that is opposite the first side panel, the troffer housing being configured for mounting in a ceiling;
a waveguide comprising a coupling end, a bottom end, a first side and an opposing second side extending from the coupling end to the bottom end, the first side forming a primary light output side of the waveguide and the second side oriented to face toward the first top panel in the direction of a wall such that first side outputs more light than the second side, the waveguide being arranged in a position such that the bottom end of the waveguide defines a depth of the interior recess; and one or more light-emitting elements arranged at the coupling end of the waveguide;

wherein the primary light output side of the waveguide comprises a plurality of light extraction features forming an array extending from the coupling end to the bottom end, and the primary light output side is angled relative to the depth of the interior recess in a vertical direction, and the bottom end of the waveguide defines at least a portion of a bottom edge of the troffer-style luminaire.

13. The troffer-style luminaire of claim 12, wherein the coupling end of the waveguide is positioned at the top of the waveguide.

14. The troffer-style luminaire of claim 12, wherein the primary light output side faces the interior recess.

15. The troffer-style luminaire of claim 12, wherein the plurality of light extraction features comprises elongated grooves on the primary light output side.

16. The troffer-style luminaire of claim 12, further comprising a reflective material to redirect light that exits the waveguide.

17. A luminaire, comprising:

a housing comprising at least one side panel, the housing being configured for mounting in a structural surface;

a plurality of waveguides arranged within the housing and positioned transverse to the structural surface, each of the plurality of waveguides comprising a light input end, a bottom end, a first side and an opposing second side extending from the light input end to the bottom end, the first side forming a primary light output side of the waveguide and the second oriented to face toward the first top panel in the direction of a wall such that the first side outputs more light than the second side; and one or more light-emitting elements disposed at the light input end of each of the plurality of waveguides;

wherein the primary light output side of each waveguide comprises a plurality of light extraction features forming an array extending from the light input end to the bottom end, and the primary light output side is angled relative to a height of the housing in a vertical direction, and the bottom end of each waveguide defines at least a portion of a bottom edge of the luminaire.

18. The luminaire of claim 17, wherein the plurality of waveguides comprises at least two waveguides arranged side-by-side.

19. The luminaire of claim 17, further comprising an elongate housing, the elongate housing connecting to the light input end of each waveguide of the plurality of waveguides.

20. The luminaire of claim 19, wherein the one or more light-emitting elements are disposed within the elongate housing.

21. The luminaire of claim 17, wherein an additional plurality of light extraction features are on the second side of the waveguide.

* * * * *